US012454539B2

(12) United States Patent
Htoo et al.

(10) Patent No.: US 12,454,539 B2
(45) Date of Patent: Oct. 28, 2025

(54) CONTROLLED-DELIVERY CROMAKALIM PRODRUGS

(71) Applicants: Qlaris Bio, Inc., Wellesley, MA (US); Mayo Foundation for Medical Education and Research, Rochester, MN (US)

(72) Inventors: Thurein M. Htoo, Waban, MA (US); Barbara M. Wirostko, Park City, UT (US); Michael P. Fautsch, Rochester, MN (US); Ian Garnett, Didcot (GB); Chiara Massarenti, Oxford (GB)

(73) Assignees: Qlaris Bio, Inc., Dedham, MA (US); Mayo Foundation for Medical Education and Research, Rochester, MN (US)

( * ) Notice: Subject to any disclaimer, the term of this patent is extended or adjusted under 35 U.S.C. 154(b) by 812 days.

(21) Appl. No.: 17/836,871

(22) Filed: Jun. 9, 2022

(65) Prior Publication Data

US 2022/0324890 A1 Oct. 13, 2022

Related U.S. Application Data

(63) Continuation of application No. PCT/US2020/064629, filed on Dec. 11, 2020.

(60) Provisional application No. 62/947,342, filed on Dec. 12, 2019.

(51) Int. Cl.
C07F 9/6558 (2006.01)

(52) U.S. Cl.
CPC ................. C07F 9/65586 (2013.01)

(58) Field of Classification Search
CPC ..................................... C07F 9/65586
See application file for complete search history.

(56) References Cited

U.S. PATENT DOCUMENTS

| | | | |
|---|---|---|---|
| 2,986,573 A | 5/1961 | Topliss et al. |
| 3,251,837 A | 5/1966 | Holland et al. |
| 3,361,816 A | 1/1968 | Topliss et al. |
| 4,200,640 A | 4/1980 | Nagano et al. |
| 4,409,222 A | 10/1983 | Arrigoni-Martelli |
| 4,616,012 A | 10/1986 | Neustadt et al. |
| 4,634,698 A | 1/1987 | Andrews et al. |
| 5,013,853 A | 5/1991 | Gericke et al. |
| 5,328,830 A | 7/1994 | Janis et al. |
| 5,565,560 A | 10/1996 | Goulet et al. |
| 5,965,620 A | 10/1999 | Sorgente et al. |
| 5,985,856 A | 11/1999 | Valentino et al. |
| 6,242,443 B1 | 6/2001 | Nordisk |
| 6,572,848 B1 | 6/2003 | Breton et al. |
| 6,872,838 B2 | 3/2005 | Zygmunt et al. |
| 7,186,707 B2 | 3/2007 | Prokai et al. |
| 8,063,054 B2 | 11/2011 | Lazdunski et al. |
| 10,981,951 B2 | 4/2021 | Fautsch et al. |
| 2006/0025386 A1 | 2/2006 | Lazdunski et al. |
| 2009/0149451 A1 | 6/2009 | Cowen |
| 2010/0113379 A1 | 5/2010 | Rubinsztein et al. |
| 2013/0150329 A1 | 6/2013 | Singh et al. |
| 2014/0221326 A1 | 8/2014 | Demopulos et al. |
| 2017/0002040 A1 | 1/2017 | Fautsch et al. |
| 2017/0165241 A1 | 6/2017 | Markowitz et al. |
| 2018/0134761 A1 | 5/2018 | Lindhout et al. |
| 2018/0243281 A1 | 8/2018 | Andres et al. |
| 2019/0224217 A1 | 7/2019 | Hazan et al. |
| 2021/0040148 A1 | 2/2021 | Fautsch et al. |
| 2022/0387457 A1 | 12/2022 | Htoo et al. |

FOREIGN PATENT DOCUMENTS

| | | |
|---|---|---|
| EP | 120428 | 10/1984 |
| EP | 366273 | 5/1990 |
| JP | 2011/136923 | 7/2011 |
| WO | WO1989/05808 | 6/1989 |
| WO | WO1989/10757 | 11/1989 |
| WO | WO1991/08741 | 6/1991 |
| WO | WO2013/130411 | 9/2013 |
| WO | WO2015/117024 | 6/2015 |

OTHER PUBLICATIONS

U.S. Appl. No. 17/991,558, Fautsch et al., Nov. 21, 2022.
Attwood et al., "Synthesis of Homochiral Potassium Channel Openers: Role of the Benzopyranyl 3-Hydroxyl Group in Cromakalim and Pyridine N-Oxides in Determining the Biological Activities of Enantiomers" Bioorg. Med. Chem. Lett. 1992, 2, 229.
Ashwood et al., "Synthesis and antihypertensive activity of 4-(cyclic amido)-2h-1-benzopyrans," J. Med. Chem. 29:2194-2201, Jan. 1, 1986.
Barot, M. et al., "Prodrugs strategies in ocular drug delivery," Accessed Jul. 6, 2018. Medicinal Chemical (2012), vol. 8, pp. 753-768; 2012.
Brayden, J.E. et al., "Role of Potassium Channels in the Vascular Response to Endogenous and Pharmacological Vasodilators" Blood Vessels, 1991, 28, 147.
Buckle et al., "Structural Modifications of the Potassium Channel Activator Cromakalim: The C-3 Position" J. Chem. Soc. Perkin Trans. 1991, 1, 63-70.
Cecchetti et al., "From Cromakalim to Different Structural Classes of KATP Channel Openers" Current Topics in Medicinal Chemistry, 2016, 6(10):1049-1068.
Chiang et al., "Effect of cromakalim and nicorandil on intraocular pressure after topical administration in rabbit eyes," J. Ocular Pharmacol Therapeut., 11(3): 195-201, Jan. 1, 1995.
Chowdhury, Uttio Roy et al. "Pharmacological Profile and Ocular Hypotensive Effects of Cromakalim Prodrug 1, a Novel ATP-Sensitive Potassium Channel Opener, in Normotensive Dogs and Nonhuman Primates," Journal of Ocular Pharmacology and Therapeutics, vol. 37, No. 5, 2021, pp. 251-260.

(Continued)

Primary Examiner — Andrew D Kosar
Assistant Examiner — John D McAnany
(74) Attorney, Agent, or Firm — Knowles Intellectual Property Strategies, LLC

(57) ABSTRACT

The present invention provides cromakalim phosphate prodrugs, compositions, and their use for the modulation of ATP-sensitive potassium ($K_{ATP}$) channels for therapeutic purposes.

19 Claims, No Drawings

(56) References Cited

OTHER PUBLICATIONS

Chowdhury, U.R., et al. "ATP-Sensitive Potassium (KATP) Channel Openers Diazoxide and Nicorandil Lower Intraocular Pressure in Vivo." Investigative Ophthalmology and Visual Science. Accessed Jul. 6, 2018 (Jul. 2013), vol. 54, No. 7, pp. 4892-4899 (Year: 2013).
Chowdhury et al., "Analogs of the ATP-Sensitive Potassium (KATP) Channel Opener Cromakalim with in Vivo Ocular Hypotensive Activity," J. Med. Chem., 59(13):6221-6231, 2016.
Chowdhury et al., "ATP-Sensitive Potassium (KATP) Channel Activation Decreases Intraocular Pressure in the Anterior Chamber of the Eye," IOVS., 52(9):6435-6442, Aug. 2011.
Chowdhury et al., "ATP sensitive potassium channel openers: A new class of ocular hypotensive agents," Experimental Eye Research, 158:85-93, 2017.
Chowdhury et al., "ATP-sensitive potassium (KATP) channel openers diazoxide and nicorandil lower intraocular pressure by activating the Erk 1/2 signaling pathway," PLOS One., Jun. 8, 2017, 18 pages.
Chowdhury et al., "Effect of Cromakalim Prodrug 1 (CKLP1) on Aqueous Humor Dynamics and Feasibility of Combination Therapy with Existing Ocular Hypotensive Agents," IOVS., 58:5731-5742, 2017.
Chowdhury et al., "Ocular Hypotensive Effects of the ATP Sensitive Potassium Channel Opener Cromakalim in Human and Murine Experimental Model Systems," PLOS ONE., 10(11):e0141783, Nov. 4, 2015, 16 pages.
Chowdhury, et al. "Pharmacology and Safety profile of the ATP-sensitive potassium channel opening prodrug CKLP1 in preclinical large animal models," Ocular hypertension abstract—TM Society—Dec. 10, 2021.
Chowdhury, et al. Effect of ATP-sensitive Potassium Channel Openers on Intraocular Pressure in Ocular Hypertensive Animal Models, Glaucoma, IOVS, vol. 63, No. 2, Article 15:3, Feb. 7, 2022, 11 pages.
Enzo Life Sciences. "Diazoxide." © Product Sheet. Aug. 19, 2009. Accessed Jul. 9, 2018. Available from: < http://www.enzolifesciences.com/ALX-550-260/diazoxide/> (Year: 2009).
Ettaiche, et al., "ATP-sensitive potassium channels (K(ATP)) in retina: a key role for delayed ischemic tolerance" Brain Research Jan. 26, 2001, 890, 118-129.
Fautsch, Michael et al. "Effect of ATP-Sensitive Potassium ($K_{ATP}$) Channel Openers on Intraocular Pressure (IOP) and Aqueous Humor Dynamics in Preclinical Ocular Hypertensive Models," Ocular hypertension, ISER, Oct. 2021, 1 page.
Fautsch, Michael et al. "Effect of ATP-sensitive potassium channel openers on intraocular pressure in ocular hypertensive animal models," Pharmacology abstract—TM Society—Dec. 11, 2021.
Howe, C.L. et al., "Neuroprotection mediated by inhibition of calpain during acute viral encephalitis" Scientific Reports 2016, 6, 28699.

International Search Report and Written Opinion for PCT/US20/64629, dated Apr. 13, 2021, 10 pages.
Ghelardini, C., et al. "Influence of potassium channel modulators on cognitive processes in mice." Accessed Jul. 9, 2018. (1998) British Journal of Pharmacology. vol. 123, pp. 1079-1084. (Year: 1998).
Glaucome Center of Excellence. Johns Hopkins University. "Can glaucoma be cured?" © Nov. 8, 2012. Accessed Jul. 6, 2018. Available from: <https://www.hopkinsmedicine.org/wilmer/services/glaucome/book/chapter_can_glaucoma_be_cured.html> (Year: 2012).
Kumari, A., et al., "Ocular inserts—Advancement in therapy of eye diseases." J. Adv. Pharm. Technol. Res. Accessed Jul. 6, 2018. (printable> (Year: 2010).
Mainolfi, N., et al. "An Effective Prodrug Strategy to Selectively Enhance Ocular Exposure of a Cannabinoid Receptor (CB1/2) Agonist." Accessed Jul. 6, 2018. J. Med. Chem. (2013), vol. 56, pp. 5464-5472. (Year: 2013).
Sebille et al., "Recent Developments in the Chemistry of Potassium Channel Activators: The Cromakalim Analogs" Current Medicinal Chemistry May 1, 2004, 11(9):1213-1222.
Steel, Cynthia L. "Preclinical Efficacy and Safety Profile of QLS-101, a Novel ATP-Sensitive Potassium Channel Opener for the Reduction of IOP," AOPT Talk, Qlaris Bio, Inc., Feb. 24, 2021.
Steel, Cynthia L., et al. "Preclinical Efficacy and Safety Profile of a Novel Episcleral Venous Pressure (EVP)-Lowering Agent," American Glaucoma Society—Poster Feb. 15, 2021; 1 page.
Steel, Cynthia L., et al. "Ocular Tissue Conversion and Activity Profile of QLS-101, a Novel Topical IOP-Lowering Therapeutic," Association for Research in Vision and Ophthalmology (ARVO), Qlaris Bio, Inc. Poster, Apr. 15, 2021; 1 page.
Steel, Cynthia L., et al. "Ocular hypotensive properties and biochemical profile of QLS-101, a novel ATP-sensitive potassium (KATP) channel opening prodrug," Qlaris Bio, Inc., Association for Ocular Pharmacology and Therapeutics (AOPT)—presentation Feb. 24, 2021.
Torrejon, Karen Y., et al. "Use of a Novel Potassium Channel Opener in a 3D-Glaucomatous Human Trabecular Meshwork/Schlemm's Canal Tissue Model," Association for Research in Vision and Ophthalmology, Glauconix Poster—Preclinical data Apr. 15, 2021; 1 page.
Patel, A., et al. "Ocular drug delivery systems: An overview." Accessed Jul. 6, 2018. World J. Pharmacol. (2013), vol. 2, Issue 2, pp. 47-64. Available from: <https://www.ncbi.nlm.nih.gov/pmc/articles/PMC4289909/pdf/nihms641436.pdf> (Year: 2013).
Quast, U. et al., "In vitro and in vivo comparison of two K + channel openers, diazoxide and cromkalim, and their inhibition by glibenclamide" Journal of Pharmacology and Experimental Therapeutics 1989, 250, 261.
Rautio et al., "Prodrugs: design and clinical application," Nat. Rev. Drug Discov., 7(3):255-270, Mar. 2008, 16 pages.
Wirostko, Barbara M., et al. "Systemic and Ocular Toxicology and Pharmacokinetic Profiles of QLS-101, a Novel topical IOP-Lowering Therapeutic," Association for Research in Vision and Ophthalmology Qlaris Poster—In vivo preclinical data Apr. 14, 2021; 1 page.

CONTROLLED-DELIVERY CROMAKALIM PRODRUGS

CROSS-REFERENCE TO RELATED APPLICATIONS

This application is a continuation of International Patent Application No. PCT/US2020/064629, filed in the U.S. Receiving Office on Dec. 11, 2020, which claims the benefit of U.S. Provisional Application No. 62/947,342 filed Dec. 12, 2019. The entirety of each of these application is hereby incorporated by reference herein for all purposes.

STATEMENT REGARDING FEDERALLY SPONSORED RESEARCH OR DEVELOPMENT

This invention was made with government support under Grant No. R01 EY21727 awarded by the National Institutes of Health. The government has certain rights in the invention.

BACKGROUND OF THE INVENTION

Potassium channels are membrane proteins that regulate selective flow of potassium ions across the cell membrane, which in turn generate electrical signals in cells and set or reset the cell's resting membrane potential.

ATP-sensitive potassium ($K_{ATP}$) channels play an important role in controlling and regulating cellular functions in response to metabolic states. These channels are gated by intracellular nucleotides ATP and ADP and are expressed on the plasma membrane of cells in multiple organs, including the brain, lungs, heart, pancreas, pituitary gland, skeletal and smooth muscle, vascular tissue, the central nervous system, hair follicles, and ocular tissue. The inhibition by intracellular ATP of $K_{ATP}$ channels allows cells to couple the cellular metabolic state to the electrical activity of the cell membrane.

Pharmacological agents that activate (open) or inhibit (close) $K_{ATP}$ channels may have important clinical applications. Channel openers allow $K^+$ efflux out of the cell, leading to a decrease in membrane potential and hyperpolarization. This then causes the closure of voltage-gated calcium channels in the cell membrane and vascular muscle relaxation (vasodilation). Conversely, inhibition (closing) of vascular $K^+$ channels decreases $K^+$ efflux and opens calcium channels, increasing intracellular calcium levels leading to depolarization and vasoconstriction.

$K_{ATP}$ channels were first discovered in the heart (Noma, A. Nature, 1983, 305, 147). Since then it has been discovered that $K_{ATP}$ channels play an important role in managing cardiac stress, including ischemic insult. $K_{ATP}$ channels are also prevalent in vascular smooth muscle where they help to maintain and regulate vessel tone. Inhibition of $K_{ATP}$ channels in vascular smooth muscle ultimately causes a decrease in vessel diameter and a heightened vascular resistance. Activation of the channels leads to the reverse: an increase in vessel diameter and a decreased vascular resistance. Therefore, $K_{ATP}$ channels play an important role in the regulation of vasodilation and vasoconstriction in response to endogenous factors and pharmaceutical products.

Patent filings that describe $K_{ATP}$ channel openers and their uses include U.S. Pat. Nos. 2,986,573; 3,361,816; 4,200,640, 4,409,222; 5,013,853; 5,328,830; 5,965,620 and PCT Application No. WO8910757. Cromakalim and diazoxide were reported to lower blood pressure in Quast, U. et al. J Pharmacol Exp Ther 1989, 250, 261. Publications by Chowdhury et al. describe the use of diazoxide and nicorandil ("ATP-Sensitive Potassium (KATP) Channel Openers Diazoxide and Nicorandil Lower Intraocular Pressure" IOVS, 2013, 54, 4894 and "ATP-Sensitive Potassium (KATP) Channel Activation Decreases Intraocular Pressure in the Anterior Chamber of the Eye" IOVS, 2011, 52, 6435). Cromakalim placed in membrane patches from rabbit mesenteric arterial smooth muscle cells increases the open-state probability ($P_{open}$) of single $K_{ATP}$ channels more than 9-fold in the presence of ATP (Brayden, J. E. et al., Blood Vessels, 1991, 28, 147). Other potassium channel openers include pinacidil and minoxidil sulfate, which act as vasodilators in vitro and in vivo.

Cromakalim exists as a mixture of diastereomers in the trans-configuration (a mixture of (3R,4S) and (3S,4R) diastereomers wherein the (3R,4S) and (3S,4R) diastereomers are enantiomers of each other).

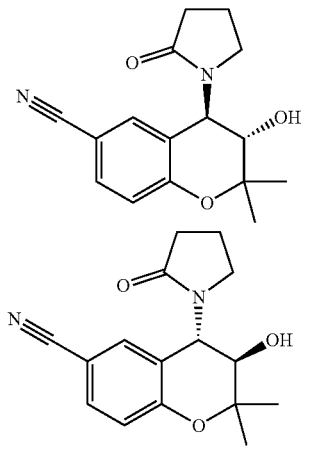

Cromakalim (mixture trans-diastereomers)

The (3S,4R)-enantiomer is also referred to as (−)-cromakalim or levcromakalim and the (3R,4S)-enantiomer is also referred to as (+)-cromakalim or dexcromakalim:

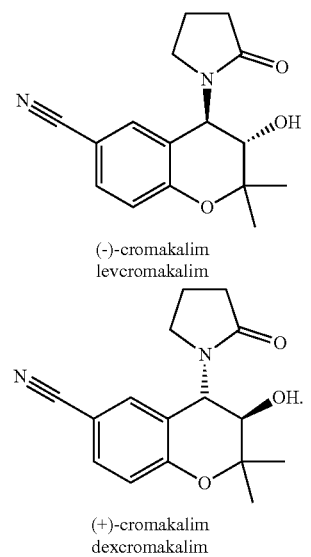

(−)-cromakalim
levcromakalim (+)-cromakalim
dexcromakalim

The majority of cromakalim's reported activity stems from the (3S,4R)-enantiomer, levcromakalim (Ashwood et al. Synthesis and Antihypertensive Activity of 4-(Cyclic Amido)-2H-1-benzopyrans" *J. Med. Chem.* 1986, 29, 2194 and Attwood et al. "Synthesis of Homochiral Potassium Channel Openers: Role of the Benzopyranyl 3-Hydroxyl Group in Cromakalim and Pyridine N-Oxides in Determining the Biological Activities of Enantiomers" *Bioorg. Med. Chem. Lett.* 1992, 2, 229).

Cromakalim and its use as an anti-hypertensive was first described in European Patent EP 0120428B1 assigned to the Beecham Group, Inc. Further disclosures on cromakalim's effect on intraocular pressure and glaucoma include PCT Application WO 89/10757; Lin et al., "Effects of Cromakalim and Nicorandil on Intraocular Pressure after Topical Administration in Rabbit Eyes" *Journal of Ocular Pharmacology and Therapeutics,* 1995, 11, 195; and Roy Chowdhury et al., "Ocular Hypotensive Effects of the ATP-Sensitive Potassium Channel Opener Cromakalim in Human and Murine Experimental Model Systems" *PLOS One,* 2015, 10, e0141783.

While cromakalim has established activity as a potassium channel opener and vasodilator, it is substantially insoluble in water. The lipophilicity of cromakalim has limited its usefulness for certain in vivo applications. Cromakalim is often solubilized with DMSO or cremophor, which is also used for the non-water-soluble drug taxol. Cremophor in particular has toxic side effects.

In response to the need to create a levcromakalim formulation that has appropriate properties for administration into aqueous environments in vivo, Mayo Foundation for Medical Education and Research and Reagents of the University of Minnesota created the phosphate ester prodrug CKLP1 (see WO 2015/117024), which can be in the form of a disodium salt.

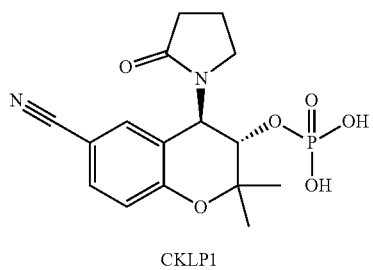 [SMILES: CC1(C)Oc2ccc(C#N)cc2[C@@H](N2CCCC2=O)[C@@H]1OP(=O)(O)O]

CKLP1

CKLP1 provides the improvement of increased water solubility for ease of administration in combination with typically rapid hydrolysis in vivo to the parent levcromakalim (depending on the concentration of alkaline phosphatase enzyme). In this way, CKLP1 overcomes one of the challenges of levcromakalim therapy without loss of the efficiency or timing of dosage. See also Roy Chowdhury et al. "Analogs of the ATP-Sensitive Potassium (KATP) Channel Opener Cromakalim with in Vivo Ocular Hypotensive Activity" *J. Med. Chem.* 2016, 59, 6221.

CKLP1 is a prodrug of levcromakalim. The phosphate prodrug is more water soluble than levcromakalim and is reported to lower intraocular pressure (IOP) with once daily dosing in a normotensive mouse model. The effect of CKLP1 on episcleral venous pressure and distal outflow resistance was described in Roy Chowdhury et al. "Effect of Cromakalim Prodrug 1 (CKLP1) on Aqueous Humor Dynamics and Feasibility of Combination Therapy with Existing Ocular Hypotensive Agents" *IOVS,* 2017, 58, 5731 and pharmacokinetic parameters in rabbits following topical and intravenous administration was described in Roy Chowdhury et al. "Pharmacological and pharmacokinetic profile of the novel ocular hypotensive prodrug CKLP1 in Dutch-belted pigmented rabbits" PLOS One, 15, e0231841). The synthesis of CKLP1 and the corresponding (3R,4S)-enantiomer is described in Roy Chowdhury et al. (*J. Med. Chem.* 2016, 59, 6221).

Despite the progress made in the area of potassium channel openers for therapeutic purposes, it would be useful to provide additional compounds with differing properties for a variety of therapeutic applications, methods of use thereof, and advantageous formulations that can modify metabolic signaling through the potassium channel pathway to treat responding disorders in patients in need thereof.

SUMMARY OF THE INVENTION

It has been discovered that cromakalim, and in one embodiment, levcromakalim, can be administered in a unique controlled delivery regime by administering it as a dimeric or trimeric prodrug or a pharmaceutically acceptable salt thereof linked via one or more phosphate ester moieties. In one embodiment, the novel dimeric and trimeric prodrugs allow for tunable kinetics wherein depending on the phosphate ester linkage, the two or three moieties of levcromakalim are converted at different rates, for example, one moiety is released more quickly than the one or two others. The second remaining moiety may be converted slowly over time. This allows for a controlled drug delivery regime with the dual ability to provide multiple rates of release over an extended period of time.

The compounds of the present invention are more lipophilic than the previously disclosed CKLP1, and instead of almost instant hydrolysis to the parent cromakalim, they are thus capable of more complex release of the active moiety over time. The compound can be administered in a more lipophilic formulation than CKLP1, rendering it useful for administration to lipophilic tissues internally as well as externally, and in some embodiments, with more ease than cromakalim itself.

The dimeric or trimeric cromakalim prodrug or its pharmaceutically acceptable salts can include a cromakalim moiety that is either the (−)(3S,4R)-enantiomer (levcromakalim) or the (+) (3R,4S)-enantiomer (+)-cromakalim) or any mixture thereof. It can be used as the free acid if existing in the molecule or a fully or partially neutralized acid. In one embodiment, the pH of the pharmaceutical formulation that includes the novel dimeric or trimeric cromakalim prodrug is adjusted using a pharmaceutically acceptable base to the desired pH level for pharmaceutical administration, often between about 5.5 or 6.5 and 8.5, and more typically between 6.5 and 8.

At physiological pH, a compound of the present invention with a free acid will exist in equilibrium with the fully ionized or, in one embodiment, the partially ionized form. For example, the pH of the eye is approximately 7.4-7.6 and is mostly composed of water. Therefore, the free hydroxyls of the compounds of the present invention will exist in the body as the corresponding ionized form (due to the natural equilibrium in a slightly basic solution). This ionized form will then degrade to cromakalim, and in one embodiment, levcromakalim.

The disclosed compound or its pharmaceutically acceptable salts can be used to treat a disorder that responds to the modulation of ATP-sensitive potassium ($K_{ATP}$) channels, including those that are treated via vasodilation and increased blood flow and/or decreased vascular and/or fluid resistance. In one embodiment, the treatment is accomplished without substantial hyperemia. Selected compounds of the present invention can be used to increase tissue perfusion and thus accomplish cell protective activity. As one example, the treatment can be used to protect neurons by decreasing cerebral ischemic injury during stroke and cerebral hypoxia. A selected compound of the present invention may also be used generally to reduce blood pressure.

Disorders can be treated by the compounds of the present invention include, but are not limited to intraocular pressure regulation (leading to a treatment for glaucoma), retinal cell protection, the regulation of insulin secretion from the pancreas, glucose homeostasis in the hypothalamus, cardioprotection and neuroprotection, neurotransmitter release, cellular adaption to stress, hair loss, alopecia, diabetes, hyperinsulinism, asthma, urinary incontinence, epilepsy, hypertension, hypoglycemia, and disorders related to metabolic stress, including general hypoxia and ischemia. The compounds of the present invention can also be used to lower venous resistance like episcleral venous pressure (EVP) and/or to improve ocular distal outflow facility in a subject in need thereof, for example in a subject with normal tension glaucoma. In particular, a selected compound of the present invention can be used to treat EVP in a diseased host, as well as in an otherwise normal host.

In certain embodiments, the compound of the present invention provides peripheral vasodilation. This is useful for the treatment of a range of disorders that can benefit from such peripheral vasodilation, for example, including, but not limited to, Raynaud's disease, peripheral artery disease, peripheral vascular disease, limb ischemia, and erectile dysfunction.

More generally, the selected compound can be administered via systemic, topical, inhaled, transmucosal (mist, branchial inhaler and or nebulizer, and or nasal spray), parenteral, intravenous, subcutaneous, intramuscular, transvaginal, suppository, transdermal, buccal, or sublingual delivery. Ocular delivery is conveniently accomplished with a topical drop, gel, emulsion, liposome, suspension, punctal plugs and or syrup. Intraocular and more posterior routes of administration include intravitreal, intrastromal, intracameral, subtenon, sub-retinal, retro-bulbar, peribulbar, suprachoroidal, choroidal, subchoroidal, conjunctival, episcleral, posterior juxtascleral, or perilimbal.

Novel Dimeric and Trimeric Cromakalim Compounds and their Salts

In certain embodiments, a dimeric or trimeric compound of the present invention is provided that metabolizes via controlled delivery of cromakalim with biphasic or multiphasic kinetics. In certain non-limiting embodiments, the first cromakalim moiety is hydrolyzed from the dimer to produce CKLP1 with the variations in stereochemistry as shown below, which then hydrolyzes to produce the second cromakalim molecule. The rate of hydrolysis will be dependent on the level of alkaline phosphatase in the surrounding environment of the compound. It is also a function of the ability of the enzyme to hydrolyze the compound based on steric hindrance. Steric hindrance is used even more dramatically in the trimeric compounds to control hydrolysis. These complex metabolic patterns contribute to the extended-release properties of the disclosed cromakalim prodrugs, and in one embodiment, levcromakalim prodrugs.

In one embodiment, the invention is Compound 1 and/or a pharmaceutically acceptable thereof:

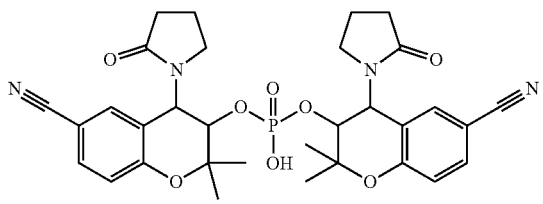

Compound 1

In one embodiment, Compound 1 has (3S,4R) stereochemistry or (4S,3R)-stereochemistry as shown below.

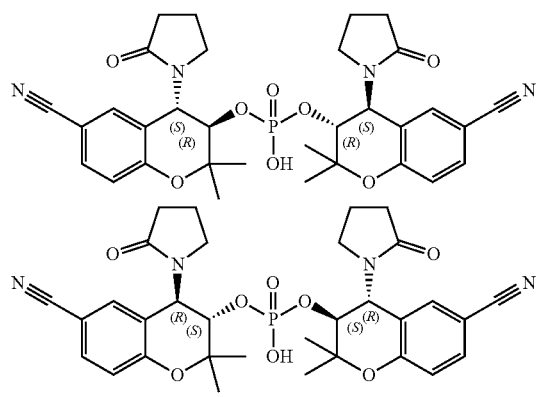

Alternative non-limiting examples of Compound 1 may include other trans-diastereomers or cis-diastereomers of cromakalim:

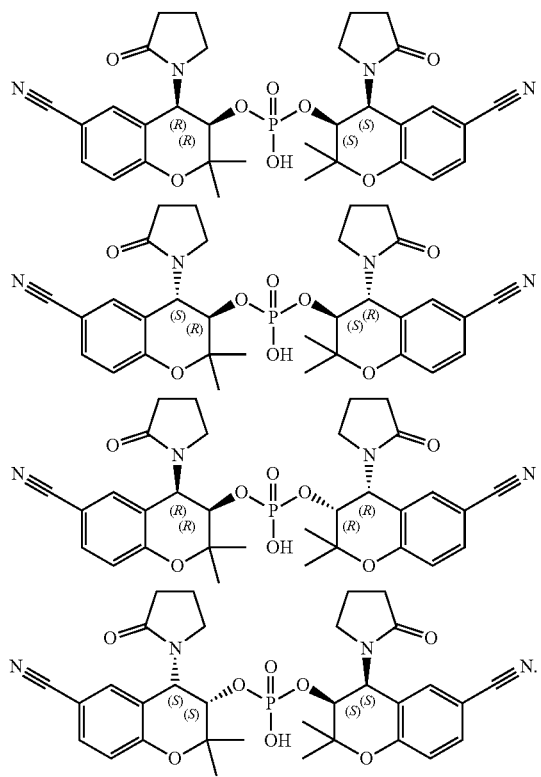

Alternative isomers include:

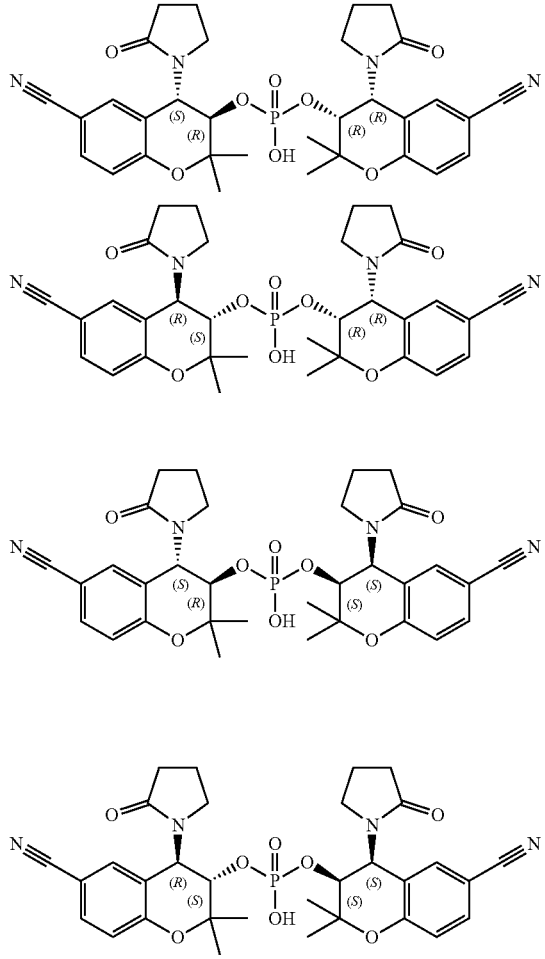

In one embodiment, Compound 1 is administered as a compound of Formula I with a neutralized negative charge:

Formula I

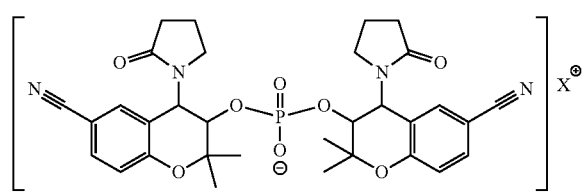

wherein X⁺ can be any pharmaceutically acceptable cation that achieves the desired results. In certain embodiments, the cation is selected from sodium, potassium, aluminum, calcium, magnesium, lithium, iron, zinc, arginine, chloroprocaine, choline, diethanolamine, ethanolamine, lysine, histidine, meglumine, procaine, hydroxyethyl pyrrolidine, ammonium, tetrapropylammonium, tetrabutylphosphonium, methyldiethanamine, and triethylamine.

Non-limiting examples of compounds of Formula I include:

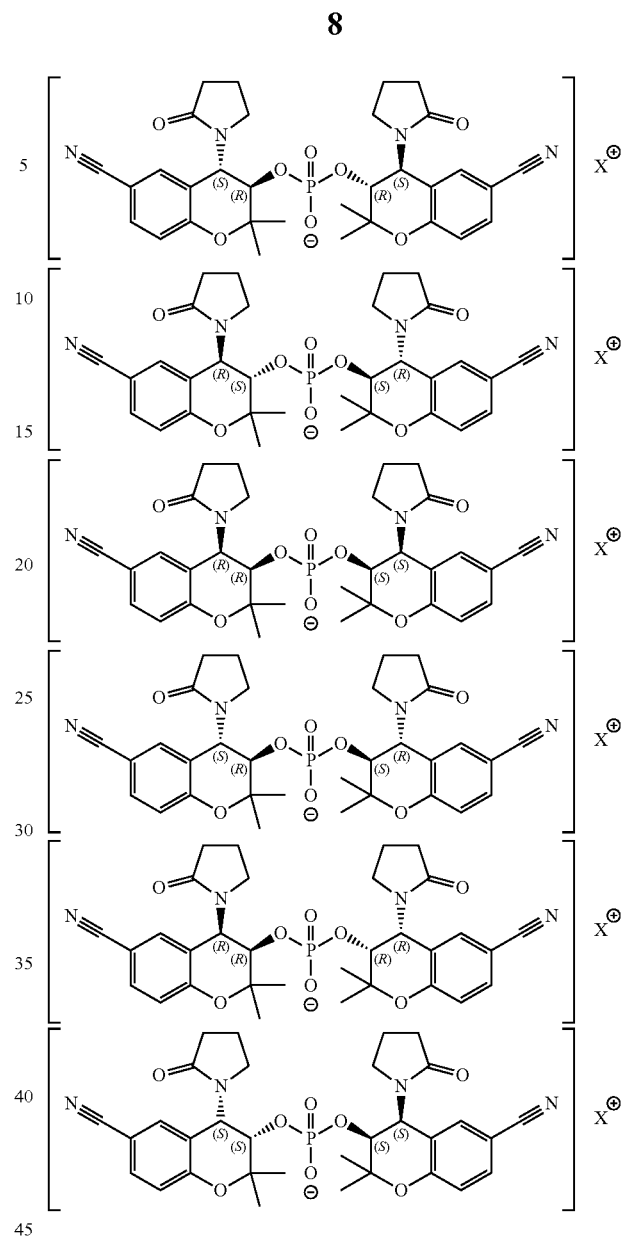

In one embodiment, $X^+$ is $Na^+$ or $K^+$. In one embodiment, $X^+$ is $Li^+$. In one embodiment, $X^+$ is $Cs^+$. In one embodiment, $X^+$ is an ammonium ion with a net positive charge of one. In an alternative embodiment, the ammonium ion with a net positive charge of one has the formula below:

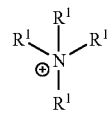

wherein $R^1$ is $C_1$-$C_6$alkyl, for example, but not limited to, methyl, ethyl, propyl, isopropyl, butyl, tbutyl, sec-butyl, isobutyl, $—CH_2C(CH_3)_3$, $—CH(CH_2CH_3)_2$, and $—CH_2CH(CH_2CH_3)_2$, cyclopropyl, $CH_2$-cyclopropyl, cyclobutyl, and $CH_2$-cyclobutyl, or aryl, for example, phenyl or napthyl.

Non-limiting examples of ammonium ions with a net positive charge of one include:

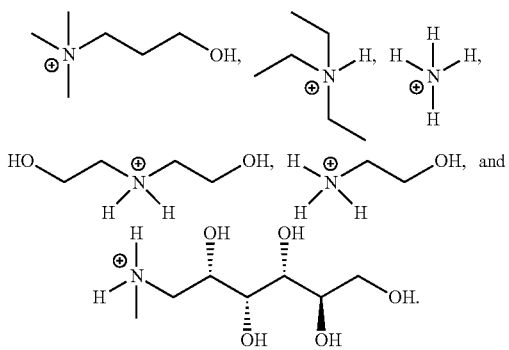

In another embodiment, X⁺ is a pharmaceutically acceptable quaternary amine such as benzalkonium, especially in a topical formulation.

In an alternative embodiment, X⁺ is a tetraalkylammonium compound, including, but not limited to tetramethylammonium.

In another embodiment, Compound 1 is administered as a compound of Formula II with a divalent cation:

Formula II

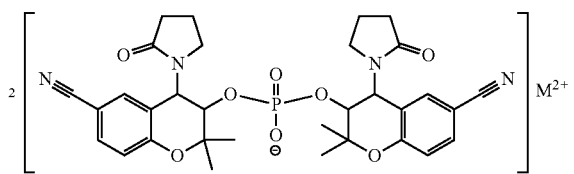

wherein $M^{2+}$ is a divalent cation, including but not limited to, an alkaline earth metal cation (magnesium, calcium, or strontium), a metal cation with an oxidation state of +2 (for example, zinc or iron), or an ammonium ion with a net positive charge of two (for example, benzathine, hexamethyl diammonium, and ethylenediamine).

Non-limiting examples of compounds of Formula II include:

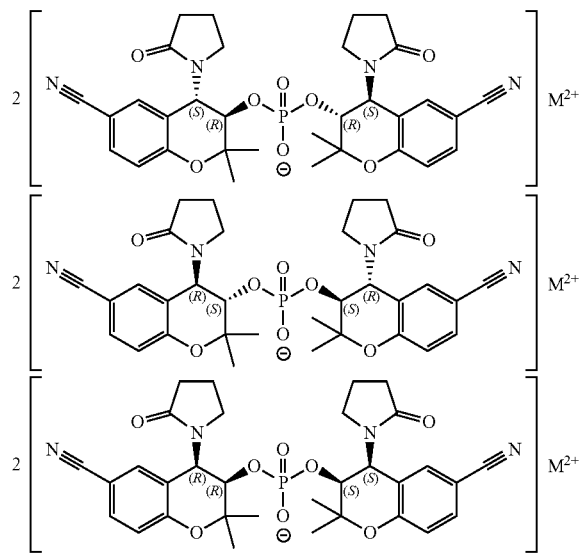

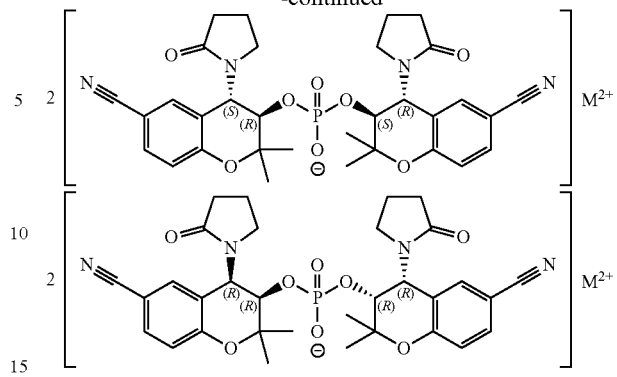

An additional non-limiting example of a compound of Formula II includes:

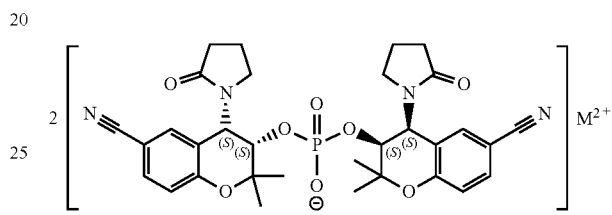

In one embodiment, $M^{2+}$ is $Mg^{2+}$. In one embodiment, $M^{2+}$ is $Ca^{2+}$. In one embodiment, $M^{2+}$ is $Sr^{2+}$. In one embodiment, $M^{2+}$ is $Zn^{2+}$. In one embodiment, $M^{2+}$ is $Fe^{2+}$. In one embodiment, $M^{2+}$ is an ammonium ion with a net positive charge of two. Non-limiting examples of ammonium ions with a net positive charge of two include:

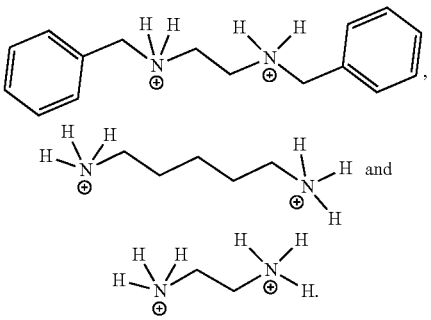

In an alternative embodiment, the ammonium ion with a net positive charge of two has the formula below:

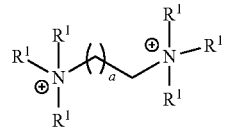

wherein
$R^1$ is $C_1$-$C_6$alkyl, for example, but not limited to, methyl, ethyl, propyl, isopropyl, butyl, tbutyl, sec-butyl, isobutyl, —CH₂C(CH₃)₃, —CH(CH₂CH₃)₂, and —CH₂CH(CH₂CH₃)₂, cyclopropyl, CH₂-cyclopropyl, cyclobutyl, and CH₂-cyclobutyl, or aryl, for example, phenyl or napthyl; and, a is an integer selected from 1, 2, 3, 4, 5, 6, 7, and 8.

In another embodiment, the invention is a therapeutic compound or a pharmaceutically acceptable salt of the structure of Formula III:

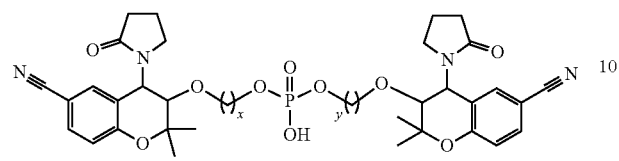

Formula III wherein x and y are independently selected from 1, 2, 3, 4, and 5, or in an alternative embodiment, x and y are independently selected from 1, 2, 3, 4, 5, 6, 7, and 8.

Non-limiting examples of compounds of Formula III include

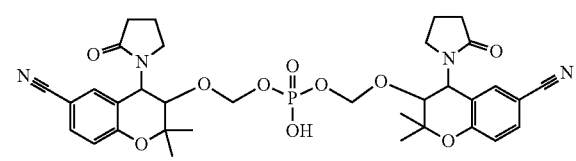

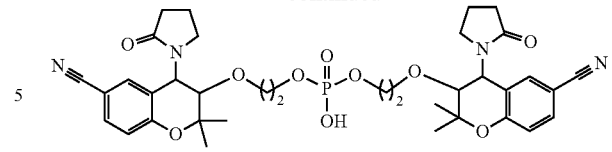

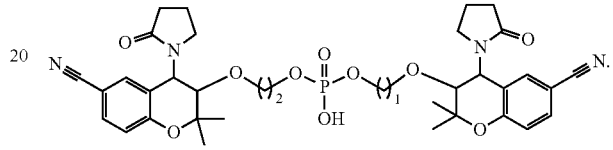

In another embodiment, the invention is a therapeutically active compound or a pharmaceutically acceptable salt thereof of the structure of Formula IV:

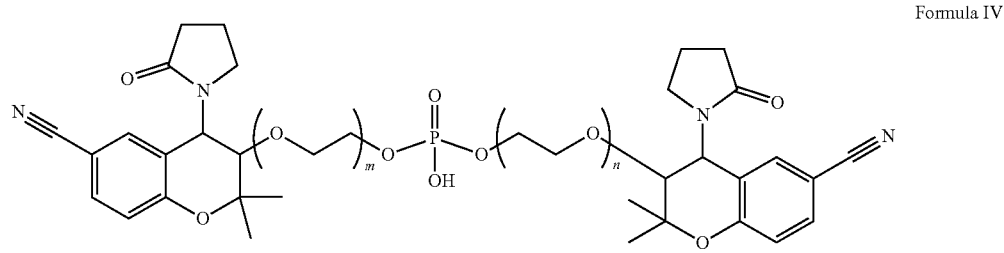

Formula IV wherein m and n are independently selected from 1, 2, 3, 4, 5, 6, 7, 8, 9, and 10, or in an alternative embodiment, m and n are independently selected from 0, 1, 2, 3, 4, 5, 6, 7, 8, 9, and 10.

Non-limiting examples of compounds of Formula IV include

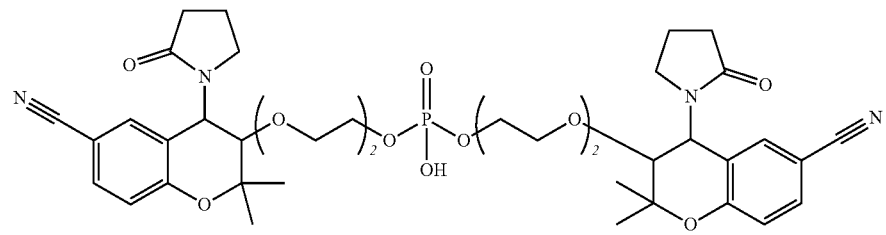

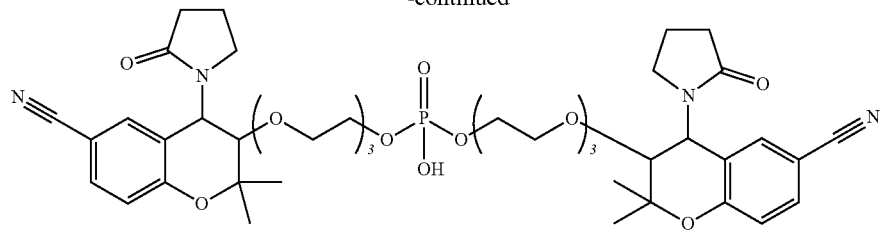
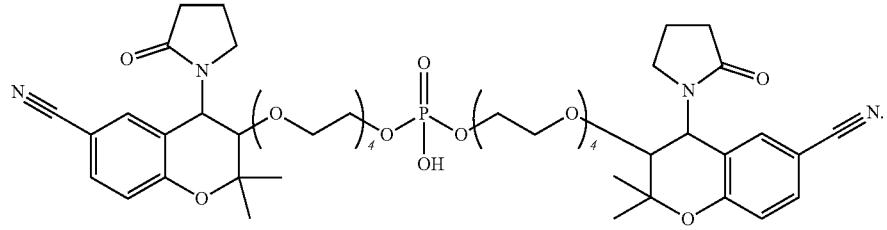
20
Other non-limiting examples of Formula IV include:
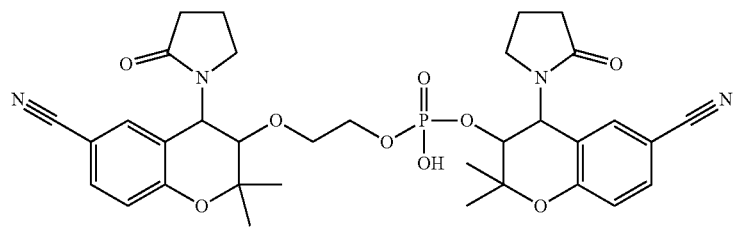
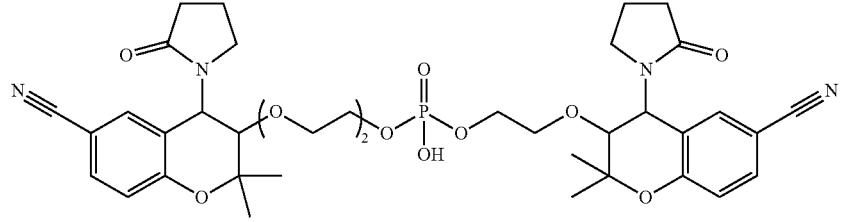
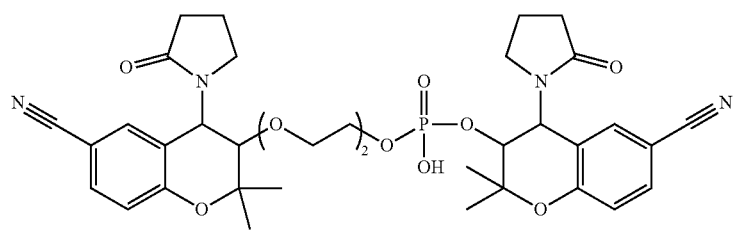
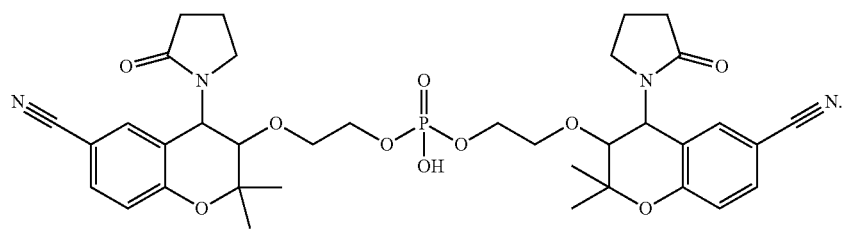
In another embodiment, the invention is a therapeutically active compound of Formula V or Formula VI with a neutralized negative charge:

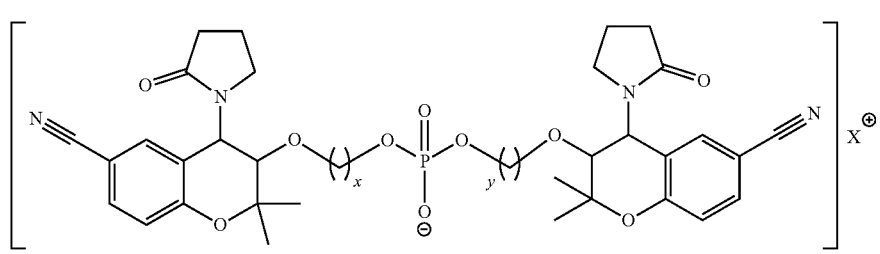
Formula V
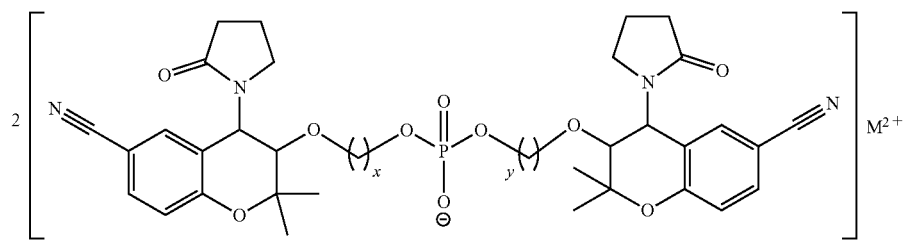
Formula VI
wherein x, y, $X^+$, and $M^{2+}$ are as defined herein.
Non-limiting examples of compounds of Formula V and Formula VI include:
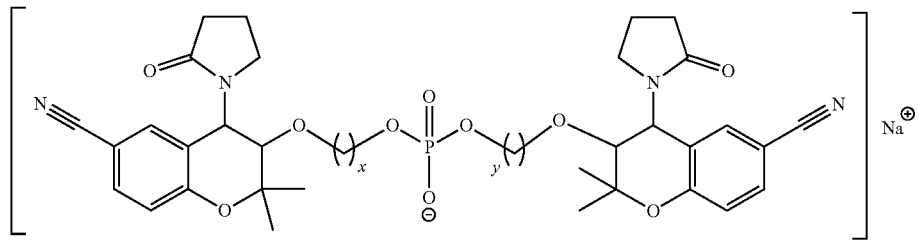
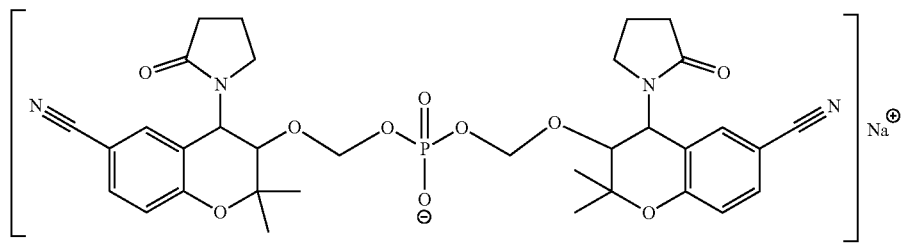
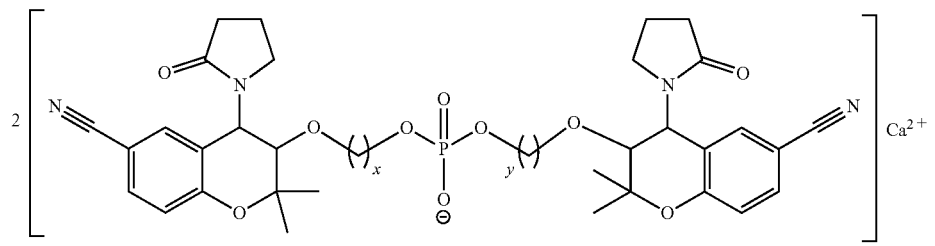
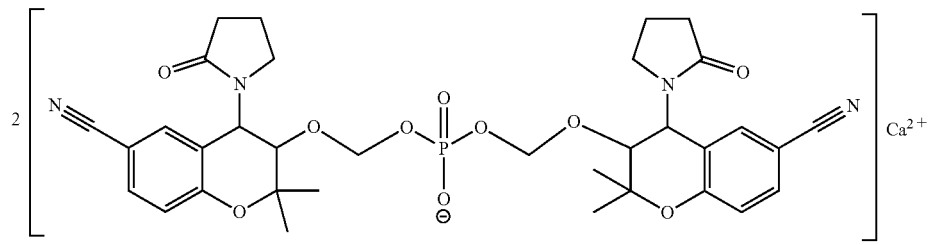

In another embodiment, the invention is an active compound of Formula VII or Formula VIII with a neutralized negative charge:

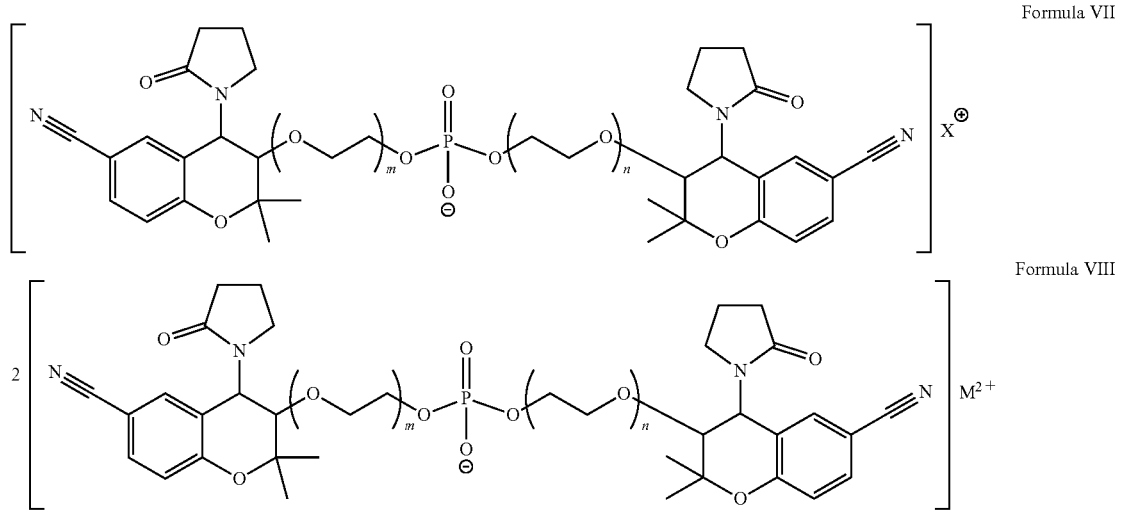

Formula VII

Formula VIII wherein m, n, X⁺, and M²⁺ are defined herein.

In another embodiment, the invention is an active compound or a pharmaceutically acceptable salt of the structure provided below as Compound 2 or a pharmaceutically acceptable salt thereof:

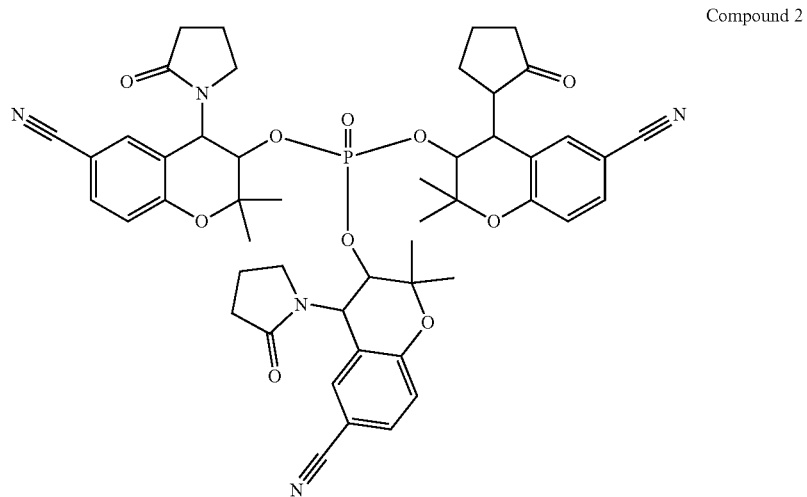 [SMILES: CC1(C)Oc2ccc(C#N)cc2C(C2CCCC2=O)C1OP(=O)(OC1C(N2CCCC2=O)c2cc(C#N)ccc2OC1(C)C)OC1C(N2CCCC2=O)c2cc(C#N)ccc2OC1(C)C]

Compound 2

In another embodiment, the active compound or pharmaceutically acceptable salt is Compound 3 or Compound 4 or a pharmaceutically acceptable salt thereof:

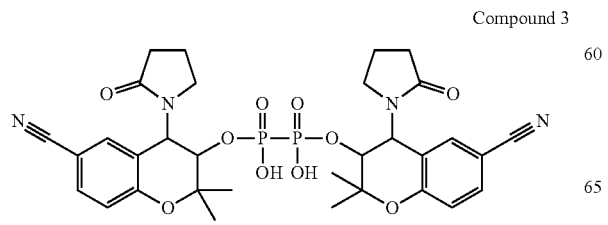

Compound 3

Compound 4
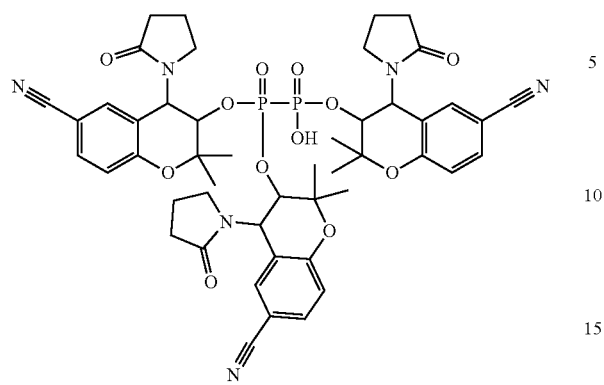
In another embodiment, the invention is a therapeutic trimeric compound or a pharmaceutically acceptable salt of the structure of Formula IX or Formula X:
Formula IX
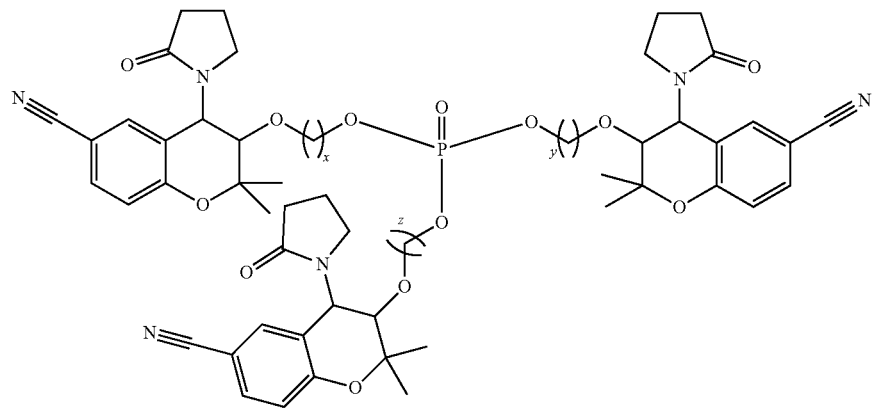
Formula X
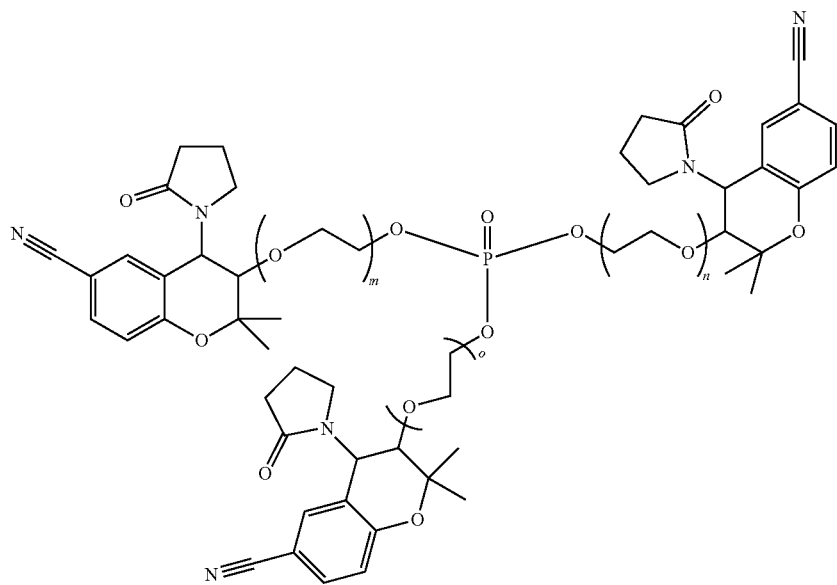

wherein x, y, and z are independently selected from 1, 2, 3, 4, and 5, or in an alternative embodiment, x, y, and z are independently selected from 1, 2, 3, 4, 5, 6, 7, and 8; and m, n, and o are independently selected from 1, 2, 3, 4, 5, 6, 7, 8, 9, and 10, or in an alternative embodiment, m, n, and o are independently selected from 0, 1, 2, 3, 4, 5, 6, 7, 8, 9, and 10.

In another embodiment, the invention is an active compound or a pharmaceutically acceptable salt of the structure of Formula XI or Formula XII:

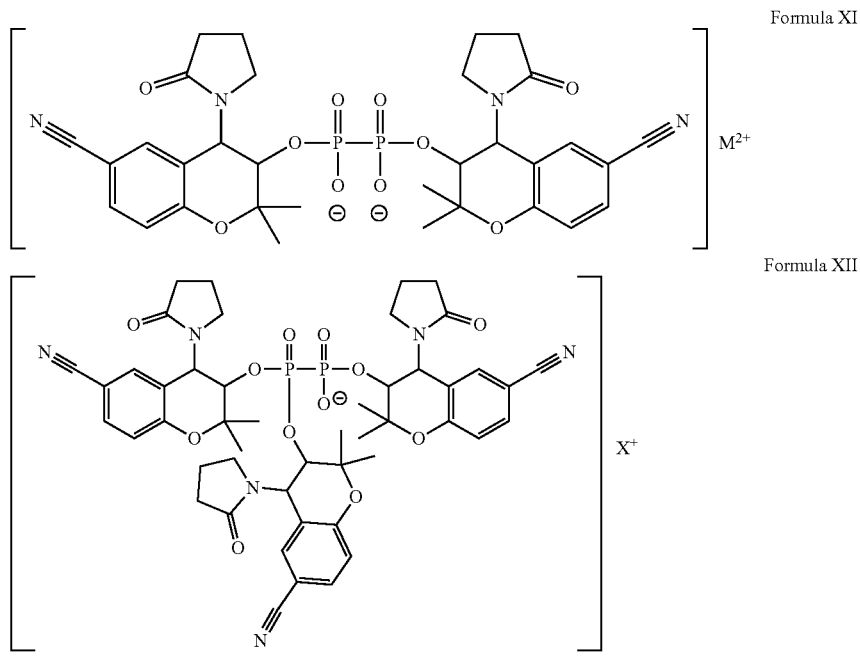

Formula XI

Formula XII wherein $X^+$ and $M^{2+}$ is defined herein.

In another embodiment, the invention is an active compound or a pharmaceutically acceptable salt of the structure of Formula XIII or a compound of Formula XIV or Formula XV with a neutralized negative charge:

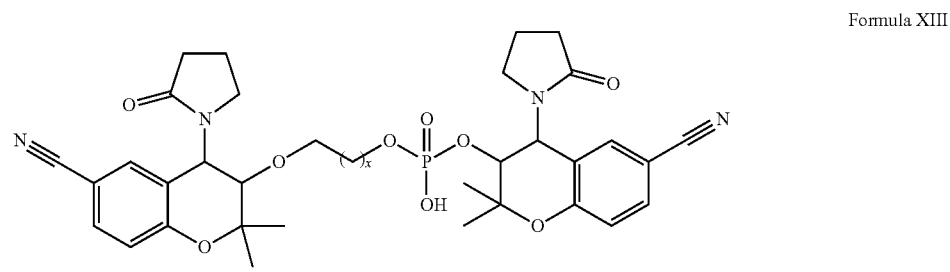

Formula XIII

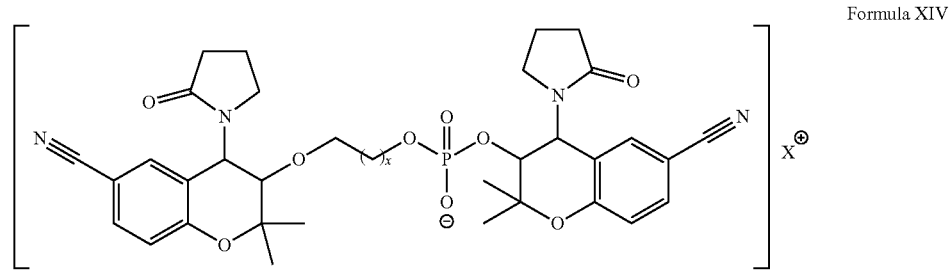

Formula XIV

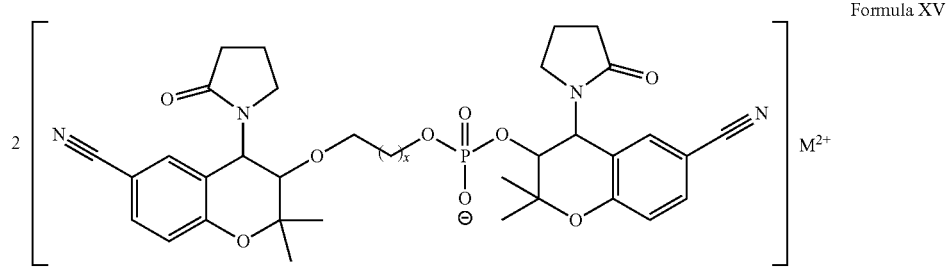

Formula XV wherein x, X$^+$, and M$^{2+}$ are defined herein.

In one embodiment, x is selected from 2, 3, 4, 5, 6, 7, and 8.

In another embodiment, the invention is an active compound or a pharmaceutically acceptable salt of the structure of Formula XVI or XVII:

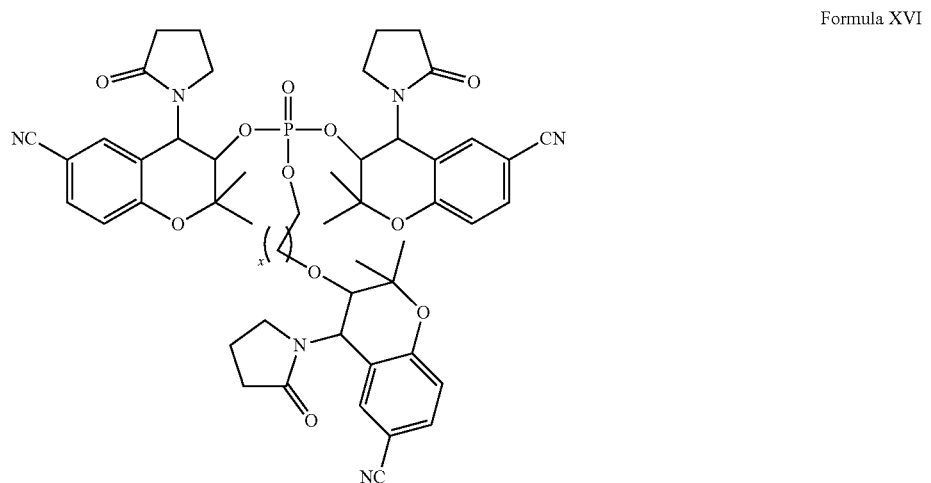

Formula XVI

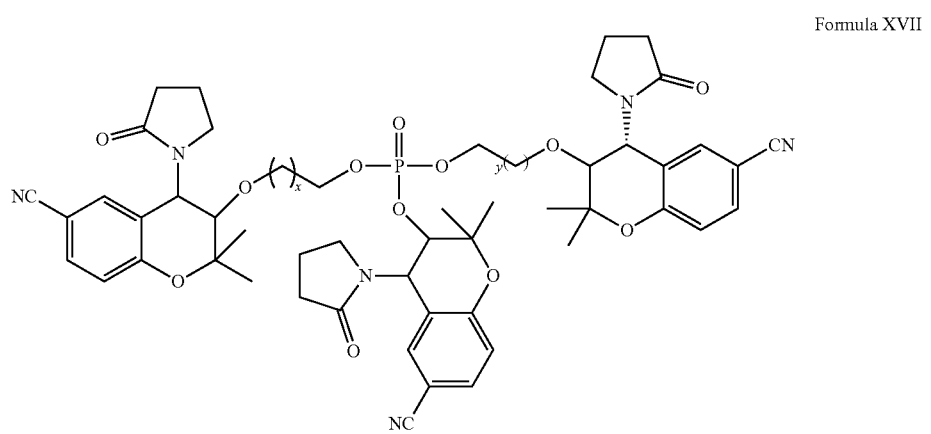

Formula XVII wherein x and y are defined herein.

In another embodiment, the invention is an active compound or a pharmaceutically acceptable salt of the structure of Formula XVIII or Formula XIX:

Formula XVIII

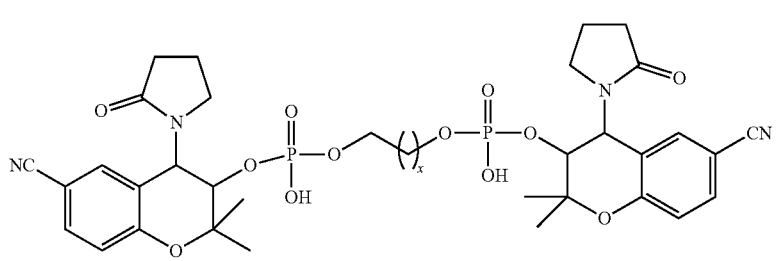

Formula XIX

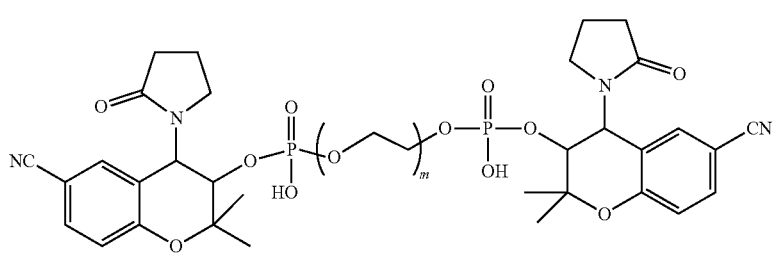

wherein x and m are defined herein.

In one embodiment, x is selected from 1, 2, 3, 4, 5, 6, 7, and 8.

In another embodiment, the invention is a compound of Formula XX or Formula XXI with a neutralized negative charge:

Formula XX

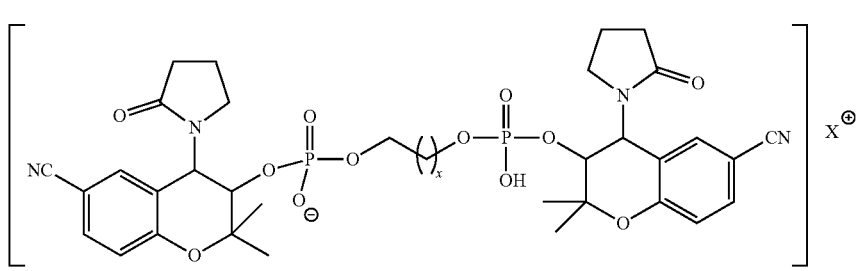

Formula XXI

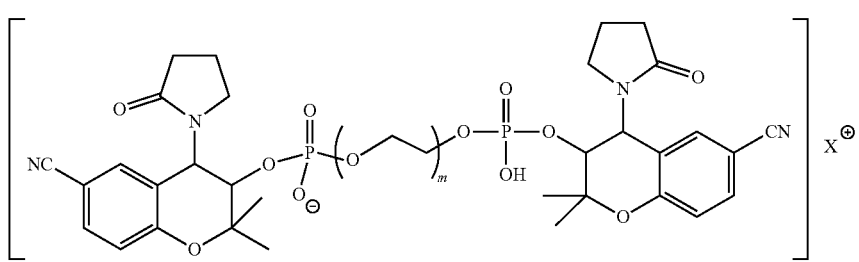

wherein x, m, and $X^+$ are defined herein.

In one embodiment, x is selected from 1, 2, 3, 4, 5, 6, 7, and 8.

In another embodiment, the invention is a compound of Formula XXII or Formula XXIII with a neutralized negative charge:

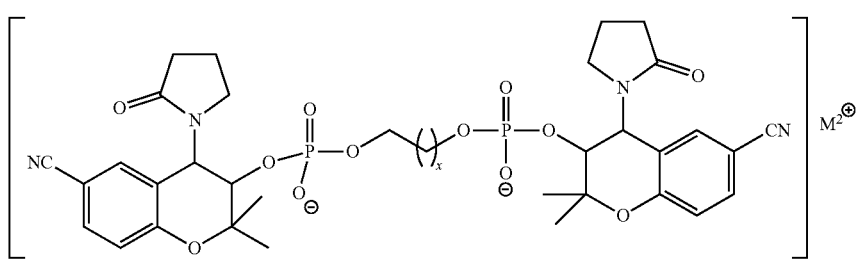

Formula XXII

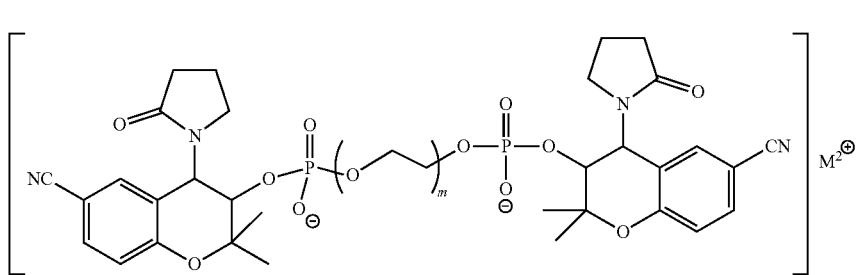

Formula XXIII wherein x, m, and $M^{2+}$ are defined herein.

In one embodiment, x is independently selected from 1, 2, 3, 4, 5, 6, 7, and 8.

In another embodiment, the invention is an active compound or a pharmaceutically acceptable salt of the structure of Formula XXIV or Formula XXV:

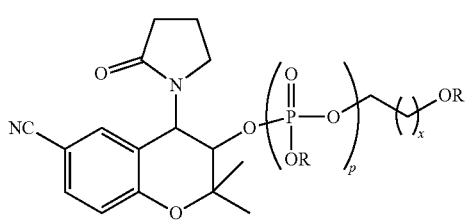

Formula XXIV

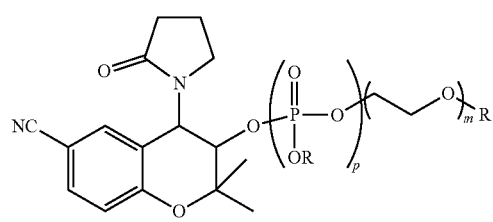

Formula XXV wherein:

p is selected from 0 and 1;

R is independently at each instance selected from H and $X^+$; and $X^+$, x, and m are defined herein.

In one embodiment, x is selected from 1, 2, 3, 4, 5, 6, 7, and 8. In another embodiment, m is selected from 0, 1, 2, 3, 4, 5, 6, 7, 8, 9, and 10.

In another embodiment, the invention is an active compound or a pharmaceutically acceptable salt of the structure of Formula XXVI or XXVII:

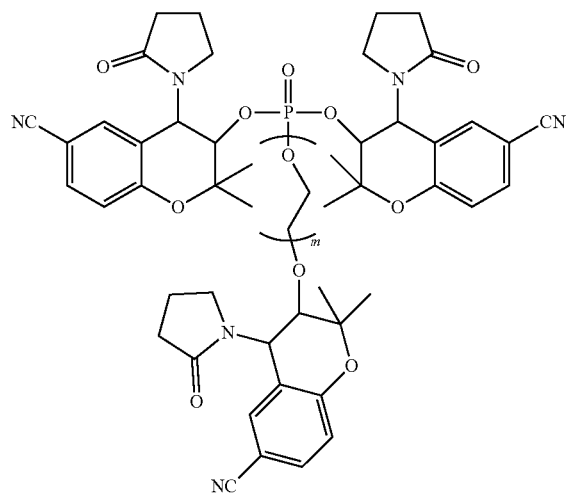
Formula XXVI
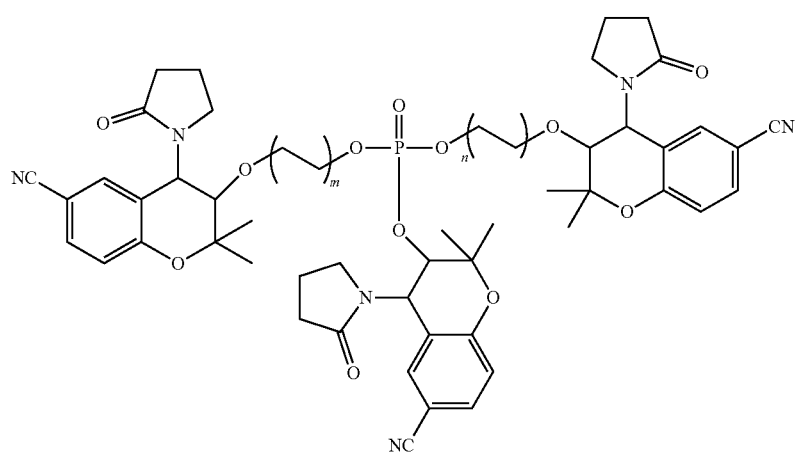
Formula XXVII
wherein m and n are defined herein.
In certain embodiments, the compound of the present invention is selected from:
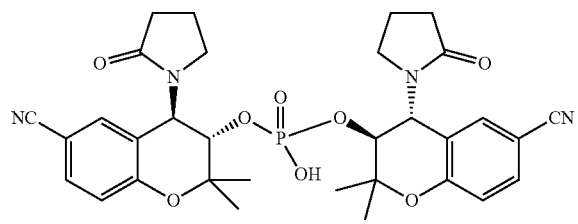
Compound 1
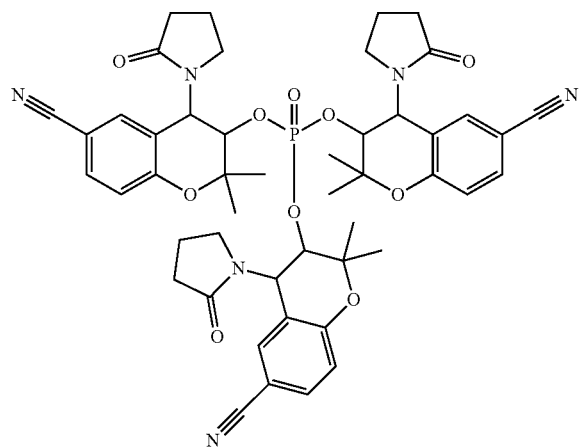
Compound 2

-continued
Compound 3
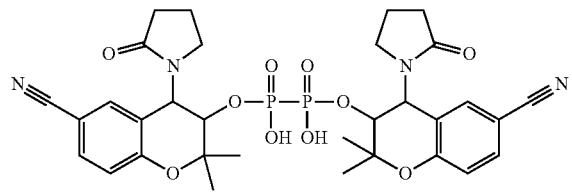
Compound 4
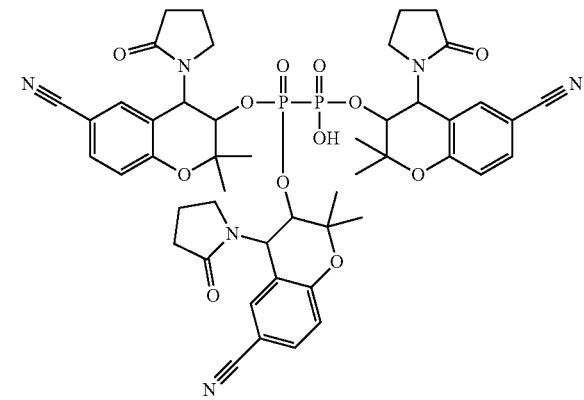
Compound 5
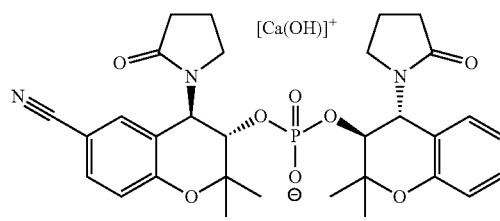
Compound 6
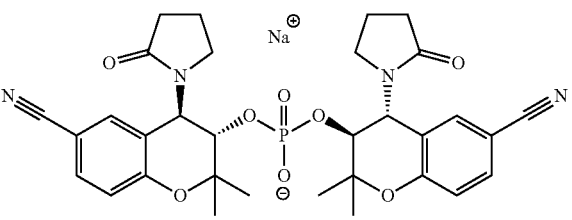
Compound 7
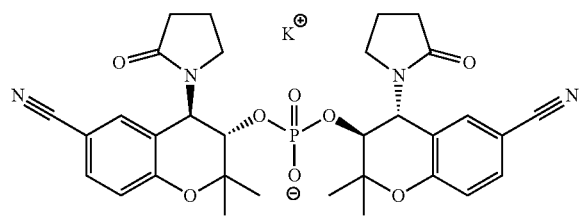
Compound 8
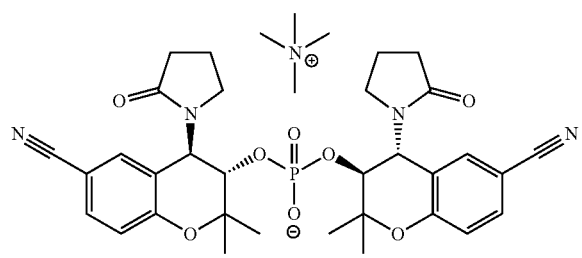
Compound 9
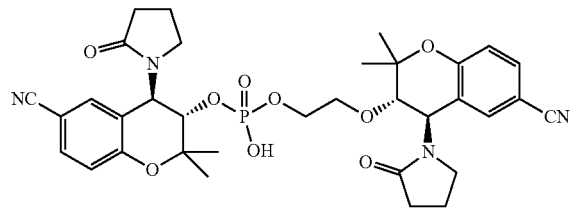
Compound 10
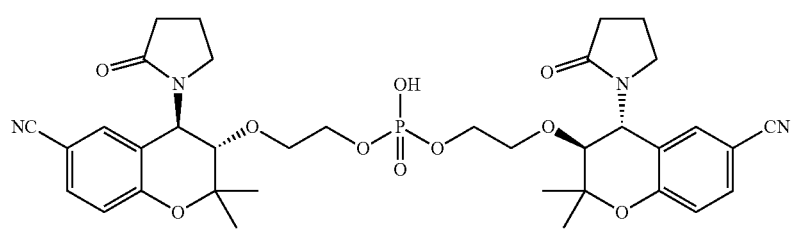
Compound 17
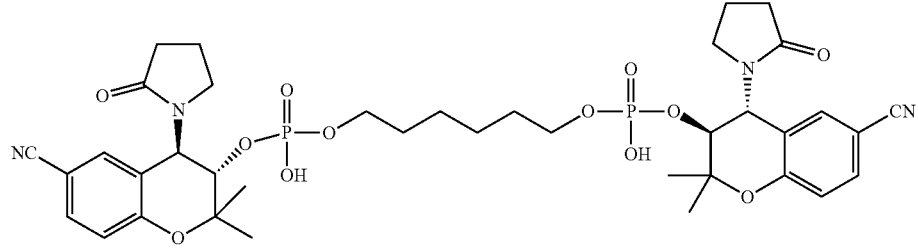

Compound 18

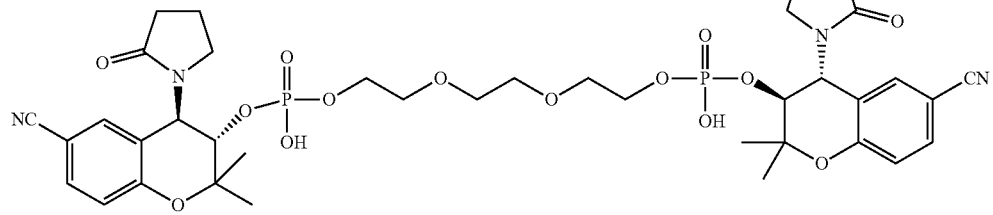

Compound 18

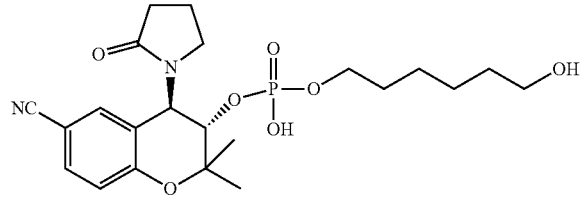

Compound 19

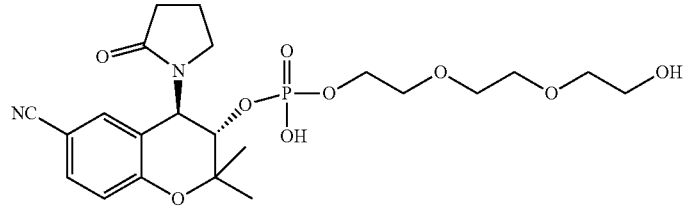 and

Compound 20

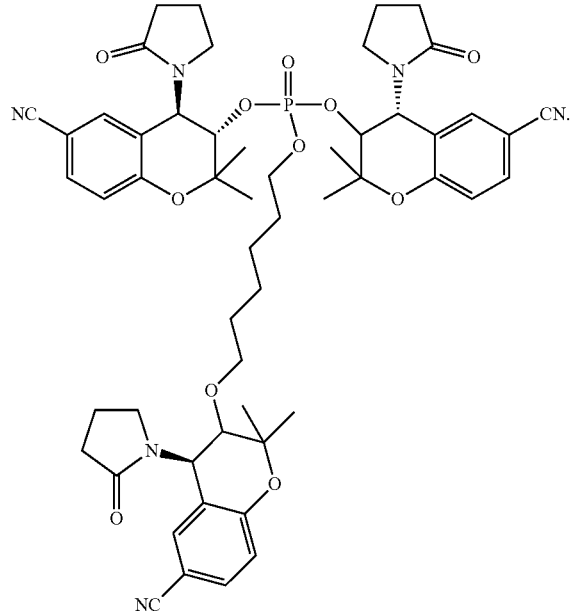

The disclosed compounds and compositions can be used for the modulation of ATP-sensitive potassium ($K_{ATP}$) channels for therapeutic purposes. In one embodiment, the compounds and compositions are modulators of $K_{ATP}$ channels that relax vascular smooth muscle for the treatment of certain cardiovascular, blood vessel, muscular, endocrine system, pulmonary, urology, dermatology, lymphatic, and neurological disorders. In one embodiment, the compounds and compositions of the present invention provide peripheral vasodilation, for example for the treatment of Raynaud's disease, peripheral artery disease, peripheral vascular disease, limb ischemia, and erectile dysfunction.

The compounds can also be used in topical formulations for a range of disorders for which increased blood flow is therapeutic, including vascular, muscular, dermatology, and ocular disorders. For example, in one embodiment, the compounds of the present are formulated for topical administration and used to improve peripheral vasodilation or to treat a blood vessel disorder, such as Raynaud's disease, peripheral vascular disease, and hypo or hyperperfusion, in a host in need thereof.

In one embodiment, the compounds and compositions of the present invention are modulators of $K_{ATP}$ channels for ophthalmic purposes, including the lowering of intraocular pressure (for example for the treatment of glaucoma), the lowering of episcleral venous pressure (EVP) and/or the improvement of distal outflow facility in a subject in need thereof. In particular, a selected compound of the present invention can be used to treat EVP in a diseased host, as well as in an otherwise normal host. A selected compound of the present invention can also be used to improve perfusion and oxygenation for the treatment of ocular and retinal diseases.

In one embodiment, any of the compounds of the present invention can be formulated for topical administration and used to treat a dermatology disorder, such as hair loss or alopecia, in a host in need thereof. In one embodiment, the compounds of the present invention are formulated for topical administration in a dosage form such as a lotion, a gel, an ointment, a patch, a cream, a mist, or a spray.

In one aspect, a compound of Formula I through Formula XXVII or a pharmaceutically acceptable salt or composition thereof is provided as a method for the relaxation of vascular smooth muscles for the treatment of certain diseases and disorders, including cardiovascular, blood vessel, ocular, muscular, endocrine system, pulmonary, urology, dermatology, lymphatic, and neurological disorders or diseases. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a cardiovascular disorder or disease or a blood vessel disorder or disease, including hypertension, high blood pressure, congestive heart failure, transient ischemic attack, heart attack, acute myocardial infarction, acute and chronic myocardial ischemia, unstable angina and associated chest pain, arrhythmias, pulmonary arterial hypertension (PAH), vasoconstrictive diseases, vasospastic diseases, Raynaud's disease, or peripheral vascular disease (PVD). In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat an endocrine metabolic system disorder or disease, including hypoglycemia, hyperinsulinism, diabetes, or prediabetes. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a skeletal muscle myopathy. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a pulmonary disease or disorder, such as asthma, nocturnal asthma, or airway hyper-reactivity. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a urology disorder or disease, such as urinary incontinence or erectile dysfunction. In one embodiment, a compound of Formula I through Formula XXVII or a pharmaceutically acceptable salt or composition thereof is used to treat female sexual arousal disorder due to blood flow. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a dermatology disorder or disease, such as hair loss or hypotrichosis. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a neurological disorder or disease, such as epilepsy, ischemic multifocal disease, neuropathic pain, or neurodegeneration. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to treat a lymphatic disease such as lymphadenopathy, lymphedema, lymphangitis, lymphadenitis, lymphangiomatosis, Castleman's disease, or a cancer of the lymph system, including Hodgkin's lymphoma, non-Hodgkin's lymphoma, or lymphangiomatosis. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided as a method to lower episcleral venous pressure (EVP), improve distal outflow, or decrease venous resistance for the treatment of an ophthalmic disorder, including elevated episcleral venous pressure (EVP), glaucoma, normal tension glaucoma, ocular hypertension, Graves' ophthalmopathy, Graves' orbitopathy (GO), retrobulbar tumors, cavernous sinus thrombosis, orbital vein thrombosis, episcleral/orbital vein vasculitis, superior vena cava obstruction, superior vena cava thrombosis, carotid cavernous sinus fistula, dural cavernous sinus shunts, orbital varices, and Sturge-Weber Syndrome. In one embodiment, the compound is selected from Compound 1 through Compound 21 or a pharmaceutically acceptable salt thereof. In one embodiment, the ocular hypertension is a result of trauma or surgery.

In another aspect, a compound of Formula I through Formula XXVII or a pharmaceutically acceptable salt or composition thereof is provided as a method to prevent or treat ocular damage due to, for example ischemic conditions by improving perfusion and oxygenation. In one embodiment, the compound is selected from Compound 1 through Compound 21 or a pharmaceutically acceptable salt thereof.

In one aspect, a compound of Formula I through Formula XXVII or a pharmaceutically acceptable salt or composition thereof is provided for the treatment of hypertensive or vascular occlusive and/or ischemic retinopathy, central retinal vein occlusion (CRVO), branch retinal vein occlusion (BRVO), artery occlusive/embolic and or hypoperfusion diseases, diabetic retinopathy, optic nerve damage due to ischemia (posterior and anterior ischemic optic neuropathy (NAION), and acute and chronic angle closure glaucoma-induced damage to the optic nerve and nerve fiber layers of the retina (retinal ganglion layers). In one embodiment, the compound is selected from Compound 1 through Compound 21 or a pharmaceutically acceptable salt thereof.

In one embodiment, a compound of Formula I through Formula XXVII or a pharmaceutically acceptable salt or composition thereof is administered for the treatment of an ocular disorder caused by elevated episcleral venous pressure in a host in need thereof wherein the disorder is selected from normal tension glaucoma, primary open angle glaucoma, juvenile and congenital glaucoma, neovascular glaucoma, pseudoexfoliation glaucoma and steroid-induced open angle glaucoma. In one embodiment, the glaucoma is selected from primary open angle glaucoma (POAG), primary angle closure glaucoma, normal tension glaucoma (NTG), pediatric glaucoma, pseudoexfoliative glaucoma, pigmentary glaucoma, traumatic glaucoma, neovascular glaucoma, irido corneal endothelial glaucoma. Primary open angle glaucoma is also known as chronic open angle glaucoma, chronic simple glaucoma, glaucoma simplex.

The present invention thus includes the following features:

(a) Compound 1 or a pharmaceutically acceptable salt thereof;

(b) Compound 2, Compound 3, or Compound 4 or a pharmaceutically acceptable salt thereof;

(c) Compound 5 through Compound 21 or a pharmaceutically acceptable salt thereof;

(d) a compound of Formula I, Formula V, Formula VII, Formula XII, Formula XIV, Formula XX, or Formula XXI;

(e) a compound of Formula II, Formula VI, Formula VIII, Formula XI, Formula XV, Formula XXII, or Formula XXIII;

(f) a compound of Formula III, Formula IV, Formula IX, Formula X, Formula XIII, Formula XVI, Formula XVII, Formula XVIII, Formula XIX, Formula XXV, or Formula XXVII or a pharmaceutically acceptable salt thereof;

(g) a compound of Formula XXIV or Formula XXV or a pharmaceutically acceptable salt thereof;

(h) the compound of (d) or (g) wherein $X^+$ is sodium, potassium, aluminum, calcium, magnesium, lithium, iron, zinc, arginine, chloroprocaine, choline, diethanolamine, ethanolamine, lysine, histidine, meglumine, procaine, hydroxyethyl pyrrolidine, ammonium, tetrapropylammonium, tetrabutylphosphonium, methyldiethanamine, or triethylamine;

(i) the compound of (e) wherein $M^{2+}$ is magnesium, calcium, or strontium, zinc, iron, benzathine, hexamethyl diammonium, or ethylenediamine;

(j) a pharmaceutical composition comprising any of embodiments (a)-(i), optionally in a pharmaceutically acceptable carrier;

(k) the pharmaceutical composition of (j) administered as a dosage form;

(l) the pharmaceutical composition of (k) wherein the dosage form is suitable for ocular administration;

(m) the pharmaceutical composition of (k) or (l) wherein the dosage form is a solution, an emulsion, or a suspension;

(n) the pharmaceutical composition of (k)-(m) wherein the dosage form is suitable for topical administration;

(o) the pharmaceutical composition of (k) or (n) wherein the dosage form is a gel, a mist, a spray, an ointment, a cream, a lotion, or a dermal patch;

(p) the pharmaceutical composition of (k) wherein the dosage form is suitable for systemic administration;

(q) the pharmaceutical composition of (p) wherein the dosage form is an inhaler, a tablet, a capsule, a solution, a suspension, an ointment, or a suppository;

(r) the pharmaceutical composition of (k) wherein the dosage form is suitable for parenteral administration;

(s) the pharmaceutical composition of (j) or (l) wherein the pharmaceutical composition is administered as a topical drop, nanoparticle or gel; and (t) the pharmaceutical composition of (k) wherein the pharmaceutical composition is administered via oral, intraocular, intravenous, subcutaneous, intramuscular, intrathecal, intranasal, transmucosal, inhalation, transdermal, intradermal, and transvaginal;

(u) a method to lower episcleral venous pressure (EVP) and/or improve distal outflow in a host with elevated EVP comprising administering Compound 1 through Compound 21 or a pharmaceutically acceptable salt thereof;

(v) a method to lower episcleral venous pressure (EVP) and/or improve distal outflow or venous congestion in a host with elevated EVP comprising administering a compound of Formula I through Formula XXVII or a pharmaceutically acceptable salt thereof;

(w) the method of (u) or (v) wherein the lowering of EVP and/or the improvement of distal outflow or venous congestion is for the treatment of an ophthalmic disorder selected from elevated episcleral venous pressure (EVP), glaucoma, acute glaucoma resulting from inflamed cataracts, ocular hypertension, Graves' ophthalmopathy, Graves' orbitopathy (GO), retrobulbar tumors, cavernous sinus thrombosis, orbital vein thrombosis, episcleral/orbital vein vasculitis, superior vena cava obstruction, superior vena cava thrombosis, carotid cavernous sinus fistula, dural cavernous sinus shunts, orbital varices, and Sturge-Weber Syndrome.

(x) a method to prevent or treat ocular damage due to ischemic conditions in a host in need thereof comprising administering Compound 1 through Compound 21 or a pharmaceutically acceptable salt thereof to a host in need thereof;

(y) a method to prevent or treat ocular damage due to ischemic conditions in a host in need thereof comprising administering a compound of Formula I through Formula XXVII or a pharmaceutically acceptable salt thereof;

(z) a method to prevent or treat hypertensive retinopathy, central retinal vein occlusion (CRVO), branch retinal vein occlusion (BRVO), artery occlusive/embolic and or hypoperfusion diseases, diabetic retinopathy, optic nerve damage due to ischemia and/or hypoperfusion (posterior and anterior ischemic optic neuropathy (NAION), and acute and chronic angle closure glaucoma-induced damage to the optic nerve and nerve fiber layers of the retina (retinal ganglion layers) in a host in need thereof comprising administering Compound 1 through Compound 21 or a pharmaceutically acceptable salt thereof to a host in need thereof;

(aa) a method to prevent or treat hypertensive retinopathy, central retinal vein occlusion (CRVO), branch retinal vein occlusion (BRVO), artery occlusive/embolic and or hypoperfusion diseases, diabetic retinopathy, optic nerve damage due to ischemia (posterior and anterior ischemic optic neuropathy (NAION), and acute and chronic angle closure glaucoma-induced damage to the optic nerve and nerve fiber layers of the retina (retinal ganglion layers) in a host in need thereof comprising administering a compound of Formula I through Formula XXVII or a pharmaceutically acceptable salt thereof;

(bb) a method to treat hypertension, congestive heart failure, acute and chronic myocardial ischemia, unstable angina and associated chest pain, arrhythmias, the occurrence of ventricular fibrillation associated with acute myocardial infarctions, pulmonary arterial hypertension, persistent pulmonary hypertension in neonates, peripheral artery disease, peripheral vascular disease, and critical limb ischemia in a host in need thereof comprising administering Compound 1 through Compound 21 or a pharmaceutically acceptable salt thereof to a host in need thereof;

(cc) a method to treat hypertension, congestive heart failure, acute and chronic myocardial ischemia, unstable angina and associated chest pain, arrhythmias, the occurrence of ventricular fibrillation associated with acute myocardial infarctions, pulmonary arterial hypertension, persistent pulmonary hypertension in neonates, peripheral artery disease, peripheral vascular disease, and critical limb ischemia in a host in need thereof comprising administering a compound of Formula I through Formula XXVII or a pharmaceutically acceptable salt thereof;

(dd) a method to treat hypoglycemia, hyperinsulinism, diabetes, or prediabetes in a host in need thereof comprising administering Compound 1 through Compound 21 or a pharmaceutically acceptable salt thereof to a host in need thereof;

(ee) a method to treat hypoglycemia, hyperinsulinism, diabetes, or prediabetes comprising administering a compound of Formula I through Formula XXVII or a pharmaceutically acceptable salt thereof;

(ff) a method to treat skeletal muscle myopathies, urinary incontinence, hair loss, hypotrichosis, airway hyperreactivity, asthma and nocturnal asthma, erectile dysfunction, and female sexual arousal disorder due to blood flow in a host in need thereof comprising administering Compound 1 through Compound 21 or a pharmaceutically acceptable salt thereof to a host in need thereof;

(gg) a method to treat skeletal muscle myopathies, urinary incontinence, hair loss, hypotrichosis, airway hyperreactivity, asthma and nocturnal asthma, erectile dysfunction, and female sexual arousal disorder due to blood flow in a host in need thereof comprising administering a compound of Formula I through Formula XXVII or a pharmaceutically acceptable salt thereof;

(hh) a method to treat a lymphatic disease such as lymphadenopathy, lymphedema, lymphangitis, lymphadenitis, lymphangiomatosis, Castleman's disease, or a cancer of the lymph system, including Hodgkin's lymphoma, non-Hodgkin's lymphoma, or lymphangiomatosis, in a host in need thereof comprising administering a compound of Formula I through Formula XXVII;

(ii) a method to treat a lymphatic disease such as lymphadenopathy, lymphedema, lymphangitis, lymphadenitis, lymphangiomatosis, Castleman's disease, or a cancer of the lymph system, including Hodgkin's lymphoma, non-Hodgkin's lymphoma, or lymphangiomatosis, in a host in need thereof comprising administering Compound 1 through Compound 21 or a pharmaceutically acceptable salt thereof to a host in need thereof;

(jj) a method to improve peripheral vasodilation or to treat a blood vessel disorder, such as Raynaud's disease, peripheral vascular disease, and hypo or hyperperfusion, in a host in need thereof comprising administering Compound 1 through Compound 21 or a pharmaceutically acceptable salt thereof to a host in need thereof;

(kk) a method to improve peripheral vasodilation or to treat a blood vessel disorder, such as Raynaud's disease, peripheral vascular disease, and hypo or hyperperfusion, in a host in need thereof comprising administering a compound of Formula I through Formula XXVII or a pharmaceutically acceptable salt thereof.

DETAILED DESCRIPTION OF THE INVENTION

The present invention provides dimeric and trimeric cromakalim prodrugs, compositions, and their use for the modulation of ATP-sensitive potassium ($K_{ATP}$) channels for therapeutic purposes. The prodrugs of the present invention can be administered in a delivery system that, in one embodiment, allows for controlled delivery over time, which is distinct from previous prodrugs of cromakalim or levcromakalim that are rapidly hydrolyzed to the parent compound. The compounds are also advantageous because they can be formulated in a lipophilic formulation that is useful for administration to lipophilic tissues.

In one embodiment, the compounds and compositions of the present invention are modulators of $K_{ATP}$ channels that relax vascular smooth muscle for the treatment of certain cardiovascular, blood vessel, muscular, endocrine system, pulmonary, urology, dermatology, ocular, and neurological disorders as described herein.

In one embodiment, the compounds and compositions of the present invention are modulators of $K_{ATP}$ channels for ophthalmic purposes, including the lowering of episcleral venous pressure (EVP) and the improvement of distal outflow facility in a subject with enhanced EVP.

In one embodiment, the active compound or pharmaceutically acceptable salt is Compound 1 or a pharmaceutically acceptable thereof.

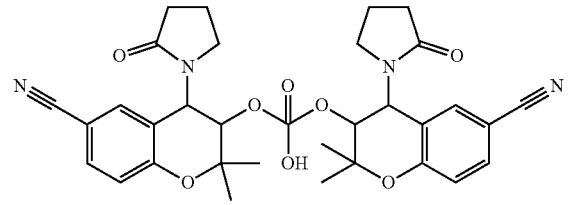

Compound 1

In one embodiment, the active compound is a compound of Formula I with a neutralized negative charge:

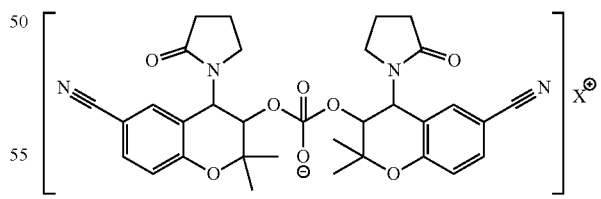

wherein $X^+$ can be any pharmaceutically acceptable cation that achieves the desired results. In certain embodiments, the cation is selected from sodium, potassium, aluminum, calcium, magnesium, lithium, iron, zinc, arginine, chloroprocaine, choline, diethanolamine, ethanolamine, lysine, histidine, meglumine, procaine, hydroxyethyl pyrrolidine, ammonium, tetrapropylammonium, tetrabutylphosphonium, methyldiethanamine, and triethylamine.

In certain embodiments, the cation is a quaternary ammonium compound. In certain embodiments, the cation is tetraalkylammonium. In certain embodiments, the cation is tetramethylammonium. In an alternative embodiment, the ammonium ion with a net positive charge of one has the formula below:

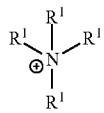

wherein $R^1$ is $C_1$-$C_6$alkyl, for example, but not limited to, methyl, ethyl, propyl, isopropyl, butyl, tbutyl, secbutyl, isobutyl, —$CH_2C(CH_3)_3$, —$CH(CH_2CH_3)_2$, and —$CH_2CH(CH_2CH_3)_2$, cyclopropyl, $CH_2$-cyclopropyl, cyclobutyl, and $CH_2$-cyclobutyl, or aryl, for example, phenyl or napthyl.

Non-limiting examples of a compound of Formula I include:

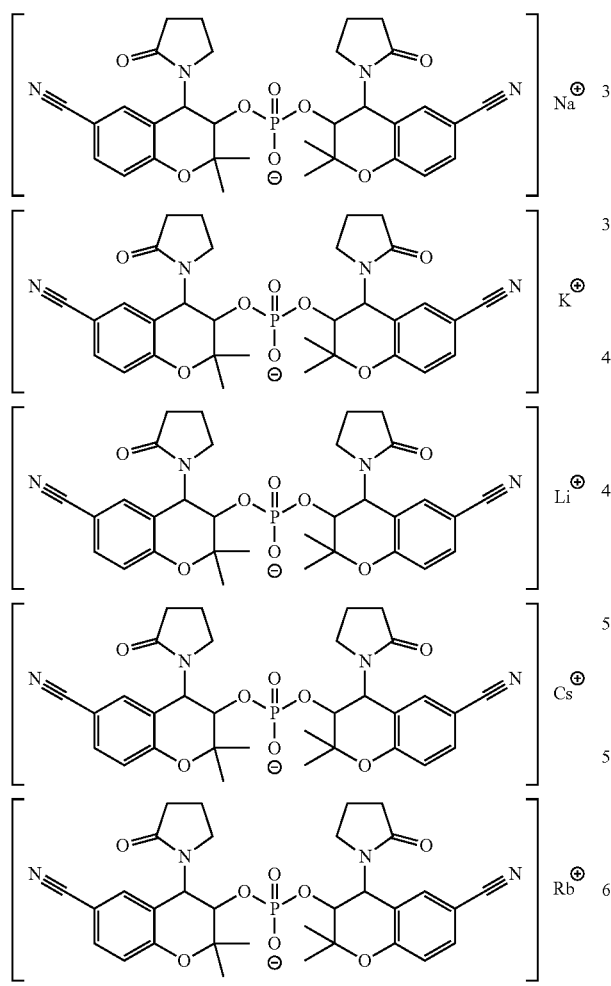

Additional non-limiting example of a compound of Formula I are

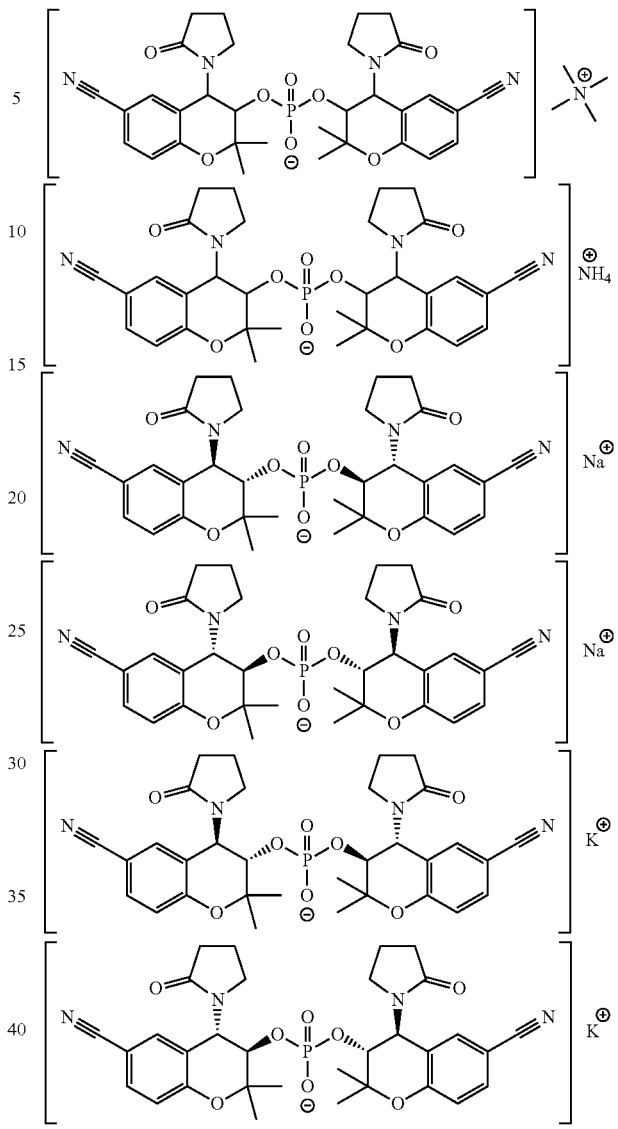

In another embodiment, the active compound is a compound of Formula II with a neutralized negative charge:

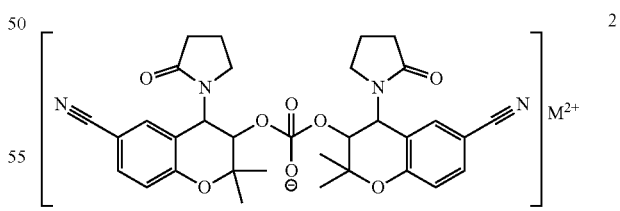

wherein $M^{2+}$ is an divalent cation, including but not limited to an alkaline earth metal cation (magnesium, calcium, or strontium), a metal cation with an oxidation state of +2 (for example, zinc or iron), or an ammonium ion with a net positive charge of two (for example, benzathine, hexamethyl diammonium, and ethylenediamine).

In an alternative embodiment, the ammonium ion with a net positive charge of two has the formula below:

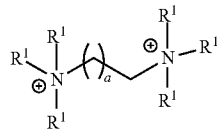

wherein $R^1$ is $C_1$-$C_6$alkyl, for example, but not limited to, methyl, ethyl, propyl, isopropyl, butyl, tbutyl, sec-butyl, isobutyl, —$CH_2C(CH_3)_3$, —$CH(CH_2CH_3)_2$, and —$CH_2CH(CH_2CH_3)_2$, cyclopropyl, $CH_2$-cyclopropyl, cyclobutyl, and $CH_2$-cyclobutyl, or aryl, for example, phenyl or napthyl; and, a is an integer selected from 1, 2, 3, 4, 5, 6, 7, and 8.

Non-limiting examples of a compound of Formula II include:

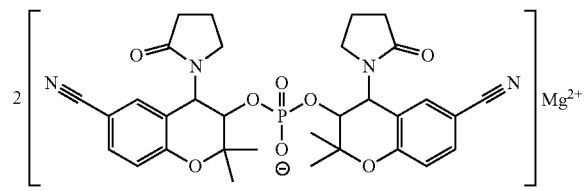

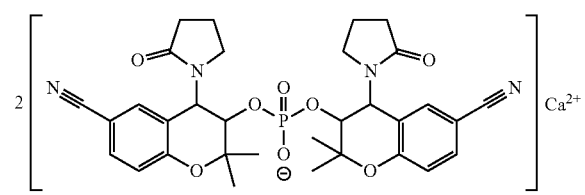

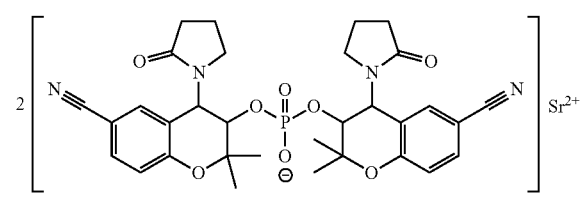

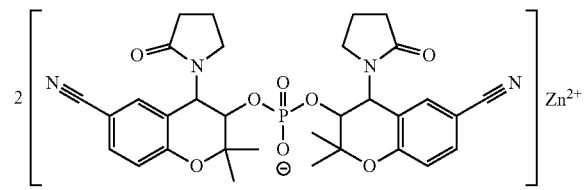

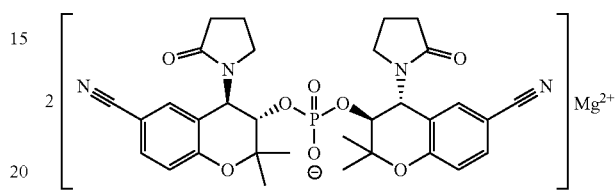

Additional non-limiting examples of a compound of Formula II include:

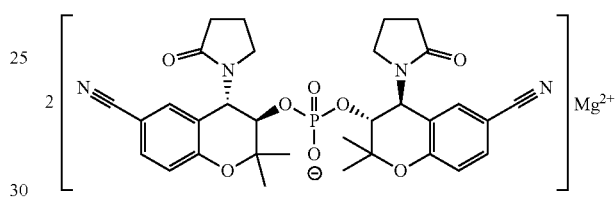

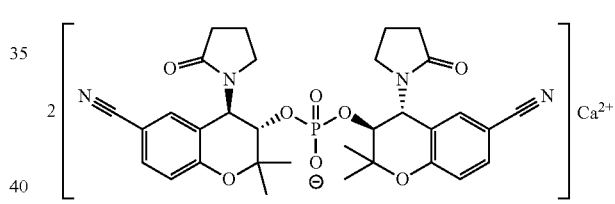

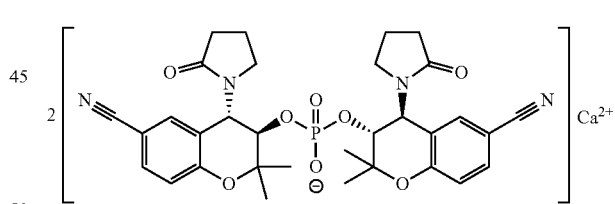

In another embodiment, the invention is an active compound or a pharmaceutically acceptable salt of the structure of Formula III:

Formula III

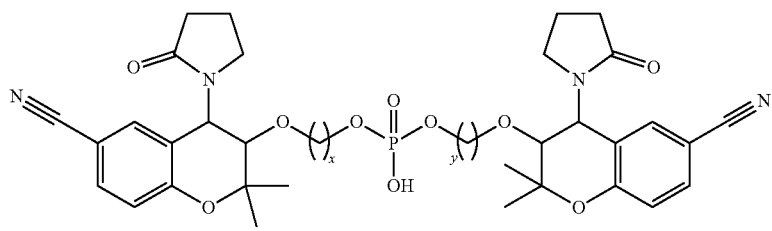

wherein x and y are independently selected from 1, 2, 3, 4, and 5, or in an alternative embodiment, x and y are independently selected from 1, 2, 3, 4, 5, 6, 7, and 8.

In one embodiment of Formula III, x and y are 1. In one embodiment of Formula III, x and y are 2. In one embodiment of Formula III, x and y are 3. In one embodiment of Formula III, x and y are 4. In one embodiment of Formula III, x and y are 5. In one embodiment of Formula III, x is 1 and y is selected from 1, 2, 3, 4, and 5. In one embodiment of Formula III, x is 2 and y is selected from 1, 2, 3, 4, and 5. In one embodiment of Formula III, x is 3 and y is 1, 2, 3, 4, and 5. In one embodiment of Formula III, x is 4 and y is selected from 1, 2, 3, 4, and 5. In one embodiment of Formula III, x is 5 and y is selected from 1, 2, 3, 4, and 5.

In one embodiment of Formula III, x is 2 and y is selected from 2, 3, 4, 5, 6, 7, and 8. In one embodiment of Formula III, x is 3 and y is selected from 2, 3, 4, 5, 6, 7, and 8. In one embodiment of Formula III, x is 4 and y is selected from 2, 3, 4, 5, 6, 7, and 8. In one embodiment of Formula III, x is 5 and y is selected from 2, 3, 4, 5, 6, 7, and 8. In one embodiment of Formula III, x is 6 and y is selected from 2, 3, 4, 5, 6, 7, and 8. In one embodiment of Formula III, x is 7 and y is selected from 2, 3, 4, 5, 6, 7, and 8. In one embodiment of Formula III, x is 8 and y is selected from 2, 3, 4, 5, 6, 7, and 8.

Non-limiting examples of a compound of Formula III include:

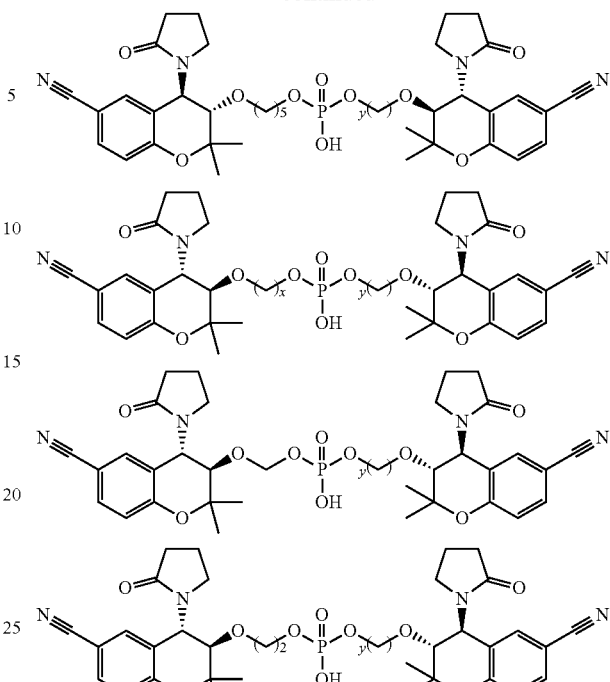

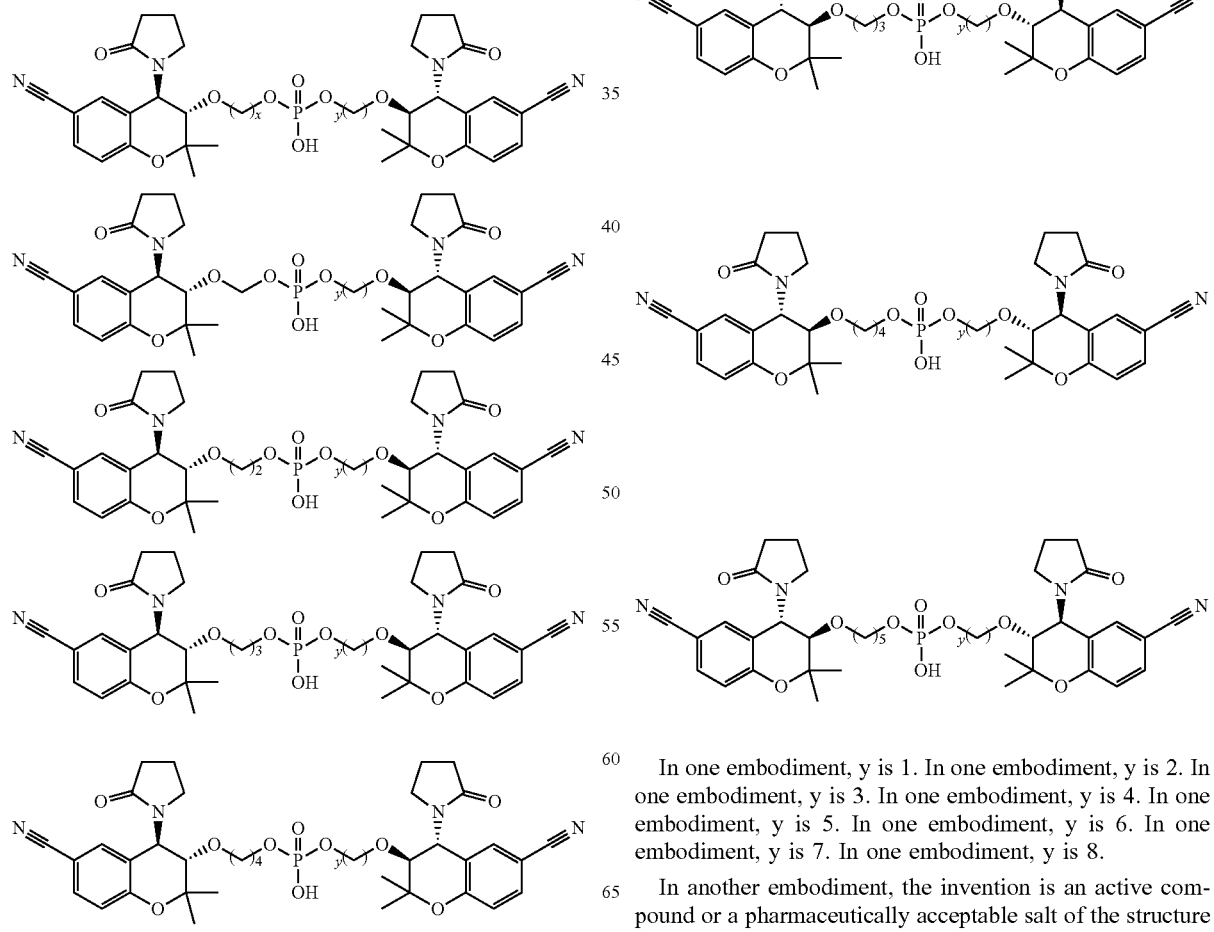

In one embodiment, y is 1. In one embodiment, y is 2. In one embodiment, y is 3. In one embodiment, y is 4. In one embodiment, y is 5. In one embodiment, y is 6. In one embodiment, y is 7. In one embodiment, y is 8.

In another embodiment, the invention is an active compound or a pharmaceutically acceptable salt of the structure of Formula IV:

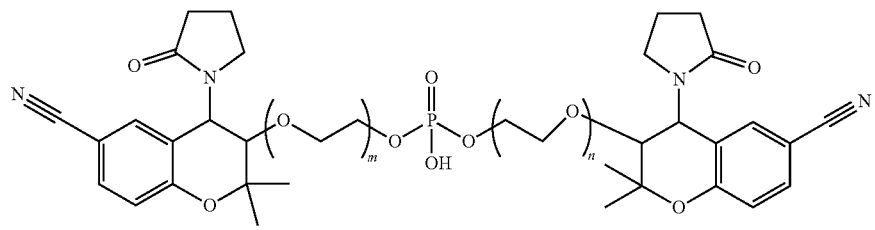

Formula IV wherein m and n are independently selected from 1, 2, 3, 4, 5, 6, 7, 8, 9, and 10, and in an alternative embodiment, m and n are independently selected from 0, 1, 2, 3, 4, 5, 6, 7, 8, 9, and 10.

In one embodiment of Formula IV, m and n are 1. In one embodiment of Formula IV, m and n are 2. In one embodiment of Formula IV, m and n are 3. In one embodiment of Formula IV, m and n are 4. In one embodiment of Formula IV, m and n are 5. In one embodiment of Formula IV, m and n are 6. In one embodiment of Formula IV, m and n are 7. In one embodiment of Formula IV, m and n are 8. In one embodiment of Formula IV, m and n are 9. In one embodiment of Formula IV, m and n are 10. In one embodiment of Formula IV, m is 1 and n is 1, 2, 3, 4, 5, 6, 7, 8, 9, or 10. In one embodiment of Formula IV, m is 2 and n is 1, 2, 3, 4, 5, 6, 7, 8, 9, or 10. In one embodiment of Formula IV, m is 3 and n is 1, 2, 3, 4, 5, 6, 7, 8, 9, or 10. In one embodiment of Formula IV, m is 4 and n is 1, 2, 3, 4, 5, 6, 7, 8, 9, or 10. In one embodiment of Formula IV, m is 5 and n is 1, 2, 3, 4, 5, 6, 7, 8, 9, or 10. In one embodiment of Formula IV, m is 6 and n is 1, 2, 3, 4, 5, 6, 7, 8, 9, or 10. In one embodiment of Formula IV, m is 7 and n is 1, 2, 3, 4, 5, 6, 7, 8, 9, or 10. In one embodiment of Formula IV, m is 8 and n is 1, 2, 3, 4, 5, 6, 7, 8, 9, or 10. In one embodiment of Formula IV, m is 9 and n is 1, 2, 3, 4, 5, 6, 7, 8, 9, or 10. In one embodiment of Formula IV, m is 10 and n is 1, 2, 3, 4, 5, 6, 7, 8, 9, or 10.

In one embodiment m and n are independently selected from 0, 1, 2, 3, 4, 5, 6, 7, 8, 9, or 10. In one embodiment of Formula IV, m is 0 and n is 0, 1, 2, 3, 4, 5, 6, 7, 8, 9, or 10. In one embodiment of Formula IV, m is 1 and n is 0, 1, 2, 3, 4, 5, 6, 7, 8, 9, or 10. In one embodiment of Formula IV, m is 2 and n is 0, 1, 2, 3, 4, 5, 6, 7, 8, 9, or 10. In one embodiment of Formula IV, m is 3 and n is 0, 1, 2, 3, 4, 5, 6, 7, 8, 9, or 10. In one embodiment of Formula IV, m is 4 and n is 0, 1, 2, 3, 4, 5, 6, 7, 8, 9, or 10. In one embodiment of Formula IV, m is 5 and n is 0, 1, 2, 3, 4, 5, 6, 7, 8, 9, or 10. In one embodiment of Formula IV, m is 6 and n is 0, 1, 2, 3, 4, 5, 6, 7, 8, 9, or 10. In one embodiment of Formula IV, m is 7 and n is 0, 1, 2, 3, 4, 5, 6, 7, 8, 9, or 10. In one embodiment of Formula IV, m is 8 and n is 0, 1, 2, 3, 4, 5, 6, 7, 8, 9, or 10. In one embodiment of Formula IV, m is 9 and n is 0, 1, 2, 3, 4, 5, 6, 7, 8, 9, or 10. In one embodiment of Formula IV, m is 10 and n is 0, 1, 2, 3, 4, 5, 6, 7, 8, 9, or 10.

Non-limiting examples of a compound of Formula IV include:

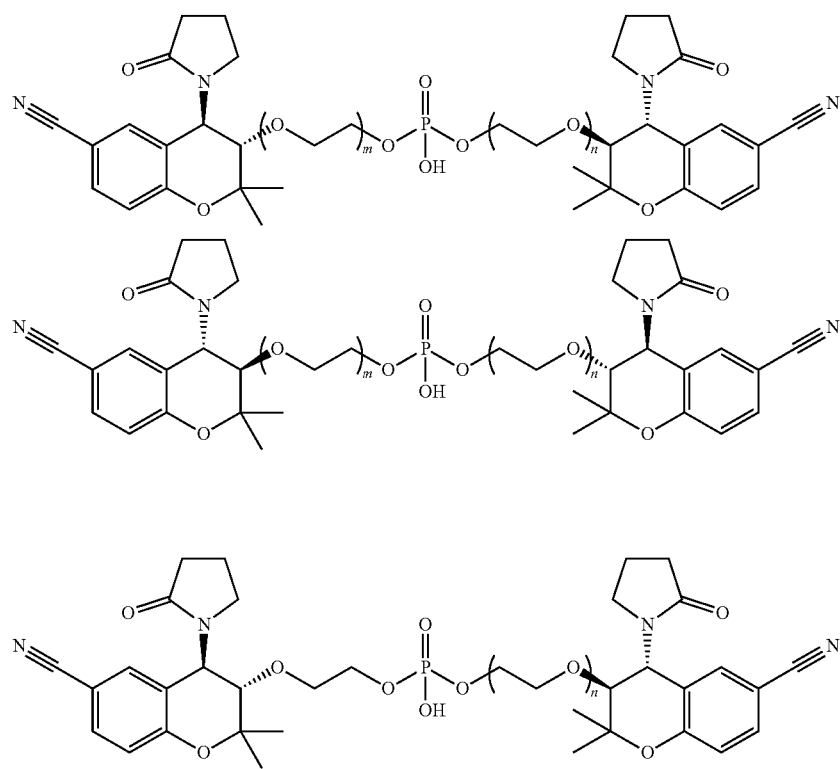

-continued
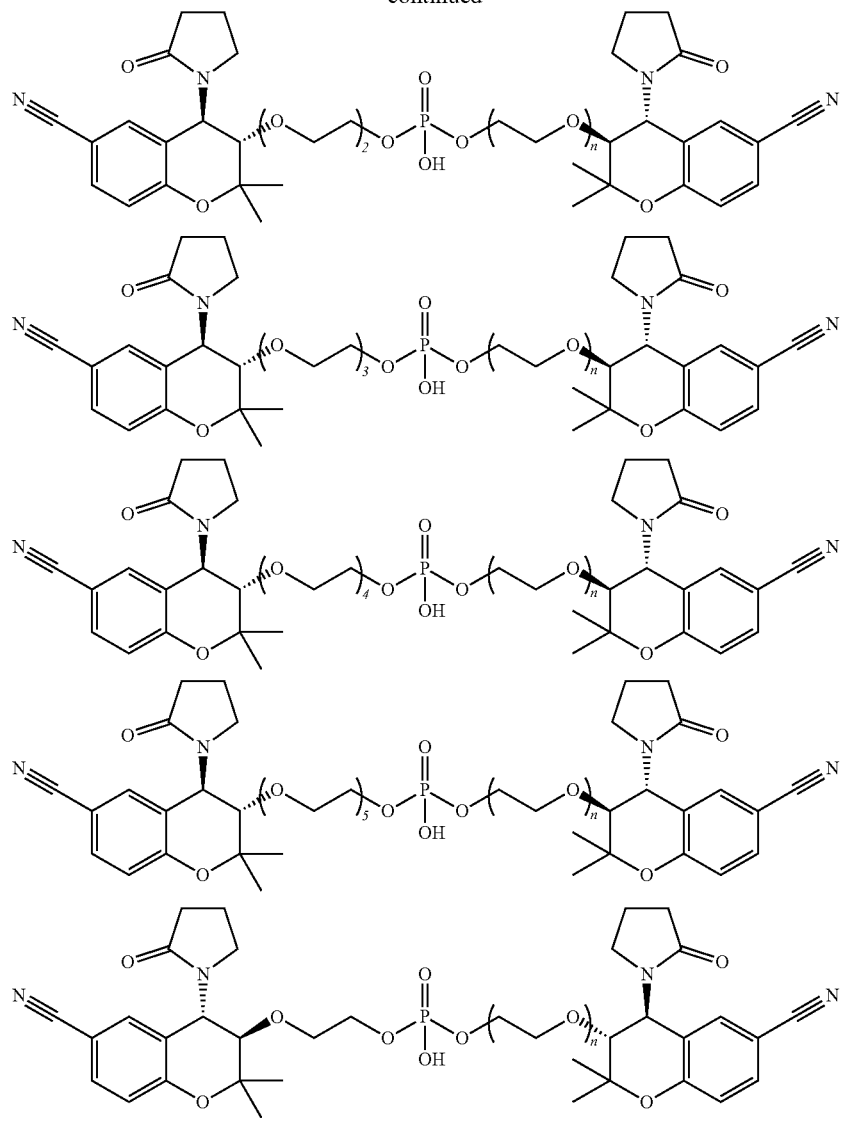
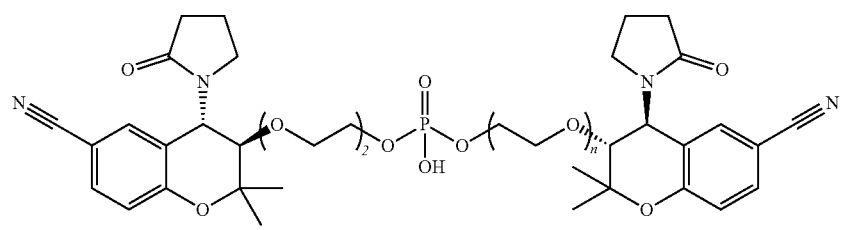
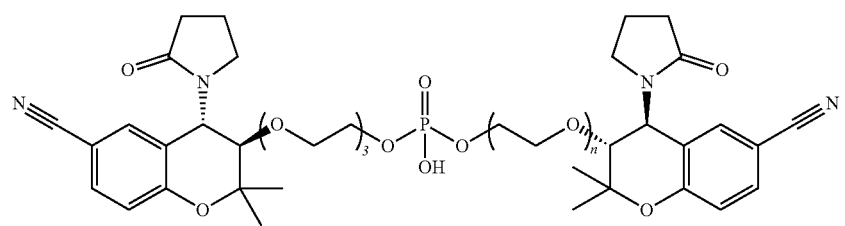

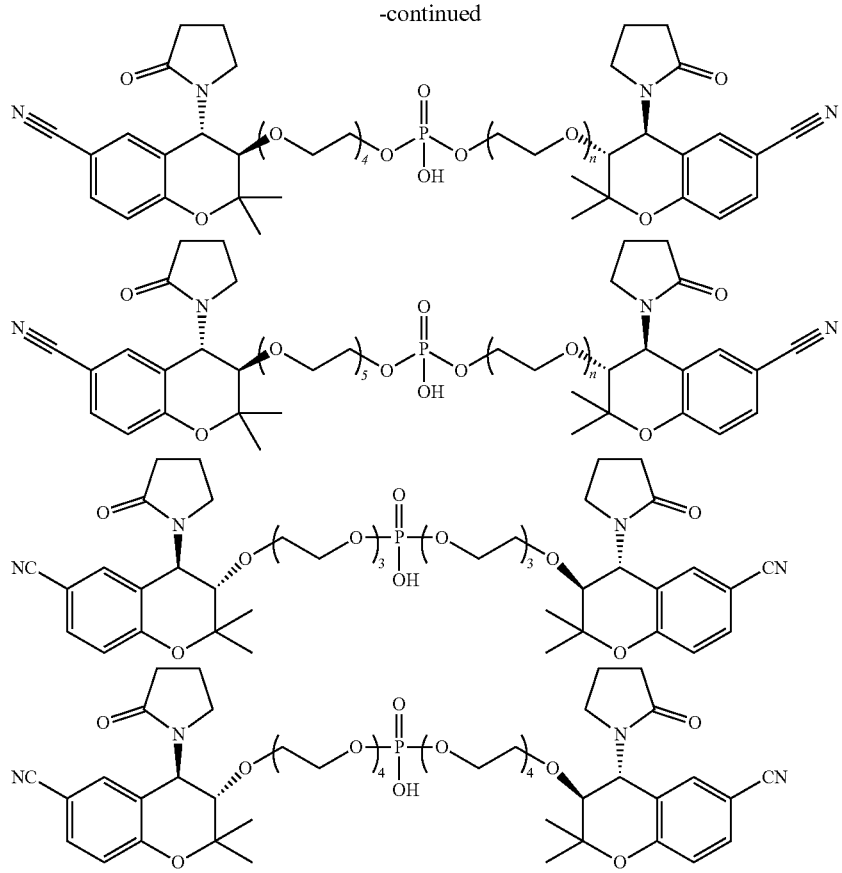

In one embodiment, n is 1. In one embodiment, n is 2. In one embodiment, n is 3. In one embodiment, n is 4. In one embodiment, n is 5. In one embodiment, n is 6. In one embodiment, n is 7. In one embodiment, n is 8.

Additional non-limiting examples of a compound of Formula IV include:

In one embodiment, n is 1. In one embodiment, n is 2. In one embodiment, n is 3. In one embodiment, n is 4. In one embodiment, n is 5. In one embodiment, n is 6. In one embodiment, n is 7. In one embodiment, n is 8.

In another embodiment, the invention is an active compound of Formula V or Formula VI with a neutralized negative charge:

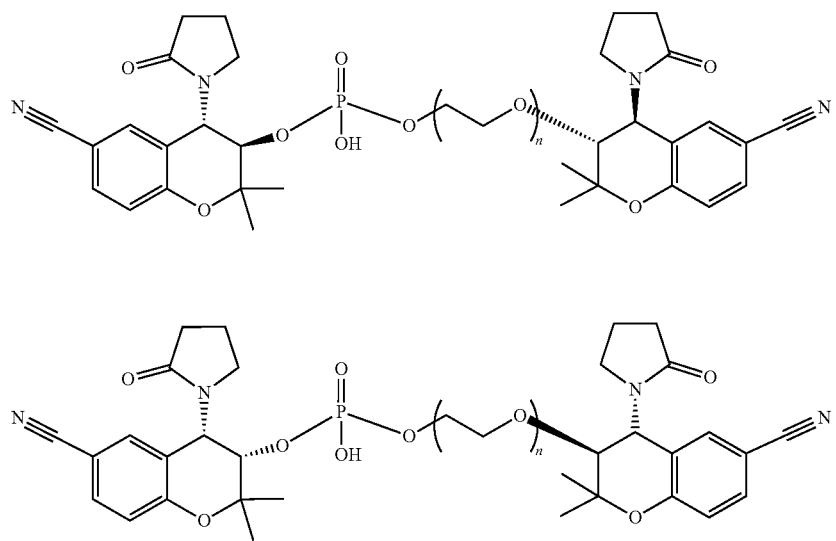

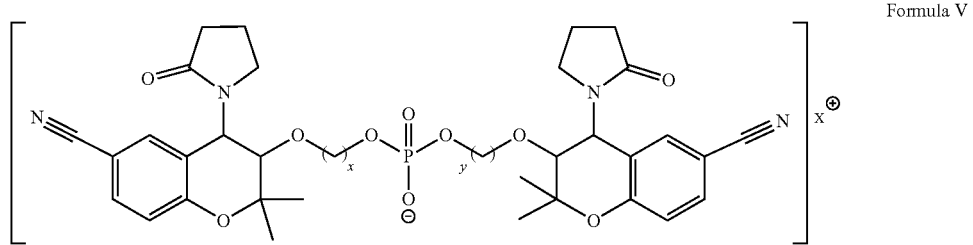
Formula V
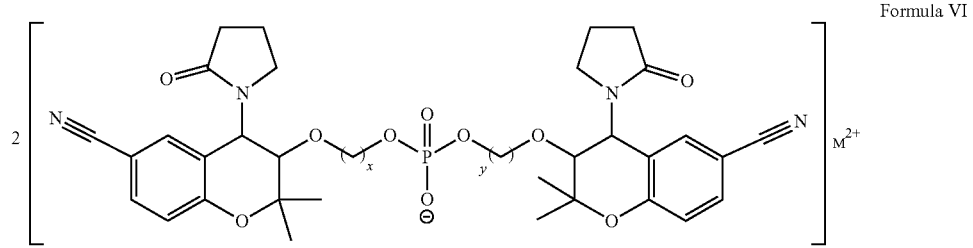
Formula VI
wherein x, y, $X^+$ and $M^{2+}$ are defined herein.
Non-limiting examples of a compound of Formula V include:
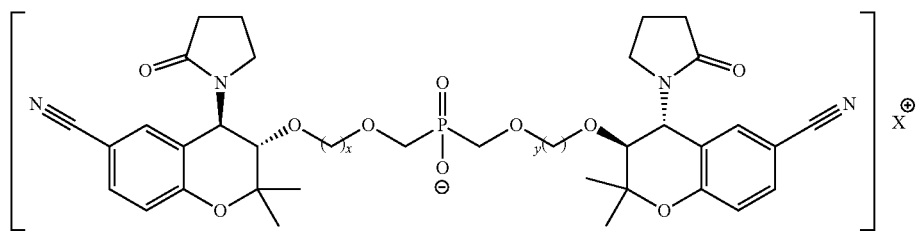
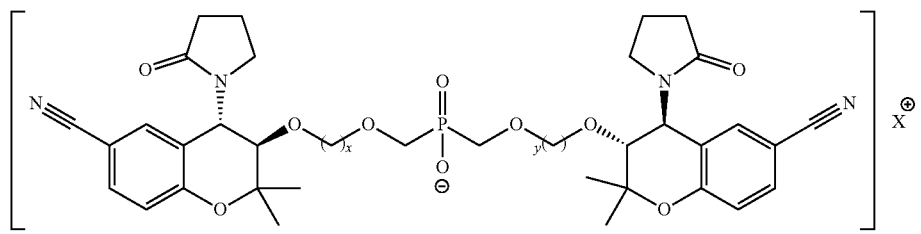
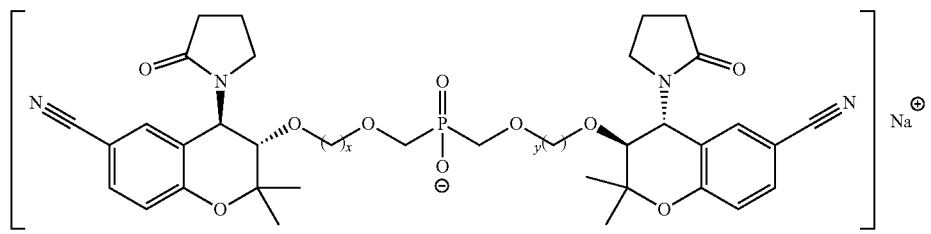
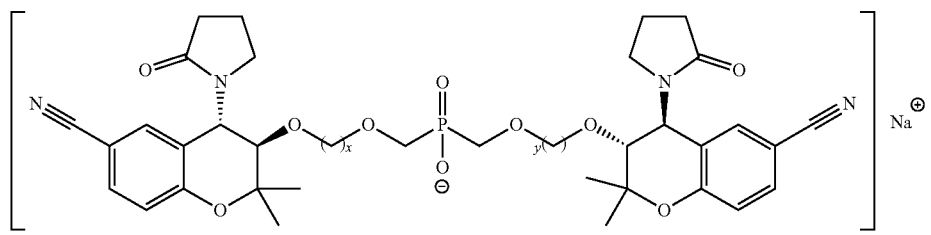

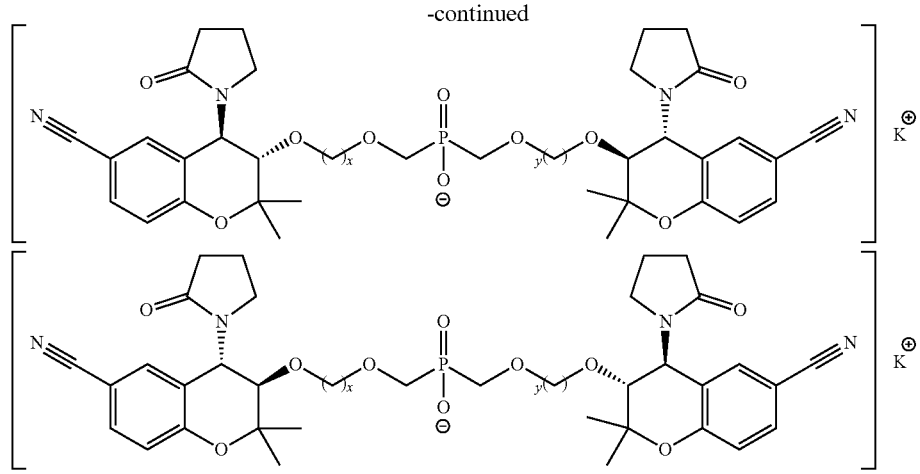
Non-limiting examples of a compound of Formula VI include:
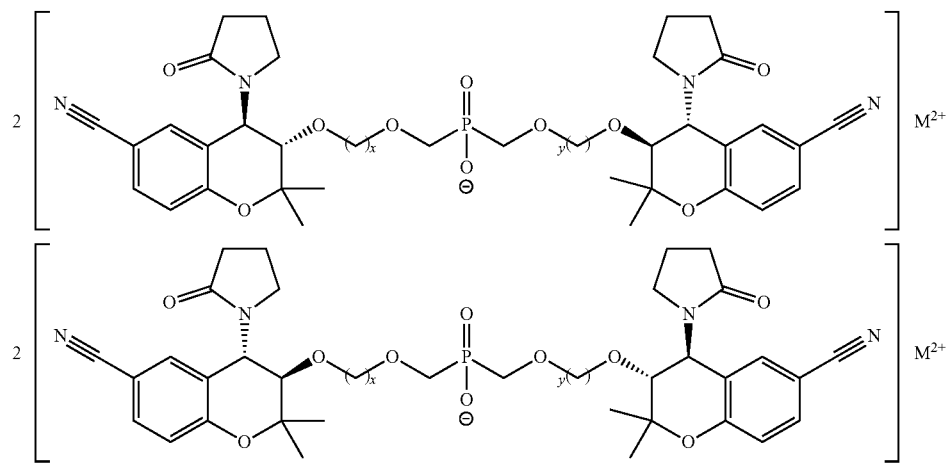
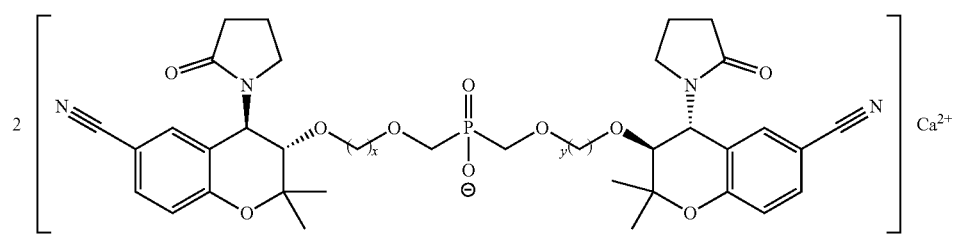
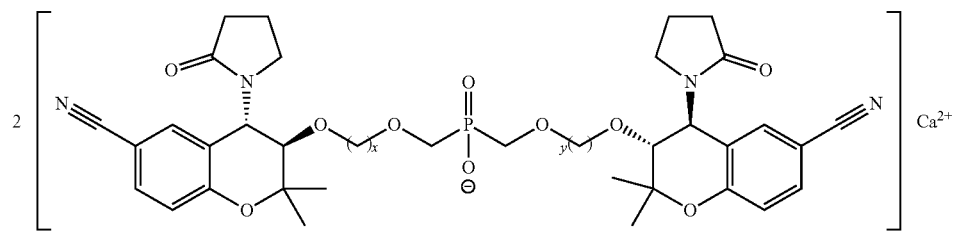

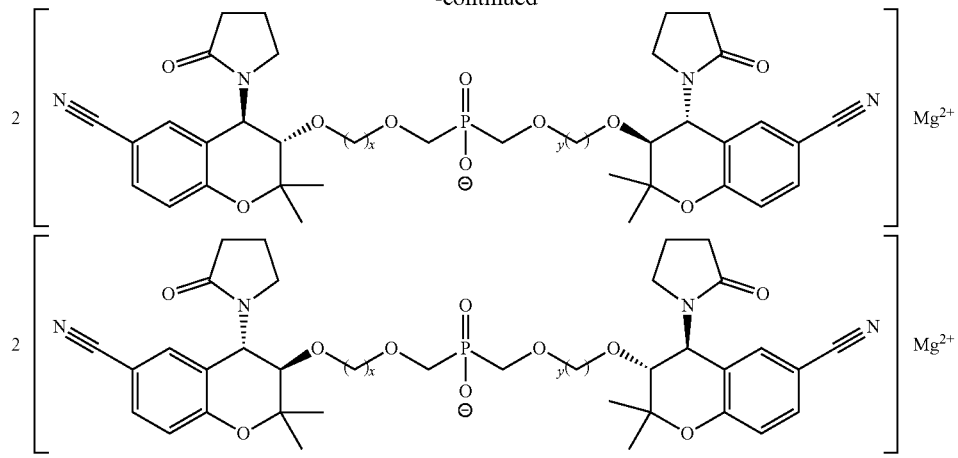

In one embodiment of Formula V or Formula VI, x and y are 1. In one embodiment of Formula V or Formula VI, x and y are 2. In one embodiment of Formula V or Formula VI, x and y are 3. In one embodiment of Formula V or Formula VI, x and y are 4. In one embodiment of Formula V or Formula VI, x and y are 5. In one embodiment of Formula V or Formula VI, x is 1 and y is selected from 1, 2, 3, 4, and 5. In one embodiment of Formula V or Formula VI, x is 2 and y is selected from 1, 2, 3, 4, and 5. In one embodiment of Formula V or Formula VI, x is 3 and y is 1, 2, 3, 4, and 5. In one embodiment of Formula V or Formula VI, x is 4 and y is selected from 1, 2, 3, 4, and 5. In one embodiment of Formula V or Formula VI, x is 5 and y is selected from 1, 2, 3, 4, and 5.

In one embodiment of Formula V or Formula VI, x is 2 and y is selected from 2, 3, 4, 5, 6, 7, and 8. In one embodiment of Formula V or Formula VI, x is 3 and y is selected from 2, 3, 4, 5, 6, 7, and 8. In one embodiment of Formula V or Formula VI, x is 4 and y is selected from 2, 3, 4, 5, 6, 7, and 8. In one embodiment of Formula V or Formula VI, x is 5 and y is selected from 2, 3, 4, 5, 6, 7, and 8. In one embodiment of Formula V or Formula VI, x is 6 and y is selected from 2, 3, 4, 5, 6, 7, and 8. In one embodiment of Formula V or Formula VI, x is 7 and y is selected from 2, 3, 4, 5, 6, 7, and 8. In one embodiment of Formula V or Formula VI, x is 8 and y is selected from 2, 3, 4, 5, 6, 7, and 8.

In another embodiment, the invention is an active compound of Formula VII or Formula VIII with a neutralized negative charge:

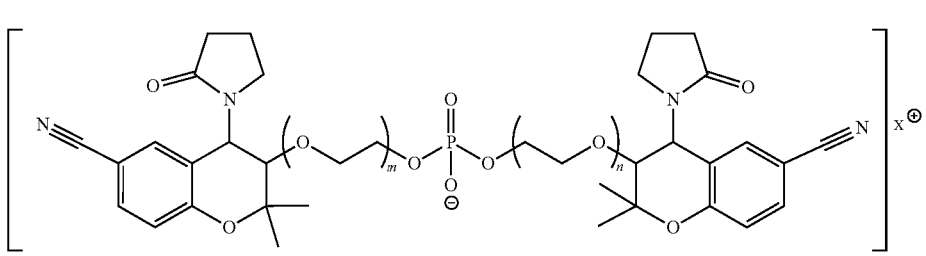

Formula VII

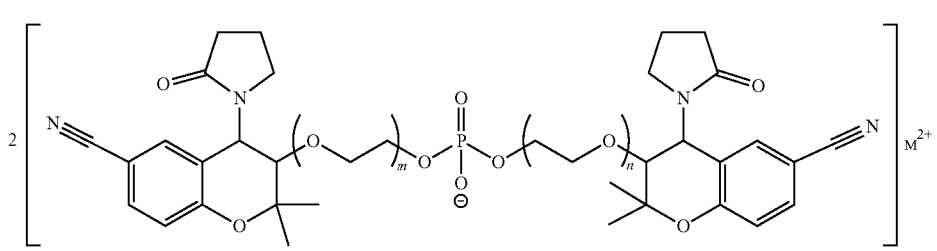

Formula VIII wherein m, n, $X^+$ and $M^{2+}$ are defined herein.

Non-limiting examples of a compound of Formula VII or Formula VIII include:
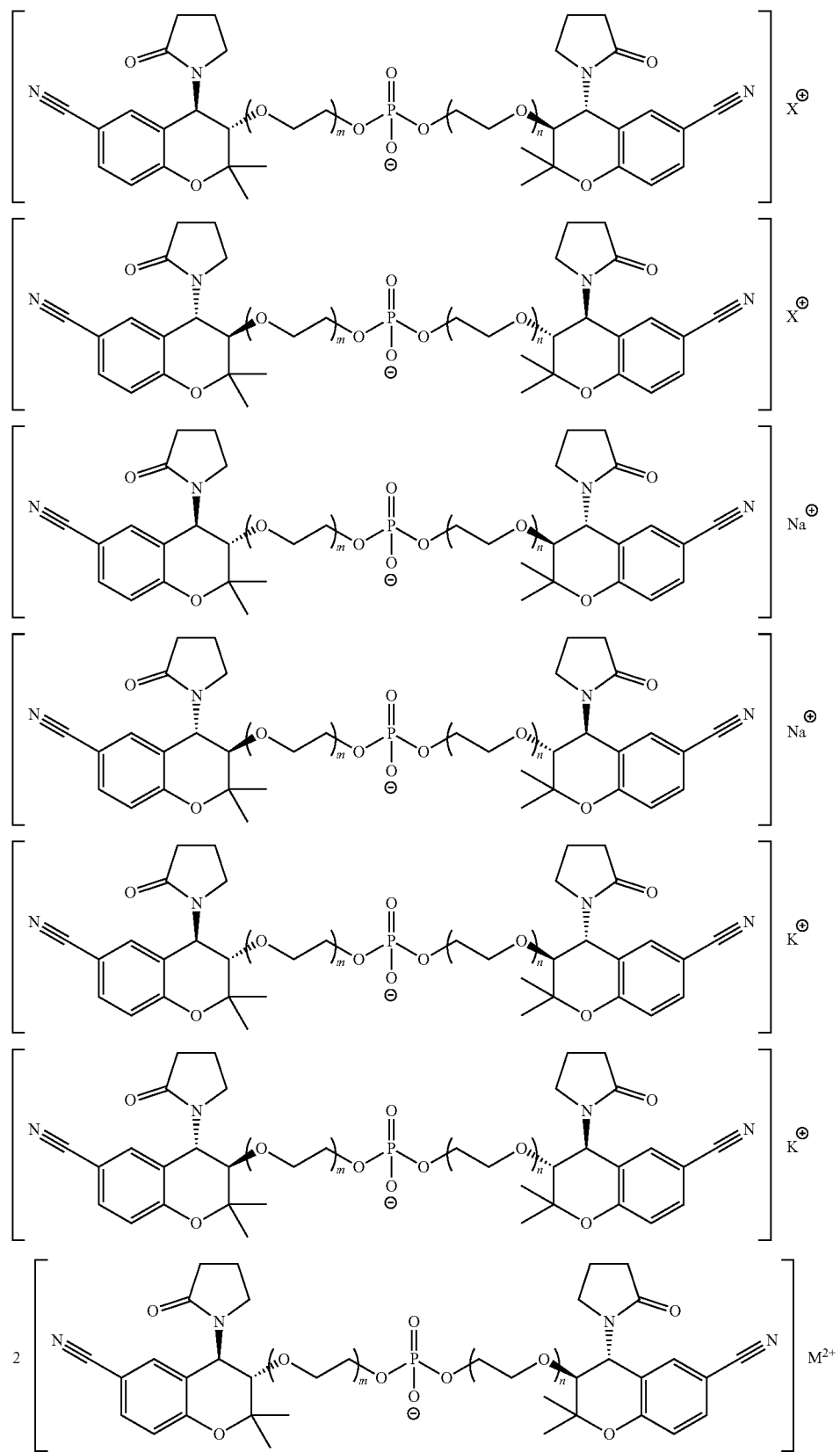

In one embodiment of Formula VII or Formula VIII, m and n are 1. In one embodiment of Formula VII or Formula VIII, m and n are 2. In one embodiment of Formula VII or Formula VIII, m and n are 3. In one embodiment of Formula VII or Formula VIII, m and n are 4. In one embodiment of Formula VII or Formula VIII, m and n are 5. In one embodiment of Formula VII or Formula VIII, m and n are 6. In one embodiment of Formula VII or Formula VIII, m and n are 7. In one embodiment of Formula VII or Formula VIII, m and n are 8. In one embodiment of Formula VII or Formula VIII, m and n are 9. In one embodiment of Formula VII or Formula VIII, m and n are 10. In one embodiment of Formula VII or Formula VIII, m is 1 and n is 1, 2, 3, 4, 5, 6, 7, 8, 9, or 10. In one embodiment of Formula VII or Formula VIII, m is 2 and n is 1, 2, 3, 4, 5, 6, 7, 8, 9, or 10. In one embodiment of Formula VII or Formula VIII, m is 3 and n is 1, 2, 3, 4, 5, 6, 7, 8, 9, or 10. In one embodiment of Formula VII or Formula VIII, m is 4 and n is 1, 2, 3, 4, 5, 6, 7, 8, 9, or 10. In one embodiment of Formula VII or Formula VIII, m is 5 and n is 1, 2, 3, 4, 5, 6, 7, 8, 9, or 10. In one embodiment of Formula VII or Formula VIII, m is 6 and n is 1, 2, 3, 4, 5, 6, 7, 8, 9, or 10. In one embodiment of Formula VII or Formula VIII, m is 7 and n is 1, 2, 3, 4, 5, 6, 7, 8, 9, or 10. In one embodiment of Formula VII or Formula VIII, m is 8 and n is 1, 2, 3, 4, 5, 6, 7, 8, 9, or 10. In one embodiment of Formula VII or Formula VIII, m is 9 and n is 1, 2, 3, 4, 5, 6, 7, 8, 9, or 10. In one embodiment of Formula VII or Formula VIII, m is 10 and n is 1, 2, 3, 4, 5, 6, 7, 8, 9, or 10.

In one embodiment m and n are independently selected from 0, 1, 2, 3, 4, 5, 6, 7, 8, 9, or 10. In one embodiment of Formula VII or Formula VIII, m is 0 and n is 0, 1, 2, 3, 4, 5, 6, 7, 8, 9, or 10. In one embodiment of Formula VII or Formula VIII, m is 1 and n is 0, 1, 2, 3, 4, 5, 6, 7, 8, 9, or 10. In one embodiment of Formula VII or Formula VIII, m is 2 and n is 0, 1, 2, 3, 4, 5, 6, 7, 8, 9, or 10. In one embodiment of Formula VII or Formula VIII, m is 3 and n is 0, 1, 2, 3, 4, 5, 6, 7, 8, 9, or 10. In one embodiment of Formula VII or Formula VII, m is 4 and n is 0, 1, 2, 3, 4, 5, 6, 7, 8, 9, or 10. In one embodiment of Formula VII or Formula VIII, m is 5 and n is 0, 1, 2, 3, 4, 5, 6, 7, 8, 9, or 10. In one embodiment of Formula VII or Formula VIII, m is 6 and n is 0, 1, 2, 3, 4, 5, 6, 7, 8, 9, or 10. In one embodiment of Formula VII or Formula VIII, m is 7 and n is 0, 1, 2, 3, 4, 5, 6, 7, 8, 9, or 10. In one embodiment of Formula VII or Formula VIII, m is 8 and n is 0, 1, 2, 3, 4, 5, 6, 7, 8, 9, or 10. In one embodiment of Formula VII or Formula VIII, m is 9 and n is 0, 1, 2, 3, 4, 5, 6, 7, 8, 9, or 10. In one embodiment of Formula VII or Formula VIII, m is 10 and n is 0, 1, 2, 3, 4, 5, 6, 7, 8, 9, or 10.

Additional non-limiting examples of a compound of Formula VII or Formula VIII include:

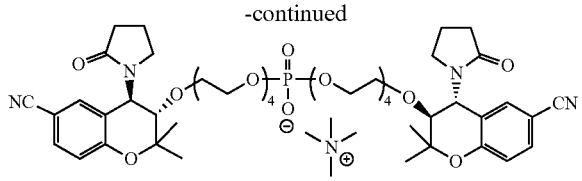

In another embodiment, the invention is an active compound or a pharmaceutically acceptable salt of the structure of Formula IX or Formula X:

Formula IX

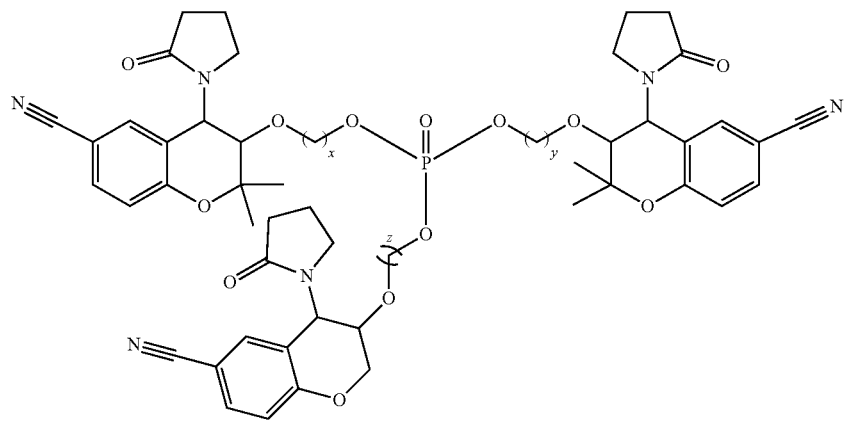

Formula X

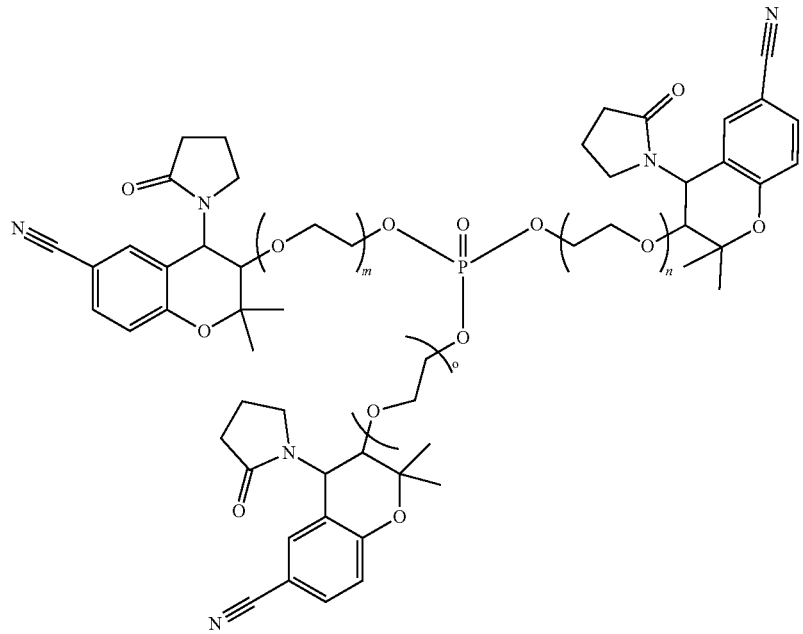

wherein x, y, and z are independently selected from 1, 2, 3, 4, and 5, or in an alternative embodiment, x, y, and z are independently selected from 1, 2, 3, 4, 5, 6, 7, and 8; and m, n, and o are independently selected from 1, 2, 3, 4, 5, 6, 7, 8, 9, and 10, or in an alternative embodiment, m, n, and o are independently selected from 0, 1, 2, 3, 4, 5, 6, 7, 8, 9, and 10.

In one embodiment of Formula IX, x, y, and z are 1. In one embodiment of Formula IX, x, y, and z are 2. In one embodiment of Formula IX, x, y, and z are 3. In one embodiment of Formula IX, x, y, and z are 4. In one embodiment of Formula IX, x, y, and z are 5.

In another embodiment, x, y, and z are independently selected from 1, 2, 3, 4, 5, 6, 7, or 8. In another embodiment, x, y, and z are each different values. In one embodiment, x is 2, y is 2, and z is selected from 1, 2, 3, 4, 5, 6, 7, and 8. In one embodiment, x is 3, y is 3, and z is selected from 1, 2, 3, 4, 5, 6, 7, and 8. In one embodiment, x is 4, y is 4, and z is selected from 1, 2, 3, 4, 5, 6, 7, and 8. In one embodiment, x is 5, y is 5, and z is selected from 1, 2, 3, 4, 5, 6, 7, and 8. In one embodiment, x is 6, y is 6, and z is selected from 1, 2, 3, 4, 5, 6, 7, and 8. In one embodiment, x is 7, y is 7, and z is selected from 1, 2, 3, 4, 5, 6, 7, and 8. In one embodiment, x is 8, y is 8, and z is selected from 1, 2, 3, 4, 5, 6, 7, and 8.

In one embodiment of Formula X, m, n, and o are 1. In one embodiment of Formula X, m, n, and o are 2. In one embodiment of Formula X, m, n, and o are 3. In one embodiment of Formula X, m, n, and o are 4. In one embodiment of Formula X, m, n, and o are 5. In one embodiment of Formula X, m, n, and o are 6. In one embodiment of Formula X, m, n, and o are 7. In one embodiment of Formula X, m, n, and o are 8. In one embodiment of Formula X, m, n, and o are 9. In one embodiment of Formula X, m, n, and o are 10.

In another embodiment, m, n, and o are selected from 0, 1, 2, 3, 4, 5, 6, 7, 8, 9, and 10. In another embodiment, m, n, and o are each different values. In another embodiment, m and n are 0 and o is selected from 0, 1, 2, 3, 4, 5, 6, 7, 8, 9, and 10. In another embodiment, m and n are 1 and o is selected from 0, 1, 2, 3, 4, 5, 6, 7, 8, 9, and 10. In another embodiment, m and n are 2 and o is selected from 0, 1, 2, 3, 4, 5, 6, 7, 8, 9, and 10. In another embodiment, m and n are 3 and o is selected from 0, 1, 2, 3, 4, 5, 6, 7, 8, 9, and 10. In another embodiment, m and n are 4 and o is selected from 0, 1, 2, 3, 4, 5, 6, 7, 8, 9, and 10. In another embodiment, m and n are 5 and o is selected from 0, 1, 2, 3, 4, 5, 6, 7, 8, 9, and 10. In another embodiment, m and n are 6 and o is selected from 0, 1, 2, 3, 4, 5, 6, 7, 8, 9, and 10. In another embodiment, m and n are 7 and o is selected from 0, 1, 2, 3, 4, 5, 6, 7, 8, 9, and 10. In another embodiment, m and n are 8 and o is selected from 0, 1, 2, 3, 4, 5, 6, 7, 8, 9, and 10. In another embodiment, m and n are 9 and o is selected from 0, 1, 2, 3, 4, 5, 6, 7, 8, 9, and 10. In another embodiment, m and n are 10 and o is selected from 0, 1, 2, 3, 4, 5, 6, 7, 8, 9, and 10.

Non-limiting examples of a compound of Formula IX include:

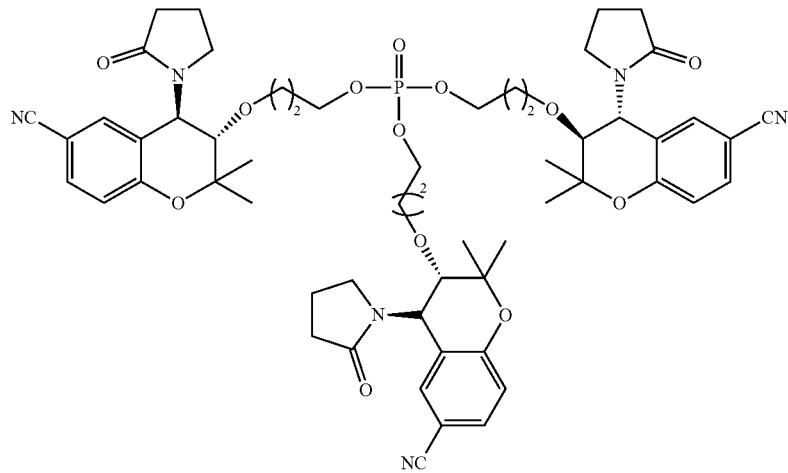

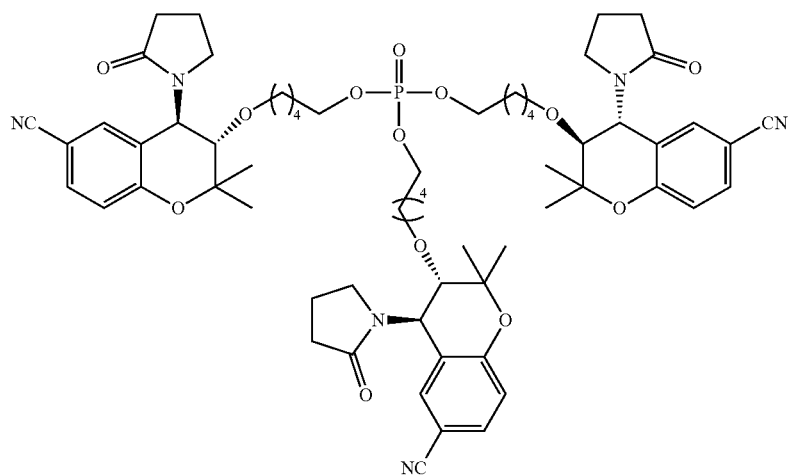

-continued
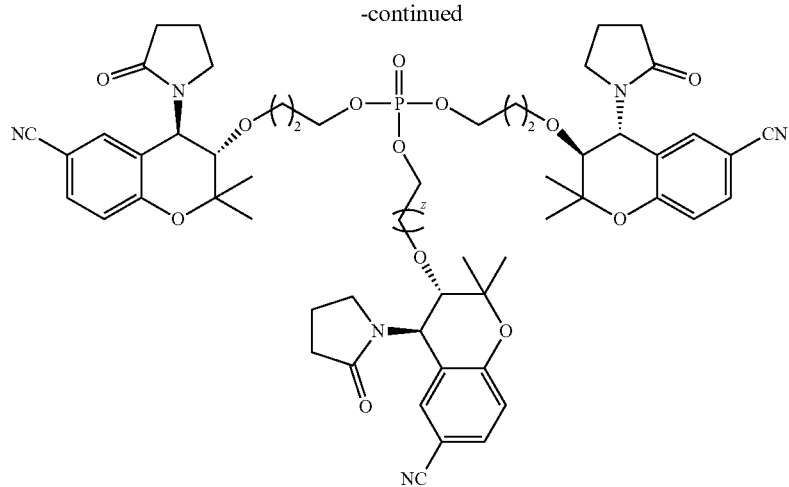
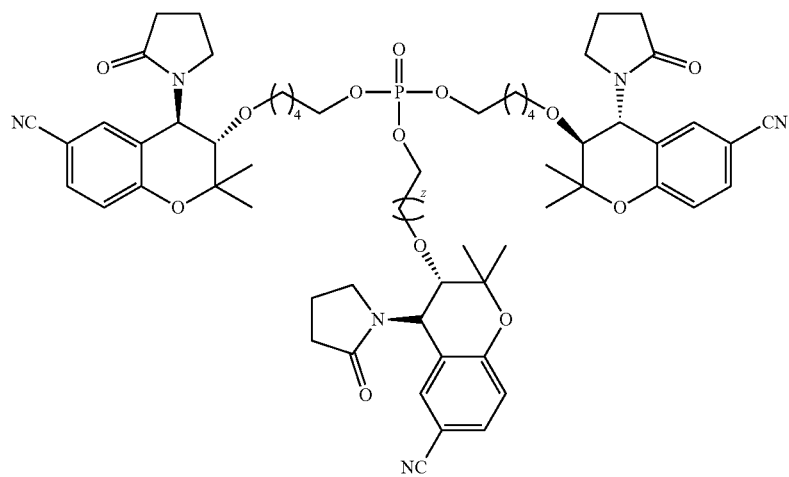
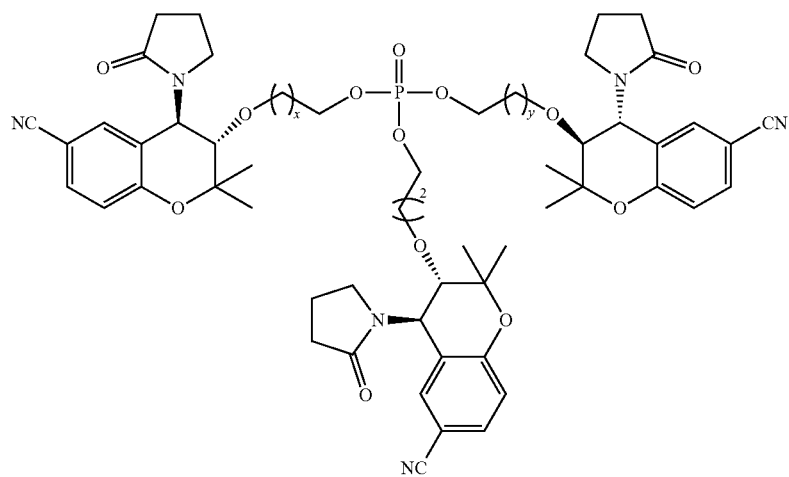

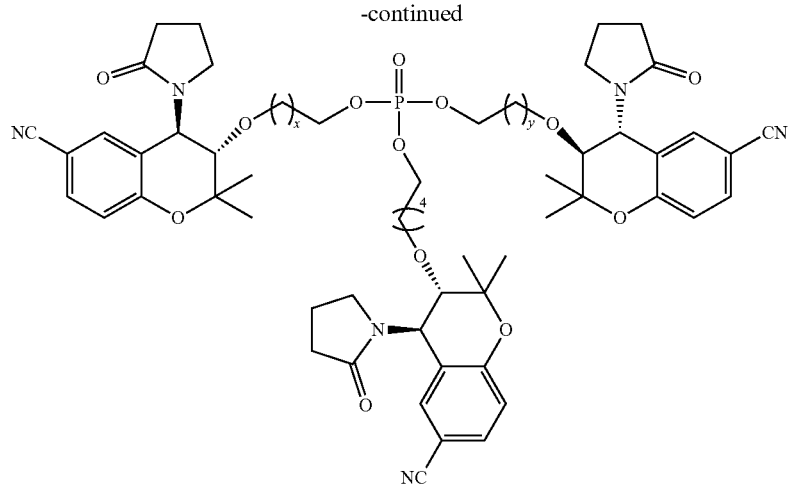
Non-limiting examples of a compound of Formula X include:
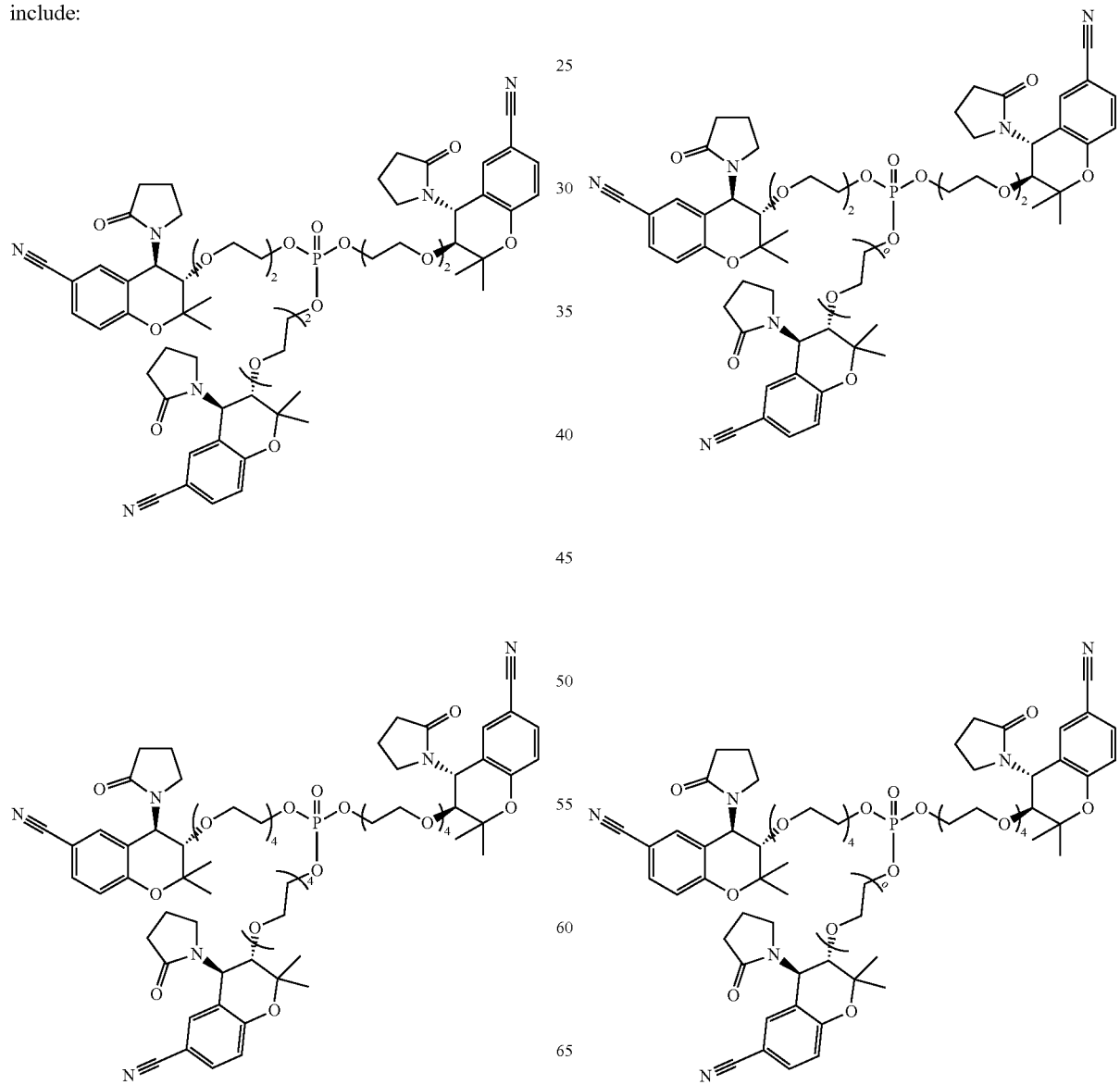

-continued

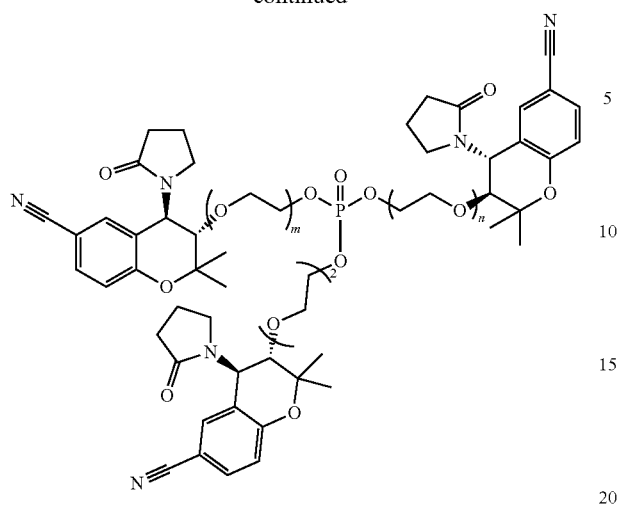

In one embodiment, the active compound or pharmaceutically acceptable salt is Compound 2 or a pharmaceutically acceptable thereof.

Compound 2

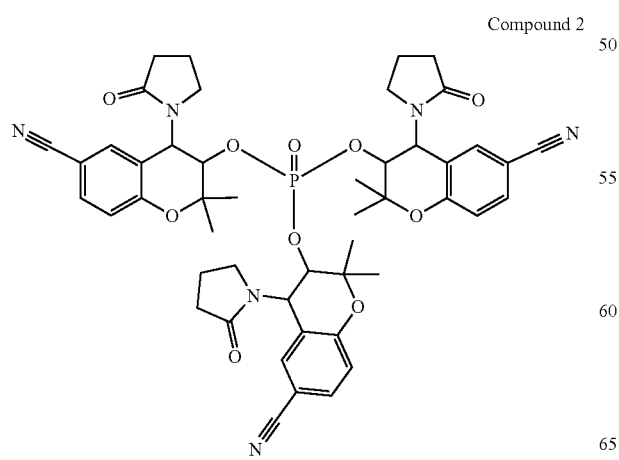

In another embodiment, the active compound or pharmaceutically acceptable salt is Compound 3 or Compound 4 or a pharmaceutically acceptable salt thereof:

Compound 3

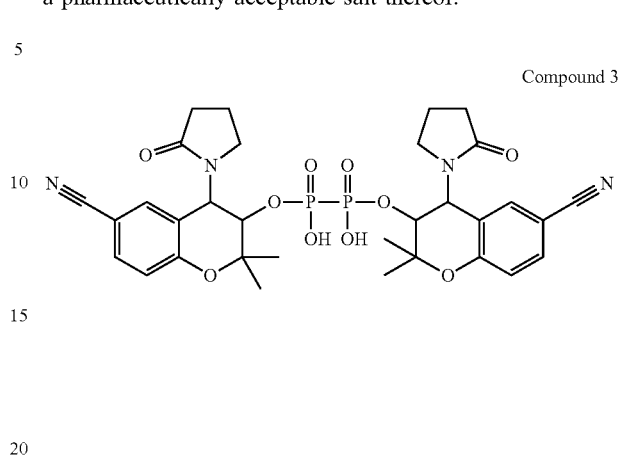

Compound 4

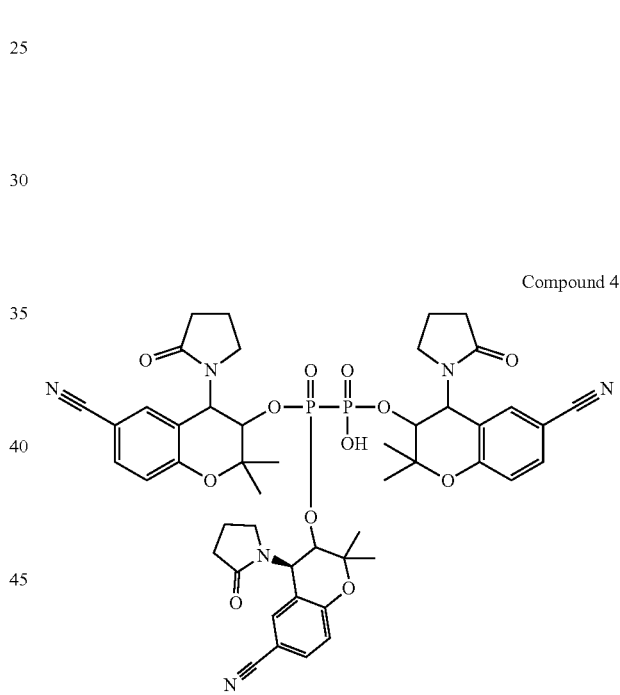

Compound 4

In another embodiment, the invention is a compound of Formula XI or Formula XII with a neutralized negative charge:

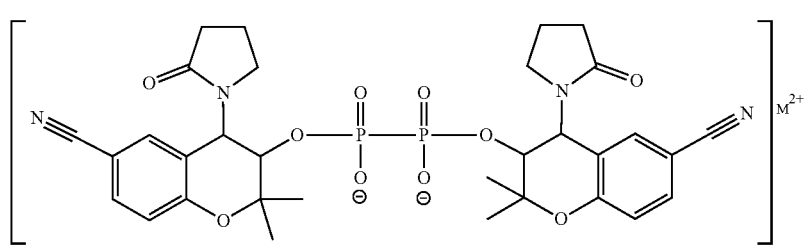
Formula XI
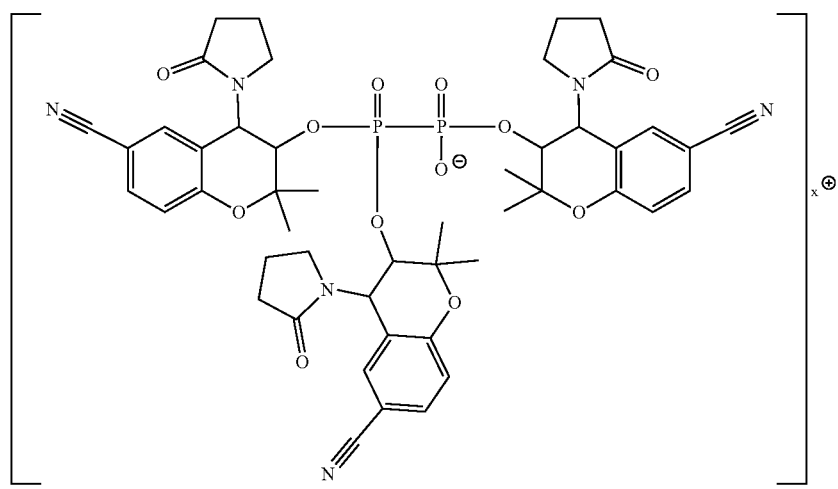
Formula XII
wherein X⁺ and M²⁺ are defined herein.
Non-limiting examples of a compound of Formula XI and XII include:
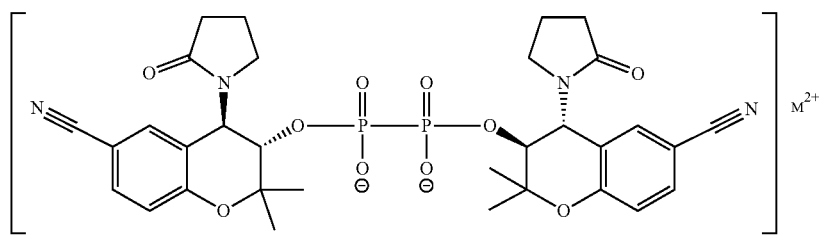
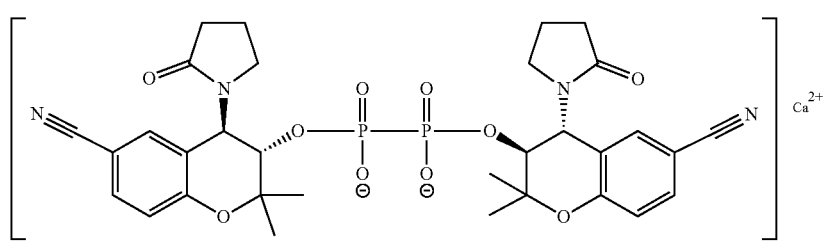

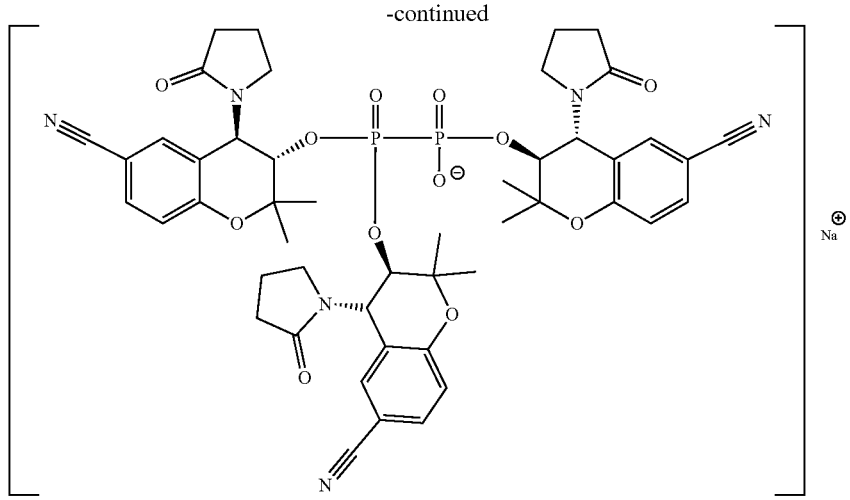

In an alternative embodiment, the invention is a compound of Formula XIA with a neutralized negative charge:

Formula XIA

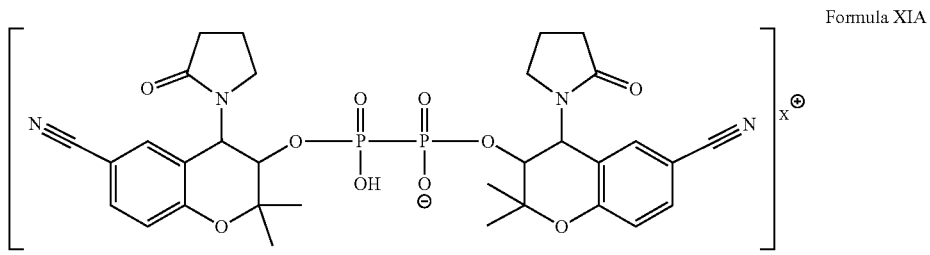

Non-limiting examples of a compound of Formula XIA include:

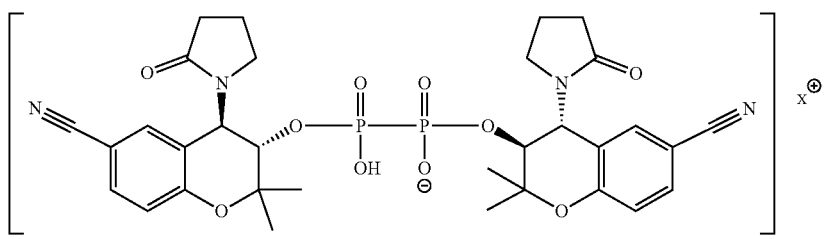

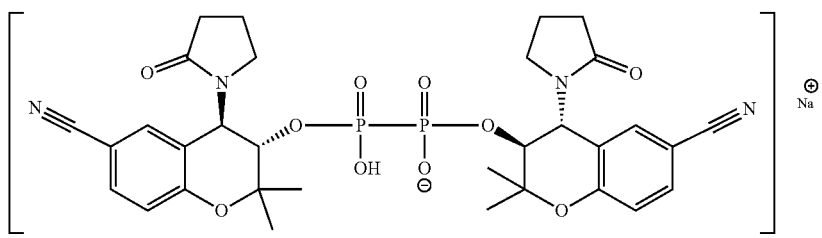

In another embodiment, the invention is an active compound or a pharmaceutically acceptable salt of the structure of Formula XIII or a compound of Formula XIV, or Formula XV with a neutralized negative charge:

Formula XIII

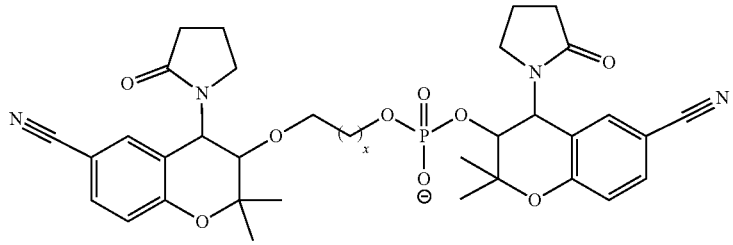

Formula XIV

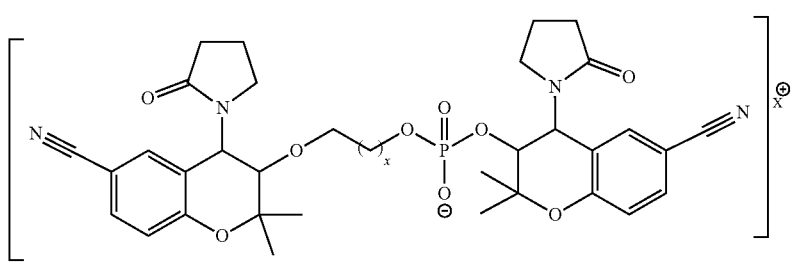

Formula XV

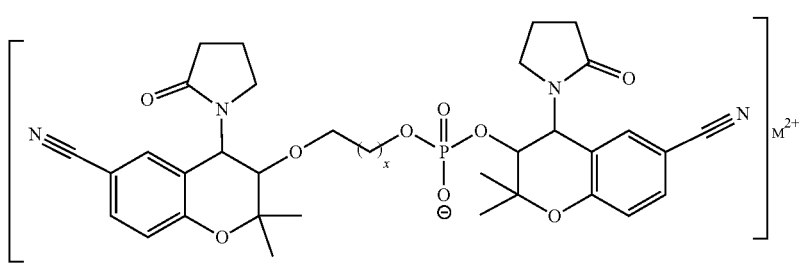

wherein x, X⁺, and M²⁺ are defined herein.

In one embodiment of Formula XIII, Formula XIV, or Formula XV, x is selected from 1, 2, 3, 4, 5, 6, 7, and 8. In one embodiment of Formula XIII, Formula XIV, or Formula XV, x is 1. In one embodiment of Formula XIII, Formula XIV, or Formula XV, x is 2. In one embodiment of Formula XIII, Formula XIV, or Formula XV, x is 3. In one embodiment of Formula XIII, Formula XIV, or Formula XV, x is 4. In one embodiment of Formula XIII, Formula XIV, or Formula XV, x is 5. In one embodiment of Formula XIII, Formula XIV, or Formula XV, x is 6. In one embodiment of Formula XIII, Formula XIV, or Formula XV, x is 7. In one embodiment of Formula XIII, Formula XIV, or Formula XV, x is 8.

Non-limiting examples of compound of Formula XIII, Formula XIV, and Formula XV include:

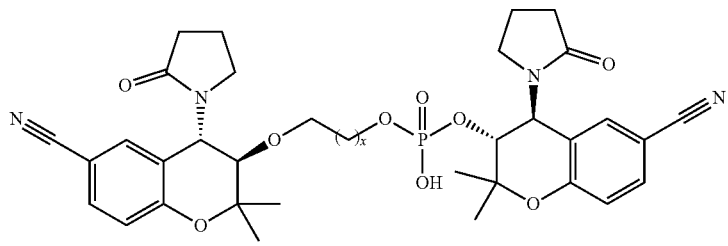

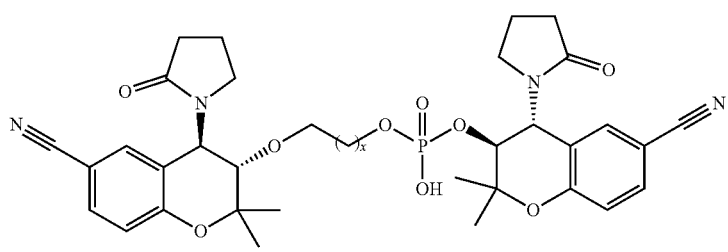

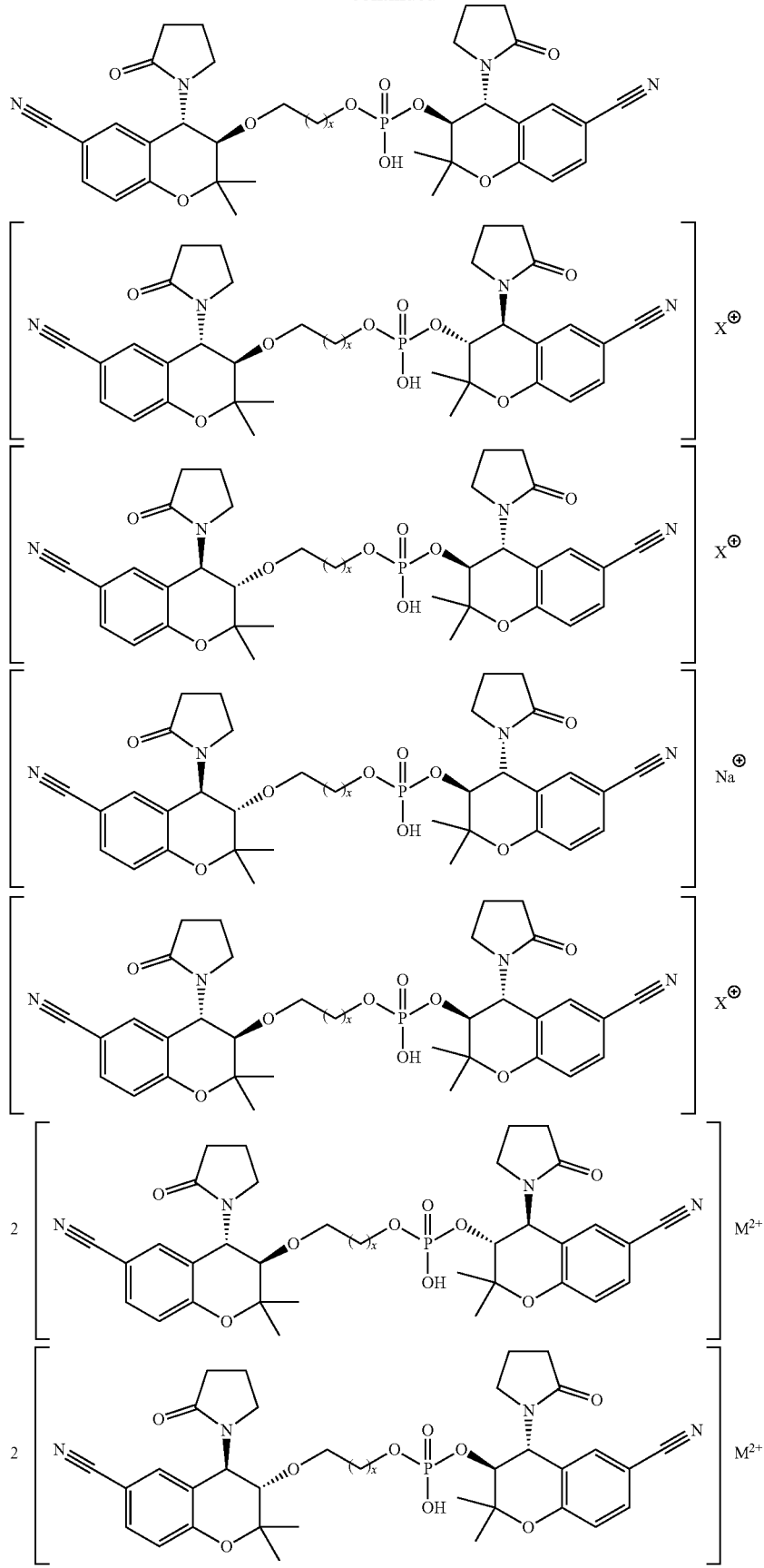

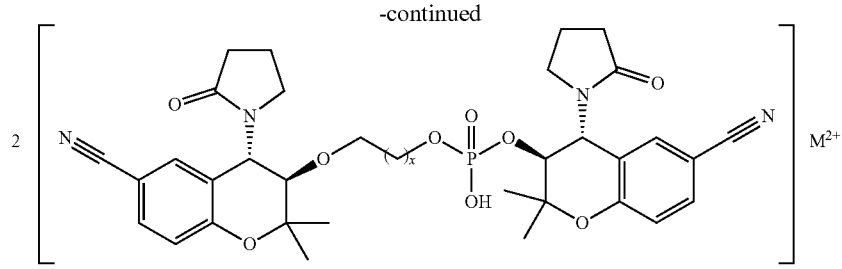

In another embodiment, the invention is an active compound or a pharmaceutically acceptable salt of the structure of Formula XVI or XVII:

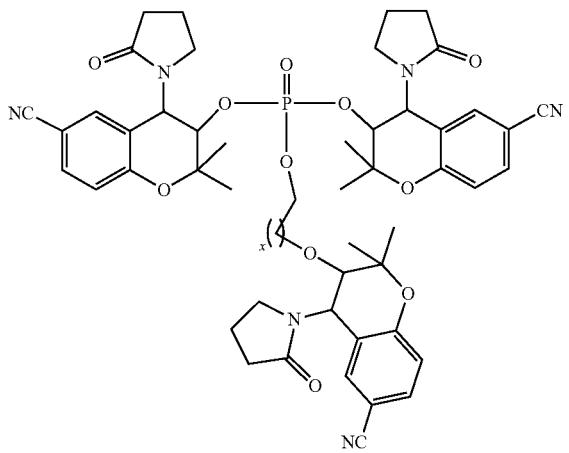

Formula XVI

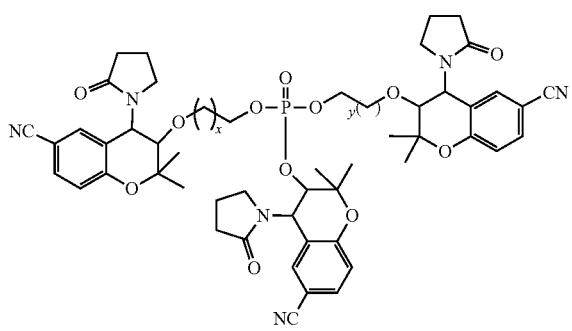

Formula XVII wherein x and y are defined herein.

In one embodiment of Formula XVI, x is selected from 1, 2, 3, 4, 5, 6, 7, and 8. In one embodiment of Formula XVI, x is 1. In one embodiment of Formula XVI, x is 2. In one embodiment of Formula XVI, x is 3. In one embodiment of Formula XVI, x is 4. In one embodiment of Formula XVI, x is 5. In one embodiment of Formula XVI, x is 6. In one embodiment of Formula XVI, x is 7. In one embodiment of Formula XVI, x is 8.

In one embodiment of Formula XVI or Formula XVII, x is selected from 1, 2, 3, 4, 5, 6, 7, and 8. In one embodiment of Formula XVII, y is selected from 1, 2, 3, 4, 5, 6, 7, and 8. In one embodiment of Formula XVI or Formula XVII, x and y are selected from 1, 2, 3, 4, 5, 6, 7, and 8. In one embodiment of Formula XVI or Formula XVII, x and y are 1. In one embodiment of Formula XVI or Formula XVII, x and y are 2. In one embodiment of Formula XVI or Formula XVII, x and y are 3. In one embodiment of Formula XVI or Formula XVII, x and y are 4. In one embodiment of Formula XVI or Formula XVII, x and y are 5. In one embodiment of Formula XVI or Formula XVII, x and y are 6. In one embodiment of Formula XVI or Formula XVII, x and y are 7. In one embodiment of Formula XVI or Formula XVII, x and y are 8. In another embodiment of Formula XVI or Formula XVII, x and y are different values. In one embodiment of Formula XVII, x is 1 and y is selected from 1, 2, 3, 4, 5, 6, 7, and 8. In one embodiment of Formula XVII, x is 2 and y is selected from 1, 2, 3, 4, 5, 6, 7, and 8. In one embodiment of Formula XVII, x is 3 and y is selected from 1, 2, 3, 4, 5, 6, 7, and 8. In one embodiment of Formula XVII, x is 4 and y is selected from 1, 2, 3, 4, 5, 6, 7, and 8. In one embodiment of Formula XVII, x is 5 and y is selected from 1, 2, 3, 4, 5, 6, 7, and 8. In one embodiment of Formula XVII, x is 6 and y is selected from 1, 2, 3, 4, 5, 6, 7, and 8. In one embodiment of Formula XVII, x is 7 and y is selected from 1, 2, 3, 4, 5, 6, 7, and 8. In one embodiment of Formula XVII, x is 8 and y is selected from 1, 2, 3, 4, 5, 6, 7, and 8.

Non-limiting examples of compound of Formula XVI include:

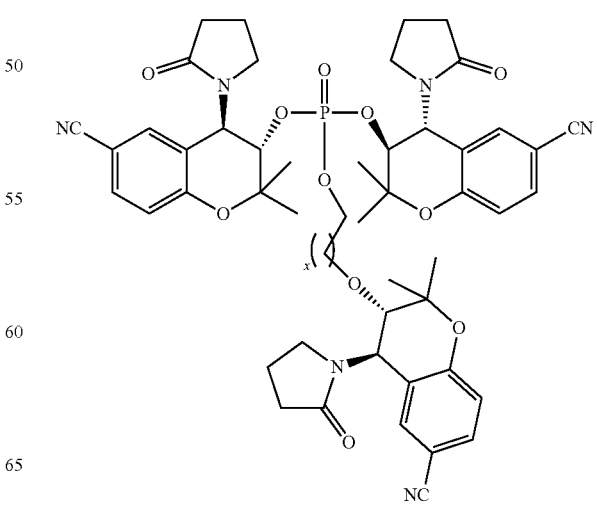

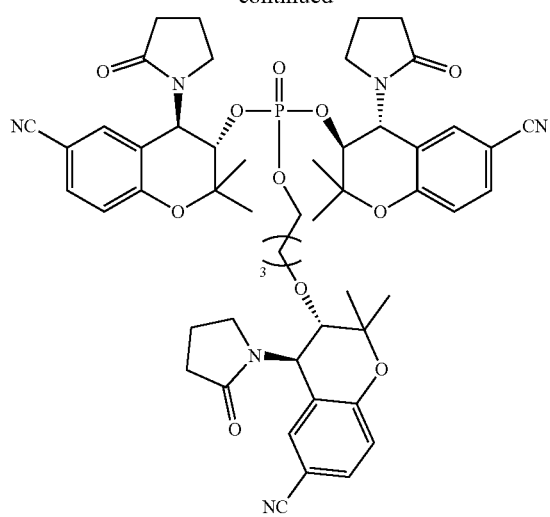
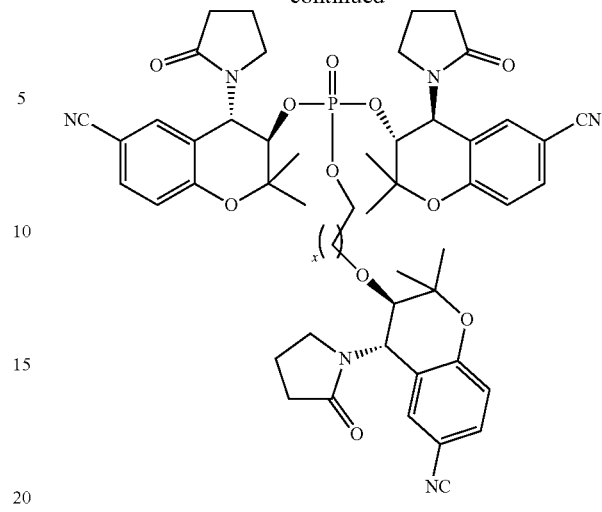
Non-limiting examples of compound of Formula XVII include:
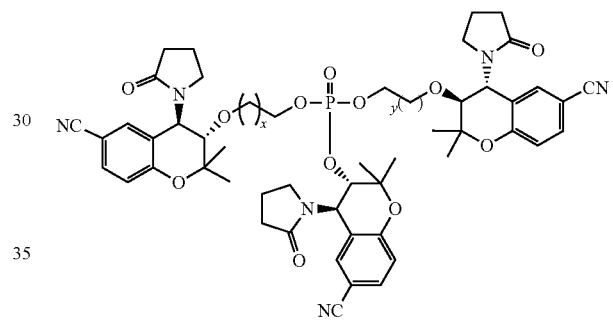
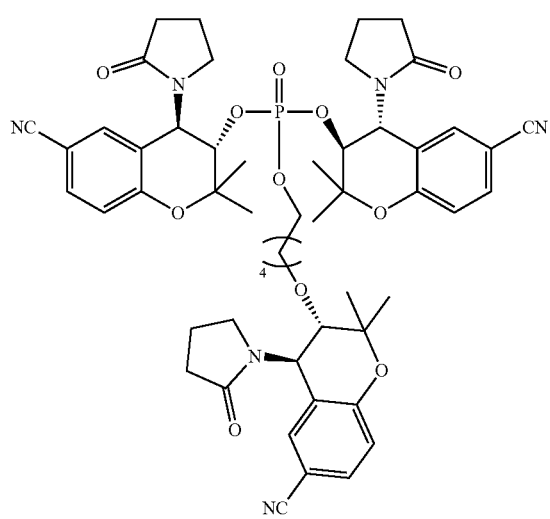
In another embodiment, the invention is an active compound or a pharmaceutically acceptable salt of the structure of Formula XVIII or Formula XIX:

Formula XVIII

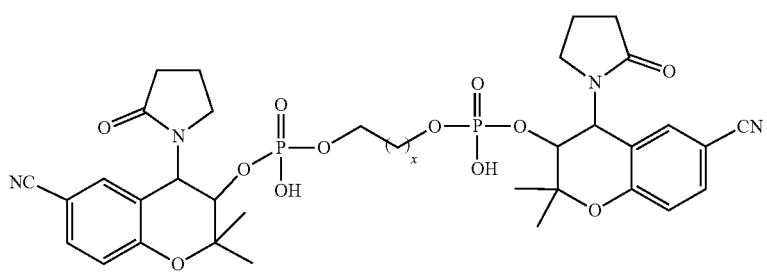

Formula XIX

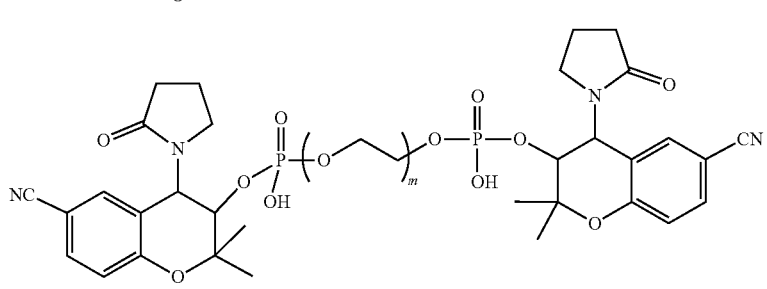

wherein m and x are defined herein.

Non-limiting examples of compounds of Formula XVIII include:

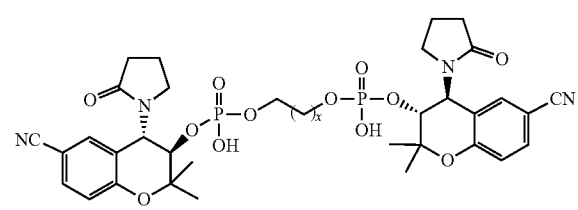

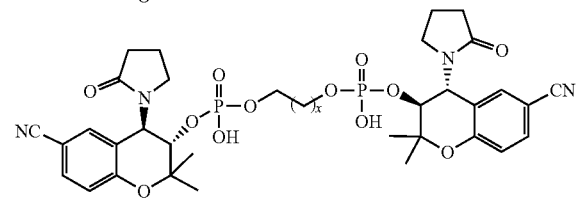

Non-limiting examples of compounds of Formula XIX include:

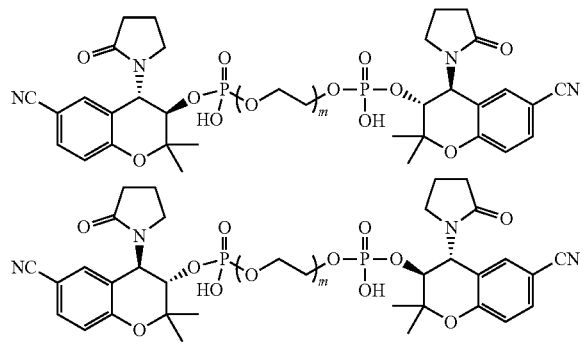

In one embodiment of Formula XVIII, x is selected from 1, 2, 3, 4, 5, 6, 7, and 8. In one embodiment of Formula XVIII, x is 1. In one embodiment of Formula XVIII, x is 2. In one embodiment of Formula XVIII, x is 3. In one embodiment of Formula XVIII, x is 4. In one embodiment of Formula XVIII, x is 5. In one embodiment of Formula XVIII, x is 6. In one embodiment of Formula XVIII, x is 7. In one embodiment of Formula XVIII, x is 8.

In one embodiment of Formula XIX m is selected from 0, 1, 2, 3, 4, 5, 6, 7, 8, 9, or 10. In one embodiment of Formula XIX, m is 0. In one embodiment of Formula XIX, m is 1. In one embodiment of Formula XIX, m is 2. In one embodiment of Formula XIX, m is 3. In one embodiment of Formula XIX, m is 4. In one embodiment of Formula XIX, m is 5. In one embodiment of Formula XIX, m is 6. In one embodiment of Formula XIX, m is 7. In one embodiment of Formula XIX, m is 8. In one embodiment of Formula XIX, m is 9. In one embodiment of Formula XIX, m is 10.

Additional non-limiting examples of a compound of Formula XVIII or XIX include:

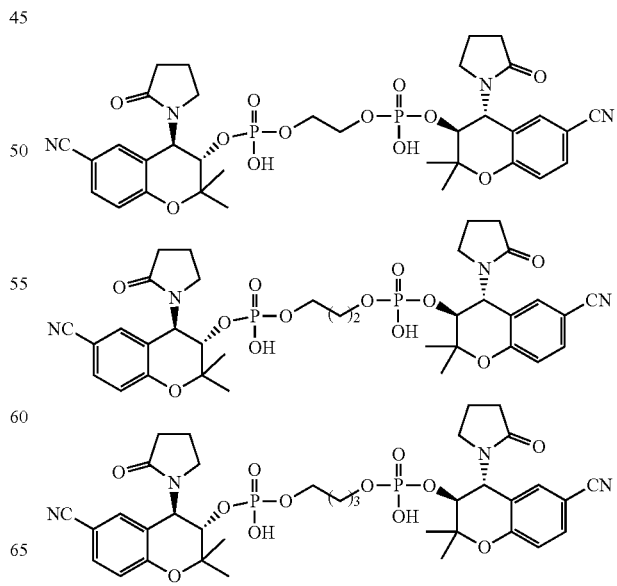

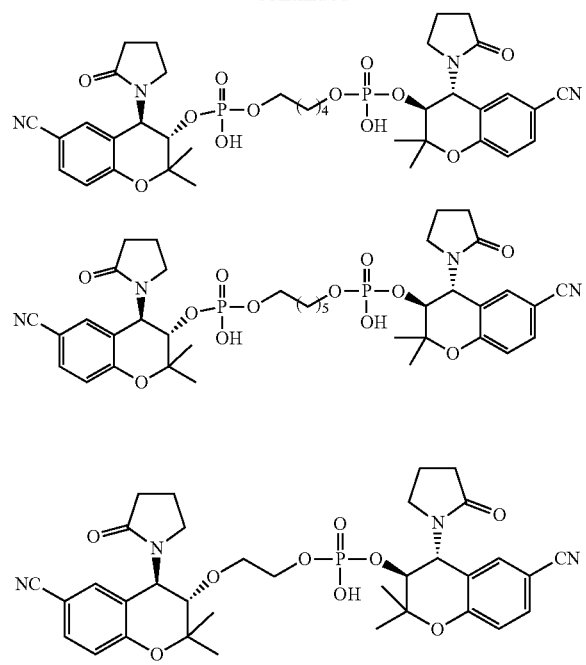
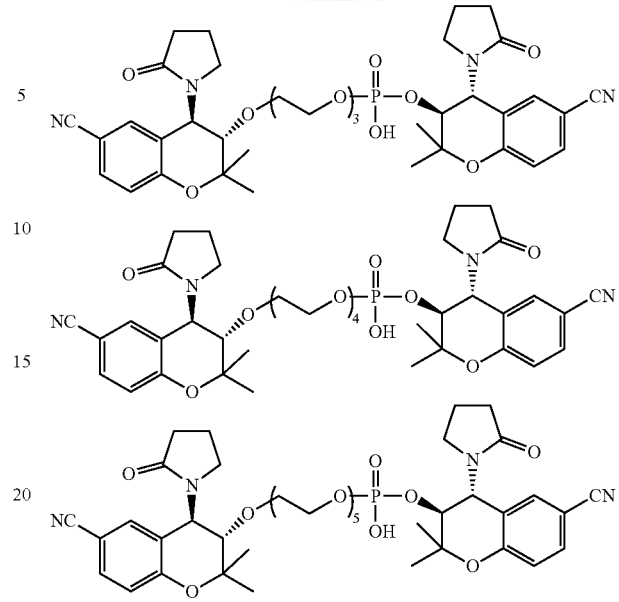
In another embodiment, the invention is compound of Formula XX or Formula XXI with a neutralized negative charge:
Formula XX
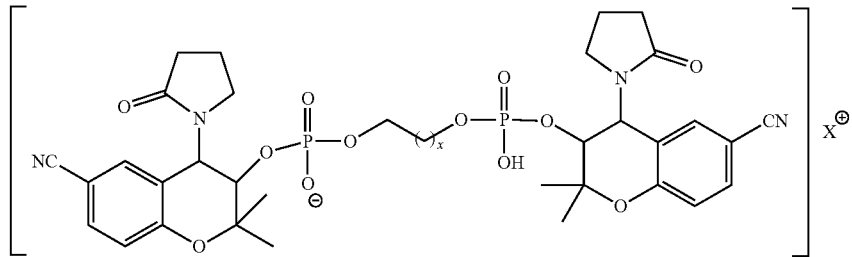
Formula XXI
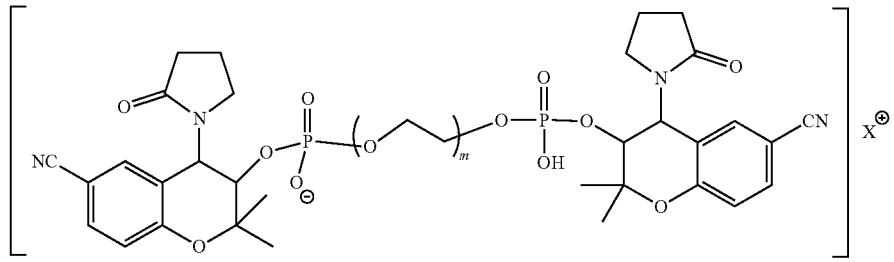
wherein m, x, and X⁺ are defined herein.
Non-limiting examples of compounds of Formula XX include:
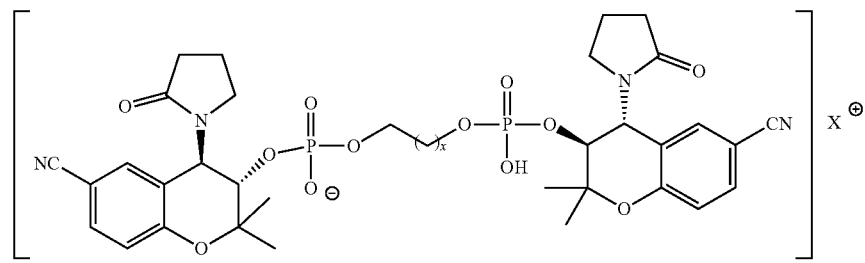

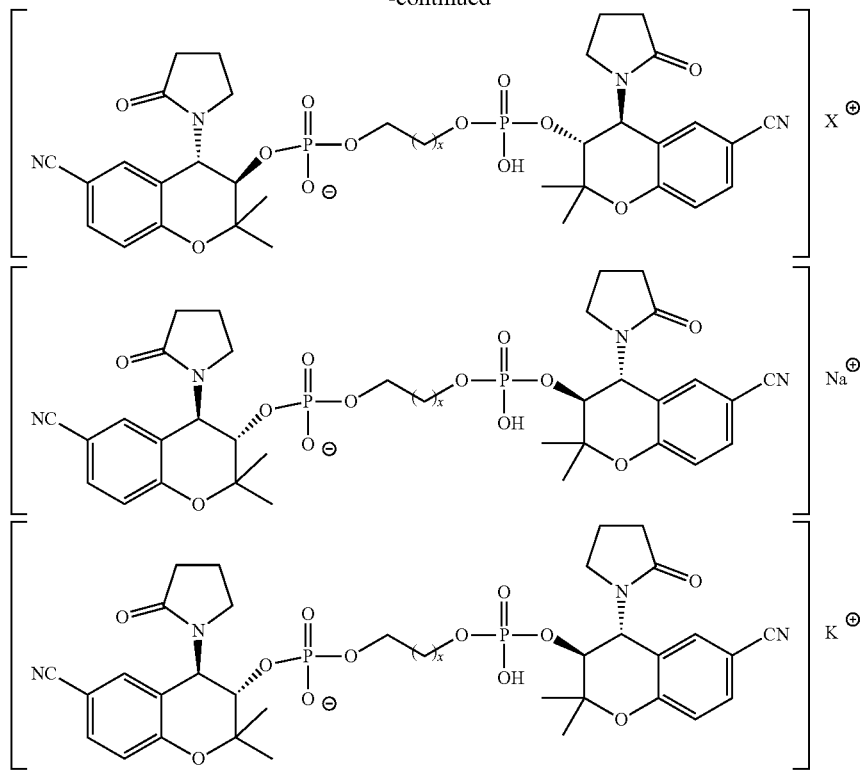
Non-limiting examples of compounds of Formula XXI include:
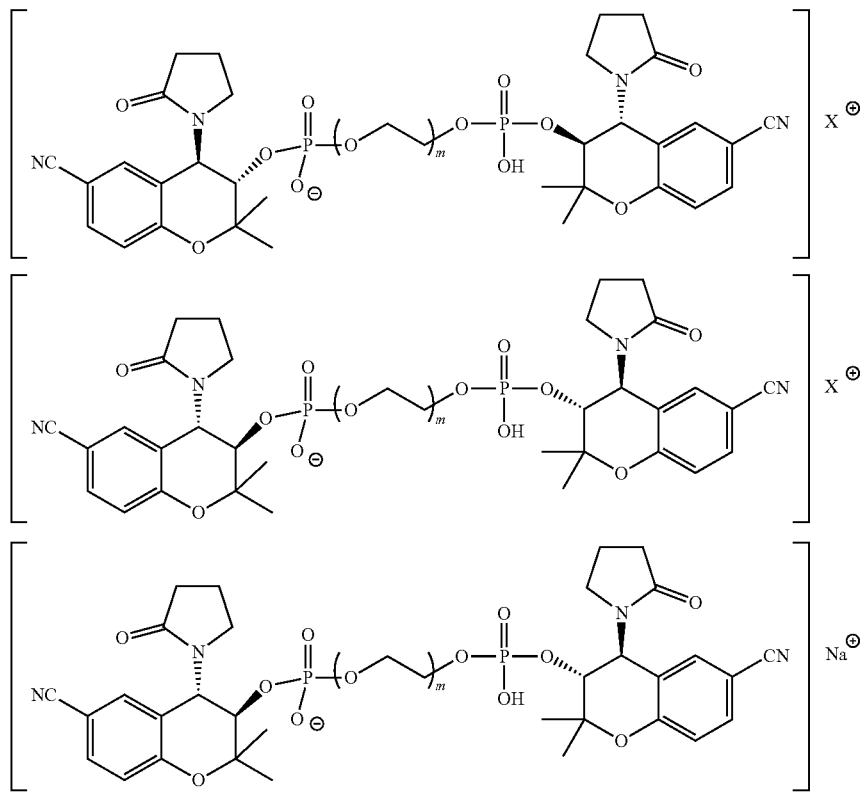

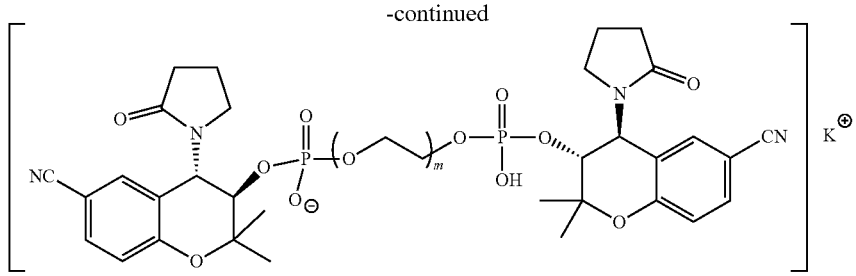

In one embodiment of Formula XX, x is selected from 1, 2, 3, 4, 5, 6, 7, and 8. In one embodiment of Formula XX, x is 1. In one embodiment of Formula XX, x is 2. In one embodiment of Formula XX, x is 3. In one embodiment of Formula XX, x is 4. In one embodiment of Formula XX, x is 5. In one embodiment of Formula XX, x is 6. In one embodiment of Formula XX, x is 7. In one embodiment of Formula XX, x is 8.

In one embodiment of Formula XXI, m is selected from 0, 1, 2, 3, 4, 5, 6, 7, 8, 9, or 10. In one embodiment of Formula XXI, m is 0. In one embodiment of Formula XXI, m is 1. In one embodiment of Formula XXI, m is 2. In one embodiment of Formula XXI, m is 3. In one embodiment of Formula XXI, m is 4. In one embodiment of Formula XXI, m is 5. In one embodiment of Formula XXI, m is 6. In one embodiment of Formula XXI, m is 7. In one embodiment of Formula XXI, m is 8. In one embodiment of Formula XXI, m is 9. In one embodiment of Formula XXI, m is 10.

Additional non-limiting examples of compounds of Formula XXI include:

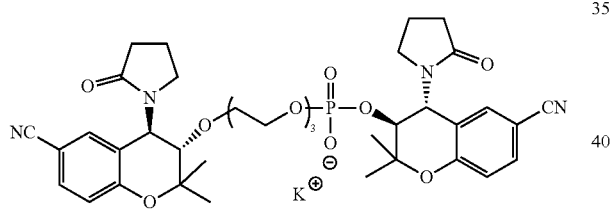

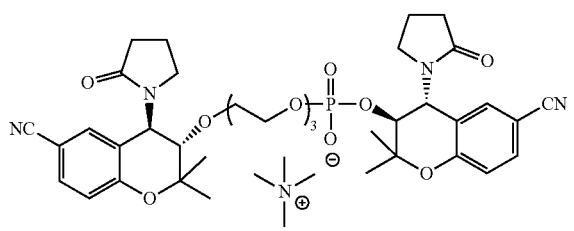

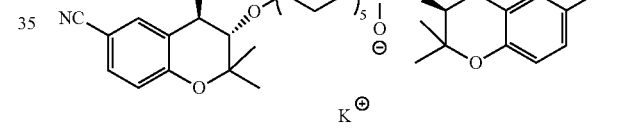

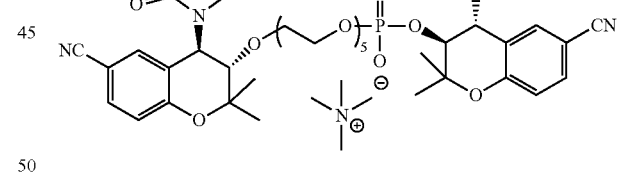

In another embodiment, the invention is a compound of Formula XXII or Formula XXIII with a neutralized negative charge:

Formula XXII

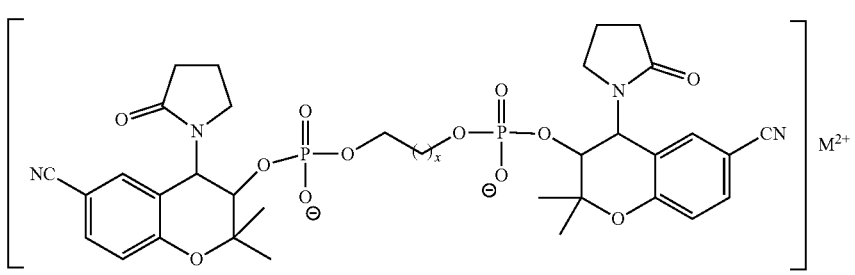

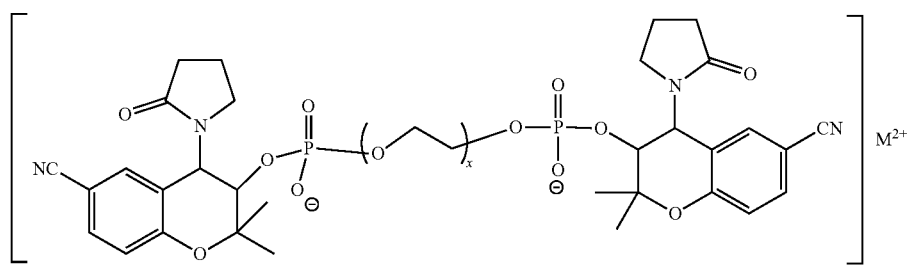

wherein m, x, and M²⁺ are defined herein.

In one embodiment of Formula XXII, x is selected from 1, 2, 3, 4, 5, 6, 7, and 8. In one embodiment of Formula XXII, x is 1. In one embodiment of Formula XXII, x is 2. In one embodiment of Formula XXII, x is 3. In one embodiment of Formula XXII, x is 4. In one embodiment of Formula XXII, x is 5. In one embodiment of Formula XXII, x is 6. In one embodiment of Formula XXII, x is 7. In one embodiment of Formula XXII, x is 8.

In one embodiment of Formula XXIII m is selected from 0, 1, 2, 3, 4, 5, 6, 7, 8, 9, or 10. In one embodiment of Formula XXIII, m is 0. In one embodiment of Formula XXIII, m is 1. In one embodiment of Formula XXIII, m is 2. In one embodiment of Formula XXIII, m is 3. In one embodiment of Formula XXIII, m is 4. In one embodiment of Formula XXIII, m is 5. In one embodiment of Formula XXIII, m is 6. In one embodiment of Formula XXIII, m is 7. In one embodiment of Formula XXIII, m is 8. In one embodiment of Formula XXIII, m is 9. In one embodiment of Formula XXIII, m is 10.

Non-limiting examples of a compound of Formula XXII and Formula XXIII include:

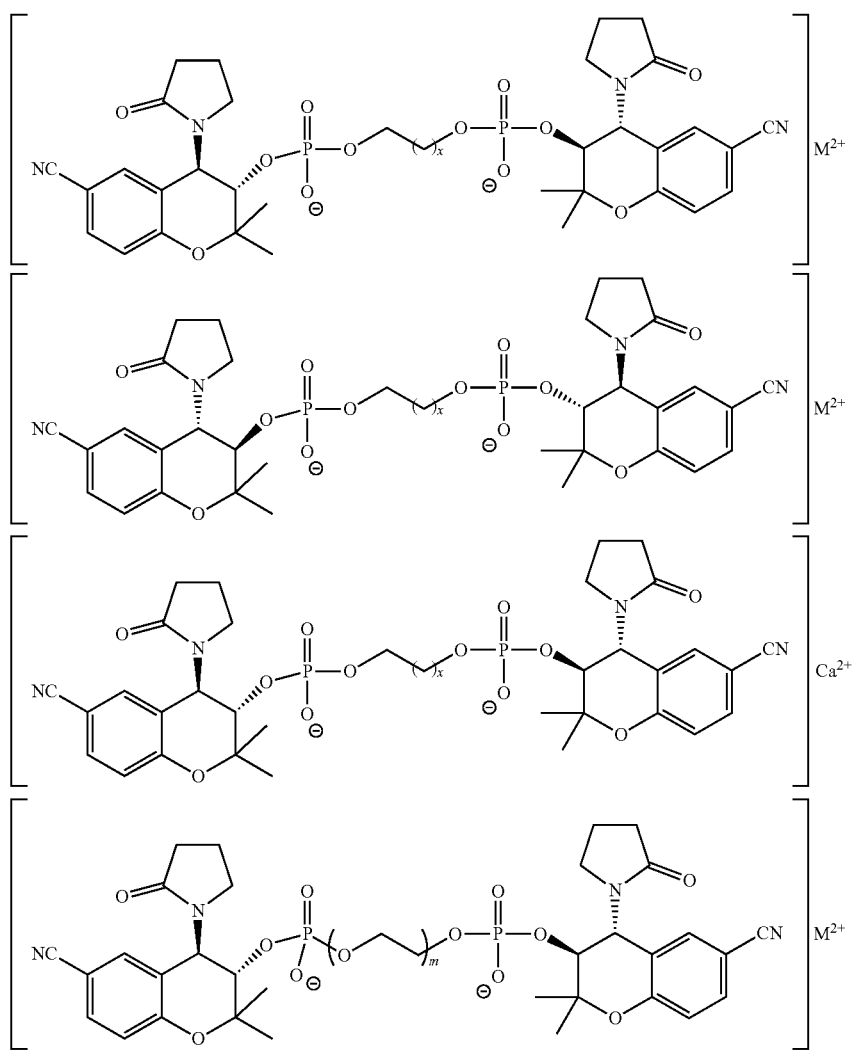

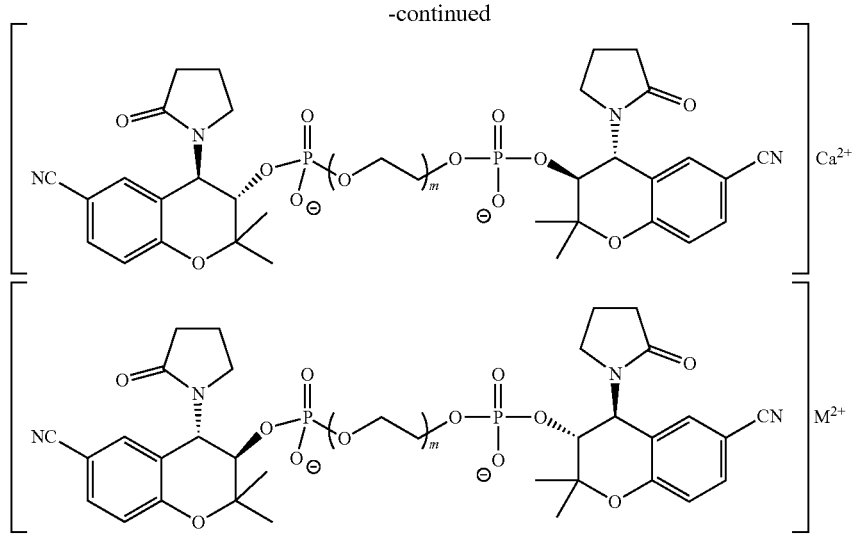

In another embodiment, the invention is an active compound or a pharmaceutically acceptable salt of the structure of Formula XXIV or Formula XXV:

Formula XXIV

Formula XXV wherein:

p is selected from 0 and 1;

R is independently at each instance selected from H and $X^+$; and $X^+$, x, and m are defined herein.

In one embodiment, x is selected from 1, 2, 3, 4, 5, 6, 7, and 8. In another embodiment, m is independently selected from 0, 1, 2, 3, 4, 5, 6, 7, 8, 9, and 10.

Non-limiting examples of a compound of formula XXIV and Formula XXV include:

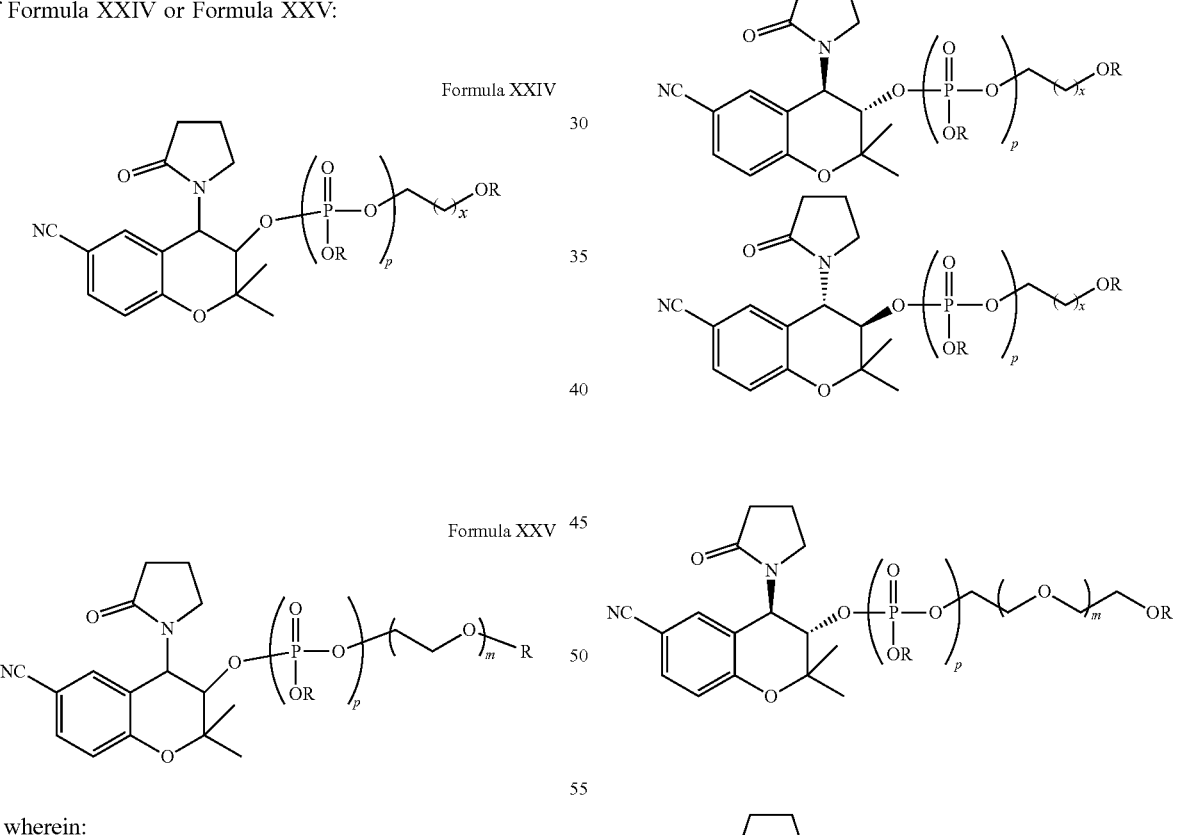

In certain embodiments, the compound of Formula XXIV is selected from:

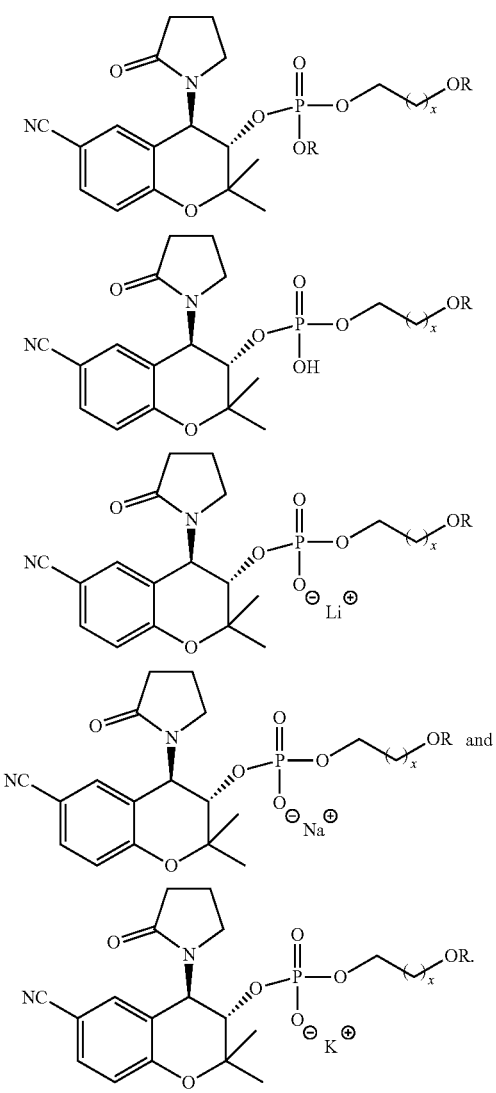
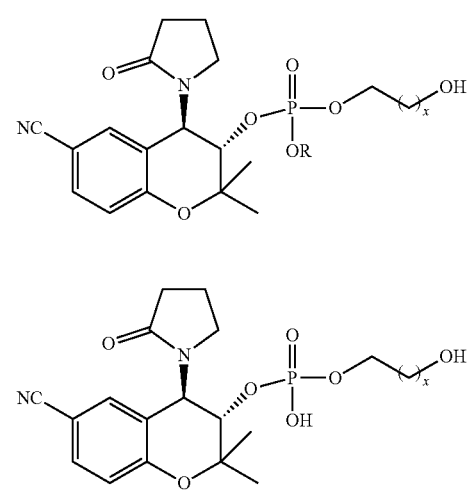
In certain embodiments, the compound of Formula XXIV is selected from:
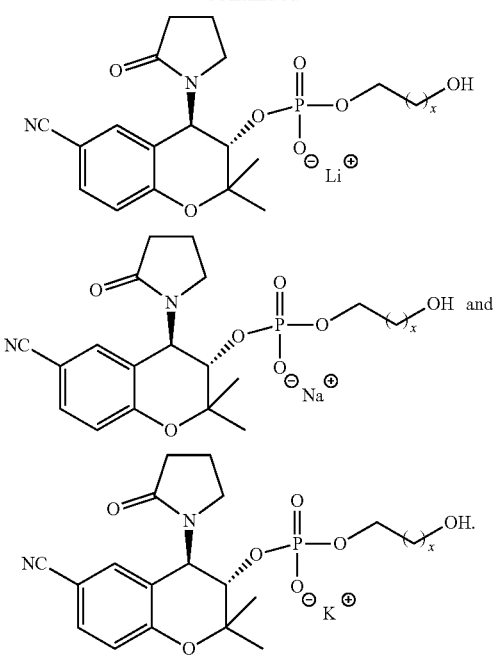
In certain embodiments, the compound of Formula XXIV is selected from:
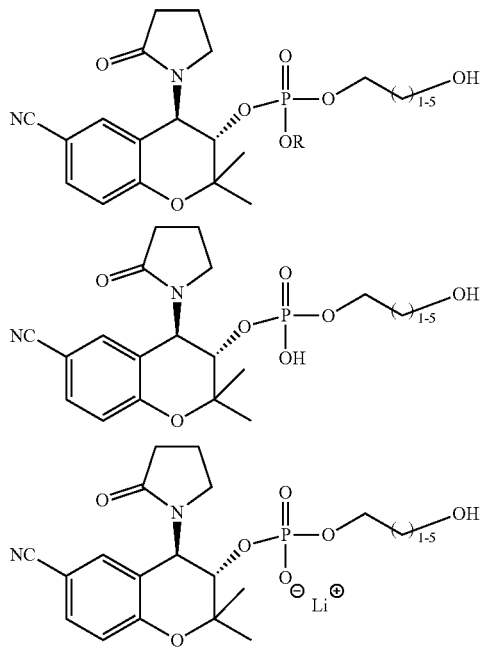
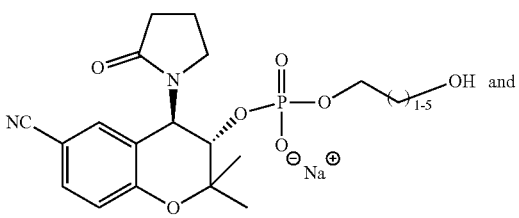

-continued
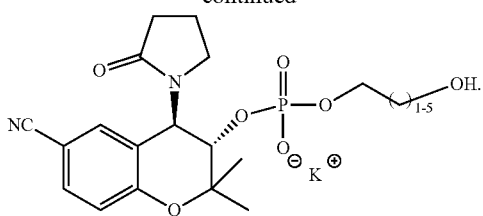
In certain embodiments, the compound of Formula XXIV is selected from:
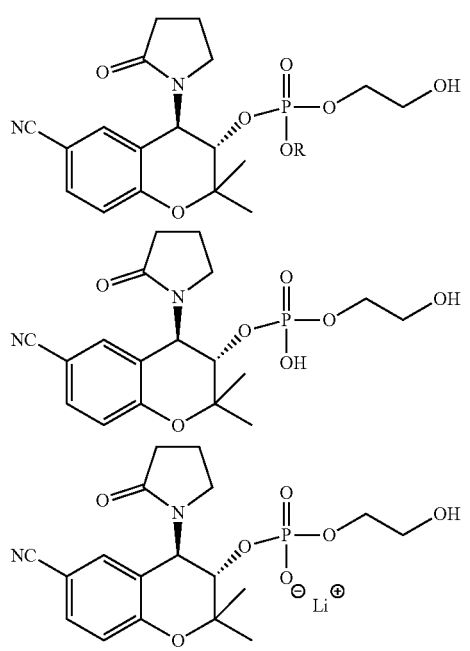
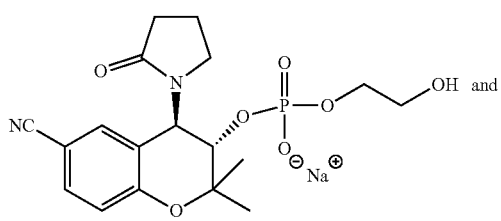
In certain embodiments, the compound of Formula XXIV is selected from:
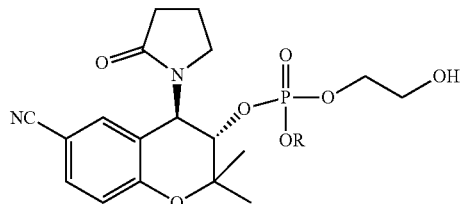
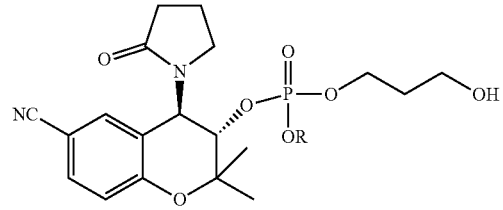
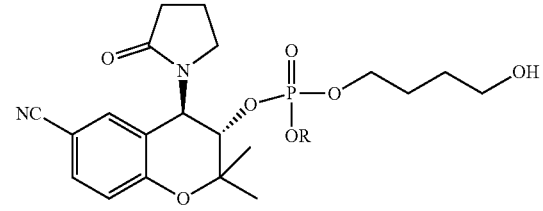
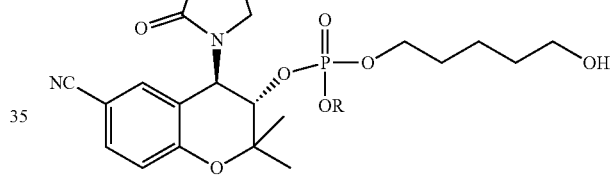
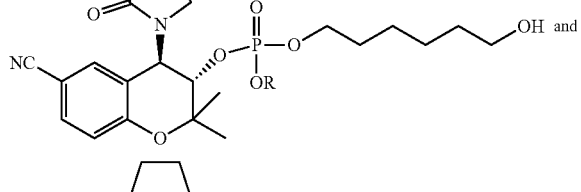
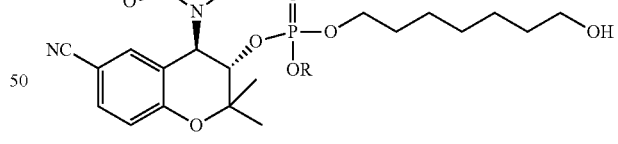
In certain embodiments, the compound of Formula XXIV is selected from:
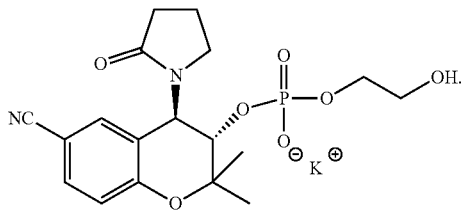
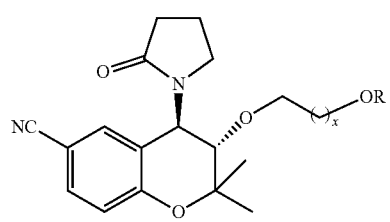

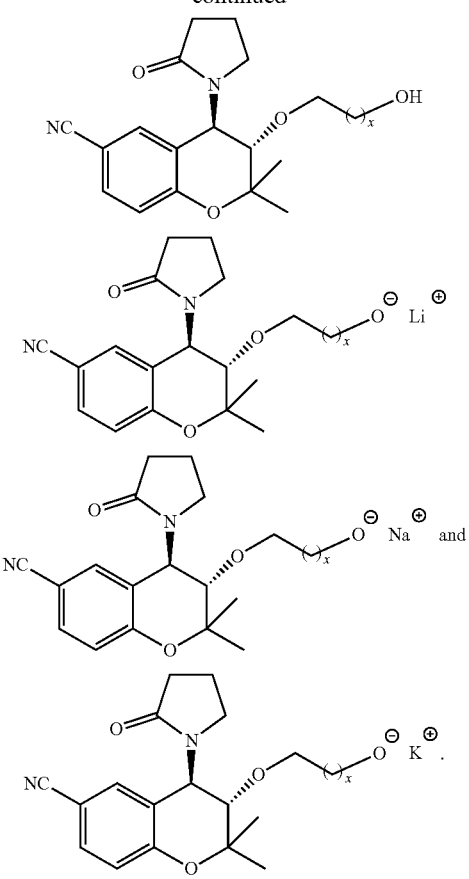
In certain embodiments, the compound of Formula XXIV is selected from:
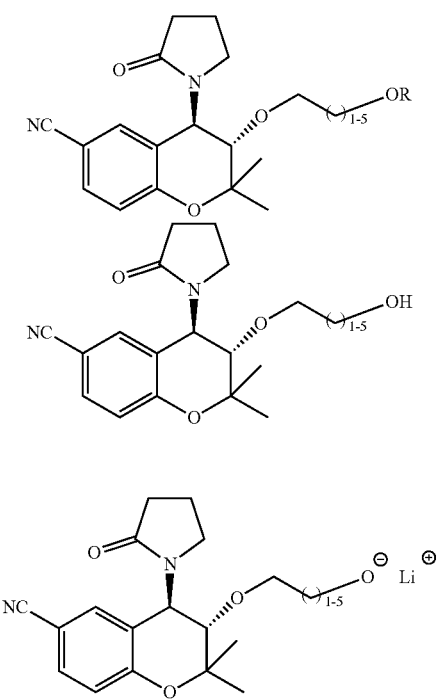
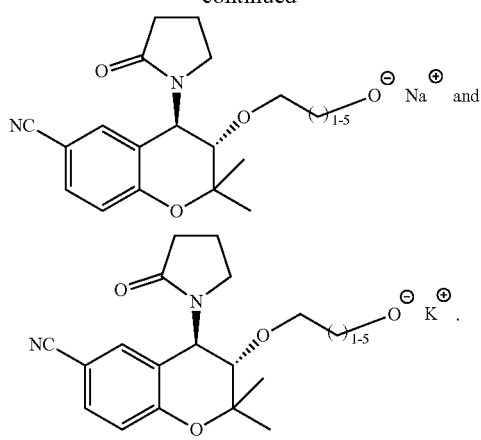
In certain embodiments, the compound of Formula XXIV is selected from:
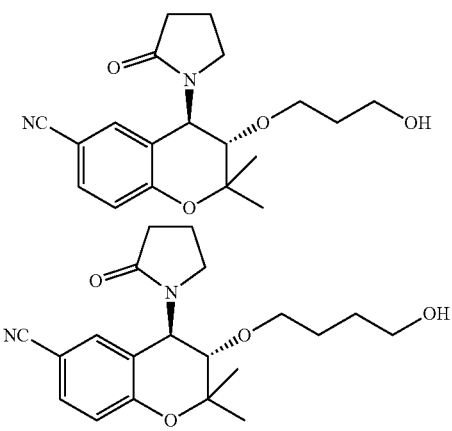

103
-continued
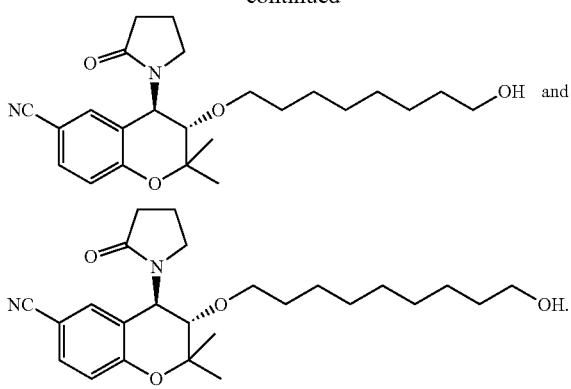
In certain embodiments, the compound of Formula XXIV is selected from:
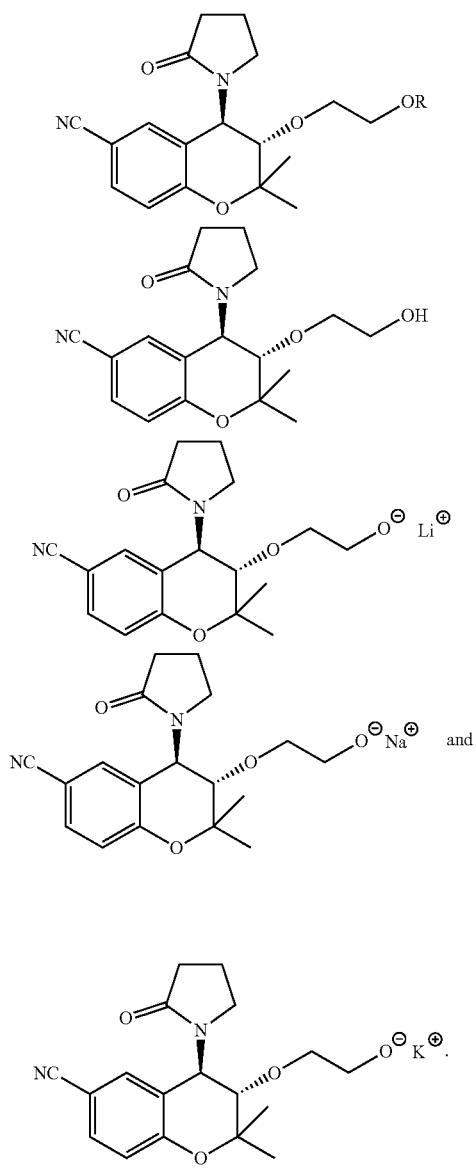
104
In certain embodiments, the compound of Formula XXV is selected from:
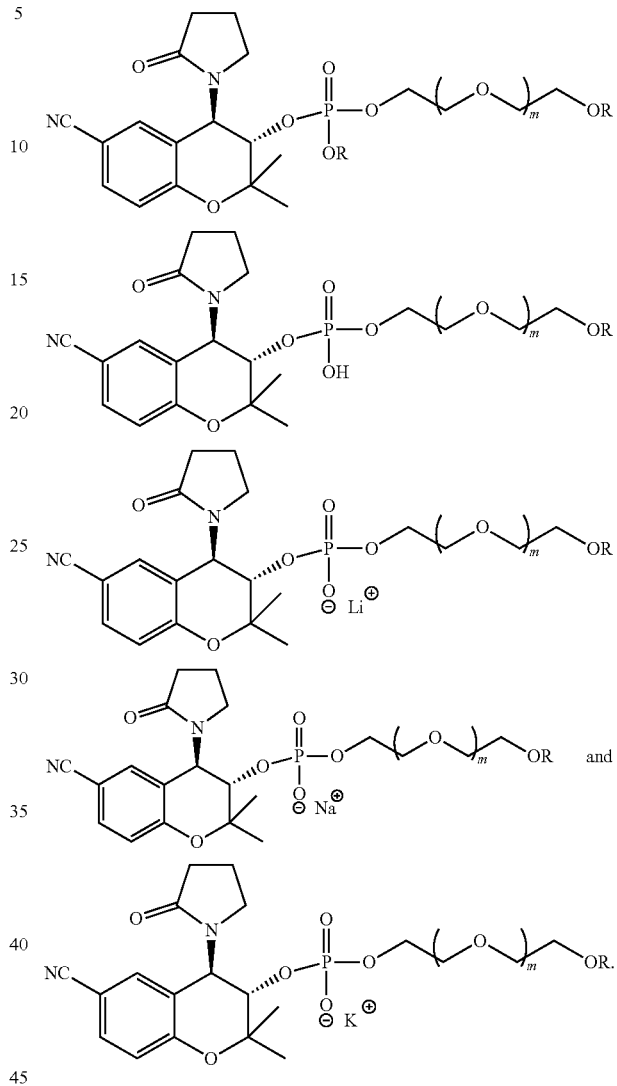
In certain embodiments, the compound of Formula XXV is selected from:
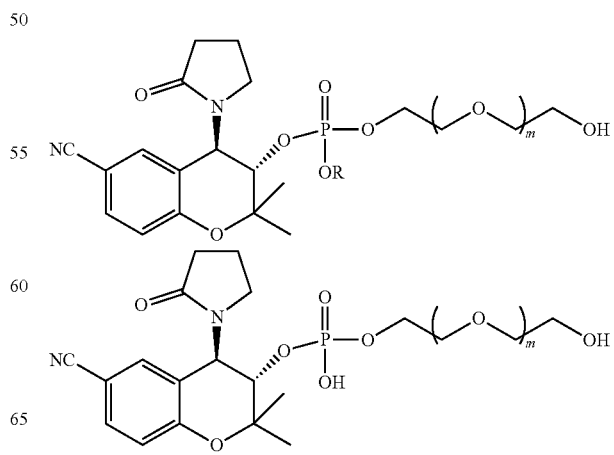

-continued
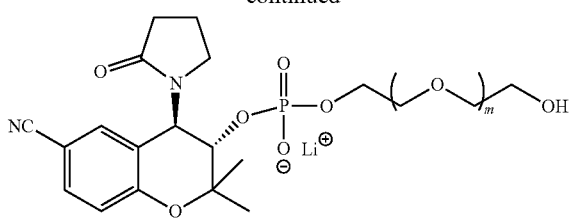
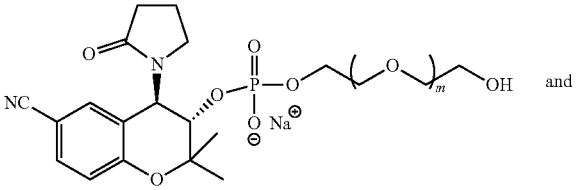
and
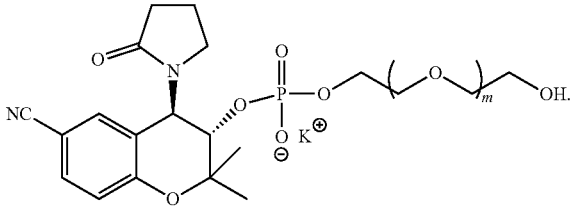
In certain embodiments, the compound of Formula XXV is selected from:
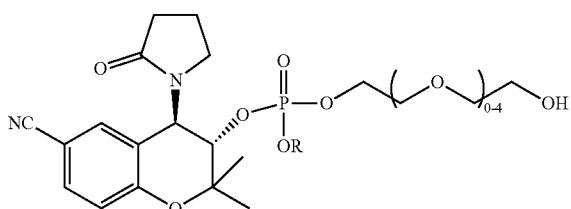
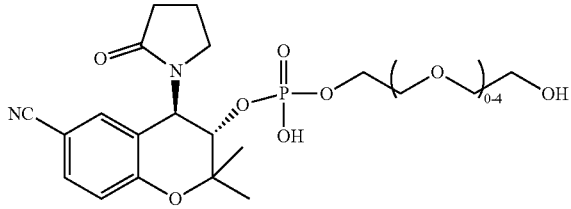
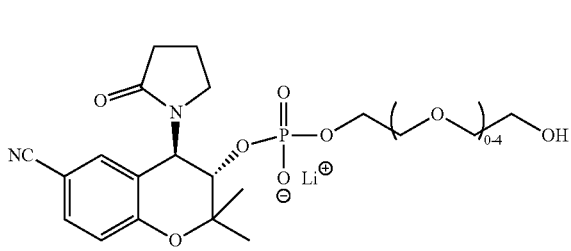
and
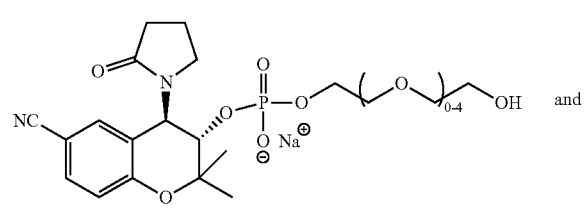
-continued
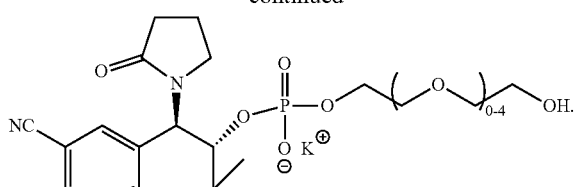
In certain embodiments, the compound of Formula XXV is selected from:
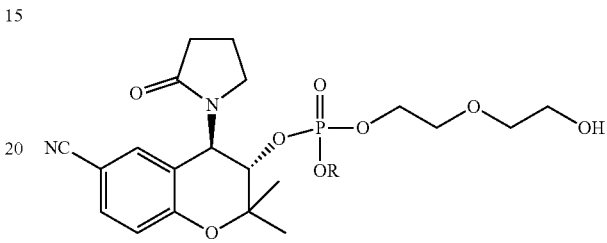
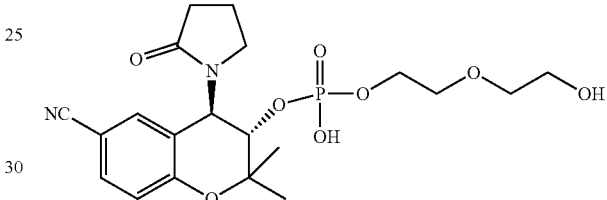
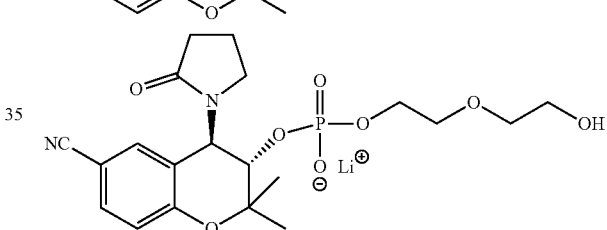
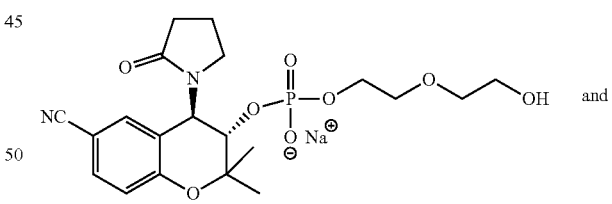
and
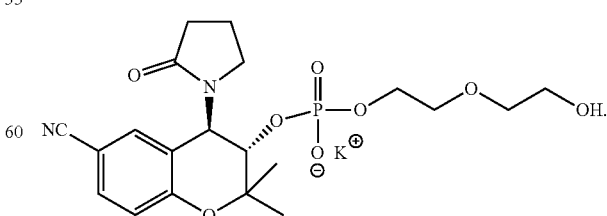
In certain embodiments, the compound of Formula XXV is selected from:

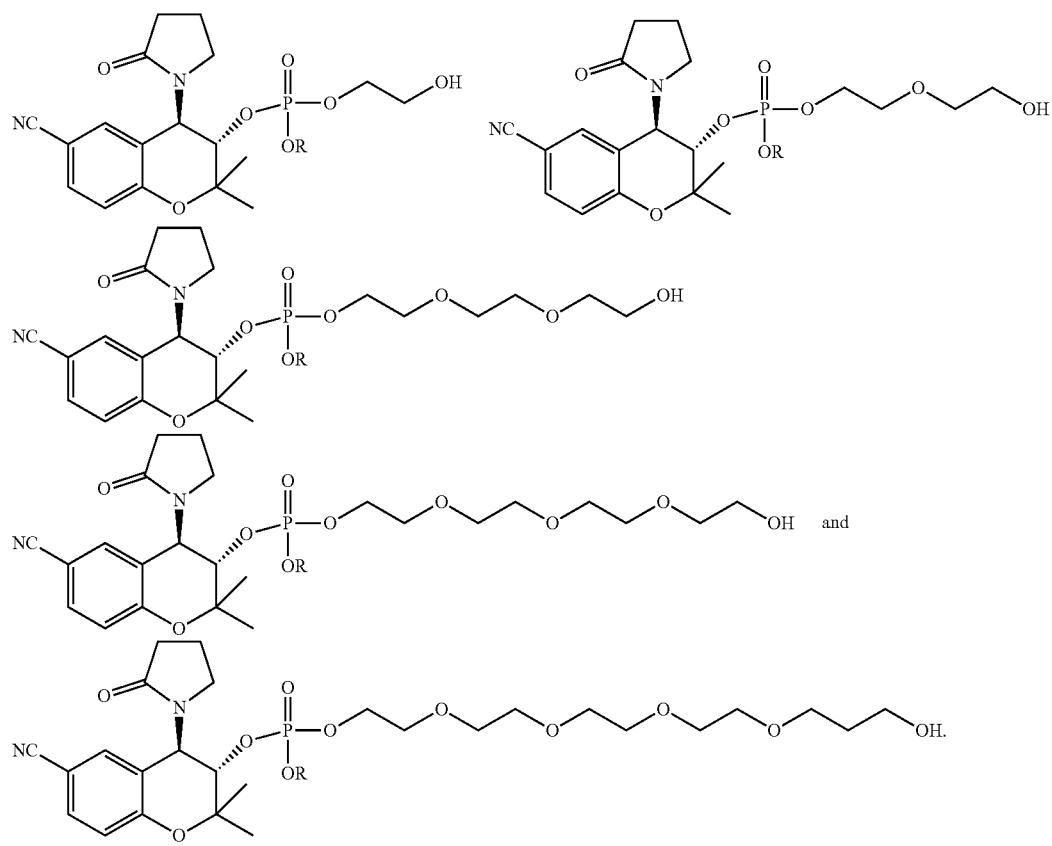
In certain embodiments, the compound of Formula XXV is selected from:
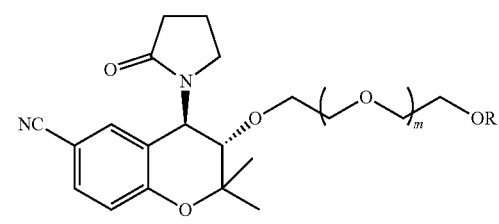
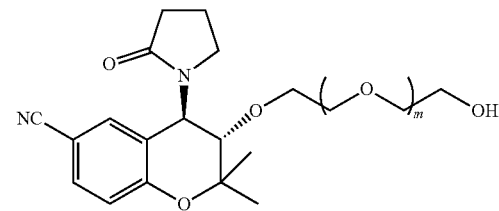
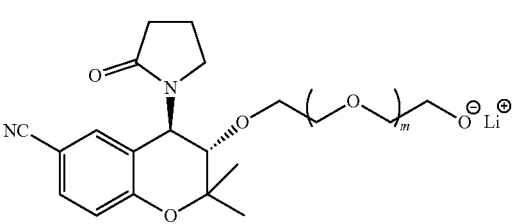
-continued
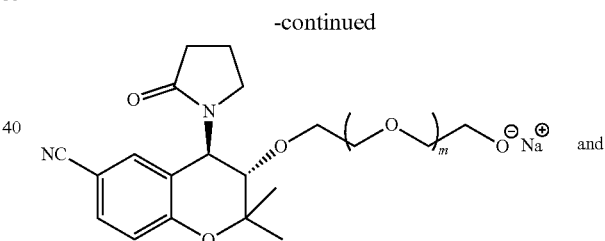
and
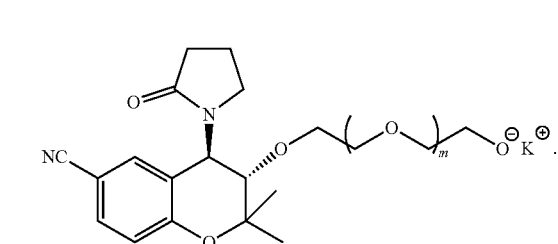
In certain embodiments, the compound of Formula XXV is selected from:

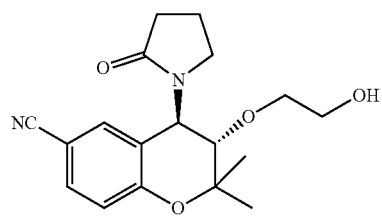
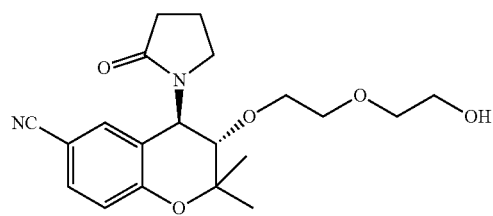
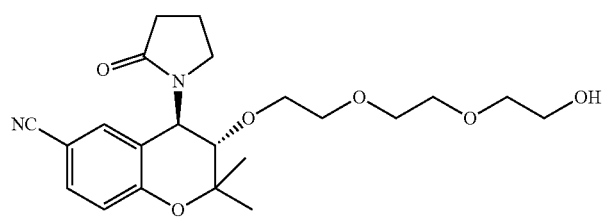
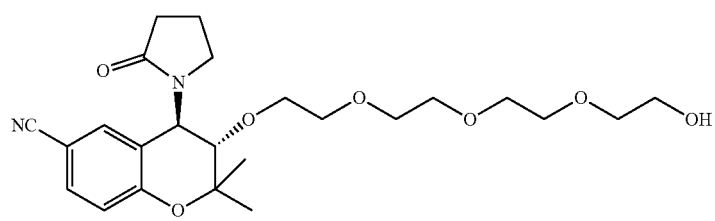
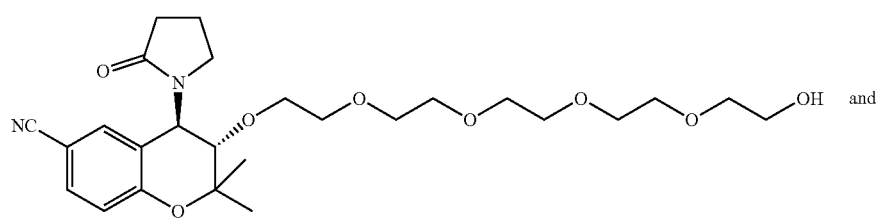
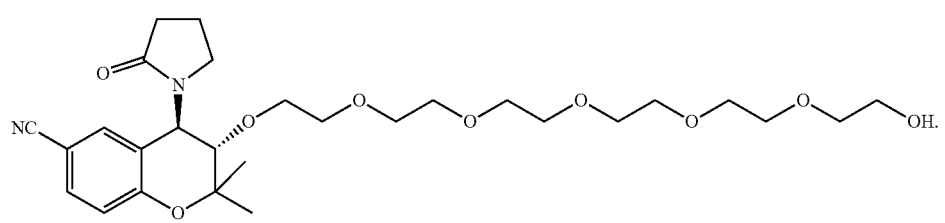

In another embodiment, the invention is an active compound or a pharmaceutically acceptable salt of the structure of Formula XXVI or XXVII:

Formula XXVI

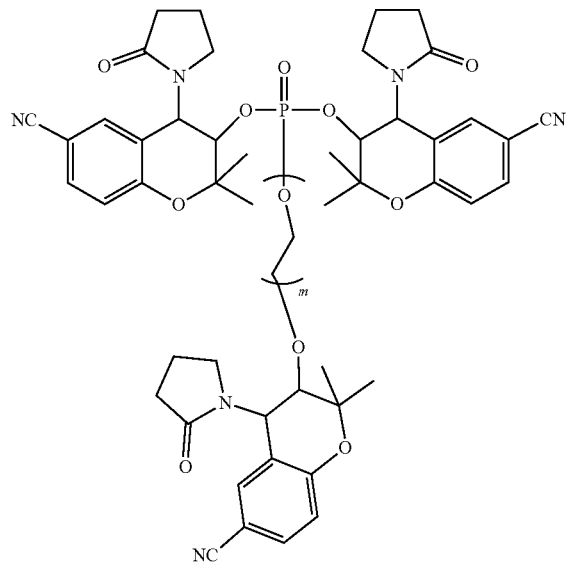

Formula XXVII

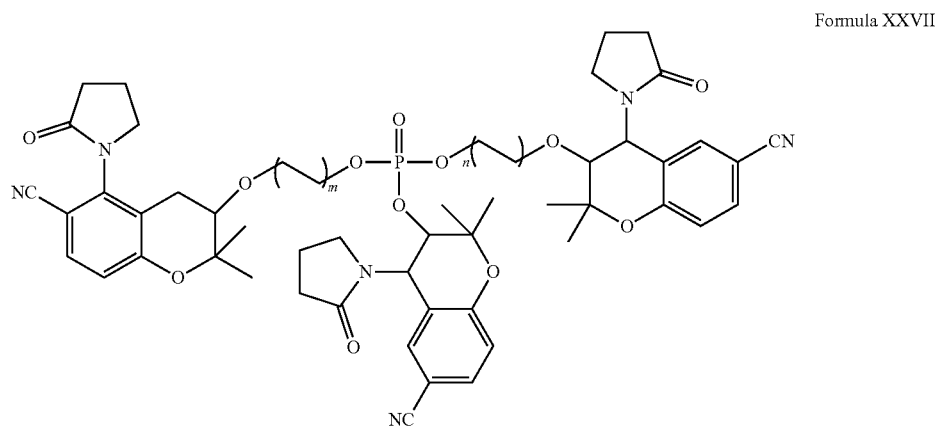

wherein x and y are defined herein.

In one embodiment of Formula XXVI, m is selected from 1, 2, 3, 4, 5, 6, 7, and 8. In one embodiment of Formula XXVI, m is 1. In one embodiment of Formula XXVI, m is 2. In one embodiment of Formula XXVI, m is 3. In one embodiment of Formula XXVI, m is 4. In one embodiment of Formula XXVI, m is 5. In one embodiment of Formula XXVI, m is 6. In one embodiment of Formula XXVI, m is 7. In one embodiment of Formula XXVI, m is 8.

In one embodiment of Formula XXVI or Formula XXVII, m is selected from 1, 2, 3, 4, 5, 6, 7, and 8. In one embodiment of Formula XXVII, m is selected from 1, 2, 3, 4, 5, 6, 7, and 8. In one embodiment of Formula XXVII, m and n are selected from 1, 2, 3, 4, 5, 6, 7, and 8. In one embodiment of Formula XXVII, m and n are 1. In one embodiment of Formula XXVII, m and n are 2. In one embodiment of Formula XXVII, m and n are 3. In one embodiment of Formula XXVII, m and n are 4. In one embodiment of Formula XXVII, m and n are 5. In one embodiment of Formula XXVII, m and n are 6. In one embodiment of Formula XXVII, m and n are 7. In one embodiment of Formula XXVII, m and n are 8. In another embodiment of Formula XXVII, m and n are different values.

In one embodiment of Formula XXVII, m is 1 and n is selected from 1, 2, 3, 4, 5, 6, 7, and 8. In one embodiment of Formula XXVII, m is 2 and n is selected from 1, 2, 3, 4, 5, 6, 7, and 8. In one embodiment of Formula XXVII, m is 3 and n is selected from 1, 2, 3, 4, 5, 6, 7, and 8. In one embodiment of Formula XXVII, m is 4 and n is selected from 1, 2, 3, 4, 5, 6, 7, and 8. In one embodiment of Formula XXVII, m is 5 and n is selected from 1, 2, 3, 4, 5, 6, 7, and 8. In one embodiment of Formula XXVII, m is 6 and n is selected from 1, 2, 3, 4, 5, 6, 7, and 8. In one embodiment of Formula XXVII, m is 7 and n is selected from 1, 2, 3, 4, 5, 6, 7, and 8. In one embodiment of Formula XXVII, m is 8 and n is selected from 1, 2, 3, 4, 5, 6, 7, and 8.

Non-limiting examples of a compound of Formula XXVI and Formula XXVII include:

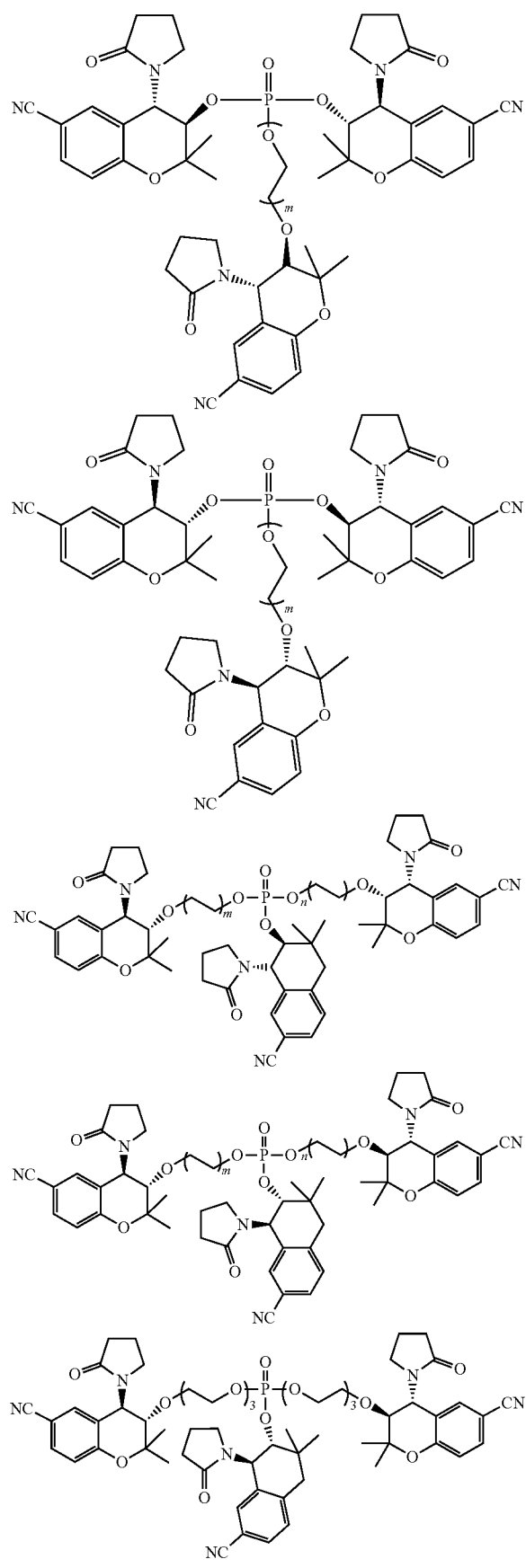

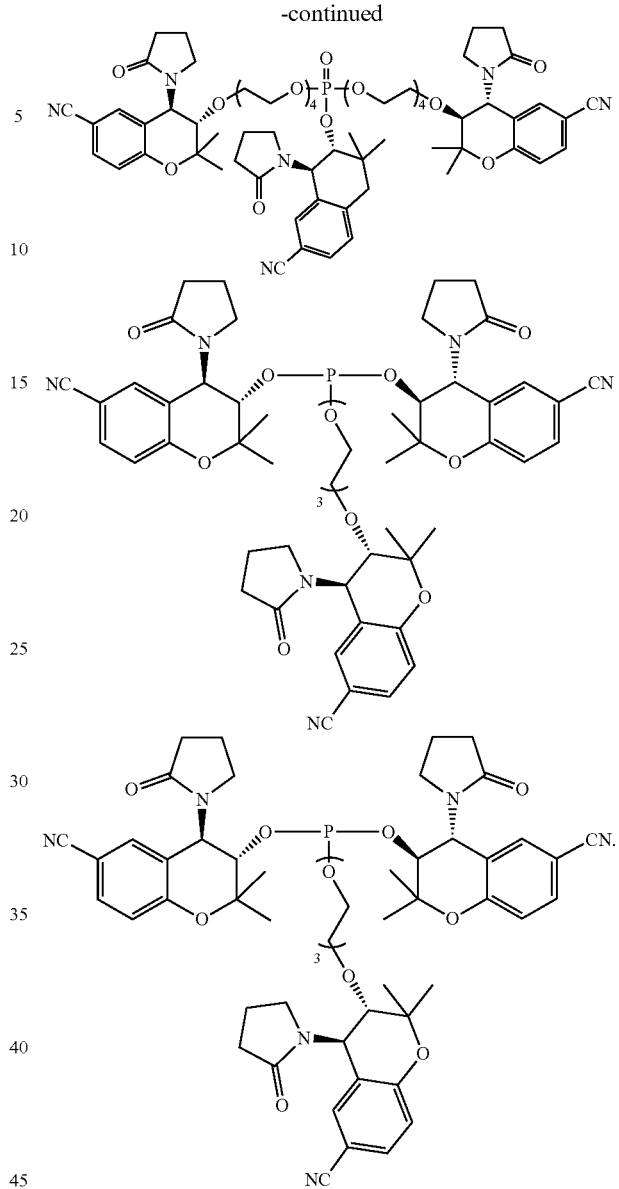

Additional embodiments of the present invention include:
Particular embodiments of Formula I and Formula XII of the present invention include:
(a) in Formula I or Formula XII, $X^+$ is $Na^+$;
(b) in Formula I or Formula XII, $X^+$ is $K^+$;
(c) in Formula I or Formula XII, $X^+$ is $Li^+$;
(d) in Formula I or Formula XII, $X^+$ is $NH_4^+$; and
(e) in Formula I or Formula XII, $X^+$ is $N(Me)_4^+$.

Particular embodiments of Formula II and Formula XI of the present invention include:
(a) in Formula II and Formula XI, $M^{2+}$ is $Ca^{2+}$;
(b) in Formula II and Formula XI, $M^{2+}$ is $Mg^{2+}$; and,
(c) in Formula II and Formula XI, $M^{2+}$ is $Zn^{2+}$.

Particular embodiments of Formula XIII, Formula XVI, and Formula XVIII of the present invention include:
(a) in Formula XIII, Formula XVI, and Formula XVIII, x is 1;
(b) in Formula XIII, Formula XVI, and Formula XVIII, x is 2;
(c) in Formula XIII, Formula XVI, and Formula XVIII, x is 3;

(d) in Formula XIII, Formula XVI, and Formula XVIII, x is 4;
(e) in Formula XIII, Formula XVI, and Formula XVIII, x is 5;
(f) in Formula XIII, Formula XVI, and Formula XVIII, x is 6;
(g) in Formula XIII, Formula XVI, and Formula XVIII, x is 7; and,
(h) in Formula XIII, Formula XVI, and Formula XVIII, x is 8.

Particular embodiments of Formula XIX and Formula XXVI of the present invention include:
(a) in Formula XIX and Formula XXVI, m is 1;
(b) in Formula XIX and Formula XXVI, m is 2;
(c) in Formula XIX and Formula XXVI, m is 3;
(d) in Formula XIX and Formula XXVI, m is 4;
(e) in Formula XIX and Formula XXVI, m is 5;
(f) in Formula XIX and Formula XXVI, m is 6;
(g) in Formula XIX and Formula XXVI, m is 7;
(h) in Formula XIX and Formula XXVI, m is 8;
(i) in Formula XIX and Formula XXVI, m is 9; and
(j) in Formula XIX and Formula XXVI, m is 10.

Particular embodiments of Formula III, Formula XVII, and Formula IX of the present invention include:
(a) in Formula III, Formula XVII, and Formula IX, x is 1;
(b) in Formula III, Formula XVII, and Formula IX, x is 2;
(c) in Formula III, Formula XVII, and Formula IX, x is 3;
(d) in Formula III, Formula XVII, and Formula IX, x is 4;
(e) in Formula III, Formula XVII, and Formula IX, x is 5;
(f) in Formula III, Formula XVII, and Formula IX, x is 6;
(g) in Formula III, Formula XVII, and Formula IX, x is 7;
(h) in Formula III, Formula XVII, and Formula IX, x is 8;
(i) in (a)-(h), y is 1;
(j) in (a)-(h), y is 2;
(k) in (a)-(hh), y is 3;
(l) in (aa)-(h), y is 4;
(m) in (a)-(h), y is 5;
(n) in (a)-(h), y is 6;
(o) in (a)-(h), y is 7;
(p) in (a)-(h), y is 8;
(q) in (a)-(p), z is 1;
(r) in (a)-(p), z is 2;
(s) in (a)-(p), z is 3;
(t) in (a)-(p), z is 4;
(u) in (a)-(p), z is 5;
(v) in (a)-(p), z is 6;
(w) in (a)-(p), z is 7; and
(x) in (a)-(p), z is 8.

Particular embodiments of Formula IV, Formula XXVII, and Formula X of the present invention include:
(a) in Formula IV and Formula XXVII, m is 0;
(b) in Formula IV and Formula XXVII, m is 1;
(c) in Formula IV and Formula XXVII, m is 2;
(d) in Formula IV and Formula XXVII, m is 3;
(e) in Formula IV and Formula XXVII, m is 4;
(f) in Formula IV and Formula XXVII, m is 5;
(g) in Formula IV and Formula XXVII, m is 6;
(h) in Formula IV and Formula XXVII, m is 7;
(i) in Formula IV and Formula XXVII, m is 8;
(j) in Formula IV and Formula XXVII, m is 9;
(k) in Formula IV and Formula XXVII, m is 10;
(l) in (a)-(k), n is 0;
(m) in (a)-(k), n is 1;
(n) in (a)-(k), n is 2;
(o) in (a)-(k), n is 3;
(p) in (a)-(k), n is 4;
(q) in (a)-(k), n is 5;
(r) in (a)-(k), n is 6;
(s) in (a)-(k), n is 7;
(t) in (a)-(k), nis 8;
(u) in (a)-(k), n is 9;
(v) in (a)-(k), n is 10;
(w) in (a)-(v), o is 0;
(x) in (a)-(v), o is 1;
(y) in (a)-(v), o is 2;
(z) in (a)-(v), o is 3;
(aa) in (a)-(v), o is 4;
(bb) in (a)-(v), o is 5;
(cc) in (a)-(v), o is 6;
(dd) in (a)-(v), o is 7;
(ee) in (a)-(v), o is 8;
(ff) in (a)-(v), o is 9; and
(gg) in (a)-(v), o is 10.

Particular embodiments of Formula V, Formula VII, Formula XIV, Formula XX, Formula XXI, Formula XXIV, Formula XXV of the present invention include:
(a) in Formula V, Formula VII, Formula XIV, Formula XX, Formula XXI, Formula XXIV, Formula XXV, $X^+$ is $Na^+$;
(b) in Formula V, Formula VII, Formula XIV, Formula XX, Formula XXI, Formula XXIV, Formula XXV, $X^+$ is $K^+$;
(c) in Formula V, Formula VII, Formula XIV, Formula XX, Formula XXI, Formula XXIV, Formula XXV, $X^+$ is $Li^+$;
(d) in Formula V, Formula VII, Formula XIV, Formula XX, Formula XXI, Formula XXIV, Formula XXV, $X^+$ is $NH_4^+$
(e) in Formula V, Formula VII, Formula XIV, Formula XX, Formula XXI, Formula XXIV, Formula XXV, $X^+$ is $N(Me)_4^+$;
(f) in (a)-(e), x is 1;
(g) in (a)-(e), x is 2;
(h) in (a)-(e), x is 3;
(i) in (a)-(e), x is 4;
(j) in (a)-(e), x is 5;
(k) in (a)-(e), x is 6;
(l) in (a)-(e), x is 7;
(m) in (a)-(e), x is 8;
(n) in (a)-(m), y is 1;
(o) in (a)-(m), y is 2;
(p) in (a)-(m), y is 3;
(q) in (a)-(m), y is 4;
(r) in (a)-(m), y is 5;
(s) in (a)-(m), y is 6;
(t) in (a)-(m), y is 7;
(u) in (a)-(m), y is 8;
(v) in (a)-(e), m is 0;
(w) in (a)-(e), m is 1;
(x) in (a)-(e), m is 2;
(y) in (a)-(e), m is 3;
(z) in (a)-(e), m is 4;
(aa) in (a)-(e), mis 5;
(bb) in (a)-(e), m is 6;
(cc) in (a)-(e), m is 7;
(dd) in (a)-(e), m is 8;
(ee) in (a)-(e), m is 9;
(ff) in (a)-(e), m is 10;
(gg) in (v)-(ff), nis 0;
(hh) in (v)-(ff), n is 1;
(ii) in (v)-(ff), n is 2;
(jj) in (v)-(ff), n is 3;
(kk) in (v)-(ff), n is 4;
(ll) in (v)-(ff), n is 5;

(mm) in (v)-(ff), n is 6;
(nn) in (v)-(ff), n is 7;
(oo) in (v)-(ff), n is 8;
(pp) in (v)-(ff), n is 9;
(qq) in (v)-(ff), n is 10;
(rr) in (a)-(m), p is 0;
(ss) in (a)-(m), p is 1;
(tt) in (a)-(e) and (v)-(ff), p is 0; and
(uu) in (a)-(e) and (v)-(ff), p is 1.

Particular embodiments of Formula VI, Formula VIII, Formula XV, Formula XXII, and Formula XXIII of the present invention include:
(a) in Formula VI, Formula VIII, Formula XV, Formula XXII, and Formula XXIII, $M^{2+}$ is $Ca^{2+}$;
(b) in Formula VI, Formula VIII, Formula XV, Formula XXII, and Formula XXIII, $M^{2+}$ is $Mg^{2+}$;
(c) in Formula VI, Formula VIII, Formula XV, Formula XXII, and Formula XXIII, $M^{2+}$ is $Zn^{2+}$;
(d) in (a)-(c), x is 1;
(e) in (a)-(c), x is 2;
(f) in (a)-(c), x is 3;
(g) in (a)-(c), x is 4;
(h) in (a)-(c), x is 5;
(i) in (a)-(c), x is 6;
(j) in (a)-(c), x is 7;
(k) in (a)-(c), x is 8;
(l) in (a)-(k), y is 1;
(m) in (a)-(k), y is 2;
(n) in (a)-(k), y is 3;
(o) in (a)-(k), y is 4;
(p) in (a)-(k), y is 5;
(q) in (a)-(k), y is 6;
(r) in (a)-(k), y is 7;
(s) in (a)-(k), y is 8;
(t) in (a)-(c), m is 0;
(u) in (a)-(c), m is 1;
(v) in (a)-(c), m is 2;
(w) in (a)-(c), m is 3;
(x) in (a)-(c), m is 4;
(y) in (a)-(c), m is 5;
(z) in (a)-(c), m is 6;
(aa) in (a)-(c), m is 7;
(bb) in (a)-(c), m is 8;
(cc) in (a)-(c), m is 9;
(dd) in (a)-(c), m is 10;
(ee) in (t)-(dd), n is 0;
(ff) in (t)-(dd), n is 1;
(gg) in (t)-(dd), n is 2;
(hh) in (t)-(dd), n is 3;
(ii) in (t)-(dd), n is 4;
(jj) in (t)-(dd), n is 5;
(kk) in (t)-(dd), n is 6;
(ll) in (t)-(dd), n is 7;
(mm) in (t)-(dd), n is 8;
(nn) in (t)-(dd), n is 9; and
(oo) in (t)-(dd), n is 10.

In one aspect, Compound 1 through Compound 21 or a pharmaceutically acceptable salt or composition thereof or a compound of Formula I through Formula XXVII or a pharmaceutically acceptable salt or composition thereof is provided as a method for the relaxation of vascular smooth muscles for increased blood flow to treat certain diseases and disorders, including cardiovascular, blood vessel, metabolic, ocular and neurodegenerative disorders and diseases. In one embodiment, a compound of Formula I through Formula XXVII is administered to improve peripheral vasodilation, for example to treat Raynaud's disease or erectile dysfunction.

In one embodiment, Compound 1 through Compound 21 or a pharmaceutically acceptable salt or composition thereof or a compound of Formula I through Formula XXVII or a pharmaceutically acceptable salt or composition thereof is provided as a method to treat a cardiovascular disorder or blood vessel disorder, including hypertension, high blood pressure, congestive heart failure, heart attack, acute myocardial infarction, acute and chronic myocardial ischemia, unstable angina and associated chest pain, arrhythmias, pulmonary arterial hypertension (PAH), peripheral vascular disease, vasoconstriction diseases, vasospastic diseases, Raynaud's disease, or peripheral artery disease.

In one embodiment, Compound 1 through Compound 21 or a pharmaceutically acceptable salt or composition thereof or a compound of Formula I through Formula XXVII or a pharmaceutically acceptable salt or composition thereof is provided as a method to treat an endocrine system disorder, including hypoglycemia, hyperinsulinism, diabetes, or pre-diabetes.

In one embodiment, Compound 1 through Compound 21 or a pharmaceutically acceptable salt or composition thereof or a compound of Formula I through Formula XXVII or a pharmaceutically acceptable salt or composition thereof is provided as a method to treat smooth and/or skeletal muscle myopathies, urinary incontinence, hair loss, hypotrichosis, airway hyper-reactivity, asthma and nocturnal asthma, erectile dysfunction, and female sexual arousal disorder due to blood flow.

In one aspect, Compound 1 through Compound 21 or a pharmaceutically acceptable salt or composition thereof or a compound of Formula I through Formula XXVII or a pharmaceutically acceptable salt or composition thereof is provided as a method to lower intraocular pressure, to lower episcleral venous pressure (EVP), decrease vascular resistance and/or to improve distal outflow in a host in need thereof. Non-limiting examples of ophthalmic disorders that are caused or cause elevated EVP include elevated episcleral venous pressure (EVP), glaucoma, ocular hypertension, normal tension glaucoma, Graves' ophthalmopathy, Graves' orbitopathy (GO), retrobulbar tumors, cavernous sinus thrombosis, orbital vein thrombosis, episcleral/orbital vein vasculitis, superior vena cava obstruction, superior vena cava thrombosis, carotid cavernous sinus fistula, dural cavernous sinus shunts, orbital varices, and Sturge-Weber Syndrome.

In another aspect, Compound 1 through Compound 21 or a pharmaceutically acceptable salt or composition thereof or a compound of Formula I through Formula XXVII or a pharmaceutically acceptable salt or composition thereof is provided as a method to prevent or treat ocular damage due to, for example ischemic conditions. In one embodiment, Compound 1 or Compound 2 or a pharmaceutically acceptable salt thereof or a compound of Formula I through Formula XXVII is provided for the treatment of hypertensive retinopathy, normal tension glaucoma, central retinal vein occlusion (CRVO), branch retinal vein occlusion (BRVO), artery occlusive/embolic and or hypoperfusion diseases, diabetic retinopathy, retinopathy of prematurity optic nerve damage due to ischemia (posterior and anterior ischemic optic neuropathy (NAION), and acute and chronic angle closure glaucoma-induced damage to the optic nerve and nerve fiber layers of the retina (retinal ganglion layers).

I. Detailed Description of the Compounds of the Present Invention

Compounds of Formula I through Formula XXVII, including Compound 1 through Compound 21, are prodrugs of cromakalim, and in some embodiments, prodrugs of levcromakalim. In Compound 1 through Compound 21 or any of the Formulas described herein (Formula I through Formula XXVII), if the stereochemistry of a chiral carbon is not specifically designated, any stereochemical configuration can be used that achieves the desired result. The carbon can be either in the R or S configuration, or a mixture thereof, including a racemic mixture. And since there are two chiral carbons in a cromakalim moiety, the moiety can exhibit one of four diastereomeric configurations; two trans and two cis. For example, in one embodiment, Compound 1:

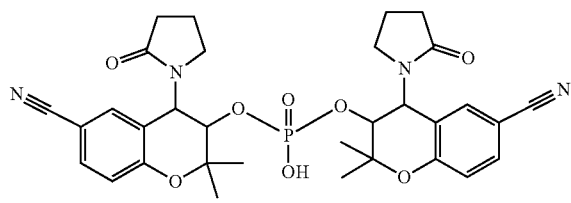 [SMILES: CC1(C)Oc2ccc(C#N)cc2C(N2CCCC2=O)C1OP(=O)(O)OC1C(N2CCCC2=O)c2cc(C#N)ccc2OC1(C)C]

is selected from a compound of the structure:

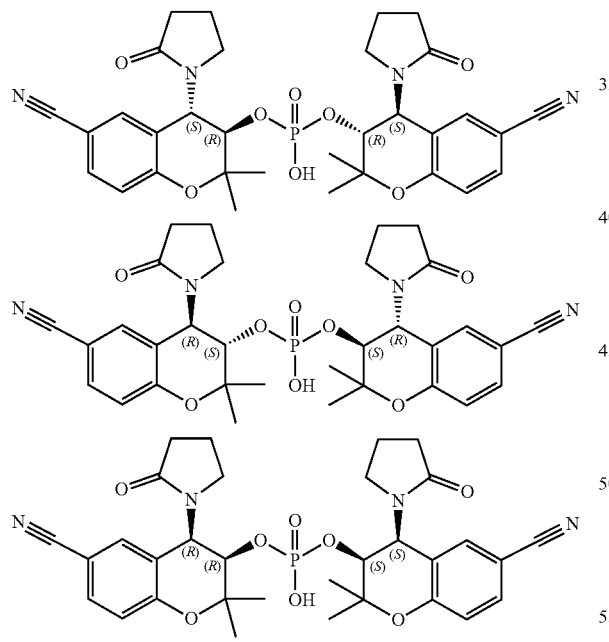

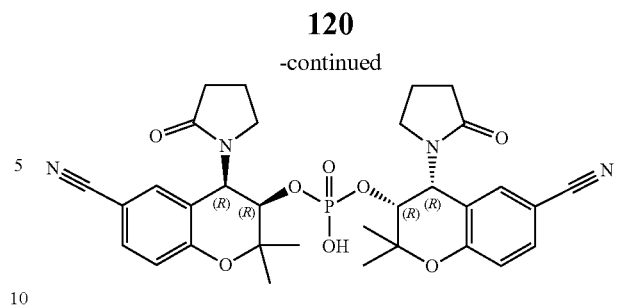

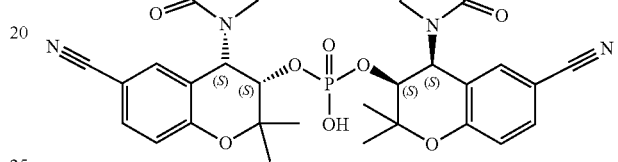

Furthermore, in one embodiment, the compounds of the present invention exist as a mixture of diastereomers and/or racemic compounds. For example, a composition that is primarily composed of

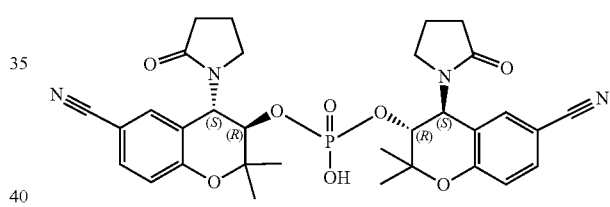

may also contain molecules of

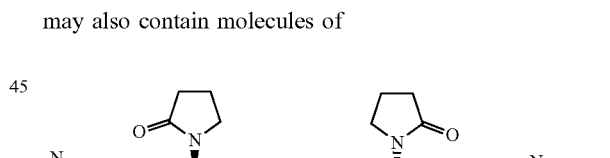
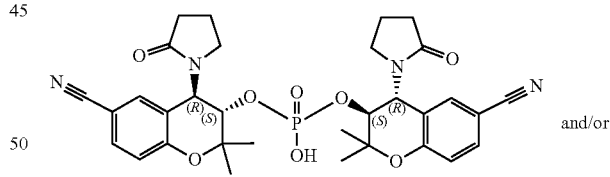

and/or

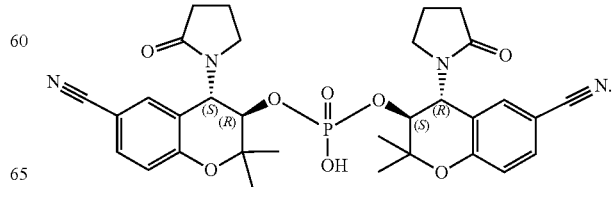
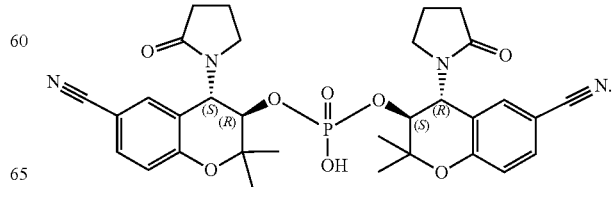

In another example, Compound 2:
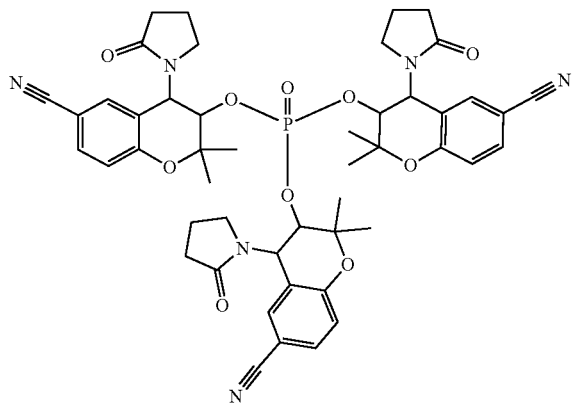 [SMILES: CC1(C)Oc2ccc(C#N)cc2C(N2CCCC2=O)C1OP(=O)(OC1C(N2CCCC2=O)c2cc(C#N)ccc2OC1(C)C)OC1C(N2CCCC2=O)c2cc(C#N)ccc2OC1(C)C]
is selected from a compound of the structure:
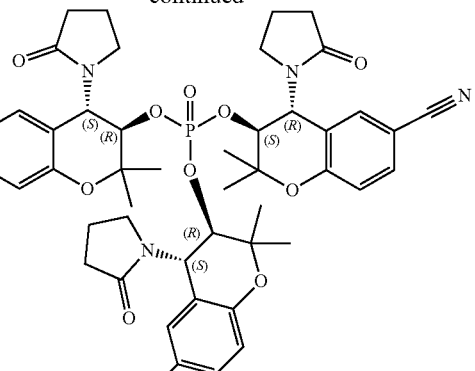
-continued
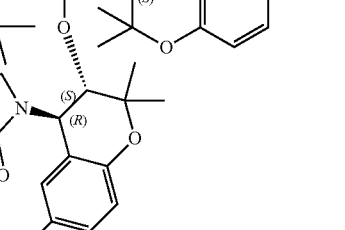
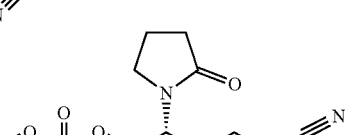
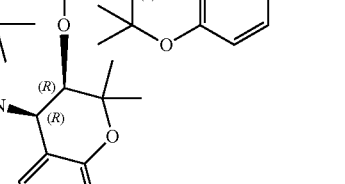
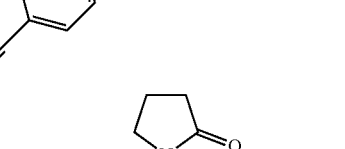
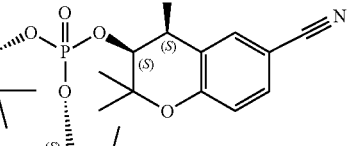
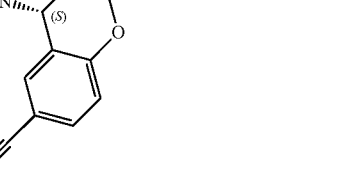

In one embodiment, Compound 1 Compound 21 or a compound of Formula I through Formula XXVII can be used in the form of any desired ratio of (3S,4R) and (3R,4S)-enantiomers, including up to pure enantiomers. In some embodiments, Compound 1 through Compound 21 or a compound of Formula I through Formula XXVII is used in a form that is at least 90% free of the opposite enantiomer, and can be at least 98%, 99%, or even 100% free of the opposite enantiomer. Unless described otherwise, an enantiomerically enriched compound of Compound 1 through Compound 21 or a compound of Formula I through Formula XXVII is at least 90% free of the opposite enantiomer.

Isotopic Substitution

The present invention includes compounds and the use of Compound 1 through Compound 21 or a compound of Formula I through Formula XXVII with desired isotopic substitutions of atoms at amounts above the natural abundance of the isotope, i.e., enriched. Isotopes are atoms having the same atomic number but different mass numbers, i.e., the same number of protons but a different number of neutrons. By way of general example and without limitation, isotopes of hydrogen, for example, deuterium ($^2$H) and tritium ($^3$H) may be used anywhere in described structures. Alternatively, or in addition, isotopes of carbon, e.g., $^{13}$C and $^{14}$C, may be used. A preferred isotopic substitution is deuterium for hydrogen at one or more locations on the molecule to improve the performance of the drug. The deuterium can be bound in a location of bond breakage during metabolism (an α-deuterium kinetic isotope effect) or next to or near the site of bond breakage (a β-deuterium kinetic isotope effect).

Substitution with isotopes such as deuterium can afford certain therapeutic advantages resulting from greater metabolic stability, such as, for example, increased in vivo half-life or reduced dosage requirements. Substitution of deuterium for hydrogen at a site of metabolic break-down can reduce the rate of or eliminate the metabolism at that bond. At any position of the compound that a hydrogen atom may be present, the hydrogen atom can be any isotope of hydrogen, including protium ($^1$H), deuterium ($^2$H) and tritium ($^3$H). Thus, reference herein to a compound encompasses all potential isotopic forms unless the context clearly dictates otherwise.

The term "isotopically-labeled" analog refers to an analog that is a "deuterated analog", a "$^{13}$C-labeled analog," or a "deuterated/$^{13}$C-labeled analog." The term "deuterated analog" means a compound described herein, whereby a H-isotope, i.e., hydrogen/protium ($^1$H), is substituted by a H-isotope, i.e., deuterium ($^2$H). Deuterium substitution can be partial or complete. Partial deuterium substitution means that at least one hydrogen is substituted by at least one deuterium. In certain embodiments, the isotope is 90, 95 or 99% or more enriched in an isotope at any location of interest. In some embodiments it is deuterium that is 90, 95 or 99% enriched at a desired location. Unless indicated to the contrary, the deuteration is at least 80% at the selected location.

II. Definitions

Compounds are described using standard nomenclature. Unless defined otherwise, all technical and scientific terms used herein have the same meaning as is commonly understood by one of skill in the art to which the invention belongs.

The terms "a" and "an" do not denote a limitation of quantity, but rather denote the presence of at least one of the referenced items. The term "or" means "and/or". Recitation of ranges of values merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of example, or exemplary language (e.g. "such as"), is intended merely to better illustrate the invention and does not pose a limitation on the scope of the invention unless otherwise claimed.

A "dosage form" means a unit of administration of an active agent. Examples of dosage forms include tablets, capsules, injections, suspensions, liquids, emulsions, implants, particles, spheres, creams, ointments, suppositories, inhalable forms, transdermal forms, buccal, sublingual, topical, gel, mucosal, and the like. A "dosage form" can also include an implant, for example an optical implant.

An "effective amount" as used herein means an amount which provides a therapeutic or prophylactic benefit.

"Parenteral" administration of a pharmaceutical composition includes, e.g., subcutaneous (s.c.), intravenous (i.v.), intramuscular (i.m.), intrasternal injection, or infusion techniques.

To "treat" a disease as the term is used herein means to reduce the frequency or severity of at least one sign or symptom of a disease or disorder experienced by a subject (i.e. palliative treatment) or to decrease a cause or effect of the disease or disorder (i.e. disease-modifying treatment).

As used herein, "pharmaceutical compositions" are compositions comprising at least one active agent and at least one other substance, such as a carrier. "Pharmaceutical combinations" are combinations of at least two active agents which may be combined in a single dosage form or provided together in separate dosage forms with instructions that the active agents are to be used together to treat any disorder described herein.

The term "carrier" applied to pharmaceutical compositions/combinations of the invention refers to a diluent, excipient, or vehicle with which an active compound is provided.

A "pharmaceutically acceptable excipient" means an excipient that is useful in preparing a pharmaceutical composition/combination that is generally safe, non-toxic and neither biologically nor otherwise inappropriate for administration to a host, typically a human. In one embodiment, an excipient is used that is acceptable for veterinary use.

A "patient" or "host" or "subject" is a human or non-human animal in need of treatment or prevention of any of the disorders specifically described herein. Typically, the host is a human. A "host" may alternatively refer to for example, a mammal, primate (e.g. human), cow, sheep, goat, horse, dog, cat, rabbit, rat, mice, fish, bird, and the like.

A "therapeutically effective amount" of a pharmaceutical composition/combination of this invention means an amount effective, when administered to a host, to provide a therapeutic benefit such as an amelioration of symptoms or reduction or diminution of the disease itself.

A "pharmaceutically acceptable salt" includes a derivative of the disclosed compound in which the parent compound is modified by making inorganic and organic, non-toxic, acid or base addition salts thereof. The salts of the present compounds can be synthesized from a parent compound that contains a basic or acidic moiety by conventional chemical methods. Generally, such salt can be prepared by reacting free acid forms of these compounds with a stoichiometric amount of the appropriate base (such as (Li, Na, Ca, Mg, or K) hydroxide, carbonate, bicarbonate, or the like), or by reacting a free base form of the compound with a stoichiometric amount of the appropriate acid. Such reactions are typically carried out in water or in an organic solvent, or in a mixture of the two. Generally, non-aqueous media like ether, ethyl acetate, ethanol, isopropanol, or acetonitrile are typical, where practicable.

Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts and the ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, HOOC—(CH2)n-COOH where n is 0-4, and the like.

Additional non-limiting examples of salts include 1-hydroxy-2-naphthoic acid, 2,2-dichloroacetic acid, 2-oxoglutaric acid, 4-acetamidobenzoic acid, 4-aminosalicylic acid, adipic acid, aspartic acid, benzenesulfonic acid, camphoric acid, camphor-10-sulfonic acid, capric acid, caproic acid, caprylic acid, carbonic acid, cinnamic acid, cyclamic acid, dodecylsulfuric acid, ethane-1,2-disulfonic acid, ethanesulfonic acid, formic acid, galactaric acid, gentisic acid, glucoheptonic acid, gluconic acid, glucuronic acid, glutaric acid, glycerophosphoric acid, hippuric acid, isobutyric acid, lactobionic acid, lauric acid, malonic acid, mandelic acid, naphthalene-1,5-disulfonic acid, naphthalene-2-sulfonic acid, nicotinic acid, nitric acid, oleic acid, palmitic acid, pyroglutamic acid, sebacic acid, thiocyanic acid, and undecylenic acid. Lists of additional suitable salts may be found, e.g., in Remington's Pharmaceutical Sciences, 17th ed., Mack Publishing Company, Easton, Pa., p. 1418 (1985).

Typical acid addition salts include acetate, adipate, alginate, aspartate, benzoate, benzenesulfonate, bisulfate, butyrate, citrate, camphorate, camphorsulfonate, cyclo-pentanepropionate, digluconate, dodecylsulfate, ethanesulfonate, fumarate, glucoheptanoate, glycerophosphate, hemisulfate, heptanoate, hexanoate, hydrochloride, hydrobromide, hydroiodide, 2-hydroxyethanesulfonate, lactate, maleate, methanesulfonate, 2-naphthalenesulfonate, nicotinate, oxalate, pamoate, pectinate, persulfate, 3-phenylpropionate, picrate, pivalate, propionate, succinate, tartrate, thiocyanate, tosylate, and undecanoate.

Certain compounds of the present invention are phosphoric acid prodrugs of cromakalim, and in some embodiments, levcromakalim, that have been neutralized with a cation. Typical inorganic basic addition salts of potassium channels include those containing benzathine, chloroprocaine, choline, diethylamino-ethanol, hydroxyethyl pyrrolidine, ammonium, tetrapropylammonium, tetrabutylphosphonium, hexamethyl diammonium, methyldiethanamine, triethylamine, meglumine, and procaine. In one embodiment, a compound of Formula I through Formula XXVII is neutralized with an inorganic basic addition salt selected from benzathine, chloroprocaine, choline, diethylamino-ethanol, hydroxyethyl pyrrolidine, ammonium, tetrapropylammonium, tetrabutylphosphonium, hexamethyl diammonium, methyldiethanamine, triethylamine, meglumine, and procaine.

III. Pharmaceutical Compositions and Dosage Forms

The compounds of the present invention described herein can be administered to a host in need thereof as the neat chemical, but are more typically administered as a pharmaceutical composition that includes an effective amount for a host, typically a human, in need of such treatment of Compound 1 through Compound 21 or a pharmaceutically acceptable salt or composition thereof or a compound of Formula I through Formula XXVII or a pharmaceutically acceptable salt or composition thereof. Thus, in one embodiment, the disclosure provides pharmaceutical compositions comprising an effective amount of a compound or pharmaceutically acceptable salt thereof together with at least one pharmaceutically acceptable carrier for any of the uses described herein. The pharmaceutical composition may contain a compound or salt as the only active agent, or, in an alternative embodiment, the compound and at least one additional active agent.

The exact amount of the active compound or pharmaceutical composition described herein to be delivered to the host, typically a human, in need thereof will be determined by the health care provider to achieve the desired clinical benefit.

In certain non-limiting embodiments the pharmaceutical composition is in a dosage form that contains from about 0.005 mg to about 5 mg, from about 0.003 mg to about 3 mg, from about 0.001 mg to about 1 mg, from about 0.05 mg to about 0.5 mg, from about 0.03 mg to about 0.3 mg, or from about 0.01 mg to about 0.1 mg, or from about 0.01 to about 0.05 mg.

In one embodiment, the pharmaceutical composition is in a dosage form that contains about 0.1 mg to about 1500 mg, from about 10 mg to about 1000 mg, from about 100 mg to about 800 mg, or from about 200 mg to about 600 mg of the active compound and optionally from about 0.01 mg to about 2000 mg, from about 10 mg to about 1000 mg, from about 100 mg to about 800 mg, or from about 200 mg to about 600 mg of an additional active agent in a unit dosage form. Examples are dosage forms with at least about 0.005, 0.01, 0.1, 0.2, 0.25, 0.5, 1, 1.5, 2, 2.5, 3, 3.5, 4, 4.5, 5, 10, 15, 20, 25, 50, 75, 100, 150, 200, 250, 300, 350, 400, 450, 500, 550, 600, 650, 700, 750, 800, 900, 1000, 1100, 1200, 1250, 1300, 1400, 1500, or 1600 mg of active compound or its salt. In one embodiment, the dosage form has at least about 1 mg, 5 mg, 10 mg, 25 mg, 50 mg, 75 mg, 100 mg, 200 mg, 400 mg, 500 mg, 600 mg, 1000 mg, 1200 mg, or 1600 mg of active compound or its salt. The amount of active compound in the dosage form is calculated without reference to the salt. The dosage form can be administered, for example, once a day (q.d.), twice a day (b.i.d.), three times a day (t.i.d.), four times a day (q.i.d.), once every other day (Q2d), once every third day (Q3d), as needed, or any dosage schedule that provides treatment of a disorder described herein.

The pharmaceutical composition may for example include any molar ratio of the active compound and an additional active agent that achieves the desired result.

Compounds or their pharmaceutically acceptable salts as disclosed or used herein can be delivered by any method known for therapeutic delivery. Methods include but are not limited to: conventional methods (solution, suspension, emulsion, ointment, inserts and gels); vesicular methods (liposomes, niosomes, discomes and pharmacosomes); particulates (microparticles and nanoparticles); advanced materials (scleral plugs, gene delivery, siRNA and stem cells); and controlled release systems (implants, hydrogels, dendrimers, collagen shields, polymeric solutions, therapeutic contact lenses, cyclodextrins carriers, microneedles and microemulsions).

The pharmaceutical carrier should be of sufficiently high purity and sufficiently low toxicity to render it suitable for administration to the patient being treated. The carrier can be inert or it can possess pharmaceutical benefits of its own. The amount of carrier employed in conjunction with the compound is sufficient to provide a practical quantity of material for administration per unit dose of the compound. Representative carriers include solvents, diluents, pH modifying agents, preservatives, antioxidants, suspending agents, wetting agent, viscosity agents, tonicity agents, stabilizing agents, and combinations thereof. In some embodiments, the carrier is an aqueous carrier. Examples of aqueous carries include, but are not limited to, an aqueous solution or suspension, such as saline, plasma, bone marrow aspirate, buffers, such as Hank's Buffered Salt Solution (HBSS), HEPES (4-(2-hydroxyethyl)-1-piperazineethanesulfonic acid), Ringers buffer, ProVisc®, diluted ProVisc®, Provisc® diluted with PBS, Krebs buffer, Dulbecco's PBS, normal PBS, sodium hyaluronate solution (HA, 5 mg/mL in PBS), citrate buffer, simulated body fluids including simulated tears, plasma platelet concentrate and tissue culture medium or an aqueous solution or suspension comprising an organic solvent. Pharmaceutical formulations for ocular administration are preferably in the form of a sterile aqueous solution. Acceptable solutions include, for example, water, Ringer's solution, phosphate buffered saline (PBS), and isotonic sodium chloride solutions. The formulation may also be a sterile solution, suspension, or emulsion in a non-toxic diluent or solvent such as 1,3-butanediol.

Viscosity agents may be added to the pharmaceutical composition to increase the viscosity of the composition as desired. Examples of useful viscosity agents include, but are not limited to, hyaluronic acid, sodium hyaluronate, carbomers, polyacrylic acid, cellulosic derivatives, polycarbophil, polyvinylpyrrolidone, gelatin, dextin, polysaccharides, polyacrylamide, polyvinyl alcohol (including partially hydrolyzed polyvinyl acetate), polyvinyl acetate, derivatives thereof and mixtures thereof. In one embodiment, the viscosity agent is hyaluronic acid and the hyaluronic acid is cross-linked. In one embodiment, the viscosity agent is hyaluronic acid and hyaluronic acid is linear.

Solutions, suspensions, or emulsions for administration may be buffered with an effective amount of buffer necessary to maintain a pH suitable for the selected administration. Suitable buffers are well known by those skilled in the art. Some examples of useful buffers are acetate, borate, carbonate, citrate, and phosphate buffers. Solutions, suspensions, or emulsions for topical, for example, ocular administration may also contain one or more tonicity agents to adjust the isotonic range of the formulation. Suitable tonicity agents are well known in the art. Some examples include glycerin, mannitol, sorbitol, sodium chloride, and other electrolytes.

Pharmaceutical compositions suitable for topical application to the skin may take the form of a gel, ointment, cream, lotion, paste, spray, aerosol, or oil, and may optionally include petroleum jelly, lanoline, polyethylene glycol, alcohol, or a combination thereof.

Pharmaceutical compositions suitable for transdermal administration may be presented as discrete patches adapted to remain in intimate contact with the epidermis of the recipient for a prolonged period of time. Pharmaceutical compositions suitable for transdermal administration may also be delivered by iontophoresis (see, for example, Pharmaceutical Research 3 (6): 318 (1986)) and typically take the form of an optionally buffered aqueous solution of the active compound. In one embodiment, microneedle patches or devices are provided for delivery of drugs across or into biological tissue, particularly the skin. The microneedle patches or devices permit drug delivery at clinically relevant rates across or into skin or other tissue barriers, with minimal or no damage, pain, or irritation to the tissue.

Other forms of administration include oral, rectal, sublingual, sublabial, or buccal and typical dosage forms for these routes include a pill, a tablet, a capsule, a solution, a suspension, an emulsion, and a suppository. Enteric coated oral tablets may also be used to enhance bioavailability of the compounds for an oral route of administration. The most effective dosage form will depend upon the bioavailability/pharmacokinetic of the particular agent chosen as well as the severity of disease in the patient. Oral dosage forms are particularly preferred, because of ease of administration and prospective favorable patient compliance. In one embodiment, the compound is administered vaginally via a suppository, a cream, a gel, a lotion, or an ointment.

In another embodiment, a compound of the present invention is administered via parenteral administration, including intravenously, subcutaneously, intramuscularly, intrathecally, intradermally, or intranasally in a dosage for suitable for parenteral administration, including a solution, a suspension, emulsion, or a lyophilized powder. In some instances, the composition is distributed or packaged in a liquid form. Alternatively, formulations can be packaged as a solid, obtained, for example by lyophilization of a suitable liquid formulation. The solid can be reconstituted with an appropriate carrier or diluent prior to administration.

In one embodiment, a compound of the present invention is administered via the inhaled pulmonary route. Pharmaceutical compositions suitable for administration to the lungs can be delivered by a wide range of passive breath driven and active power driven single/-multiple dose dry powder inhalers (DPI). The devices most commonly used for respiratory delivery include nebulizers, metered-dose inhalers, and dry powder inhalers. Several types of nebulizers are available, including jet nebulizers, ultrasonic nebulizers, and vibrating mesh nebulizers. Selection of a suitable lung delivery device depends on parameters, such as nature of the drug and its formulation, the site of action, and pathophysiology of the lung.

Additional non-limiting examples of inhalation drug delivery devices and methods include, for example, U.S. Pat. No. 7,383,837 titled "Inhalation device" (SmithKline Beecham Corporation); WO/2006/033584 titled "Powder inhaler" (Glaxo SmithKline Pharmaceuticals SA); WO/2005/044186 titled "Inhalable pharmaceutical formulations employing desiccating agents and methods of administering the same" (Glaxo Group Ltd and SmithKline Beecham Corporation); U.S. Pat. No. 9,095,670 titled "Inhalation device and method of dispensing medicament", U.S. Pat. No. 8,205,611 titled "Dry powder inhaler" (Astrazeneca AB); WO/2013/038170 titled "Inhaler" (Astrazeneca AB and Astrazeneca UK Ltd.); US/2014/0352690 titled "Inhalation Device with Feedback System", U.S. Pat. No. 8,910,625 and US/2015/0165137 titled "Inhalation Device for Use in Aerosol Therapy" (Vectura GmbH); U.S. Pat. No.

6,948,496 titled "Inhalers", US/2005/0152849 titled "Powders comprising anti-adherent materials for use in dry powder inhalers", U.S. Pat. Nos. 6,582,678, 8,137,657, US/2003/0202944, and US/2010/0330188 titled "Carrier particles for use in dry powder inhalers", U.S. Pat. No. 6,221,338 titled "Method of producing particles for use in dry powder inhalers", U.S. Pat. No. 6,989,155 titled "Powders", US/2007/0043030 titled "Pharmaceutical compositions for treating premature ejaculation by pulmonary inhalation", U.S. Pat. No. 7,845,349 titled "Inhaler", US/2012/0114709 and U.S. Pat. No. 8,101,160 titled "Formulations for Use in Inhaler Devices", US/2013/0287854 titled "Compositions and Uses", US/2014/0037737 and U.S. Pat. No. 8,580,306 titled "Particles for Use in a Pharmaceutical Composition", US/2015/0174343 titled "Mixing Channel for an Inhalation Device", U.S. Pat. No. 7,744,855 and US/2010/0285142 titled "Method of making particles for use in a pharmaceutical composition", U.S. Pat. No. 7,541,022, US/2009/0269412, and US/2015/0050350 titled "Pharmaceutical formulations for dry powder inhalers" (Vectura Limited).

Pharmaceutically acceptable excipients should be of sufficiently high purity and sufficiently low toxicity to render them suitable for administration to the patient being treated. The excipient can be inert or it can possess pharmaceutical benefits of its own. The amount of excipient employed in conjunction with the compound is sufficient to provide a practical quantity of material for administration per unit dose of the compound. Classes of excipients include, but are not limited to binders, buffering agents, coloring agents, diluents, disintegrants, emulsifiers, fillers, flavorants, glidents, lubricants, pH modifiers, preservatives, stabilizers, surfactants, solubilizers, tableting agents, and wetting agents. Exemplary pharmaceutically acceptable excipients include sugars, starches, celluloses, powdered tragacanth, malt, gelatin, talc, and vegetable oils. Examples of other matrix materials, fillers, or diluents include lactose, mannitol, xylitol, microcrystalline cellulose, calcium diphosphate, and starch. Examples of surface-active agents include sodium lauryl sulfate and polysorbate 80. Examples of drug complexing agents or solubilizers include the polyethylene glycols, caffeine, xanthene, gentisic acid and cylodextrins. Examples of disintegrants include sodium starch glycolate, sodium alginate, carboxymethyl cellulose sodium, methyl cellulose, colloidal silicon dioxide, and croscarmellose sodium. Examples of binders include methyl cellulose, microcrystalline cellulose, starch, gums, and tragacanth. Examples of lubricants include magnesium stearate and calcium stearate. Examples of pH modifiers include acids such as citric acid, acetic acid, ascorbic acid, lactic acid, aspartic acid, succinic acid, phosphoric acid, and the like; bases such as sodium acetate, potassium acetate, calcium oxide, magnesium oxide, trisodium phosphate, sodium hydroxide, calcium hydroxide, aluminum hydroxide, and the like, and buffers generally comprising mixtures of acids and the salts of said acids. Optionally, other active agents may be included in a pharmaceutical composition, so long as they do not substantially interfere with the activity of the compound of the present invention.

In certain embodiments the excipient is selected from phosphoglyceride; phosphatidylcholine; dipalmitoyl phosphatidylcholine (DPPC); dioleylphosphatidyl ethanolamine (DOPE); dioleyloxypropyltriethylammonium (DOTMA); dioleoylphosphatidylcholine; cholesterol; cholesterol ester; diacylglycerol; diacylglycerolsuccinate; diphosphatidyl glycerol (DPPG); hexanedecanol; fatty alcohol; polyethylene glycol (PEG); polyoxyethylene-9-lauryl ether; a surface active fatty acid, such as palmitic acid or oleic acid; fatty acid; fatty acid monoglyceride; fatty acid diglyceride; fatty acid amide; sorbitan trioleate (Span®85) glycocholate; sorbitan monolaurate (Span®20); polysorbate 20 (Tween®20); polysorbate 60 (Tween®60); polysorbate 65 (Tween®65); polysorbate 80 (Tween®80); polysorbate 85 (Tween®85); polyoxyethylene monostearate; surfactin; a poloxomer; a sorbitan fatty acid ester such as sorbitan trioleate; lecithin; lysolecithin; phosphatidylserine; phosphatidylinositol; sphingomyelin; phosphatidylethanolamine (cephalin); cardiolipin; phosphatidic acid; cerebroside; dicetylphosphate; dipalmitoylphosphatidylglycerol; stearylamine; dodecylamine; hexadecyl-amine; acetyl palmitate; glycerol ricinoleate; hexadecyl sterate; isopropyl myristate; tyloxapol; poly(ethylene glycol)5000-phosphatidylethanolamine; poly(ethylene glycol)400-monostearate; phospholipid; synthetic and/or natural detergent having high surfactant properties; deoxycholate; cyclodextrin; chaotropic salt; ion pairing agent; glucose, fructose, galactose, ribose, lactose, sucrose, maltose, trehalose, cellbiose, mannose, xylose, arabinose, glucoronic acid, galactoronic acid, mannuronic acid, glucosamine, galatosamine, and neuramic acid; pullulan, cellulose, microcrystalline cellulose, hydroxypropyl methylcellulose (HPMC), hydroxycellulose (HC), methylcellulose (MC), dextran, cyclodextran, glycogen, hydroxyethylstarch, carageenan, glycon, amylose, chitosan, N,O-carboxylmethylchitosan, algin and alginic acid, starch, chitin, inulin, konjac, glucommannan, pustulan, heparin, hyaluronic acid, curdlan, and xanthan, mannitol, sorbitol, xylitol, erythritol, maltitol, and lactitol, a pluronic polymer, polyethylene, polycarbonate (e.g. poly(1,3-dioxan-2one)), polyanhydride (e.g. poly(sebacic anhydride)), polypropylfumerate, polyamide (e.g. polycaprolactam), polyacetal, polyether, polyester (e.g., polylactide, polyglycolide, polylactide-co-glycolide, polycaprolactone, polyhydroxyacid (e.g. poly(β-hydroxyalkanoate)), poly(orthoester), polycyanoacrylate, polyvinyl alcohol, polyurethane, polyphosphazene, polyacrylate, polymethacrylate, polyurea, polystyrene, and polyamine, polylysine, polylysine-PEG copolymer, and poly (ethyleneimine), poly(ethylene imine)-PEG copolymer, glycerol monocaprylocaprate, propylene glycol, Vitamin E TPGS (also known as d-α-Tocopheryl polyethylene glycol 1000 succinate), gelatin, titanium dioxide, polyvinylpyrrolidone (PVP), hydroxypropyl methyl cellulose (HPMC), hydroxypropyl cellulose (HPC), methyl cellulose (MC), block copolymers of ethylene oxide and propylene oxide (PEO/PPO), polyethyleneglycol (PEG), sodium carboxymethylcellulose (NaCMC), or hydroxypropylmethyl cellulose acetate succinate (HPMCAS).

In some embodiments, a compound of the present invention can be provided as a lyophilized powder formulation. Lyophilized powder formulations can be prepared, for example, by a low temperature dehydration process that removes residual solvents by sublimation rather than boiling. Lyophilization is the preferred method for the formulation of sensitive solid materials as it typically maintains the integrity of the product due to the low temperature used in processing. Additionally, lyophilized solids can be reconstituted more quickly and easily due to the presence of microscopic pores formed by the process. The high vacuum used during lyophilization ensures thorough removal of any undesired volatile components such as methanol, ethanol, or other volatile organic substances. In one embodiment, the lyophilized powder formulation of the compounds and products described herein contains less than about 5%, about 4%, about 3%, about 2%, about 1%, about 0.5%, or about 0.01% of methanol by weight. Methods for the lyophilization of solids, particularly of sensitive materials used in pharmaceutical applications, are known in the art. Lyophilization may be performed using any number of commercially available apparatuses, for example a shelf-cabinet, contact, radiant, or microwave assisted lyophilizer.

Typical lyophilization procedures are composed of four steps. In the first step (Pre-Treatment), the compound is dissolved in an appropriate solvent and additional excipients are optionally added as required to increase stability, preserve appearance, or improve later processing. Additionally, solutions of the active compound may be concentrated as appropriate to aid in the freezing and later sublimation processes. Additionally, components may undergo initial individual quick freezing to ensure formation of a free-flowing solid upon completion of the lyophilization.

In the second step (freezing), the solution of the active compound is frozen in a vessel below its triple point to ensure that sublimation rather than melting will occur. Optionally, the material can be cycled up and down in temperature in a process called annealing. If the compound to be lyophilized is an amorphous solid, it may not have a triple point and instead has a critical point. Amorphous solids must be maintained below the critical point temperature during the entirety of the lyophilization process to prevent melt-back or collapse of the solid during the subsequent drying steps. For sensitive materials, the freezing step is often performed quickly by lowering the temperature of the material to between about −50 and −80° C. This prevents the formation of large solvent crystals that may diminish the structure integrity of the material being lyophilized and lead to poor texture.

In the third step (primary drying), the pressure of the vessel is lowered (typically to the range of a few millibars) and a minimum of heat is applied to the material for the solvent to sublime. Pressure is typically controlled by the application of a partial vacuum. A small amount of heat may be applied to facilitate sublimation of the solvent molecules. Typically, this heat is applied via conduction or radiation due to the low air density within the vessel.

In the final step (secondary drying), the temperature is raised higher than in the primary drying phase to remove any residual unfrozen solvent molecules. The rise in temperature is required to break any physico-chemical interactions that may have formed between the solvent molecules and the frozen material. Additionally, the pressure is typically lowered compared to the primary drying step to encourage desorption.

Upon completion of the lyophilization process, the vacuum is typically broken with an inert gas, for example nitrogen, and sealed in an appropriate container. Typical containers include sealed ampoules comprising sealed glass that is broken open at the time of desired application. The active material may be subsequently reconstituted at the time of application by using an appropriate carrier such as those that are described herein, for example sterile water or glycerin.

In one aspect, a compound of Formula I-Formula XXVII is administered as an implant formulation that provides, in one embodiment, controlled release. The implant can be any desired shape, and in one embodiment, the implant is a rod, cylinder, or pellet. In one embodiment, the invention includes a sustained-released amorphous solid glass formulation comprising a prodrug of Formula I-Formula XXVII. In one embodiment, a composition comprising a prodrug of Formula I-Formula XXVII is machined, molded, emulsion-processed, electrospun, electrosprayed, blow molded, or extruded to form a fiber, fiber mesh, woven fabric, non-woven fabric, pellet, cylinder, microsphere, nanosphere, or any other type shaped article from which the compound is released in a glassy state that allows for controlled release at for example, body temperature (approximately 37° C.). In one embodiment, the glassiness of the state enhances the control release of cromakalim, or in one embodiment, levcromakalim. In one embodiment, the article with a glassy state is free of controlled released excipients, mechanical integrity enhancing excipients, and/or binding excipients.

The term "glassy state," as used herein, refers to an amorphous solid including greater than 70%, 80%, 90%, 95%, 98%, or 99% (w/w) of one or more compounds of Formula I through Formula XXVII and exhibiting a glass transition temperature in the range of from 38 to 150° C. In the glassy state, as measured by DSC or XRD, the level of crystallinity is low, ranging from 0-15%, e.g., 0-1%, 0-3%, 0-5%, 0-7%, 0-9%, 0-10%, or 0-13%. Glass formulations of the disclosure can be formed using heat processing or solvent processing one or more of the compounds of Formula I through Formula XXVII.

In some embodiments, the sustained-released amorphous solid glass formulation releases the prodrug of Formula I-Formula XXVII through surface erosion following injection, for example, ocular injection, at a temperature of approximately 37° C., for example in the range of 35° C.-38° C. In some embodiments, surface erosion releases less than about 90%, less than about 80%, less than about 70%, less than about 60%, less than about 50%, less than about 40%, less than about 30%, less than about 20%, less than about 10%, or less than about 5% of the compound of Formula I-Formula XXVII as a percentage of the total compound of Formula I-Formula XXVII, which then goes on to release cromakalim, or in some embodiments, levcromakalim.

In some embodiments, the compounds of Formula I-Formula XXVII are are machined, molded, emulsion-processed, electrospun, electrosprayed, blow molded, or extruded to form a fiber, fiber mesh, woven fabric, non-woven fabric, pellet, cylinder, microsphere, nanosphere to form a glassy state solid. The glassy state solid is then heated above its glass transition temperature, Tg, and heat processed. In an alternative embodiment, a microparticle or nanoparticle or another shaped article, such as a rod, cone, or cylinder, is prepared by melting a compound of Formula I through Formula XXVII to form a glassy state pellet of other shape, crushing the glassy state articles into rough or irregular-shaped particle, filtering particles through a sieves, and heating the particles above the Tg to round them into smooth articles, for example a microparticle, nanoparticle, or sphere.

Ocular Delivery

When used for ocular treatment, the compounds disclosed herein or used as described herein are typically administered, for example, as a solution, suspension, or other formulation via intraocular, intravitreal, intrastromal, intracameral, sub-tenon, sub-retinal, retro-bulbar, peribulbar, suprachorodial, subchorodial, chorodial, conjunctival, subconjunctival, episcleral, periocular, transscleral, retrobulbar, posterior juxtascleral, circumcorneal, within the puncta and/or intracanalicular system, or through a mucus, mucin, or a mucosal barrier, in an immediate or controlled release fashion or via an ocular device, injection, or topically administered formulation, for example a solution, a suspension, or an emulsion provided as an eye drop.

Suitable non-aqueous pharmaceutically acceptable carriers include but are not limited to oleoyl polyethyleneglycol gylcerides, linoleoyl polyethyleneglycol gylcerides, lauroyl polyethyleneglycol gylcerides, hydrocarbon vehicles like liquid paraffin (Paraffinum liquidum, mineral oil), light liquid paraffin (low viscosity paraffin, Paraffinum perliquidum, light mineral oil), soft paraffin (vaseline), hard paraffin, vegetable fatty oils like castor oil, peanut oil or sesame oil, synthetic fatty oils like middle chain trigylcerides (MCT, triglycerides with saturated fatty acids, preferably octanoic and decanoic acid), isopropyl myristate, caprylocaproyl macrogol-8 glyceride, caprylocaproyl polyoxyl-8 glycerides, wool alcohols like cetylstearylalcohols, wool fat, glycerol, propylene glycol, propylene glycol diesters of caprylic/capric acid, polyethyleneglycols (PEG), semifluorinated alkanes (e.g. as described in WO 2011/113855) or a mixture of thereof. Preferably non-aqueous pharmaceutically acceptable vehicles used for the solution are hydrophobic.

Pharmaceutically acceptable excipients used in the topical ophthalmological pharmaceutical composition according to the present invention include but are not limited to stabilizers, surfactants, polymer-based carriers like gelling agents, organic co-solvents, pH active components, osmotic active components and preservatives.

Surfactants used in the topical ophthalmological pharmaceutical composition according to the present invention include but are not limited to lipids such as phospholipids, phosphatidylcholines, lecithin, cardiolipins, fatty acids, phosphatidylethanolamines, phosphatides, tyloxapol, polyethylenglycols and derivatives like PEG 400, PEG 1500, PEG 2000, poloxamer 407, poloxamer 188, polysorbate 80, polysorbate 20, sorbitan laurate, sorbitan stearate, sorbitan palmitate or a mixture thereof, preferably polysorbate 80. Suitable polymer base carriers like gelling agents used in the topical ophthalmological pharmaceutical composition according to the present invention include but are not limited to cellulose, hydroxypropylmethylcellulose (HPMC), hydroxypropylcellulose (HPC), carboxymethyl cellulose (CMC), methylcellulose (MC), hydroxyethylcellulose (HEC), amylase and derivatives, amylopectins and derivatives, dextran and derivatives, polyvinylpyrrolidone (PVP), polyvinyl alcohol (PVA), and acrylic polymers such as derivatives of polyacrylic or polymethacrylic acid like HEMA, carbopol and derivatives of the before mentioned or a mixture thereof.

A suitable pH active component such as a buffering agent or pH-adjusting agent used in the pharmaceutical composition according to the invention include but are not limited to acetate, borate, carbonate, citrate, and phosphate buffers, including disodium phosphate, monosodium phosphate, boric acid, sodium borate, sodium citrate, hydrochloric acid, sodium hydroxide. The pH active components are chosen based on the target pH for the composition which generally ranges from pH 4-9. In one embodiment, the formulation comprising a compound or pharmaceutically acceptable salt thereof of Formula I-III has a pH approximately between 5 and 8, between 5.5 and 7.4, between 6 and 7.5, or between 6.5 and 7. In one embodiment, the formulation comprises a citrate buffer at a pH around 6.5 to 7. In another embodiment, the formulation comprises a phosphate buffer at a pH around 6.5 to 7. Suitable osmotic active components used in the pharmaceutical composition according to the invention include but are not limited to sodium chloride, mannitol and glycerol.

Organic co-solvents used in the pharmaceutical composition according to the invention include but are not limited to ethylene glycol, propylene glycol, N-methyl pyrrolidone, 2-pyrrolidone, 3-pyrrolidinol, 1,4-butanediol, dimethylglycol monomethylether, diethyleneglycol monomethylether, solketal, glycerol, polyethylene glycol, polypropylene glycol.

Preservatives used in the pharmaceutical composition according to the invention include but are not limited to benzalkonium chloride, alkyldimethylbenzylammonium chloride, cetrimide, cetylpyridinium chloride, benzododecinium bromide, benzethonium chloride, thiomersal, chlorobutanol, benzyl alcohol, phenoxethanol, phenylethyl alcohol, sorbic acid, methyl and propyl parabens, chlorhexidine digluconate, EDTA or mixtures thereof.

In certain embodiments, the ocular solution comprises approximately 0.1% to 5.0% of a compound of Formula I-Formula XXVII or a pharmaceutically acceptable salt thereof as measured in mg/mL. In certain embodiments, the ocular solution comprises approximately 5% to 30% of a compound of Formula I-Formula XXVII as measured in mg/mL. In one embodiment, the solution comprises approximately 0.2% to 4.5%, 0.3% to 3.0%, 0.4% to 2.0%, or 0.5% to 1.5% of a compound of Formula I-Formula XXVII as measured in mg/mL. In one embodiment, the solution comprises at least 10%, at least 8%, at least 5%, at least 4%, at least 3%, at least 2%, at least 1%, at least 0.9%, at least 0.7%, at least 0.5%, at least 0.3%, or at least 0.1% of a compound of Formula I-Formula XXVII. In another embodiment, the solution comprises at least 30%, at least 25%, at least 20%, or at least 15% of a compound of Formula I-Formula XXVII. In one embodiment, the solution comprises approximately 0.2%, 0.4%, or 0.8% of a compound of Formula I-Formula XXVII or salts thereof. In one embodiment, the solution comprises approximately 0.5%, 1%, or 2% of a compound of Formula I-Formula XXVII or salts thereof.

In another embodiment, the solution has a concentration of a compound of Formula I-Formula XXVII or a pharmaceutically acceptable salt thereof ranging from about 2.5 mM to 500 mM. In one embodiment, the concentration is not greater than about 550 mM, 500 mM, 450 mM, 400 mM, 350 mM, 300 mM, 250 mM, 200 mM, 150 mM, 100 mM, 50 mM, 45 mM, 40 mM, 35 mM, 30 mM, 25 mM, 20 mM, 15 mM, 10 mM, 8 mM, 6 mM, 5 mM, 4 mM, 3 mM, 2.5 mM, 2.0 mM, 1.5 mM, or 1.0 mM.

In one embodiment, the concentration of a compound of Formula I-Formula XXVII I or a pharmaceutically acceptable salt thereof is in the range of approximately 0.2%-2% (equivalent to a 5 mM to 52 mM solution). In one embodiment, the concentration is at least 0.2% (equivalent to 5M), at least 0.4% (equivalent to 10 mM), at least 0.5% (equivalent to 12.5 mM), at least 0.8% (equivalent to 20 mM), at least 1% (equivalent to approximately 25 mM), or at least 2% (equivalent to approximately 50 mM).

A compound or a pharmaceutically acceptable salt thereof of Formula I-Formula XXVII can also be used for ocular therapy using an alternative route: intravitreal, intrastromal, intracameral, sub-tenon, sub-retinal, retro-bulbar, peribulbar, suprachorodial, subchorodial, chorodial, conjunctival, subconjunctival, episcleral, periocular, transscleralposterior juxtascleral, circumcorneal, or tear duct injections, or through a mucus, mucin, or a mucosal barrier, in an immediate or controlled release fashion or via an ocular device, or injection.

In one embodiment, a compound Formula I-Formula XXVII is administered via suprachoroidal injection. Suprachoroidal delivery is described in U.S. Pat. Nos. 9,636,332; 9,539,139; 10,188,550; 9,956,114; 8,197,435; 7,918,814 and PCT Applications WO 2012/051575; WO 2015/095772; WO 2018/031913; WO 2017/192565; WO 2017/190142; WO 2017/120601; and WO 2017/120600.

A device for minimally invasive delivery of drugs to the suprachoroidal space may comprise a needle for injection of drugs or drug containing materials directly to the suprachoroidal space. The device may also comprise elements to advance the needle through the conjunctiva and sclera tissues to or just adjacent to the suprachoroidal space without perforation or trauma to the inner choroid layer. The position of the leading tip of the delivery device may be confirmed by non-invasive imaging such as ultrasound or optical coherence tomography, external depth markers or stops on the tissue-contacting portion of the device, depth or location sensors incorporated into the device or a combination of such sensors. For example, the delivery device may incorporate a sensor at the leading tip such as a light pipe or ultrasound sensor to determine depth and the location of the choroid or a pressure transducer to determine a change in local fluid pressure from entering the suprachoroidal space. In one embodiment, the suprachoroidal injection is conducted with a thin- or regular-walled needle of 26-, 27-, 28-, 29- or 30-gauge. In an alternative embodiment, the suprachoroidal injection is conducted with a thin- or regular-walled needle of 31, 32, or 33-gauge.

Many methods and devices for drug delivery to the eye are known in the art. Non-limiting examples are described in the following patents and patent applications (fully incorporated herein by reference). Examples are U.S. Pat. No. 8,192,408 titled "Ocular trocar assembly" (Psivida Us, Inc.); U.S. Pat. No. 7,585,517 titled "Transcleral delivery" (Macusight, Inc.); U.S. Pat. Nos. 5,710,182 and 5,795,913 titled "Ophthalmic composition" (Santen O Y); U.S. Pat. No. 8,663,639 titled "Formulations for treating ocular diseases and conditions", U.S. Pat. No. 8,486,960 titled "Formulations and methods for vascular permeability-related diseases or conditions", U.S. Pat. Nos. 8,367,097 and 8,927,005 titled "Liquid formulations for treatment of diseases or conditions", U.S. Pat. No. 7,455,855 titled "Delivering substance and drug delivery system using the same" (Santen Pharmaceutical Co., Ltd.); WO/2011/050365 titled "Conformable Therapeutic Shield For Vision and Pain" and WO/2009/145842 titled "Therapeutic Device for Pain Management and Vision" (Forsight Labs, LLC); U.S. Pat. Nos. 9,066,779 and 8,623,395 titled "Implantable therapeutic device", WO/2014/160884 titled "Ophthalmic Implant for Delivering Therapeutic Substances", U.S. Pat. Nos. 8,399,006, 8,277, 830, 8,795,712, 8,808,727, 8,298,578, and WO/2010/088548 titled "Posterior segment drug delivery", WO/2014/152959 and US20140276482 titled "Systems for Sustained Intraocular Delivery of Low Solubility Compounds from a Port Delivery System Implant", U.S. Pat. Nos. 8,905,963 and 9,033,911 titled "Injector apparatus and method for drug delivery", WO/2015/057554 titled "Formulations and Methods for Increasing or Reducing Mucus", U.S. Pat. Nos. 8,715,712 and 8,939,948 titled "Ocular insert apparatus and methods", WO/2013/116061 titled "Insertion and Removal Methods and Apparatus for Therapeutic Devices", WO/2014/066775 titled "Ophthalmic System for Sustained Release of Drug to the Eye", WO/2015/085234 and WO/2012/019176 titled "Implantable Therapeutic Device", WO/2012/065006 titled "Methods and Apparatus to determine Porous Structures for Drug Delivery", WO/2010/141729 titled "Anterior Segment Drug Delivery", WO/2011/050327 titled "Corneal Denervation for Treatment of Ocular Pain", WO/2013/022801 titled "Small Molecule Delivery with Implantable Therapeutic Device", WO/2012/019047 titled "Subconjunctival Implant for Posterior Segment Drug Delivery", WO/2012/068549 titled "Therapeutic Agent Formulations for Implanted Devices", WO/2012/019139 titled "Combined Delivery Methods and Apparatus", WO/2013/040426 titled "Ocular Insert Apparatus and Methods", WO/2012/019136 titled "Injector Apparatus and Method for Drug Delivery", WO/2013/040247 titled "Fluid Exchange Apparatus and Methods" (ForSight Vision4, Inc.). Kala Pharmaceuticals describe the use of muco permeable polymers in U.S. Pat. Nos. 9,056,057; 9,393,213; 9,532,955; 9,737,419; 9,827,191; and 10,058,511.

Additional non-limiting examples of how to deliver the active compounds are provided in WO/2015/085251 titled "Intracameral Implant for Treatment of an Ocular Condition" (Envisia Therapeutics, Inc.); WO/2011/008737 titled "Engineered Aerosol Particles, and Associated Methods", WO/2013/082111 titled "Geometrically Engineered Particles and Methods for Modulating Macrophage or Immune Responses", WO/2009/132265 titled "Degradable compounds and methods of use thereof, particularly with particle replication in non-wetting templates", WO/2010/099321 titled "Interventional drug delivery system and associated methods", WO/2008/100304 titled "Polymer particle composite having high fidelity order, size, and shape particles", WO/2007/024323 titled "Nanoparticle fabrication methods, systems, and materials" (Liquidia Technologies, Inc. and the University of North Carolina at Chapel Hill); WO/2010/009087 titled "Iontophoretic Delivery of a Controlled-Release Formulation in the Eye", (Liquidia Technologies, Inc. and Eyegate Pharmaceuticals, Inc.) and WO/2009/132206 titled "Compositions and Methods for Intracellular Delivery and Release of Cargo", WO/2007/133808 titled "Nanoparticles for cosmetic applications", WO/2007/056561 titled "Medical device, materials, and methods", WO/2010/065748 titled "Method for producing patterned materials", WO/2007/081876 titled "Nanostructured surfaces for biomedical/biomaterial applications and processes thereof" (Liquidia Technologies, Inc.).

Topical Skin or Transdermal Delivery

Administration of a compound or a pharmaceutically acceptable salt of Formula I-Formula XXVII may also include topical or transdermal administration. Pharmaceutical compositions suitable for topical application to the skin may take the form of a gel, ointment, cream, lotion, paste, spray, aerosol, or oil, and may optionally include petroleum jelly, lanoline, polyethylene glycol, alcohol, or a combination thereof.

Pharmaceutical compositions suitable for transdermal administration may be presented as discrete patches adapted to remain in intimate contact with the epidermis of the recipient for a prolonged period of time. Pharmaceutical compositions suitable for transdermal administration may also be delivered by iontophoresis (see, for example, Pharmaceutical Research 3 (6): 318 (1986)) and typically take the form of an optionally buffered aqueous solution of the active compound. In one embodiment, microneedle patches or devices are provided for delivery of drugs across or into biological tissue, particularly the skin. The microneedle patches or devices permit drug delivery at clinically relevant rates across or into skin or other tissue barriers, with minimal or no damage, pain, or irritation to the tissue.

A wide variety of skin care active and inactive ingredients may be advantageously combined with the present compounds in accordance with the present invention, including, but not limited to, conditioning agents, skin protectants, other antioxidants, UV absorbing agents, sunscreen actives, cleansing agents, viscosity modifying agents, film formers, emollients, surfactants, solubilizing agents, preservatives, fragrance, chelating agents, foaming or antifoaming agents, opacifying agents, stabilizing agents, pH adjustors, absorbents, anti-caking agents, slip modifiers, various solvents, solubilizing agents, denaturants, abrasives, bulking agents, emulsion stabilizing agents, suspending agents, colorants, binders, conditioning agent-emollients, surfactant emulsifying agents, biological products, anti-acne actives, anti-wrinkle and anti-skin atrophy actives, skin barrier repair aids, cosmetic soothing aids, topical anesthetics, artificial tanning agents and accelerators, skin lightening actives, antimicrobial and antifungal actives, sebum stimulators, sebum inhibitors, humectants, and/or combinations thereof.

Conditioning agents may generally be used to improve the appearance and/or feel of the skin upon and after topical application via moisturization, hydration, plasticization, lubrication, and occlusion, or a combination thereof. Non-limiting examples of the conditioning component include, but are not limited to, mineral oil, petrolatum, $C_7$-$C_{40}$ branched chain hydrocarbons, $C_1$-$C_{30}$ alcohol esters of $C_1$-$C_{30}$ carboxylic acids, $C_1$-$C_{30}$ alcohol esters of $C_2$-$C_{30}$ dicarboxylic acids, monoglycerides of $C_1$-$C_{30}$ carboxylic acids, diglycerides of $C_1$-$C_{30}$ carboxylic acids, triglycerides of $C_1$-$C_{30}$ carboxylic acids, ethylene glycol monoesters of $C_1$-$C_{30}$ carboxylic acids, ethylene glycol diesters of $C_1$-$C_{30}$ carboxylic acids, propylene glycol monoesters of $C_1$-$C_{30}$ carboxylic acids, propylene glycol diesters of $C_1$-$C_{30}$ carboxylic acids, $C_1$-$C_{30}$ carboxylic acid monoesters and polyesters of sugars, polydialkylsiloxanes, polydiarylsiloxanes, polyalkarylsiloxanes, cylcomethicones having 3 to 9 silicon atoms, vegetable oils, hydrogenated vegetable oils, polypropylene glycol $C_4$-$C_{20}$ alkyl ethers, di $C_8$-$C_{30}$ alkyl ethers, and mixtures thereof. Non-limiting examples of straight and branched chain hydrocarbons having from about 7 to about 40 carbon atoms include, but are not limited to, dodecane, isododecane, squalane, cholesterol, hydrogenated olyisobutylene, docosane hexadecane, isohexadecane, $C_7$-$C_{40}$ isoparaffins, monoglycerides of $C_1$-$C_{30}$ carboxylic acids, diglycerides of $C_1$-$C_{30}$ carboxylic acids, triglycerides of $C_1$-$C_{30}$ carboxylic acids, ethylene glycol monoesters of $C_1$-$C_{30}$ carboxylic acids, ethylene glycol diesters of $C_1$-$C_{30}$ carboxylic acids, propylene glycol monoesters of $C_1$-$C_{30}$ carboxylic acids, and propylene glycol diesters of $C_1$-$C_{30}$ carboxylic acids, including straight chain, branched chain and aryl carboxylic acids, and propoxylated and ethoxylated derivatives of these materials.

Non-limiting examples of sunscreens which are useful in the compositions include 4-N,N-(2-ethylhexyl)methylaminobenzoic acid ester of 2,4-dihydroxybenzophenone, 4-N,N-(2-ethylhexyl)methylaminobenzoic acid ester with 4-hydroxydibenzoylmethane, 4-N,N-(2-ethylhexyl)-methylaminobenzoic acid ester of 2-hydroxy-4-(2-hydroxyethoxy)benzophenone, 4-N,N-(2-ethylhexyl)-methylaminobenzoic acid ester of 4-(2-hydroxyethoxy) dibenzoylmethane, 2-ethylhexyl p-methoxycinnamate, 2-ethylhexyl N,N-dimethyl-p-aminobenzoate, p-aminobenzoic acid, 2-phenylbenzimidazole-5-sulfonic acid, octocrylene, oxybenzone, homomenthyl salicylate, octyl salicylate, 4,4'-methoxy-t-butyldibenzoylmethane, 4-isopropyl dibenzoylmethane, 3-benzylidene camphor, 3-(4-methylbenzylidene) camphor, titanium dioxide, zinc oxide, silica, iron oxide, and mixtures thereof. Other useful sunscreens include aminobenzoic acid (PABA), benzylidene camphor, butyl methoxy dibenzoyl methane, diethanolamine p-methoxycinnamate, 5 dioxybenzone, ethyl dihydroxypropyl (PABA), glyceryl aminobenzoate, homomenthyl salicylate, isopropyl dibenzoyl methane, lawsone and dihydroxyacetone, menthyl anthranilate, methyl anthranilate, methyl benzylidene camphor, octocrylene, octyl dimethyl (PABA), octyl methoxycinnamate, oxybenzone, 2-phenylbenzimidazole-5-sulfonic acid, red petrolatum, sulisobenzone, titanium dioxide, triethanolamine salicylate, zinc oxide, and mixtures thereof.

Exact amounts of sunscreens which can be employed will vary depending upon the sunscreen chosen and the desired Sun Protection Factor (SPF) to be achieved.

Viscosity agents may be added to the topical formulation to increase the viscosity of the composition as desired. Examples of useful viscosity agents include, but are not limited to, water-soluble polyacrylic and hydrophobically modified polyacrylic resins such as Carbopol and Pemulen; starches such as corn starch, potato starch, and tapioca; gums such as guar gum and gum arabic; and, cellulose ethers such as hydroxypropyl cellulose, hydroxyethyl cellulose, carboxymethyl cellulose, and the like.

A wide variety of emulsifiers are also useful and include, but are not limited to, sorbitan esters, glyceryl esters, poly glyceryl esters, methyl glucose esters, sucrose esters, ethoxylated fatty alcohols, hydrogenated castor oil ethoxylates, sorbitan ester ethoxylates, polymeric emulsifiers, silicone emulsifiers, glyceryl monoesters, preferably glyceryl monoesters of $C_{16}$-$C_{22}$ saturated, unsaturated and branched chain fatty acids such as glyceryl oleate, glyceryl monostearate, glyceryl monopalmitate, glyceryl monobehenate, and mixtures thereof; polyglyceryl esters of $C_{16}$-$C_{22}$ saturated, unsaturated and branched chain fatty acids, such as polyglyceryl-4 isostearate, polyglyceryl-3 oleate, diglycerol monooleate, tetraglycerol monooleate and mixtures thereof; methyl glucose esters, preferably methyl glucose esters of $C_{16}$-$C_{22}$ saturated, unsaturated and branched chain fatty acids such as methyl glucose dioleate, methyl glucose sesquhsostearate, and mixtures thereof; sucrose fatty acid esters, preferably sucrose esters of $C_{12}$-$C_{22}$ saturated, unsaturated and branched chain fatty acids such as sucrose stearate, sucrose laurate, sucrose distearate (e.g., CRODESTA® F10), and mixtures thereof, $C_{12}$-$C_{22}$ ethoxylated fatty 5 alcohols such as oleth-2, oleth-3, steareth-2, and mixtures thereof; hydrogenated castor oil ethoxylates such as PEG-7 hydrogenated castor oil; sorbitan ester ethoxylates such as PEG-40 sorbitan peroleate, Polysorbate-80, and mixtures thereof; polymeric emulsifiers such as ethoxylated dodecyl glycol copolymer; and silicone emulsifiers such as laurylmethicone copolyol, cetyldimethicone, dimethicone copolyol, and mixtures thereof.

Systemic Delivery

In another embodiment, a compound or a pharmaceutically acceptable salt thereof of Formula I-Formula XXVII is administered in an effective amount via any systemic route that achieves the desired effect. Examples are enteral or parenteral administration, including via oral, buccal, sublingual, intravenous, subcutaneous, intramuscular, intrathecal, or intranasal delivery, including a solution, a suspension, emulsion, or a lyophilized powder. In some instances, the composition is distributed or packaged in a liquid form. Alternatively, formulations can be packaged as a solid, obtained, for example by lyophilization of a suitable liquid formulation. The solid can be reconstituted with an appropriate carrier or diluent prior to administration. In one embodiment, the compound is administered vaginally via a suppository, a cream, a gel, a lotion, or an ointment.

Other forms of administration include oral, rectal, sublingual, sublabial, or buccal and typical dosage forms for these routes include a pill, a tablet, a capsule, a solution, a suspension, an emulsion, and a suppository.

In one embodiment, a compound a pharmaceutically acceptable salt thereof of Formula I-Formula XXVII is administered via the inhaled pulmonary route. Dosage forms for pulmonary drug delivery include propellants, non-aqueous inhalers, dry powder inhalers, and jet or ultrasonic nebulizers.

Oral Delivery

In one aspect, a compound or a pharmaceutically acceptable salt thereof of Formula I-Formula XXVII is administered orally. The compound can be formulated using any desired techniques including formulating the prodrug as a neat chemical (for example a powder, morphic form, amorphous form, or oil), or mixing the prodrug with a pharmaceutically acceptable excipient. The resulting pharmaceutically acceptable composition for oral deliver contains an effective amount of the prodrug or a pharmaceutically acceptable salt thereof and one or more pharmaceutically acceptable excipients.

Typical dosage forms for oral administration includes a pill, a tablet, a capsule, a gel cap, a solution, a suspension, or an emulsion. The dosage form may also feature compartmentalization. For example, when the dosage form is a pill, tablet, or capsule, it may have different layers of material which have different excipients or different concentrations of excipients. For example, an enteric coated oral tablet may be used to enhance bioavailability of the compounds for an oral route of administration. The entric coating will be a layer of excipient that allows the tablet to survive stomach acid. The most effective dosage form will depend upon the bioavailability/pharmacokinetic of the particular agent chosen as well as the severity of disease in the patient. Oral dosage forms are particularly preferred, because of ease of administration and prospective favorable patient compliance.

In certain embodiments the oral dosage form contains one or more additional active agents as described herein. In certain embodiments the second active agent is administered separately from the compound of the present invention.

In another embodiment one dosage form may be converted to another to favorably improve the properties. For example, when making a solid pharmaceutically acceptable composition a suitable liquid formulation can be lyophilization. The solid can be reconstituted with an appropriate carrier or diluent prior to administration.

Oral pharmaceutical compositions can contain any amount of active compound that achieves the desired result, for example between 0.1 and 99 weight % (wt. %) of the compound and usually at least about 5 wt. % of the compound. Some embodiments contain at least about 10%, 15%, 20%, 25 wt. % to about 50 wt. % or from about 5 wt. % to about 75 wt. % of the compound.

The oral dosage form can be administered, for example, once a day (q.d.), twice a day (b.i.d.), three times a day (t.i.d.), four times a day (q.i.d.), once every other day (Q2d), once every third day (Q3d), as needed, or any dosage schedule that provides treatment of a disorder described herein.

IV. Methods of Treatment for Systemic Diseases and Disorders

Cardiovascular Diseases and Disorders

Potassium channel activity is a major regulator of vascular muscle cell membrane potential and potassium channel activity is often altered during cardiovascular diseases, including hypertension, atherosclerosis, myocardial ischemia, and chronic heart failure. Vasoconstriction and the compromised ability of an artery to dilate are likely consequences of defective and/or dysfunctional potassium channel function in blood vessels. Potassium channel openers that activate (or open) potassium channels act as a vasodilator to dilate or relax blood vessels, preventing artery walls and veins from narrowing.

In one embodiment, a compound of Compound 1 through Compound 21 or a pharmaceutically acceptable salt thereof is administered for the treatment of hypertension in a host in need thereof. In one embodiment, a compound of Formula I through Formula XXVII is administered for the treatment of hypertension in a host in need thereof. In one embodiment, the hypertension is systemic and/or refractory hypertension. In one embodiment, the hypertension is Stage 1 hypertension, Stage 2 hypertension, Stage 3 hypertension, or Stage 4 hypertension. In one embodiment, the hypertension is acute. In one embodiment, the hypertension is chronic. In one embodiment, the hypertension is primary or essential. In one embodiment, the hypertension is secondary. In one embodiment, the hypertension is pulmonary arterial hypertension. In one embodiment, the hypertension is persistent pulmonary hypertension in neonates.

Studies have shown that potassium channel openers limit myocardial dysfunction under ischemic and heart failure conditions through direct action on the myocardium (Grover G J, Garlid K D. ATP-sensitive potassium channels: a review of their cardioprotective pharmacology. J Mol Cell Cardiol 2000; 32:677-95). Therefore, in one embodiment, a compound of Compound 1 through Compound 21 or a pharmaceutically acceptable salt thereof is administered for the treatment of acute and/or chronic heart failure in a host in need thereof. In one embodiment, a compound of Formula I through Formula XXVII is administered for the treatment of heart failure in a host in need thereof. In one embodiment, the heart failure is Stage 1, Stage 2, Stage 3, or Stage 4. In one embodiment, the heart failure is congestive heart failure. In one embodiment, the heart failure is low-output heart failure. In one embodiment, the heart failure is left ventricular failure after an acute myocardial infarction (AMI) or heart attack. In one embodiment, Compound 1 through Compound 21 or a pharmaceutically acceptable salt thereof or a compound selected from Formula I through Formula XXVII is provided in an amount effective to reduce capillary wedge pressure. In one embodiment, Compound 1 through Compound 21 or a pharmaceutically acceptable salt thereof or a compound selected from Formula I through Formula XXVII is provided in an amount effective to treat or prevent arrhythmias and/or ventricular fibrillation associated with AMI in a host in need thereof. In one embodiment, the host is undergoing a cauterization procedure.

In one embodiment, a compound of Compound 1 through Compound 21 or a pharmaceutically acceptable salt thereof or a composition thereof is administered for the treatment of acute, transient, and/or chronic myocardial ischemia in a host in need thereof. In one embodiment, a compound of Formula I through Formula XXVII or a pharmaceutically acceptable salt or composition thereof is administered for the treatment of myocardial ischemia in a host in need thereof. In one embodiment, the myocardial ischemia is acute. In one embodiment, the myocardial ischemia is chronic.

Evidence has been provided that potassium channel openers exhibit cardioprotective properties. For example, potassium channel openers such as nicorandil, aprikalim and pinacidil have exhibited cardioprotective effects in several experimental models of surgical ischemia and cardiopulmonary bypass. The use of potassium channel openers before storage has also shown to provide preservation of cardiac function following prolonged hypothermic storage (Kevelaitis E, et al. Circulation, 1999:100:345). Therefore, in one embodiment, a compound of Compound 1 through Compound 21 or a pharmaceutically acceptable salt thereof is administered as a cardioprotective agent in a host in need thereof. In one embodiment, a compound of Formula I through Formula XXVII or a pharmaceutically acceptable salt or composition thereof is administered as a cardioprotective agent in a host in need thereof. In one embodiment, Compound 1 through Compound 21 or a pharmaceutically acceptable salt thereof or a compound selected from Formula I through Formula XXVII is used as a cardioprotective agent in a host experiencing a heart attack. In one embodiment, Compound 1 Compound 21 or a pharmaceutically acceptable salt thereof or a compound selected from Formula I through Formula XXVII is used as a cardioprotective agent in a host undergoing heart surgery. In one embodiment, Compound 1 Compound 21 or a pharmaceutically acceptable salt thereof or a compound selected from Formula I through Formula XXVII is provided in an effective amount for the preservation of heart prior to organ donation.

Potassium channel openers, such as nicorandil, have been shown to be useful for the treatment of stable and unstable angina (Simpson D, Wellington K. Drugs 2004, 641941) with minimal side effects. In one study, nicorandil reduced transient myocardial ischemia, non-sustained ventricular, and supraventricular arrhythmia compared to placebo when added to aggressive anti-anginal treatment for unstable angina (Patel, D. J., et al. Eur Heart J. 1999, 20, 51). Therefore, in one embodiment, a compound of Compound 1 through Compound 21 or a pharmaceutically acceptable salt thereof is administered for the treatment of angina in a host in need thereof. In one embodiment, a compound of Formula I through Formula XXVII is administered for the treatment of angina in a host in need thereof. In one embodiment, the angina is stable angina. In one embodiment, the angina is unstable angina. In one embodiment, the angina is variant and/or paroxysmal angina. In one embodiment, the angina is microvascular angina.

The vascular endothelium is a thin layer of cells that line the blood vessels and damage that impairs the function of the endothelium is referred to as endothelial dysfunction. This is often a precursor to cardiovascular disease, AMI, volatile hypertension and hypoperfusion, nocturnal hypotension, migraines, Raynauds disease, and atherosclerosis. Therefore, in one embodiment, a compound of Compound 1 through Compound 21 or a pharmaceutically acceptable salt thereof is administered for the treatment of endothelial dysfunction in a host in need thereof. In one embodiment, a compound of Formula I through Formula XXVII or a pharmaceutically acceptable salt or composition thereof is administered for the treatment of endothelial dysfunction a in a host in need thereof.

Microvascular dysfunction (or coronary microvascular disease) is a type of non-obstructive coronary artery disease that causes the small blood vessels feeding the heart muscle to not work. Patients with microvascular dysfunction do not have plaque buildup in the coronary artery blood vessels, but have damage to the inner walls of the blood vessels that can lead to spasms and decrease blood flow to the heart muscle. In an alternative embodiment of the invention, a compound of Formula I through Formula XXVII or a pharmaceutically acceptable salt is provided in an effective amount for the treatment of microvascular dysfunction.

Blood Vessel Diseases and Disorders

Potassium channel activity is a major regulator of vascular muscle cell membrane potential and therefore potassium channel activity has a large influence on vascular diameter, blood flow, perfusion pressure, vascular resistance and blood pressure. Vasospastic diseases are peripheral vascular disorders caused by a reversible localized or diffuse vasoconstriction of arteries or smaller blood vessels. Vasospastic syndromes include Raynaud's disease, acrocyanosis, and livedo reticularis. In one embodiment, Compound 1 through Compound 21 or a pharmaceutically acceptable salt thereof or a compound selected from Formula I through Formula XXVII is administered for the treatment of Raynaud's disease.

In another embodiment, Compound 1 through Compound 21 or a pharmaceutically acceptable salt thereof or a compound selected from Formula I through Formula XXVII is used to treat peripheral artery disease or peripheral vascular disease, including limb ischemia. In one embodiment, the limb ischemia is acute. In one embodiment, the limb ischemia is chronic.

Excess vasoconstriction and endothelial dysfunction to various triggers in the brain can also cause migraines, especially migraines believed to be due to endothelial dysfunction. In one embodiment, a compound of Compound 1 through Compound 21 or a pharmaceutically acceptable salt thereof is administered for the treatment of migraines in a host in need thereof. In one embodiment, a compound of Formula I through Formula XXVII is administered for the treatment of migraines in a host in need thereof.

Skeletal & Smooth Muscle Diseases and Disorders

Potassium channels are found in skeletal & smooth muscles (Quasthoff et al. Neuroscience Letters 1990, 119: 191). Myopathies are diseases of the muscle wherein the muscle fibers do not function properly, which results in muscular weakness. In one embodiment, a compound of Compound 1 through Compound 21 or a pharmaceutically acceptable salt thereof or a composition thereof is administered for the treatment of myopathy in a host in need thereof. In one embodiment, a compound Formula I through Formula XXVII or a pharmaceutically acceptable salt or composition thereof is administered for the treatment of myopathy in a host in need thereof.

In one embodiment, the myopathy is acquired. Acquired myopathies can be further subclassified as inflammatory myopathies, toxic myopathies, and myopathies associated with systemic conditions. In one embodiment, the inflammatory myopathy is selected from polymyositis, dermatomyositis, and inclusion body myositis (IBM). Toxic myopathies are myopathies that are drug-induced and are a side effect observed with the use of cholesterol-lowering drugs, HIV therapy, antiviral therapy, rheumatologic agents, and antifungal agents (Valiyil et al. Curr Rheumatol Rep. 2010, 12, 213). Therefore in one embodiment, Compound 1 through Compound 21 or a pharmaceutically acceptable salt thereof or a compound selected from Formula I through Formula XXVII is administered for the treatment of a toxic myopathy induced by a medication. Non-limiting examples of medications that induce toxic myopathy include steroids, cholesterol-lowering medications (for example, statins, fibrates, niacin, and ezetimibe), propofol, amiodarone, colchicine, chloroquine, antivirals and protease inhibitors, omeprazole, and tryptophan.

In an alternative embodiment, Compound 1 through Compound 21 or a pharmaceutically acceptable salt thereof or a compound selected from Formula I through Formula XXVII is administered for the treatment of a myopathy associated with systemic conditions. Non-limiting examples of systemic diseases include Endocrine disorders, systemic inflammatory diseases, electrolyte imbalance, critical illness myopathy, and amyloid myopathy.

In one embodiment, the myopathy is inherited. Inherited myopathies can be further subclassified as muscular dystrophies, congenital myopathies, mitochondrial myopathies, and metabolic myopathies. In one embodiment, Compound 1 through Compound 21 or a pharmaceutically acceptable salt thereof or a compound selected from Formula I through Formula XXVII is administered for the treatment of muscular dystrophy, including dystrophinopathy (Duchenne muscular dystrophy), myotonic dystrophy 1 and 2, facioscapulohumeral muscular dystrophy, oculopharyngeal muscular dystrophy, and limb girdle muscular dystrophy. In one embodiment, Compound 1 through Compound 21 or a pharmaceutically acceptable salt thereof or a compound selected from Formula I through Formula XXVII is administered for the treatment of Congenital Myopathy, including nemaline myopathy or central core myopathy. In one embodiment, Compound 1 through Compound 21 or a pharmaceutically acceptable salt thereof or a compound selected from Formula I through Formula XXVII is administered for the treatment of a metabolic myopathy, including acid maltase or acid alpha-1,4-glucosidase deficiency (Pompe's disease), glycogen storage disorders 3-11, carnitine deficiency, fatty acid oxidation defects, and carnitine palmitoyl transferase deficiency. In one embodiment, a compound of Formula I-Formula X is administered for the treatment of a mitochondrial myopathy, including Kearns-Sayre syndrome (KSS), mitochondrial DNA depletion syndrome (MDS), mitochondrial encephalomyopathy, lactic acidosis, and stroke-like episodes (MELAS), maternally inherited deafness and diabetes (MIDD), mitochondrial neurogastrointestinal encephalomyopathy (MNGIE), myoclonus epilepsy with ragged red fibers (MERRF), neuropathy, ataxia, and retinitis pigmentosa (NARP), and Pearson syndrome.

Endocrine Systems Diseases and Disorders

One endocrine system disorder that is related to altered potassium channel activity is diabetes. Potassium channels, which are found in the pancreas, act as modulators for the release of insulin and therefore affect glucose metabolism. Channel openers, namely diazoxide, have been used for the treatment of hypoglycemia due to hyperinsulinism (Dunne M J, et al. N Engl J Med, 1997, 336:703).

Therefore, in one embodiment, a compound of Compound 1 through Compound 21 or a pharmaceutically acceptable salt thereof is administered for the treatment of diabetes in a host in need thereof. In one embodiment, a compound of Formula I through Formula XXVII is administered for the treatment of diabetes in a host in need thereof. In one embodiment, Compound 1 through Compound 21 or a pharmaceutically acceptable salt thereof or a compound selected from Formula I through Formula XXVII is provided in an effective amount for the treatment of hypoglycemia.

Pulmonary Diseases and Disorders

Excitability of bronchial smooth muscle is one cause of bronchial hyperreactivity, which is a hallmark of asthma. Potassium channel openers that are able to induce hyperpolarization of smooth muscles are useful for the treatment for bronchial asthma (Fozard, JR.; Manley, PW. Potassium channel openers: agents for the treatment of airways hyper-reactivity. New drugs for asthma, allergy and COPD. In: Hansel, TT.; Barnes, PJ., editors. Prog Respir Res. 2001. p. 77-80.p. 31). Nicorandil has been shown to have a bronchodilator effect in humans (Wajima Z, et al. Crit Care Med, 2003, 31, 485) and cromakalim is useful for the treatment of nocturnal asthma (Williams, A. J. et al. Lancet, 1990, 336, 334).

In one embodiment, Compound 1 through Compound 21 or a pharmaceutically acceptable salt thereof or a compound selected from Formula I through Formula XXVII is provided in an effective amount for the treatment of airway hyper-reactivity. In one embodiment, a compound of Compound 1 through Compound 21 or a pharmaceutically acceptable salt thereof is administered for the treatment of an obstructive airway disease in a host in need thereof. In one embodiment, a compound of Formula I through Formula XXVII or a pharmaceutically acceptable salt or composition thereof is administered for the treatment of an obstructive airway disease in a host in need thereof. In one embodiment, the obstructive airway disease is asthma or nocturnal asthma. In one embodiment, the obstructive airway disease is selected form chronic bronchitis, emphysema, cystic fibrosis, and bronchiolitis.

Urology Diseases, Erectile Dysfunction, and Premature Labor

Urinary incontinence is caused by muscle hyper-reactivity and involuntary contraction of the bladder and is incredibly common, especially in the elderly. The use of cromakalim in a preliminary clinical trial resulted in improved symptoms of urinary frequency (Nurse, D. E. et al. Br J Urol, 1991, 68, 27-31). In one embodiment, a compound of Compound 1 through Compound 21 or a pharmaceutically acceptable salt thereof or a composition thereof is administered for the treatment of urinary incontinence in a host in need thereof. In one embodiment, a compound of Formula I through Formula XXVII or a pharmaceutically acceptable salt or composition thereof is administered for the treatment of urinary incontinence in a host in need thereof.

Vasodilators have also shown to be useful in the treatment of erectile dysfunction to help relax blood vessel constriction to improve blood flow. Potassium channel openers that relax smooth muscle can help to produce erections. In one study, minoxidil applied as a lubricating gels was more effective than placebo or nitroglycerin in facilitating erections (Cavallini, G. J Urol 1991, 146, 50-53). Therefore, in one embodiment, a compound of Compound 1 through Compound 21 or a pharmaceutically acceptable salt thereof or a composition thereof is administered for the treatment of erectile dysfunction in a host in need thereof. In one embodiment, a compound of Formula I through Formula XXVII or a pharmaceutically acceptable salt or composition thereof is administered for the treatment of erectile dysfunction in a host in need thereof. In an alternative embodiment, a compound of Formula I through Formula XXVII is used in the treatment of female sexual arousal disorder in an effective amount in increase blood flow.

In one embodiment, a compound of Formula I through Formula XXVII or a pharmaceutically acceptable salt or composition thereof is used to relax the smooth muscles of the uterus as a treatment for premature labor.

Dermatology Diseases and Disorders

Potassium channel openers improve blood supply to hair follicles and help to promote hair growth. One example of a channel opener improving hair growth includes the use of minoxidil administered topically and or oral as a treatment for the loss of hair in men with androgenic alopecia and women with female-pattern hair loss (Lucky, A. W. et al. J Am Acad Dermatol, 2004, 50, 541 and Olsen, E. A. et al. J Am Acad Dermatol, 2002, 47, 377). Minoxidil also helped to decrease the period of baldness from maximal hair loss to first regrowth after chemotherapy. Therefore, in one embodiment, an effective amount of Compound 1 through Compound 21 or a pharmaceutically acceptable salt thereof is administered to promote hair loss in a host in need thereof.

In one embodiment, an effective amount of a compound of Formula I through Formula XXVII or a pharmaceutically acceptable salt or composition thereof is administered to promote hair loss in a host in need thereof. Non-limiting examples of types of hair loss include male pattern hair loss, female pattern hair loss, alopecia, and hypotrichosis.

Neurological Diseases and Disorders

ATP-sensitive potassium channels are expressed in the substantia nigra, the neocortex, the hippocampus, the hypothalamus, and the microglial of the brain (Rodriguez, M. J. et al. Oxidative Medicine and Cellular Longevity, 2013, 2013, 194546). By hyperpolarizing the membrane, channel openers decrease neuronal excitability and therefore are potential therapeutic agents for a number of neurological disorders, including epilepsy, neuropathic pain, ischemia and stroke, and neurodegeneration. Cromakalim has also been shown to induce neuroprotective effects when injected prior to epileptic attacks (Blondeau, et al. Neurosci, 2000, 100, 465) and to exhibit protective effects against beta-amyloid toxicity, a contributor to cerebrovascular amyloidosis, a feature of Alzheimer's disease (Chi, X. et al. Neurosci Lett, 2000, 290, 9.

Therefore, in one embodiment, a compound of Compound 1 through Compound 21 or a pharmaceutically acceptable salt thereof is administered for the treatment of epilepsy in a host in need thereof. In one embodiment, a compound of Formula I through Formula XXVII is administered for the treatment of epilepsy in a host in need thereof. In one embodiment, the epilepsy is generalized epilepsy. In one embodiment, the epilepsy is focal epilepsy.

Neurodegeneration is the loss and death of neurons. This cellular process includes a neuroinflammatory reaction that involves the activation of glial cells, including microglia and astrocytes. ATP-sensitive potassium channels are found in microglial and therefore microglial represent a drug target for neurodegeneration and disorders that occur as a result of neurodegeneration, including normal tension glaucoma, primary open angle glaucoma, Alzheimer's disease, Parkinson's disease, Huntington's disease, motor neuron disease, spinocerebellar ataxia, and spinal muscular atrophy. In one embodiment, Compound 1 through Compound 21 or a pharmaceutically acceptable salt thereof or a compound selected from Formula I through Formula XXVII is administered for the treatment of neurodegeneration in a host in need thereof. In one embodiment, the neurodegenerative disease is selected from Alzheimer's disease, glaucoma, Parkinson's disease, Huntington's disease, motor neuron disease, spinocerebellar ataxia, and spinal muscular atrophy.

Tumor Hypoperfusion and Hypoxia

In one aspect an effective amount of a compound of Formula I through Formula XXVII or a pharmaceutically acceptable salt thereof is administered to a patient to treat tumor hypoperfusion or tumor hypoxia. Tumor hypoperfusion refers to reduced blood flow in the tumor. Tumor hypoxia refers to a reduced level of oxygen in the tumor cells. There can be overlap between the two.

When a tumor is in a state of hypoperfusion, perhaps because it is growing quickly, it does not have sufficient blood flow to allow tumor therapeutics to have access to the tumor cells. This can create resistance to chemotherapeutic treatment. In one embodiment, a compound of Formula I through Formula XXVII or a pharmaceutically acceptable salt thereof is administered to a patient with hypoperfusion of a tumor so that the tumor is more easily treated with anti-tumor medication such as chemotherapy.

In another embodiment, the compound of Formula I through Formula XXVII is administered to a patient with hypoperfusion of non-tumor cells, for example as a result of trauma.

When a tumor is hypoxic, it is in a low oxygen state due to the lack of oxygen in the cell. Tumors that are hypoxic can be more likely to exhibit metastatic behavior. Therefore, in one aspect, a compound or a pharmaceutically acceptable salt thereof of Formula I through Formula XXVII is administered in an effective amount to a patient to treat tumor hypoxia, optionally in combination or alternation with chemotherapy or other anti-tumor treatment.

In another embodiment, an effective amount of the compound of the present invention or its pharmaceutically acceptable salt is administered to treat hypoxia or hypoperfusion optionally in combination with a VEFG therapy.

In an alternative embodiment, an effective amount of the compound of Formula I through Formula XXVII or its pharmaceutically acceptable salt is used in combination or alternation with oxygen therapy (for example, an oxygen mask or a small tube clipped under the nose to provide supplemental oxygen) or an asthma medication (for example, fluticasone, budesonide, mometasone, beclomethasone, ciclesonide, montelukast, zafirlukast, zileuton, salmeterol, formoterol, vilanterol, albuterol, levalbuterol, prednisone, methylprednisone, omalizumab, mepolizumab, benralizumab, or resilzumab).

Lymphatic Diseases

The lymphatic system acts to rid the bodies of toxins and waste and its primary role is to transport lymph, a fluid containing white blood cells, throughout the body to fight infection. The system is primarily composed of lymphatic vessels that are connected to lymph nodes, which filter lymph. $K_{ATP}$ channels are expressed by lymphatic muscle cells and studies have shown that certain $K_{ATP}$ channel openers dilate lymphatic vessels.

For example, as discussed in a recent study by Garner et al. ("KATP Channel Openers Inhibit Lymphatic Contractions and Lymph Flow as a Possible Mechanism of Peripheral Edema", *Journal of Pharmacology and Experimental Therapeutics*, Oct. 25, 2020) rhythmic contractions of isolated rat mesenteric lymph vessels are progressively impaired when exposed to $K_{ATP}$ channel openers, such as cromakalim, minoxidil sulfate, and diazoxide. Increasing concentrations of cromakalim ultimately abolished the contractions of the vessels and impaired flow through the vessels by attenuating the frequency and amplitude of the contractions. Similar effects were observed with minoxidil sulfate and diazoxide when administered at clinically relevant concentrations.

The most common diseases of the lymphatic system include lymphadenopathy, enlargement of the lymph nodes, and lymphedema, swelling of the lymph nodes due to blockage. Therefore, in one embodiment, an effective amount of a compound of Formula I through Formula XXVII or its pharmaceutically acceptable salt is administered for the treatment of lymphadenopathy or lymphedema. In one embodiment, an effective amount of Compound 1 through Compound 21 or its pharmaceutically acceptable salt is administered for the treatment of lymphadenopathy or lymphedema.

Inflammation of the lymph vessels is known as lymphangitis and symptoms generally include swelling, redness, and/or pain in the infected area. In one embodiment, an effective amount of a compound of Formula I through Formula XXVII or its pharmaceutically acceptable salt is administered for the treatment of lymphangitis. In one embodiment, an effective amount of Compound 1 through Compound 21 or its pharmaceutically acceptable salt is administered for the treatment of lymphangitis.

The lymph nodes can also become infected with a virus, bacteria, and/or fungi and this is referred to as lymphadenitis. Symptoms of lymphadenitis also include redness or swelling around the lymph nodes. In one embodiment, an effective amount of a compound of Formula I-Formula III or its pharmaceutically acceptable salt is administered for the treatment of lymphangitis, and in one embodiment, the compound of Formula I through Formula XXVII is administered in combination with an antibiotic or antifungal medication. In one embodiment, Compound 1 through Compound 21 is administered in combination with an antibiotic or antifungal medication.

A common cancer of the lymph system is Hodgkin's lymphoma, in which cancer originates from the white blood cells lymphocytes. The cancer can begin in any part of the body and symptoms include non-painful enlarged lymph nodes in the neck, under the arm, or in the groin. There are two major types of Hodgkin lymphoma: classical Hodgkin lymphoma and nodular lymphocyte-predominant Hodgkin lymphoma. Treatment for Hodgkin's lymphoma includes chemotherapy and/or radiation, and the most common treatment is the monoclonal antibody rituximab (Rituxan). In one embodiment, an effective amount of a compound of Formula I through Formula XXVII or its pharmaceutically acceptable salt is administered for the treatment of Hodgkin's lymphoma, in combination with chemotherapy and/or radiation. In one embodiment, an effective amount of Compound 1 through Compound 21 or its pharmaceutically acceptable salt is administered for the treatment of Hodgkin's lymphoma, in combination with chemotherapy and/or radiation. In one embodiment, the chemotherapy is rituximab.

Non-Hodgkin's lymphoma is caused when the body produces too many abnormal white blood cells called lymphocytes, which leads to tumors. A common subtype of Non-Hodgkin's lymphoma is B-Cell Non-Hodgkin's lymphoma. Symptoms include swollen lymph nodes, fever, and/or chest pain. Non-Hodgkin's lymphoma is treated with chemotherapy and/or radiation. A common treatment is a regimen known as R—CHOP that consists of cyclophosphamide, doxorubicin, vincristine, and prednisone, plus the monoclonal antibody rituximab (Rituxan). In one embodiment, an effective amount of a compound of Formula I through Formula XXVII or its pharmaceutically acceptable salt is administered for the treatment of Non-Hodgkin's lymphoma, in combination with chemotherapy and/or radiation. In one embodiment, an effective amount of Compound 1 through Compound 21 or its pharmaceutically acceptable salt is administered for the treatment of Non-Hodgkin's lymphoma, in combination with chemotherapy and/or radiation. In one embodiment, the chemotherapy consists of cyclophosphamide, doxorubicin, vincristine, prednisone, and rituximab.

Castleman's disease is a group of lymphoproliferative disorders characterized by lymph node enlargement and there are at least three distinct subtypes: unicentric Castleman disease (UCD), human herpesvirus 8 associated multicentric Castleman disease (HHV-8-associated MCD), and idiopathic multicentric Castleman disease (iMCD). In UCD, enlarged lymph nodes are present in a single region and in iMCD, enlarged lymph nodes are present in multiple regions. HHV-8-Associated MCD is similar to iMCD in that enlarged lymph nodes are present in multiple regions, but the patient is also infected with human herpesvirus 8.

In one embodiment, an effective amount of a compound of Formula I through Formula XXVII or its pharmaceutically acceptable salt is administered for the treatment of Castleman's disease, including unicentric Castleman disease (UCD), human herpesvirus 8 associated multicentric Castleman disease (HHV-8-associated MCD), and idiopathic multicentric Castleman disease (iMCD). In one embodiment, an effective amount of Compound 1 through Compound 21 or its pharmaceutically acceptable salt is administered for the treatment of Castleman's disease, including unicentric Castleman disease (UCD), human herpesvirus 8 associated multicentric Castleman disease (HHV-8-associated MCD), and idiopathic multicentric Castleman disease (iMCD).

Lymphangiomatosis is a disease where cysts and/or lesions are formed from lymphatic vessels. The masses are not present in one single localized mass, but are widespread. It is a multi-system disorder where over time abnormally proliferating lymphatic channels expand and infiltrate surrounding tissues, bones, and organs. It is a rare disease that is most widespread in children and teenagers. There is no standard treatment and often treatments are only aimed at reducing symptoms. In one embodiment, an effective amount of a compound of Formula I through Formula XXVII or its pharmaceutically acceptable salt is administered for the treatment or the reduction of symptoms associated with lymphangiomatosis. In one embodiment, an effective amount of Compound 1 through Compound 21 or its pharmaceutically acceptable salt is administered for the treatment or the reduction of symptoms associated with lymphangiomatosis.

V. Method of Treatment for Ocular Diseases and Disorders

Reduction of Episcleral Venous Pressure (EVP) and Improvement of Distal Outflow Pathway In a healthy eye, aqueous humor is produced by the ciliary body and then flows through the pupil and fills the anterior chamber of the eye. The aqueous humor then drains from the anterior chamber through the trabecular meshwork (TM) into the Schlemm's canal. From Schlemm's canal, collector channels carry the aqueous humor to the episcleral veins and ultimately drain into the distal venous system. The episcleral vasculature is comprised of arteriovenous anastomoses and a muscle-rich venous network that is innervated by vasodilatory and vasoconstrictive nerve fibers. When aqueous humor comes into contact within the episcleral veins, the result is a retrograde pressure that can slow aqueous drainage and this is referred to as episcleral venous pressure (EVP).

This system for aqueous humor production and drainage is simply driven by a pressure gradient across tissue. The pressure difference inside (IOP) and outside (episcleral venous pressure ((EVP)) moves aqueous humor through the pathway and IOP is directly related to EVP as expressed by Goldmann's modified model of aqueous humor dynamics:

$$IOP=((\text{Aqueous inflow}-\text{Uveoscleral outflow})/\text{conventional outflow facility})+EVP.$$

Normal EVP ranges from 8 to 12 mm Hg and for every 1 mm Hg of elevation in the EVP, the mean IOP is estimated to rise 1 mm Hg. EVP can be influenced by a variety of factors, including body position, vascular pathologies, volume overload, Valsalva, and systemic diseases. The reasons for EVP can be grouped into three categories: 1) venous congestion (thyroid-associated ophthalmopathy, superior vena cava syndrome, retrobulbar tumors, cavernous sinus thrombosis, and orbital amyloidsis); 2) arteriovenous fistulas (carotid-cavernous sinus fistula, dural arteriovenous shunts, orbital varices, and Sturge-Weber syndrome); and 3) idiopathic.

Ocular disorders are caused and/or worsened by episcleral venous pressure (EVP) include normal tension glaucoma, primary open angle glaucoma, juvenile and congenital glaucoma, steroid-induced open angle glaucoma, steroid-induced elevated intraocular pressure, ocular hypertension, neovascular glaucoma, Graves' ophthalmopathy (or thyroid eye disease (TED)), thyroid-associated orbitopathy (TAO), Graves' orbitopathy (GO), retrobulbar tumors, cavernous sinus thrombosis, orbital vein thrombosis, episcleral/orbital vein vasculitis, superior vena cava obstruction, superior vena cava thrombosis, carotid cavernous (CC) sinus fistula, dural cavernous sinus shunts, orbital varices, Sturge-Weber Syndrome, and idiopathic elevated episcleral venous pressure In one aspect, Compound 1 through Compound 21 or a pharmaceutically acceptable salt thereof or a compound selected from Formula I through Formula XXVII or composition thereof is provided for the treatment of elevated episcleral venous pressure (EVP) in a subject with enhanced EVP.

In one embodiment, Compound 1 through Compound 21 or a pharmaceutically acceptable salt thereof or a compound selected from Formula I through Formula XXVII or composition thereof is provided for the treatment of an ocular disorder caused by elevated episcleral venous pressure (EVP). In one embodiment, the elevated episcleral venous pressure is idiopathic. In one embodiment, the elevated episcleral venous pressure is caused by venous congestion. In one embodiment, the elevated episcleral venous pressure is caused by arteriovenous fistulas and/or CC sinus fistula.

In one embodiment, Compound 1 through Compound 21 or a pharmaceutically acceptable salt or composition thereof is administered for the treatment of an ocular disorder caused by elevated episcleral venous pressure in a host in need thereof wherein the disorder is selected from normal tension glaucoma, primary open angle glaucoma, juvenile and congenital glaucoma, neovascular glaucoma, and steroid-induced open angle glaucoma.

In one embodiment, Compound 1 through Compound 21 or a pharmaceutically acceptable salt or composition thereof is administered for the treatment of an ocular disorder caused by elevated episcleral venous pressure in a host in need thereof wherein the disorder is selected from steroid-induced elevated intraocular pressure, normal tension glaucoma, ocular hypertension, Sturge-Weber Syndrome, and idiopathic elevated episcleral venous pressure.

In one aspect, Compound 1 through Compound 21 or a pharmaceutically acceptable salt thereof or a compound selected from Formula I through Formula XXVII or composition thereof is provided for the treatment of age-related macular degeneration (AMD), including wet or dry AMD.

In one embodiment, Compound 1 through Compound 21 or a pharmaceutically acceptable salt or composition thereof is administered for the treatment of an ocular disorder caused by elevated episcleral venous pressure in a host in need thereof wherein the disorder is selected from Graves' ophthalmopathy, thyroid eye disease (TED), thyroid-associated orbitopathy (TAO), Graves' orbitopathy (GO), retrobulbar tumors, cavernous sinus thrombosis, and orbital vein thrombosis.

In one embodiment, Compound 1 through Compound 21 or a pharmaceutically acceptable salt or composition thereof is administered for the treatment of an ocular disorder caused by elevated episcleral venous pressure in a host in need thereof wherein the disorder is selected from episcleral/orbital vein vasculitis, superior vena cava obstruction, superior vena cava thrombosis, carotid cavernous sinus fistula, dural cavernous sinus shunts, and orbital varices.

In one embodiment, a compound of Formula I through Formula XXVII or a pharmaceutically acceptable salt or composition thereof is administered for the treatment of an ocular disorder caused by elevated episcleral venous pressure in a host in need thereof wherein the disorder is selected from normal tension glaucoma, primary open angle glaucoma, juvenile and congenital glaucoma, neovascular glaucoma, pseudoexfoliation glaucoma and steroid-induced open angle glaucoma. In one embodiment, the glaucoma is selected from primary open angle glaucoma (POAG), primary angle closure glaucoma, normal tension glaucoma (NTG), pediatric glaucoma, pseudoexfoliative glaucoma, pigmentary glaucoma, traumatic glaucoma, neovascular glaucoma, irido corneal endothelial glaucoma. Primary open angle glaucoma is also known as chronic open angle glaucoma, chronic simple glaucoma, glaucoma simplex.

In one embodiment, a compound of Formula I through Formula XXVII or a pharmaceutically acceptable salt or composition thereof is administered for the treatment of an ocular disorder caused by elevated episcleral venous pressure in a host in need thereof wherein the disorder is selected from steroid-induced elevated intraocular pressure, ocular hypertension, Sturge-Weber Syndrome, pseudoexfoliation glaucoma, and idiopathic elevated episcleral venous pressure.

In one embodiment, a compound of Formula I through Formula XXVII or a pharmaceutically acceptable salt or composition thereof is administered for the treatment of an ocular disorder caused by elevated episcleral venous pressure in a host in need thereof wherein the disorder is selected from Graves' ophthalmopathy, thyroid eye disease (TED), thyroid-associated orbitopathy (TAO), Graves' orbitopathy (GO), retrobulbar tumors, cavernous sinus thrombosis, and orbital vein thrombosis.

In one embodiment, a compound of Formula I through Formula XXVII or a pharmaceutically acceptable salt or composition thereof is administered for the treatment of an ocular disorder caused by elevated episcleral venous pressure in a host in need thereof wherein the disorder is selected from episcleral/orbital vein vasculitis, superior vena cava obstruction, superior vena cava thrombosis, carotid cavernous sinus fistula, dural cavernous sinus shunts, and orbital varices.

In one aspect, a method is provided for lowering intraocular pressure comprising administering Compound 1 through Compound 21 or a pharmaceutically acceptable salt or composition thereof in an amount effective to decrease episcleral venous pressure (EVP) in a host in need thereof.

In one aspect, a method is provided for lowering intraocular pressure comprising administering a compound of Formula I through Formula XXVII or a pharmaceutically acceptable salt or composition thereof in an amount effective to decrease episcleral venous pressure (EVP) in a host in need thereof.

In one aspect, a method is provided for lowering intraocular pressure comprising administering Compound 1 through Compound 21 or a pharmaceutically acceptable salt or composition thereof in an amount effective to increase distal outflow facility in a host in need thereof.

In one aspect, a method is provided for lowering intraocular pressure comprising administering a compound of Formula I through Formula XXVII or a pharmaceutically acceptable salt or composition thereof in an amount effective to increase distal outflow facility in a host in need thereof.

In another aspect, a method is provided for the reduction of the synthesis and/or deposition of extracellular matrix (ECM) proteins in the trabecular meshwork (TM). The TM is specialized tissue located at the iridocorneal angle of the eye that is responsible for regulating aqueous humor outflow resistance. Functional $K_{ATP}$ channels are present in the TM and Schlemm's canal and it has been shown that when the channels are activated by channel openers, the channels increase outflow facility (Chowdhury et al. IOVS, 2011, 52, 6435).

Therefore, in one embodiment, a method is provided for lowering intraocular pressure comprising administering Compound 1 through Compound 21 or a pharmaceutically acceptable salt or composition thereof in an amount effect to reduce the synthesis and/or deposition of extracellular matrix (ECM) proteins in the trabecular meshwork (TM). In one embodiment, a method is provided for lowering intraocular pressure comprising administering a compound of Formula I through Formula XXVII or a pharmaceutically acceptable salt or composition thereof in an amount effect to reduce the synthesis and/or deposition of extracellular matrix (ECM) proteins in the trabecular meshwork (TM).

Prevention or Treatment of Ocular Damage

Retinal ischemia is a condition where blood flow, and therefore oxygen and necessary nutrients, has been blocked off from the retina. When the retina does not have the amount of oxygen that it requires, cells begin to die. ATP-sensitive potassium channels exist in the retina and it has been shown that $K_{ATP}$ channel openers have a neuroprotective effect. In fact, levcromakalim has been shown to mimic the effect of ischemic preconditioning (Ettaiche, M. et al. Brain Research, 2001, 890, 118).

Therefore, in one embodiment, Compound 1 through Compound 21 or a pharmaceutically acceptable salt or composition thereof is administered for the treatment or prevention of ocular damage due to ischemia in a host in need thereof. In one embodiment, a compound of Formula I through Formula XXVII or a pharmaceutically acceptable salt or composition thereof is administered for the treatment or prevention of ocular damage due to ischemia in a host in need thereof.

Non-limiting examples of ocular diseases that are a result of ocular damage due to ischemic conditions are hypertensive retinopathy, central retinal vein occlusion (CRVO), branch retinal vein occlusion (BRVO), retinal artery occlusion that may be caused by an embolus, hypoperfusion retinopathy, diabetic retinopathy, retinopathy of prematurity, posterior ischemic optic neuropathy (PION), anterior ischemic optic neuropathy (AION), non-arteritic anterior ischemic optic neuropathy (NAION), and acute and chronic angle closure glaucoma.

In some embodiments, in may be useful to administer Compound 1 through Compound 21, or a compound of Formula I through Formula XXVII to a host in need thereof in combination with, for example, an effective amount of a compound selected from:
  (1) a prostaglandin (latanoprost (Xalatan), bimatoprost (Lumigan), travoprost (Travatan or Travatan Z), Tafluprost (Zioptan), or latanoprostene bunod (Vyzulta));
  (2) an α-2 adrenergic agonist (brimonidine or apraclonidne);
  (3) a β-blocker (timolol, betaxolol, levobunolol, metipranolol, or carteolol);
  (4) a rho kinase inhibitor or a ROCK inhibitor (ripasudil or netarsudil (Rhopressa));
  (5) a second potassium channel opener (minoxidil, diazoxide, nicorandil, or pinacidil); or
  (6) a carbonic anhydrase inhibitor (dorzolamide, brinzolamide, acetazolamide, dichlorphenamide, pilocarpine, or methazolamide).
  (7) a PI3K inhibitor, such as Wortmannin, demethoxyviridin, perifosine, idelalisib, Pictilisib, Palomid 529, ZSTK474, PWT33597, CUDC-907, and AEZS-136, duvelisib, GS-9820, BKM120, GDC-0032 (Taselisib) (2-[4-[2-(2-Isopropyl-5-methyl-1,2,4-triazol-3-yl)-5,6-dihydroimidazo[1,2-d][1,4]benzoxazepin-9-yl]pyrazol-1-yl]-2-methylpropanamide), MLN-1117 ((2R)-1-Phenoxy-2-butanyl hydrogen(S)-methylphosphonate; or Methyl(oxo) {[(2R)-1-phenoxy-2-butanyl]oxy}phosphonium)), BYL-719 ((2S)—N1-[4-Methyl-5-[2-(2,2,2-trifluoro-1,1-dimethylethyl)-4-pyridinyl]-2-thiazolyl]-1,2-pyrrolidinedicarboxamide), GSK2126458 (2,4-Difluoro-N-{2-(methyloxy)-5-[4-(4-pyridazinyl)-6-quinolinyl]-3-pyridinyl}benzenesulfonamide) (omipalisib), TGX-221 ((+)-7-Methyl-2-(morpholin-4-yl)-9-(1-phenylaminoethyl)-pyrido[1,2-a]-pyrimidin-4-one), GSK2636771 (2-Methyl-1-(2-methyl-3-(trifluoromethyl)benzyl)-6-morpholino-1H-benzo[d]imidazole-4-carboxylic acid dihydrochloride), KIN-193 ((R)-2-((1-(7-methyl-2-morpholino-4-oxo-4H-pyrido[1,2-a]pyrimidin-9-yl)ethyl)amino)benzoic acid), TGR-1202/RP5264, GS-9820 ((S)-1-(4-((2-(2-aminopyrimidin-5-yl)-7-methyl-4-mohydroxypropan-1-one), GS-1101 (5-fluoro-3-phenyl-2-([S)]-1-[9H-purin-6-ylamino]-propyl)-3H-quinazolin-4-one), AMG-319, GSK-2269557, SAR245409 (N-(4-(N-(3-((3,5-dimethoxyphenyl)amino) quinoxalin-2-yl) sulfamoyl)phenyl)-3-methoxy-4 methylbenzamide), BAY80-6946 (2-amino-N-(7-methoxy-8-(3-morpholinopropoxy)-2,3-dihydroimidazo[1,2-c]quinaz), AS 252424 (5-[1-[5-(4-Fluoro-2-hydroxy-phenyl)-furan-2-yl]-meth-(Z)-ylidene]-thiazolidine-2,4-dione), CZ 24832 (5-(2-amino-8-fluoro-[1,2,4]triazolo[1,5-a]pyridin-6-yl)-N-tert-butylpyridine-3-sulfonamide), Buparlisib (5-[2,6-Di(4-morpholinyl)-4-pyrimidinyl]-4-(trifluoromethyl)-2-pyridinamine), GDC-0941 (2-(1H-Indazol-4-yl)-6-[[4-(methylsulfonyl)-1-piperazinyl]methyl]-4-(4-morpholinyl) thieno[3,2-d]pyrimidine), GDC-0980 ((S)-1-(4-((2-(2-aminopyrimidin-5-yl)-7-methyl-4-morpholinothieno[3,2-d]pyrimidin-6 yl)methyl) piperazin-1-yl)-2-hydroxypropan-1-one (also known as RG7422)), SF1126 ((8S,14S,17S)-14-(carboxymethyl)-8-(3-guanidinopropyl)-17-(hydroxymethyl)-3,6,9,12,15-pentaoxo-1-(4-(4-oxo-8-phenyl-4H-chromen-2-yl) morpholino-4-ium)-2-oxa-7,10,13,16-tetraazaoctadecan-18-oate), PF-05212384 (N-[4-[[4-(Dimethylamino)-1-piperidinyl]carbonyl]phenyl]-N'-[4-(4,6-di-4-morpholinyl-1,3,5-triazin-2-yl)phenyl]urea) (gedatolisib), LY3023414, BEZ235 (2-Methyl-2-{4-[3-methyl-2-oxo-8-(quinolin-3-yl)-2,3-dihydro-1H-imidazo[4,5-c]quinolin-1-yl]phenyl}propanenitrile) (dactolisib), XL-765 (N-(3-(N-(3-(3,5-dimethoxyphenylamino) quinoxalin-2-yl) sulfamoyl)phenyl)-3-methoxy-4-methylbenzamide), and GSK1059615 (5-[[4-(4-Pyridinyl)-6-quinolinyl]methylene]-2,4-thiazolidenedione), PX886 ([(3aR,6F,9S,9aR,10R,11aS)-6-[[bis(prop-2-enyl)amino]methylidene]-5-hydroxy-9-(methoxymethyl)-9a,11a-dimethyl-1,4,7-trioxo-2,3,3a,9,10,11-hexahydroindeno[4,5h]isochromen-10-yl] acetate (also known as sonolisib)), LY294002, AZD8186, PF-4989216, pilaralisib, GNE- 317, PI-3065, PI-103, NU7441 (KU-57788), HS 173, VS-5584 (SB2343), CZC24832, TG100-115, A66, YM201636, CAY10505, PIK-75, PIK-93, AS-605240, BGT226 (NVP-BGT226), AZD6482, voxtalisib, alpelisib, IC-87114, TGI100713, CH5132799, PKI-402, copanlisib (BAY 80-6946), XL 147, PIK-90, PIK-293, PIK-294, 3-MA (3-methyladenine), AS-252424, AS-604850, apitolisib (GDC-0980; RG7422);

(8) a BTK inhibitor, such as: ibrutinib (also known as PCI-32765) (Imbruvica™) (1-[(3R)-3-[4-amino-3-(4-phenoxy-phenyl) pyrazolo[3,4-d]pyrimidin-1-yl]piperidin-1-yl]prop-2-en-1-one), dianilinopyrimidine-based inhibitors such as AVL-101 and AVL-291/292 (N-(3-((5-fluoro-2-((4-(2-methoxyethoxy)phenyl) amino)pyrimidin-4-yl)amino)phenyl) acrylamide) (Avila Therapeutics) (US Patent publication No 2011/0117073, incorporated herein in its entirety), Dasatinib ([N-(2-chloro-6-methylphenyl)-2-(6-(4-(2-hydroxyethyl) piperazin-1-yl)-2-methylpyrimidin-4-ylamino) thiazole-5-carboxamide], LFM-A13 (alpha-cyano-beta-hydroxy-beta-methyl-N-(2,5-ibromophenyl) propenamide), GDC-0834 ([R—N-(3-(6-(4-(1,4-dimethyl-3-oxopiperazin-2-yl)phenylamino)-4-methyl-5-oxo-4,5-dihydropyrazin-2-yl)-2-methylphenyl)-4,5,6,7-tetrahydrobenzo[b]thiophene-2-carboxamide], CGI-560 4-(tert-butyl)-N-(3-(8-(phenylamino) imidazo[1,2-a]pyrazin-6-yl)phenyl)benzamide, CGI-1746 (4-(tert-butyl)-N-(2-methyl-3-(4-methyl-6-((4-(morpholine-4-carbonyl)phenyl)amino)-5-oxo-4,5-dihydropyrazin-2-yl)phenyl)benzamide), CNX-774 (4-(4-((4-((3-acrylamidophenyl)amino)-5-fluoropyrimidin-2-yl) amino) phenoxy)-N-methylpicolinamide), CTA056 (7-benzyl-1-(3-(piperidin-1-yl) propyl)-2-(4-(pyridin-4-yl)phenyl)-1H-imidazo[4,5-g]quinoxalin-6 (5H)-one), GDC-0834 ((R)—N-(3-(6-((4-(1,4-dimethyl-3-oxopiperazin-2-yl)phenyl)amino)-4-methyl-5-oxo-4,5-dihydropyrazin-2-yl)-2-methylphenyl)-4,5,6,7-tetrahydrobenzo[b]thiophene-2-carboxamide), GDC-0837 ((R)—N-(3-(6-((4-(1,4-dimethyl-3-oxopiperazin-2-yl)phenyl)amino)-4-methyl-5-oxo-4,5-dihydropyrazin-2-yl)-2-methylphenyl)-4,5,6,7-tetrahydrobenzo[b]thiophene-2-carboxamide), HM-71224, ACP-196, ONO-4059 (Ono Pharmaceuticals), PRT062607 (4-((3-(2H-1,2,3-triazol-2-yl)phenyl)amino)-2-(((1R,2S)-2-aminocyclohexyl)amino)pyrimidine-5-carboxamide hydrochloride), QL-47 (1-(1-acryloylindolin-6-yl)-9-(1-methyl-1H-pyrazol-4-yl)benzo[h][1,6]naphthyridin-2 (1H)-one), and RN486 (6-cyclopropyl-8-fluoro-2-(2-hydroxymethyl-3-{1-methyl-5-[5-(4-methyl-piperazin-1-yl)-pyridin-2-ylamino]-6-oxo-1,6-dihydro-pyridin-3-yl}-phenyl)-2H-isoquinolin-1-one); or a (9) a Syk inhibitor, such as Cerdulatinib (4-(cyclopropylamino)-2-((4-(4-(ethylsulfonyl) piperazin-1-yl)phenyl)amino)pyrimidine-5-carboxamide), entospletinib (6-(1H-indazol-6-yl)-N-(4-morpholinophenyl) imidazo [1,2-a]pyrazin-8-amine), fostamatinib ([6-({5-Fluoro-2-[(3,4,5-trimethoxyphenyl)amino]-4-pyrimidinyl}amino)-2,2-dimethyl-3-oxo-2,3-dihydro-4H-pyrido[3,2-b][1,4]oxazin-4-yl]methyl dihydrogen phosphate), fostamatinib disodium salt (sodium (6-((5-fluoro-2-((3,4,5-trimethoxyphenyl)amino)pyrimidin-4-yl)amino)-2,2-dimethyl-3-oxo-2H-pyrido[3,2-b][1,4] oxazin-4 (3H)-yl)methyl phosphate), BAY 61-3606 (2-(7-(3,4-Dimethoxyphenyl)-imidazo[1,2-c]pyrimidin-5-ylamino)-nicotinamide HCl), RO9021 (6-[(1R,2S)-2-Amino-cyclohexylamino]-4-(5,6-dimethyl-pyridin-2-ylamino)-pyridazine-3-carboxylic acid amide), imatinib (Gleevac; 4-[(4-methylpiperazin-1-yl) methyl]-N-(4-methyl-3-{[4-(pyridin-3-yl)pyrimidin-2-yl]amino}phenyl)benzamide), staurosporine, GSK143 (2-(((3R,4R)-3-aminotetrahydro-2H-pyran-4-yl) amino)-4-(p-tolylamino)pyrimidine-5-carboxamide), PP2 (1-(tert-butyl)-3-(4-chlorophenyl)-1H-pyrazolo[3,4-d]pyrimidin-4-amine), PRT-060318 (2-(((1R,2S)-2-aminocyclohexyl)amino)-4-(m-tolylamino)pyrimidine-5-carboxamide), PRT-062607 (4-((3-(2H-1,2,3-triazol-2-yl)phenyl)amino)-2-(((1R,2S)-2-aminocyclohexyl)amino)pyrimidine-5-carboxamide hydrochloride), R112 (3,3'-((5-fluoropyrimidine-2,4-diyl)bis(azanediyl)) diphenol), R348 (3-Ethyl-4-methylpyridine), R406 (6-((5-fluoro-2-((3,4,5-trimethoxyphenyl)amino)pyrimidin-4-yl)amino)-2,2-dimethyl-2H-pyrido[3,2-b][1,4]oxazin-3 (4H)-one), piceatannol (3-Hydroxyresveratol), YM193306, 7-azaindole, piceatannol, ER-27319, PRT060318, luteolin, apigenin, quercetin, fisetin, myricetin, morin.

Long Term Therapy without Significant Tachyphylaxis or Tolerance

In one embodiment, the invention includes long term medical therapy, including ocular therapy (i.e., for at least 6 weeks, 7 weeks, or at least 2, 3, 4, 5, or 6 months or indefinitely for the duration of the therapy) using a compound or a pharmaceutically acceptable salt thereof of Formula I through Formula XXVII, in a manner that does not create significant tachyphylaxis (i.e., loss of activity over time) or tolerance, including but not limited to normal tension glaucoma. Tachyphylaxis is the decrease in response to a drug that can be acute or sudden. It can occur after an initial dose or after a series of doses. Tolerance is the requirement to increase the dose of a drug to produce a given response.

The present invention provides a method for the use of a compound of Formula I through Formula XXVII or its pharmaceutically acceptable salt of the present invention for long term therapy in a manner that does not induce significant tachyphylaxis or alternatively, tolerance. The loss of activity over time has been noted with a number of drugs, including for ocular therapy. For example, tachyphylaxis is a common effect of over the counter ocular allergy medications and is also observed using several drugs for other ophthalmic conditions, including glaucoma. Tachyphylaxis has a number of causes, including the increased or decreased expression of receptors or enzymes. This phenomena has been noted in particular with beta adrenergic antagonists and with histamine.

The dose can be once a day or several times a day in the best judgement of the physician, and as further described herein. In one aspect, it is delivered as a topical drop for glaucoma, including normal tension glaucoma or for any form of high-pressure glaucoma, including as otherwise listed herein by example. It is advantageous to the patient to be able to take a stable dose of the drug over a lengthy period without having to change medications or dosage strength. While each patient is unique, and patients may exhibit different results based on their genetics or disease, in general, the long-term therapy using an effective amount of the compound of Formula I through Formula XXVII or its pharmaceutically acceptable salt in a suitable delivery system for the disorder to be treated is achievable according to this invention.

Once Daily Dosing

In another embodiment, once-daily (QD) human dosing to treat high pressure glaucoma, including but not limited to primary open angle glaucoma (POAG), primary angle closure glaucoma, pediatric glaucoma, pseudo-exfoliative glaucoma, pigmentary glaucoma, traumatic glaucoma, neovascular glaucoma, irido corneal endothelial glaucoma (primary open angle glaucoma is also known as chronic open angle glaucoma, chronic simple glaucoma and glaucoma simplex) is provided. In an alternative embodiment, once-daily (QD) human dosing is used to treat acute high pressure glaucoma resulting from cataracts. An aspect of the present invention is the ability to treat glaucoma with once-daily dosing in humans, without (or alternatively with) a controlled release formulation (for example, a gel or microparticle or nanoparticle). In a typical embodiment, it is administered without a controlled release formulation, including for example, in a simple formulation such as phosphate buffered saline or citrate buffer, optionally with an ocular excipient, including but not limited to mannitol or another osmotic agent.

Patient compliance is a serious issue, and the fewer times per day that dosing is required, the more likely compliance is achieved. Once a day human dosing for glaucoma is advantageous to maintain the ocular pressure in the desired range to minimize optic nerve damage while also optimizing compliance. Many of the treatments for glaucoma must be used multiple times a day for effective therapy or must be formulated in a gel or controlled delivery material to achieve once a day dosing. However, the compound of Formula I through Formula XXVII or its pharmaceutically acceptable salt of the present invention in the selected effective dosage can be administered once a day in a topical drop or other convenient manner.

Hyperemia

In yet another embodiment, ocular therapy using an effective amount of a compound of Formula I through Formula XXVII or its pharmaceutically acceptable salt that does not result in significant hyperemia is provided. Hyperemia is an excess of blood in vessels supplying an organ. Ocular hyperemia, also called "red eye", can include or result in vascular congestion, small bleeds, small punctate bleeds and/or microbleeds. Ocular hyperemia can have a variety of causes, including but not limited to exogenous irritants, conjunctivitis (including infectious or allergic), trauma, endogenous ocular insults, subconjunctival hemorrhage, blepharitis, anterior uveitis, glaucoma, or irritating drugs.

Certain ocular drugs either do not address hyperemia or actually cause hyperemia. According to the present invention, the use of a compound of Formula I through Formula XXVII or its pharmaceutically acceptable salt of the present invention does not cause significant hyperemia in the patient when used during therapy, even over long-term therapy as described herein. Significant hyperemia in one embodiment is that which causes enough discoloration or discomfort to the patient that the patient considers it an adverse effect of the treatment. This can result in an advance in the art by assisting patient compliance and comfort.

Another aspect of the present invention is the treatment of glaucoma associated with Sturge Weber Syndrome, which is a congenital disorder that affects the skin, neurological system and sometimes the eyes. It is sometimes referred to as a neurocutaneous disorder. Sturge Weber Syndrome can result in Sturge Weber Syndrome-induced glaucoma, which affects 30-70% of the patients. Managing Sturge Weber Syndrome-induced glaucoma can be complex, and a number of patients need surgery or a drainage device. According to the invention, Sturge Weber Syndrome—induced glaucoma can be treated by administering an effective amount of a compound of Formula I through Formula XXVII or its pharmaceutically acceptable salt of the present invention optionally in a pharmaceutically acceptable carrier, as described herein. The patient can remain on long-term therapy under the care of a physician.

Integrated or Adjunctive Therapy with MIGS (Microinvasive Glaucoma Surgery)

Minimally (or Micro) Invasive Glaucoma Surgery (MIGS) has become an innovative procedure in the evolution of glaucoma surgery. Since glaucoma is a disease in which the optic nerve gets damaged primarily due to elevated eye pressure, the goal of glaucoma surgery is to lower eye pressure to prevent or reduce damage to the optic nerve.

Standard glaucoma surgeries are still considered a major surgery and involve trabeculectomy, ExPRESS shunts, or external tube-shunts such as the Ahmed and Baerveldt style valve implants. While such procedures have often been effective at lowering eye pressure and preventing progression of glaucoma, they have numerous potential complications such as double vision, devastating eye infections, exposure of a drainage implant, swelling of the cornea, and excessively low intraocular pressure.

According to Saheb and Ahmed, the term MIGS refers to a group of surgical procedures which share five preferable qualities:
1. an ab interno approach through a clear corneal incision which spares the conjunctiva of incision,
2. a minimally traumatic procedure to the target tissue,
3. an IOP lowering efficacy that justifies the approach,
4. a high safety profile avoiding serious complications compared to other glaucoma surgeries, and
5. a rapid recovery with minimal impact on the patient's quality of life.

The MIGS group of operations have been developed in recent years to reduce some of the complications of most standard glaucoma surgeries and therefore, in one embodiment, a prodrug of Formula I through Formula XXVII is used as an additive in combination with a microinvasive glaucoma surgery (MIGS).

MIGS is intended to achieve lower intraocular pressure in patients with glaucoma with shorter surgical time, and ideally to achieve a medication sparing effect. MIGS procedures work by using microscopic-sized equipment and tiny incisions. While they reduce the incidence of complications, some degree of effectiveness is also traded for the increased safety. (Pillunat, L. E., et al., Clin Ophthalmol. 2017; 11:1583-1600)

The MIGS group of operations are divided into several categories:
1. Trabecular bypass operations;
2. Microtrabeculectomies (Miniaturized versions of trabeculectomy);
3. Totally internal or suprachoroidal shunts; and
4. Milder, gentler versions of laser photocoagulation.

Trabecular Surgery (Trabeculotomy) involves the use of a special contact lens on the eye and cutting through the trabecular meshwork with a tiny device, under high power microscopic control, without damaging any other tissues in the ocular drainage pathway. The trabecular meshwork can either be destroyed (Trabectome or Trab360) or bypassed using a tiny snorkel-like device (the iStent) or using a plug-shaped stent device (iStent Inject). Both procedures are FDA-approved but generally don't get the eye pressure very low so are most useful in early to moderate stages of glaucoma. With these devices, the resistance of the trabecular meshwork is obviated, thus primarily leaving distal outflow facility and episcleral venous pressure as limits to further aqueous humor drainage. In certain embodiments, a compound of Formula I through Formula XXVII or its pharmaceutically acceptable salt or another compound or its salt of the present invention are used as an additive in combination with Trabectome or Trab360 and/or the iStent/ iStent Inject for the treatment of glaucoma by additively lowering IOP via increased distal outflow or reduced episcleral venous pressure prior to or after the procedure in an acute or chronic use setting. In certain embodiments, a compound of Formula I through Formula XXVII or a pharmaceutically acceptable salt of the present invention are used as an additive in combination with Trabectome or Trab360 and/or the iStent/iStent Inject for the treatment of glaucoma by additively lowering IOP via increased distal outflow or reduced episcleral venous pressure prior to or after the procedure in an acute or chronic use setting.

Microtrabeculectomies work by inserting tiny, microscopic-sized tubes into the eye and draining the fluid from inside the eye to underneath the outer membrane of the eye (conjunctiva). The Xen Gel Stent and PRESERFLO are two new devices that can make the trabeculectomy operation safer. Results have shown excellent pressure lowering with improved safety over trabeculectomy in studies done outside the United States. In certain embodiments, the compounds of the present invention are used as part of the protocols with Xen Gel Stent and/or Preserflo for the treatment of glaucoma by additively lowering IOP via increased distal outflow or reduced episcleral venous pressure prior to or after the procedure in an acute or chronic use setting.

Suprachoroidal Shunts, including the Gold Micro-shunt, iStent Supra, Cypass Micro-stent, Aquashunt, and STARflo, work by using tiny tubes with very small internal openings, the front of the eye is connected to the suprachoroidal space between the retina and the wall of the eye to augment the drainage of fluid from the eye. This operation has relatively few serious complications and lowers pressures enough to be useful even in moderately severe glaucoma. In certain embodiments, a compound of Formula I through Formula XXVII or a pharmaceutically acceptable salt of the present invention are used in combination with Suprachoroidal Shunts procedure for the treatment of glaucoma by additively lowering IOP via increased distal outflow or reduced episcleral venous pressure prior to or after the procedure in an acute or chronic use setting.

Trabecular bypass stents and shunts are investigational devices that work to dilate Schlemm's canal. These procedures facilitate the flow of aqueous into Schlemm's canal by shunting (Eyepass Glaucoma Implant; GMP Companies, Inc., Fort Lauderdale, FL) or by stenting the canal itself (iStent; Glaukos Corp., Laguna Hills, CA). Other devices such as the Solx Gold Micro-Shunt (OccuLogix, Inc., Mississauga, Ontario, Canada) divert aqueous into the suprachoroidal space. In certain embodiments, a compound of Formula I through Formula XXVII or a pharmaceutically acceptable salt of the present invention are used in combination with trabecular bypass stents or shunts procedure for the treatment of glaucoma by additively lowering IOP via increased distal outflow or reduced episcleral venous pressure prior to or after the procedure in an acute or chronic use setting.

Laser photocoagulation was previously reserved for advanced glaucoma that could not be controlled despite trabeculectomy or tube shunts. Endocyclophotocoagulation and micropulse cyclophotocoagulation are two recent advances to the use of laser photocoagulation and have proven useful in cases where glaucoma has yet to become advanced. In certain embodiments, a compound of Formula I through Formula XXVII or a pharmaceutically acceptable salt of the present invention are used in the Endocyclophotocoagulation and micropulse cyclophotocoagulation protocol for the treatment of glaucoma by additively lowering IOP via increased distal outflow/reduced episcleral venous pressure prior to or after the procedure in an acute or chronic use setting.

Endocyclophotocoagulation (ECP) in recent years has become a widely accepted and popular treatment of refractory glaucoma, pediatric glaucoma, and as an adjunct to cataract surgery in both medically controlled and uncontrolled glaucoma; in conjunction with phacoemulsification with intraocular lens placement. ECP is performed following lens removal and intraocular lens implantation by inserting an endolaser unit through the cataract incision, across the anterior segment, and into the posterior chamber on the nasal side of the eye. Laser energy is applied to the ciliary processes to destroy ciliary epithelial cells that produce aqueous humor. In certain embodiments, a compound of Formula I through Formula XXVII or a pharmaceutically acceptable salt of the present invention are used in the ECP protocol for the treatment of glaucoma by additively lowering IOP via increased distal outflow/reduced episcleral venous pressure prior to or after the procedure in an acute or chronic use setting.

Micropulse cyclophotocoagulation delivers the laser in short bursts to allow the surgeon to target specific areas of the ciliary body while giving the tissue time to cool down between bursts, minimizing damage. MicroPulse P3 probe and the new Cyclo G6 glaucoma laser system (Iridex) have both been used successfully in retinal diseases, showing excellent safety and efficacy rates. In certain embodiments, a compound of Formula I-Formula XXVII or a pharmaceutically acceptabe salt of the present invention are used in the Micropulse cyclophotocoagulation surgical protocol for the treatment of glaucoma by additively lowering IOP via increased distal outflow or reduced episcleral venous pressure prior to or after the procedure in an acute or chronic use setting.

Other devices include Gonioscopy-assisted transluminal trabeculotomy (GATT), Kahook Dual Blade, Ab interno canaloplasty and Hydrus Microstent, CyPass Micro-Stent, iStent Supra, Xen Glaucoma Treatment System and InnFocus MicroShunt. In certain embodiments, a compound of Formula I through Formula XXVII or a pharmaceutically acceptable salt of the present invention are used in the surgical protocol of these devices for the treatment of glaucoma as described above.

Laser Trabeculoplasty, including Selective Laser Trabeculoplasty (SLT), Argon Laser Trabeculoplasty (ALT), and Micropulse Laser Trabeculoplasty (MLT) are surgical laser procedures that help to reduce resistance at the trabecular meshwork by ablating cells of the trabecular meshwork and improving outflow in a manner similar to other forms of trabeculoplasty and certain MIGS devices. In certain embodiments, a compound of Formula I through Formula XXVII or a pharmaceutically acceptable salt of the present invention are used as an additive in combination with Selective Laser Trabeculoplasty for the treatment of glaucoma by additively lowering IOP via increased distal outflow or reduced episcleral venous pressure prior to or after the procedure in an acute or chronic use setting.

In one embodiment, a compound of Formula I through Formula XXVII is used as a secondary therapy to a prostaglandin analog, such as lanatoprost, bimatoprost (Lumigan), travoprost (Travatan or Travatan Z), or Tafluprost (Zioptan), and as an additive to a MIGS therapy as described herein.

In one embodiment, a compound of Formula I through Formula XXVII is used as a secondary therapy to latanoprost and as an additive to a MIGS therapy as described herein.

In one embodiment, a compound of Formula I through Formula XXVII is used as a secondary therapy to an α-2 adrenergic agonist, such as brimonidine (Alphagan®), epinephrine, dipivefrin (Propine®) or apraclonidine (Lopidine®), and as an additive to a MIGS therapy as described herein.

In one embodiment, a compound of Formula I through Formula XXVII is used as a secondary therapy to a beta-blocker, such as timolol, levobunolol, metipranolol, or carteolol, and as an additive to a MIGS therapy as described herein.

In one embodiment, a compound of Formula I through Formula XXVII is used as a secondary therapy to a ROCK inhibitor, such as ripasudil, netarsudil (Rhopressa), fasudil, RKI-1447, GSK429286A, or Y-30141, and as an additive to a MIGS therapy as described herein.

In one embodiment, a compound of Formula I through Formula XXVII is used as a secondary therapy to a ROCK inhibitor, such as ripasudil, netarsudil (Rhopressa), fasudil, RKI-1447, GSK429286A, or Y-30141, and as an additive to a MIGS therapy as described herein.

In one embodiment, a compound of Formula I through Formula XXVII is used as a secondary therapy to a second potassium channel opener, such as minoxidil, diazoxide, nicorandil, or pinacidil, and as an additive to a MIGS therapy as described herein.

In one embodiment, a compound of Formula I through Formula XXVII is used as a secondary therapy to a carbonic anhydrase inhibitor, such as dorzolamide (Trusopt®), brinzolamide (Azopt®), acetazolamide (Diamox®) or methazolamide (Neptazane®), and as an additive to a MIGS therapy as described herein.

EXPERIMENTAL EXAMPLES

General Chemical Synthesis Methods

All oxygen and/or moisture sensitive reactions were carried out under $N_2$ atmosphere. All reagents and solvents were purchased from commercial vendors and used as received. HPLC conditions for all LCMS reported: Column: XBridge C18, 3.5 μm, 4.6×30 mm at 25° C.; Gradient for 3 min run: 5% to 100% B in 2.0 minutes; hold 100% B for 0.7 minute, run time=2.7 min. Gradient for 7 min run: 5% B for 0.5 min, 5% to 100% B in 5 minutes; hold 100% B for 1.5 minute; Flow: 3 mL/min. Eluent A: 10 mM ammonium formate in water (pH=3.8); Eluent B: Acetonitrile (no additive).

LIST OF ABBREVIATIONS

ACN Acetonitrile
DCM dichloromethane
DIPEA diisopropylethylamine
DMF N, N-dimethylformamide
DMSO dimethylsulfoxide
EDCI N-(3-Dimethylaminopropyl)-N'-ethylcarbodiimide
EtOH ethanol
HCl Hydrochloric acid
HPLC High-performance liquid chromatography
$I_2$ iodine
LCMS Liquid chromatography-mass spectrometry
mCPBA meta-Chloroperoxybenzoic acid
MeCN acetonitrile
MEK Methyl ethyl ketone
MeOH methanol
NaH Sodium hydride
NaOH Sodium hydroxide
$Na_2S_2O_3$ Sodium thiosulfate
$Na_2SO_4$ Sodium sulfate
NMO N-Methylmorpholine N-oxide
$PCl_3$ Phosphorous trichloride
$POCl_3$ Phosphoryl trichloride
PTFE polytetrafluoroethylene
Py pyridine
RT Retention time or room temperature
TBAF Tetrabutylammonium fluoride
TBS Tert-butyldimethylsilyl
THF tetrahydrofuran
UPLC Ultra-performance liquid chromatography Example 1

Method a for Synthesis of Compound 1
Step 1.

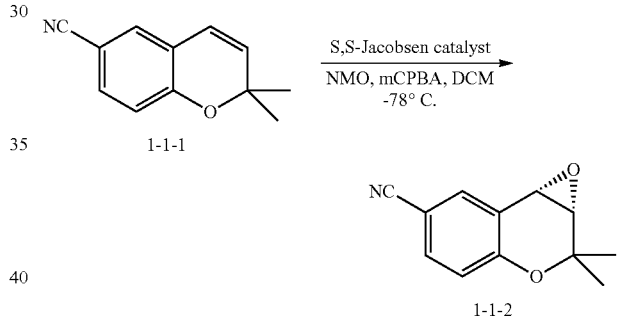

To a solution of 2,2-dimethyl-2H-1-benzopyran-6-carbonitrile (1.00 g, 5.24 mmol) in DCM (40.0 mL) was added (S,S)-(+)—N,N'-Bis(3,5-di-tert-butylsalicylidene)-1,2-cyclohexanediaminomanganese (III) chloride ((S,S)-Jacobsen's catalyst) (166 mg, 262 umol). The solution was cooled to −78° C. Then NMO (3.16 g, 26.2 mmol) was added in one portion, followed by 3-chloroperbenzoic acid (2.41 g, 10.5 mmol) in a few portions. Upon consumption of the olefin (TLC or LCMS monitor, about 90 min), the reaction was quenched by the addition of a solution of $Na_2S_2O_3$ (20 mL). A solution of 2 N NaOH (40 mL) was then added and organic layers were separated. The aqueous phase was further extracted with 2×50 mL DCM. Combined organic layers were washed with 2 N HCl (50 mL), washed with brine, dried with anhydrous $Na_2SO_4$, filtered and concentrated. The organic residue was purified by normal phase column chromatography with 0-20% Ethyl Acetate in Hexane, product eluted at 20%. Fractions were concentrated to yield Compound 1-1-2 (1.05 g, quant. yield) as a white solid. LCMS RT=1.27 min; MS cal.: 201.28; found: [M]+: N/A. 1H NMR (400 MHZ, $CDCl_3$) δ 7.65 (d, J=2.0 Hz, 1H), 7.55-7.51 (m, 1H), 6.87 (dd, J=8.5, 4.5 Hz, 1H), 3.91 (dd, J=4.4, 0.4 Hz, 1H), 3.54 (d, J=4.4 Hz, 1H), 1.60 (s, 3H), 1.30 (s, 3H).

Step 2.

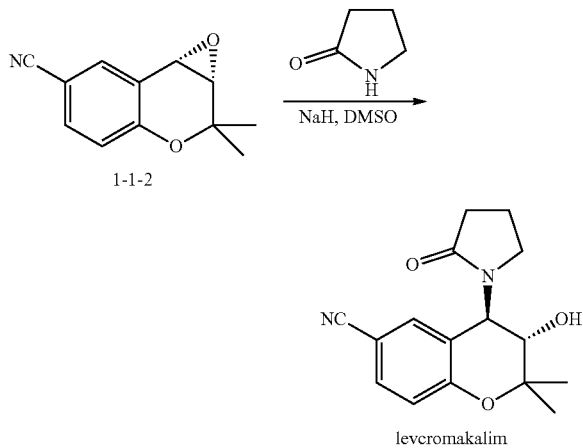

A solution of 2-pyrrolidinone (713 uL, 6.29 mmol) and Compound 1-1-2 (1.05 g, 5.24 mmol) in DMSO (26.2 mL) was treated with sodium hydride (60% in dispersion in mineral oil, 151 mg, 6.29 mmol). The reaction mixture was stirred at room temperature overnight. The reaction was diluted by water (50 mL) and extracted by ethyl acetate (3×30 mL). The organic layers were combined, washed by brine, dried, filtered, and concentrated. To the crude residue was added 5 mL DCM and a few drops of EtOH, then sonicated and filtered to yield levcromakalim (0.93 g, 62% yield) as a white solid. LCMS RT=1.08 min; MS cal.: 286.13; found: [M+H]$^+$: 287.2. $^1$H NMR (400 MHZ, CDCl$_3$) δ 7.51-7.41 (m, 1H), 7.25-7.24 (m, 1H), 6.89 (d, J=8.5 Hz, 1H), 5.28 (d, J=10.4 Hz, 1H), 3.75 (d, J=10.4 Hz, 1H), 3.33 (dd, J=16.9, 7.8 Hz, 1H), 3.10-3.02 (m, 1H), 2.67-2.48 (m, 2H), 2.22-2.02 (m, 2H), 1.54 (s, 3H), 1.28 (s, 3H).

ee Analysis of Levcromakalim:
- Anal. Column: ChiralPak IA, 250 mm×4.6 mm ID, 5 um;
- Mobile Phase: 8:8:84
- MeOH:DCM:Hexane; Isocratic Flow: 1 mL/min, (pressure was 49.5 bars); Column Temp.: ~ 26° C.; Run Time: 12 min; Wavelength: 254 nm
- RT peak #1=RT1=9.3 min. (width at mid height=W1=0.1546 min.)
- RT peak #2=RT2=10.0 min. (width at mid height=W2=0.1696 min.)
- Enantiomeric excess>99%.

Step 3.

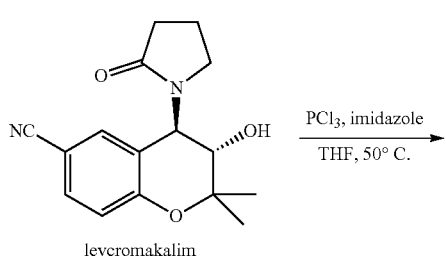

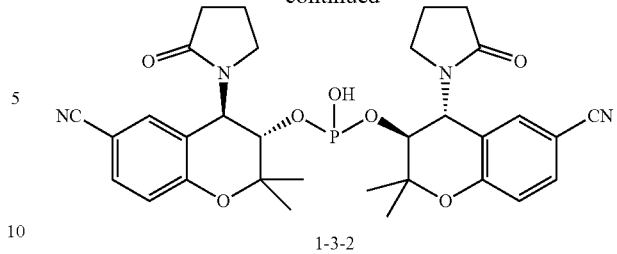

To a suspension of levcromakalim (300 mg, 1.05 mmol) and imidazole (89.2 mg, 1.31 mmol) in THF (5.24 mL) was added phosphorus trichloride (46.2 μL, 524 μmol). The reaction was stirred at 50° C. overnight. After clean full conversion to product, the reaction was concentrated and used directly in the next step without further purification.

LCMS RT=1.45 min; MS cal.: 618.22; found: [M+H]$^+$: 619.4.

Step 4.

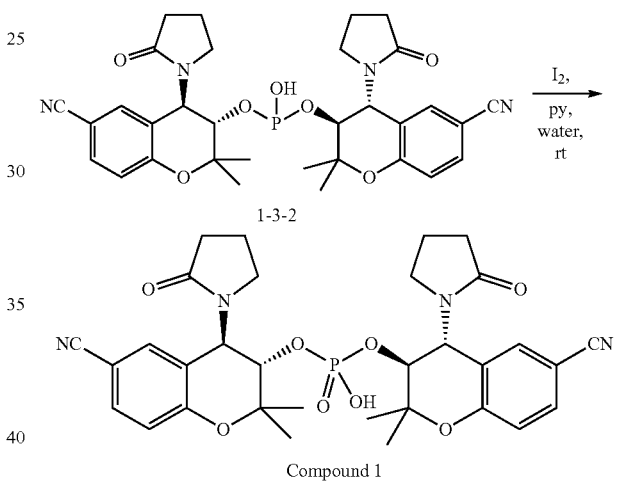

Compound 1-3-2 (324 mg, 524 μmol) was dissolved in pyridine/water 10:1 (5.24 mL), then to the solution was added iodine (400 mg, 1.57 mmol) and stirred at room temperature for 1 h. Reaction was concentrated and acidified by 1N HCl to pH-1. The aqueous layer was extracted by ethyl acetate 3 times. The combined organic layers were washed with brine, dried over anhydrous Na$_2$SO$_4$ and concentrated to dryness. The residue was purified by reverse phase column chromatography 60 g, with 0-20-40% ACN in water. Product eluted at 35% ACN in water. Fractions were concentrated to yield Compound 1 (252 mg, 76% yield) as a white solid.

$^1$H NMR (400 MHZ, DMSO-d6) δ 7.66 (dd, J=8.4, 1.8 Hz, 2H), 7.47 (s, 2H), 7.02 (d, J=8.5 Hz, 2H), 5.19 (d, J=8.1 Hz, 2H), 4.45 (t, J=9.7 Hz, 2H), 3.52-3.38 (m, 2H), 3.01-2.85 (m, 2H), 2.41 (dd, J=16.3, 7.6 Hz, 2H), 2.30-2.20 (m, 2H), 2.03-1.88 (m, 4H), 1.53 (s, 6H), 1.22 (s, 6H). LCMS RT=2.26 min (7 min run); MS cal.: 634.22; found: [M]$^+$: 635.4.

LCMS showed Compound 1 as single enantiomer.
Compound 1 LCMS RT=2.26 min (7 min run)
Diastereomer of Compound 1 was made according the procedure above.

Diastereomer of Compound 1 LCMS RT=2.07 min (7 min run)

Method B for Synthesis of Compound 1

Step 3.

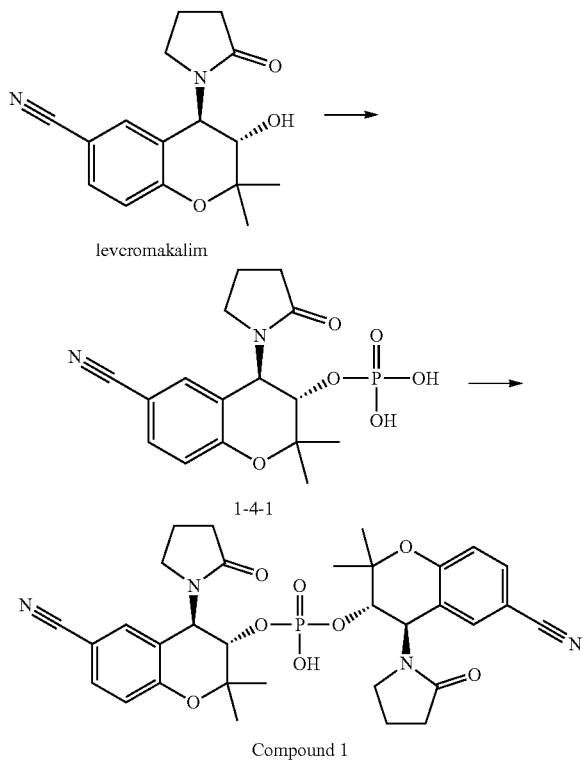

Compound 1

A vessel was charged with levcromakalim (1.0 wt) followed by MEK (20 vol) at 18 to 23° C. Pyridine (6 eq, 1.3 vol) was then added and the resulting slurry was cooled to 0 to 5° C. before POCl₃ (4 eq, 1.7 vol) was added while maintaining the temperature between 0 and 5° C. The temperature of the reaction mixture was then adjusted to 18 to 23° C. and the mixture was stirred for 18 hours. Analysis by HPLC indicated 98.1% conversion to Compound 1-4-1. Additional POCl₃ (1 eq) was added and the reaction was allowed to stir for 3 additional hours. HPLC analysis showed 98.3% conversion to Compound 1. The mixture was allowed to stir for another 18 hours and was then quenched with 2M HCl (8.0 vol). The mixture was heated to 60 to 65° C. and stirred at this temperature for 2 hours before it was cooled to 18 to 23° C. The organic and aqueous layers were separated and the acidic phase was back extracted with MEK (5.0 vol). The combined organic layers were washed with brine (13% w/w, 5 vol) and the aqueous phase was back-extracted with MEK (2×2.5 vol). The organic layer was left standing overnight, at which point, a yellow solid had precipitated. The mixture was concentrated to a residue under reduced pressure at 40° C. The residue was dissolved in MEK (5.0 vol) and the mixture was concentrated to a residue under reduced pressure at 40° C. The crude product (63% yield uncorrected) was analyzed by HPLC and LCMS. The crude mixture contained product as analyzed by LCMS ([MH]+=635.40).

The crude product was transferred to a second vessel and slurry washed with MeCN (5.0 vol) at ambient temperature for 20 minutes. The product was isolated by filtration through filter paper and the cake was washed with MeCN (1.0 vol). The product was dried on the filter paper under vacuum and a flow of nitrogen for 2 hours. The isolated product (26% yield uncorrected) was of high purity (96.78% area purity by HPLC).

Example 2

Formation of Calcium Salt of Compound 1

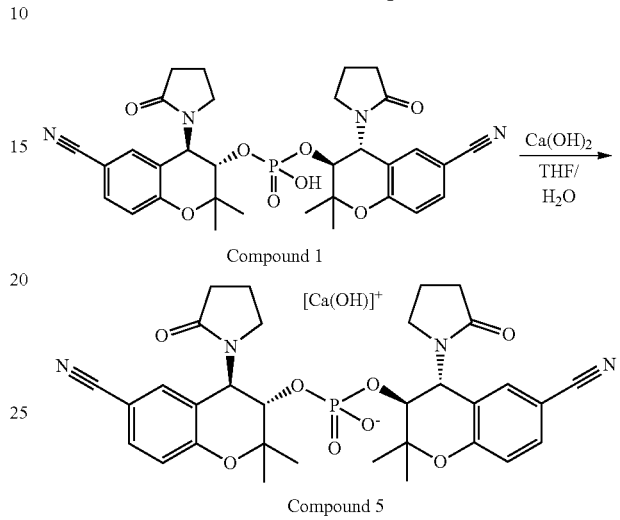

To a 4 dram vial was added Compound 1 (4.20 mg, 6.62 μmol) in a 1:1 mixture of THF (200 μL):H2O (200 μL). To this solution was added a 0.0216 M solution of Calcium hydroxide, 95% (306 uL, 6.62 μmol). The solution was sonicated, directly freeze dried, and lyophilized to yield Compound 5 as a solid.

UPLC:

Waters Acquity UPLC CSH C18, 1.8 μm, 2.1×30 mm at 40° C.; 5% to 100% B in 2.0 minutes; hold 100% B for 0.7 minute, run time=2.7 min; Eluents: A=Milli-Q H2O 10 mM Ammonium formate pH=3.8; B=MeCN. M/z [ESI+]-635.3, Rt=1.14 min

HNMR:

1H NMR (400 MHZ, dmso) δ 7.62 (dd, J=8.5, 1.8 Hz, 1H), 7.34 (s, 1H), 6.96 (d, J=8.5 Hz, 1H), 5.03 (d, J=10.3 Hz, 1H), 4.41 (t, J=10.4 Hz, 1H), 3.73 (dd, J=14.0, 8.1 Hz, 1H), 2.89 (d, J=5.5 Hz, 1H), 2.43-2.25 (m, 2H), 2.04-1.81 (m, 2H), 1.54 (s, 3H), 1.20 (s, 3H).

Example 3

Formation of Sodium Salt of Compound 1

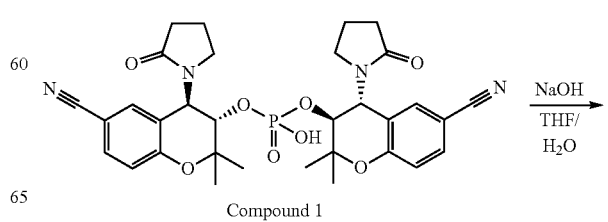

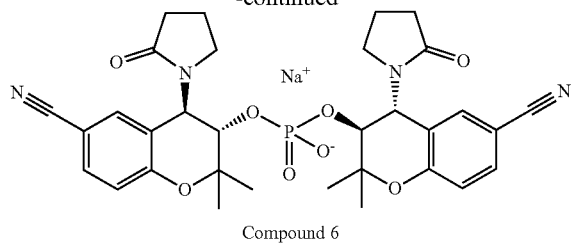

Compound 6

To a 4 dram vial was added Compound 1 (4.20 mg, 6.62 μmol) in a 1:1 mixture of THF (200 μL):H2O (200 μL). To this solution was added a 0.25 M solution of Sodium Hydroxide (26.5 uL, 6.62 μmol). The solution was sonicated, directly freeze dried, and lyophilized to yield Compound 6 as a solid.

UPLC:

Waters Acquity UPLC CSH C18, 1.8 μm, 2.1×30 mm at 40° C.; 5% to 100% B in 2.0 minutes; hold 100% B for 0.7 minute, run time=2.7 min; Eluents: A=Milli-Q H2O 10 mM Ammonium formate pH=3.8; B=MeCN. M/z [ESI+]=635.3, Rt=1.14 min

HNMR:

1H NMR (400 MHZ, dmso) δ 7.61 (dd, J=8.5, 1.8 Hz, 1H), 7.31 (s, 1H), 6.96 (d, J=8.5 Hz, 1H), 5.01 (d, J=10.5 Hz, 1H), 4.40 (t, J=10.5 Hz, 1H), 3.76 (dd, J=14.0, 8.2 Hz, 1H), 2.88 (d, J=6.0 Hz, 1H), 2.41-2.25 (m, 2H), 2.02-1.83 (m, 2H), 1.53 (s, 3H), 1.19 (s, 3H).

Example 4

Formation of Potassium Salt of Compound 1

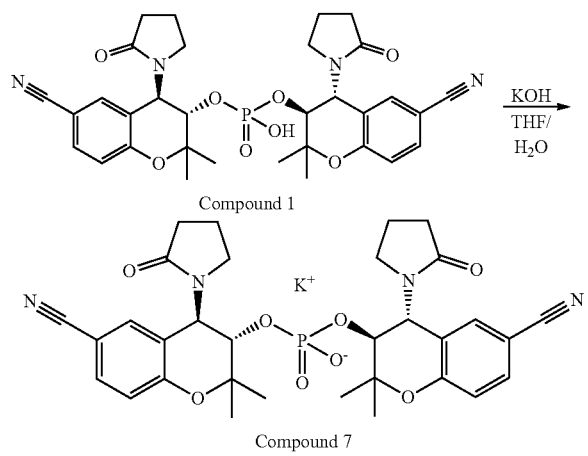

Compound 1

Compound 7

To a 4 dram vial was added Compound 1 (4.20 mg, 6.62 μmol) in a 1:1 mixture of THF (200 μL):H2O (200 μL). To this solution was added a 0.25 M solution of Potassium hydroxide (26.5 uL, 6.62 μmol). The solution was sonicated, directly freeze dried, and lyophilized to yield Compound 7 as a solid.

UPLC:

Waters Acquity UPLC CSH C18, 1.8 μm, 2.1×30 mm at 40° C.; 5% to 100% B in 2.0 minutes; hold 100% B for 0.7 minute, run time=2.7 min; Eluents: A=Milli-Q H2O 10 mM Ammonium formate pH=3.8; B=MeCN. M/z [ESI+]=635.3, Rt=1.14 min

HNMR:

1H NMR (400 MHZ, dmso) δ 7.61 (dd, J=8.5, 2.0 Hz, 1H), 7.31 (d, J=1.1 Hz, 1H), 6.96 (d, J=8.5 Hz, 1H), 5.01 (d, J=10.5 Hz, 1H), 4.40 (t, J=10.5 Hz, 1H), 3.77 (dd, J=14.18.3 Hz, 1H), 2.87 (d, J=5.8 Hz, 1H), 2.39-2.24 (m, 2H), 2.02-1.82 (m, 2H), 1.53 (s, 3H), 1.19 (s, 3H).

Example 5

Formation of Tetramethylammonium Salt of Compound 1

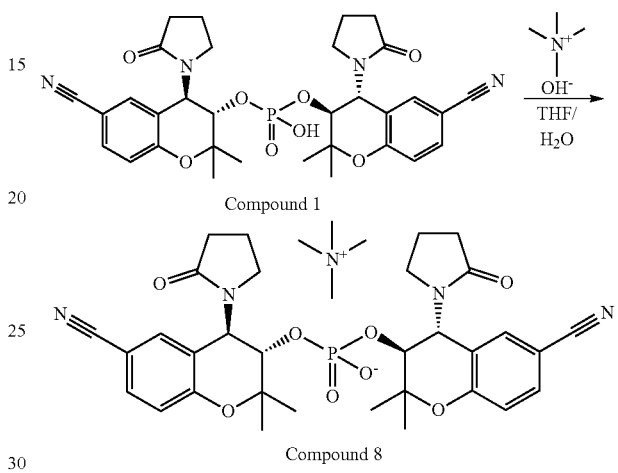

Compound 1

Compound 8

To a 4 dram vial was added Compound 1 (4.00 mg, 6.30 μmol) in a 1:1 mixture of THF (200 μL): H2O (200 μL). To this solution was added a 2.5% solution of Tetramethylammonium hydroxide, 10% aq (23.0 μL, 6.30 μmol). The solution was sonicated, directly freeze dried, and placed on the lyo to yield Compound 8 as a solid.

UPLC:

Waters Acquity UPLC CSH C18, 1.8 μm, 2.1×30 mm at 40° C.; 5% to 100% B in 2.0 minutes; hold 100% B for 0.7 minute, run time=2.7 min; Eluents: A=Milli-Q H2O 10 mM Ammonium formate pH=3.8; B=MeCN. M/z [ESI+]=635.3, Rt (A05)=1.14 min

HNMR:

1H NMR (400 MHZ, dmso) δ 7.60 (dd, J=8.4, 1.9 Hz, 1H), 7.30 (d, J=1.1 Hz, 1H), 6.96 (d, J=8.5 Hz, 1H), 5.01 (d, J=10.6 Hz, 1H), 4.40 (t, J=10.5 Hz, 1H), 3.78 (dd, J=14.1, 8.3 Hz, 1H), 3.09 (s, 9H), 2.95-2.76 (m, 1H), 2.03-1.82 (m, 2H), 1.53 (s, 3H), 1.19 (s, 3H). Note: peak at 3.09 should be 12H for the salt.

Example 6

Synthesis of Compound 9

General Method

All oxygen and/or moisture sensitive reactions were carried out under N2 atmosphere. All reagents and solvents were purchased from commercial vendors and used as received. HPLC conditions for all LCMS reported: Waters Acquity UPLC CSH C18, 1.8 μm, 2.1×30 mm at 40° C.; 5% to 100% B in 2.0 minutes; hold 100% B for 0.7 minute, run time=2.7 min; Eluents: A=Milli-Q H2O+10 mM Ammonium formate pH=3.8; B=MeCN. Waters Acquity H-Class UPLC system. UV Detector=Waters Acquity PDA, 195-360 nm. MS Detector=Acquity QDa Performance ESI.

Step 1

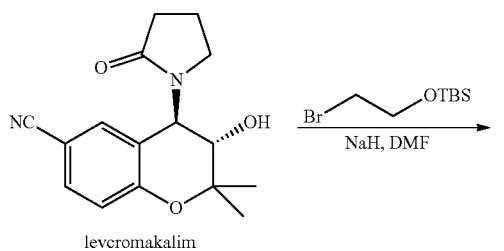

levcromakalim

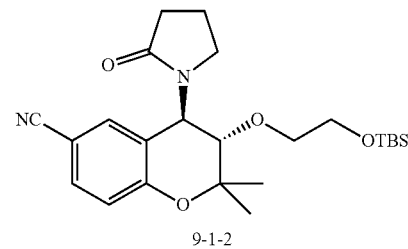

9-1-2

To a solution of levcromakalim (50.0 mg, 0.175 mmol) in DMF (2.00 mL) under nitrogen balloon at room temperature was added sodium hydride (60% in dispersion in mineral oil) (48.9 mg, 1.22 mmol). This solution was stirred for 3 min and then sodium iodide (10.0 mg, 66.7 µmol) was added. Finally, (2-bromoethoxy)-tert-butyldimethylsilane (262 µL, 1.22 mmol) was added dropwise and reaction was stirred for 20 min after which 3 mL of water was added to quench the reaction. Reaction mixture was concentrated under vacuum to remove methanol and DMF. Then, water was added again and product was extracted with EtOAc 3 times. Combined organic layers were dried over MgSO$_4$, filtered, and concentrated under vacuum. Crude was purified by flash column chromatography (silica, eluent gradient: 0-100% Ethyl Acetate in heptanes) to obtain compound 9-1-2 (65.0 mg, 84%) as a yellow viscous oil.

Note: Keeping the reaction longer such as 1 h or overnight results in the dehydration side product so it must be quenched in a short time.

Compound 9-1-2: LCMS RT=1.94 min; MS cal.: 444.64; found: [M+H]$^+$: 445.3.

Step 2

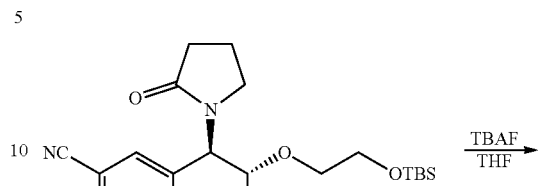

9-1-2

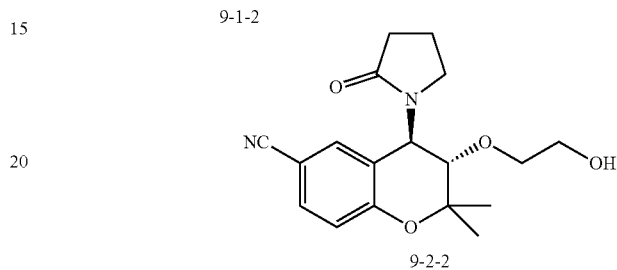

9-2-2

Compound 9-1-2 (64.0 mg, 0.144 mmol) was dissolved in THF (1.44 mL) in a 4 mL vial. Tetrabutylammonium fluoride (1.0 M in THF) (45.0 µL, 0.288 mmol) was added to this solution at rt. After stirring the reaction for 20 min at room temperature, LCMS showed the complete conversion to the desired product. The reaction mixture was concentrated in vacuo and dissolved in EtOAc, the crude solution was passed through a silica pad to remove TBAF. The filtrate was concentrated to afford compound 9-2-2 (40.0 mg, 84%) as an amorphous white solid. Note: Purification should be done in the same day because overnight, around 10% dehydration side product was observed.

Compound 9-2-2: LCMS RT=1.08 min; MS cal.: 330.38; found: [M+H]$^+$: 331.1.

Step 3

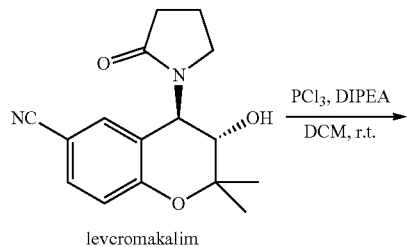

levcromakalim

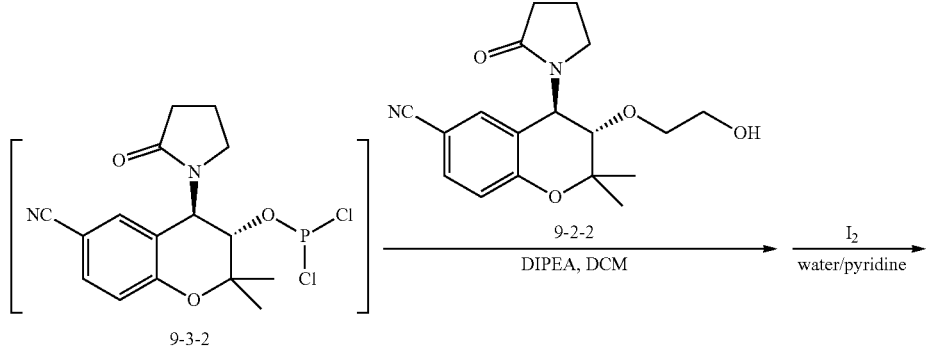

-continued

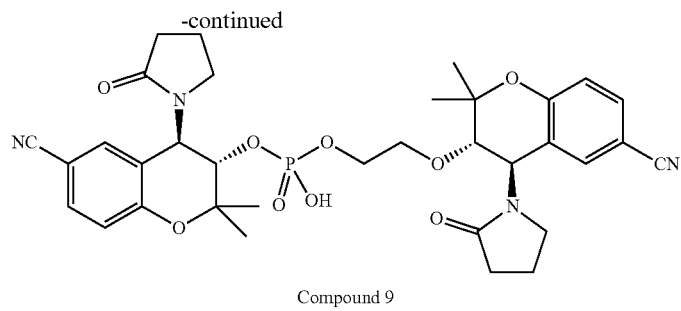

Compound 9

To a suspension of levcromakalim (20 mg, 0.07 mmol) in DCM (0.80 mL) was added DIPEA (12.12 μL, 0.07 mmol). The suspension was slowly added to a solution of PCl3 (18.28 μL, 0.210 mmol) in DCM (0.80 mL). The reaction was stirred at room temperature for 1 hour until the reaction was judged complete. The reaction was then concentrated in vacuo to give the crude compound 9-3-2, which was dried under high vacuum and used in the next step without further purification.

Compound 9-3-2 was dissolved in DCM (1.00 mL). To this solution was added a solution of compound 9-2-2 (22 mg, 0.070 mmol) with DIPEA (12.12 μL, 0.07 mmol) in DCM (0.50 mL). The reaction mixture was stirred at room temperature for 16 hours to give the crude bis-substituted intermediate. This crude was concentrated in vacuo and dissolved in pyridine/water 10:1 (0.30 mL), then to the solution was added iodine (23 mg, 0.091 mmol). The resulting solution was stirred at room temperature for 15 min. LCMS showed complete conversion to the desired product. Reaction was concentrated and acidified by HCl 1 N to pH=1 then extracted by EtOAc 3 times. Combined organic layers were dried over MgSO4 and concentrated to dryness. The residue was purified with preparative HPLC using the indicated method below to yield Compound 9 (9.00 mg, 39% yield) as a white solid.

Note: Using ammonium bicarbonate LCMS method shows degradation in the final compound so ammonium formate pH 3.8 is ideal for purification.

$^1$H NMR (400 MHZ, DMSO-$d_6$) δ 7.65-7.61 (m, 1H), 7.61-7.58 (m, 1H), 7.39 (s, 1H), 7.30 (s, 1H), 6.97 (d, J=3.6 Hz, 1H), 6.95 (d, J=3.5 Hz, 1H), 5.07 (d, J=10.5 Hz, 1H), 5.05-4.97 (m, 1H), 4.35 (t, J=10.4 Hz, 1H), 3.82-3.56 (m, 6H), 3.52-3.40 (m, 1H), 3.09-2.91 (m, 1H), 2.84-2.73 (m, 1H), 2.48-2.36 (m, 3H), 2.34-2.21 (m, 1H), 2.09-1.85 (m, 4H), 1.52 (s, 3H), 1.50 (s, 3H), 1.18 (s, 6H). (Exchangeable OH is invisible and it contains 2.3 wt % formic acid)

LCMS RT=1.16 min (2.7 min run); MS cal.: 678.67; found: [M+H]$^+$: 679.4.

Purification method: PPIMS03 Prep-QDa
General Description
  Instrumentation: Waters Prep LC-MS
  LC: Autopurification LC-MS (2545 Quaternary, Solvent heater, 2767, SFO, 515, 515, 2998, QDa Performance)
  MassLynx 4.1 SCN 947/961/FractionLynx
  UV Detection: Waters PDA 2998 (198-360 nm)
  MS Detection: Waters QDa Performance, ESI (ES (+/−), 100-1200 amu)
Mobile Phase at 40° C.
  Eluent A: 10 mM Ammonium formate pH=3.8 in Milli-Q H2O
  Eluent B: Acetonitrile
  Precolumn: XBridge Prep C18, 5 μm 19×10 mm
  Column: CSH Prep C18 OBD, 5 μm, 30×75 mm
  Gradient: 0 min=10% B, 1 min=10% B, 12 min=30% B, 12.1 min=100% B, 15 min=100%
  Flow: 45 mL/min
  Run Time: 15 minutes
  Triggered by: MS (Mass A=678.67)

Example 7

Synthesis of Compound 10
General Method

All oxygen and/or moisture sensitive reactions were carried out under N2 atmosphere. All reagents and solvents were purchased from commercial vendors and used as received. HPLC conditions for all LCMS reported: Column: XBridge C18, 3.5 μm, 4.6×30 mm at 25° C.; Gradient for 3 min run: 5% to 100% B in 2.0 minutes; hold 100% B for 0.7 minute, run time=2.7 min. Gradient for 7 min run: 5% B for 0.5 min, 5% to 100% B in 5 minutes; hold 100% B for 1.5 minute; Flow: 3 mL/min. Eluent A: 10 mM ammonium formate in water (pH=3.8); Eluent B: Acetonitrile (no additive).

Step 1

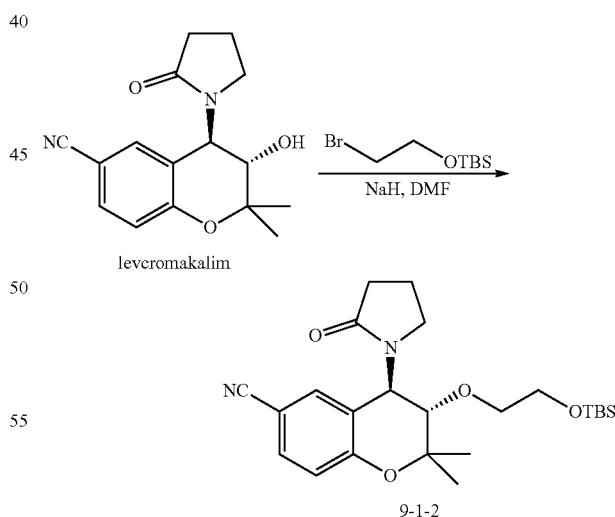

Sodium hydride (60% in dispersion in mineral oil) (21.0 mg, 524 μmol) was added to a DMF solution (1.00 mL) of levcromakalim (50.0 mg, 175 μmol) at room temperature, forming bubbles. After 5 min, sodium iodide (5.29 mg, 34.9 μmol) was added, then (2-Bromoethoxy)-tert-butyldimethylsilane (116 μL, 524 μmol) was added. Upon completion (as monitored by TLC or LCMS, about 30 min), the reaction was diluted by water (5 mL), and extracted by ethyl acetate (3×5 mL). Organic layers were combined, dried and concentrated. The resulting residue was purified by 24 g normal phase column with 0-40% ethyl acetate in hexane, product eluted at 36% ethyl acetate in hexane. Fractions were concentrated to yield compound 9-1-2 (75.2 mg, 97% yield) as colorless oil.

Compound 9-1-2: LCMS $R_T$=2.00 min; MS cal.: 444.24; found: $[M]^+$: 445.3.

Step 2

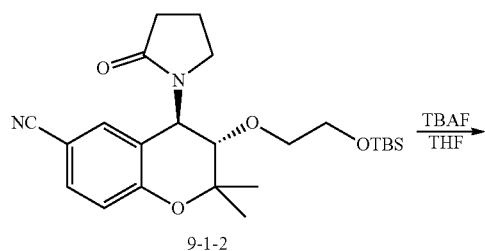

9-1-2

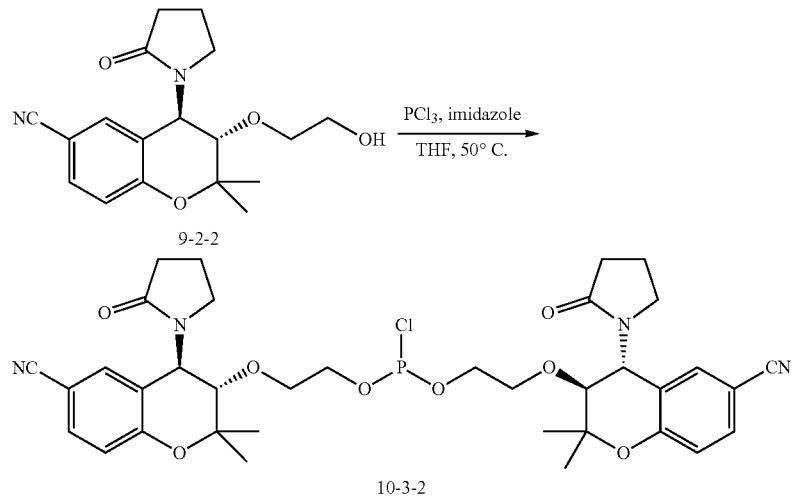

9-2-2

To compound 9-1-2 (75.2 mg, 169 μmol) in THF (1 mL) was added tetrabutylammonium fluoride (1.0 M in THF) (338 μL, 338 μmol). After stirring 20 min at room temperature, reaction was judged to be complete. Reaction mixture was concentrated under vacuum and purified with normal phase directly on 24 g column with 60-100% ethyl acetate in hexane, product compound 2-2 eluted at 100% ethyl acetate, yielding 52 mg of colorless solid.

Please note: Purification should be done in the same day. Dehydration product was observed in crude mixture over time.

Compound 9-2-2: LCMS RT=1.10 min; MS cal.: 330.16; found: $[M+H]^+$: 331.1.

Step 3

10-3-2

To a suspension of compound 9-2-2 (52.0 mg, 157 μmol) and imidazole (13.4 mg, 197 μmol) in THF (1 mL) was added phosphorus trichloride (6.94 uL, 78.7 μmol). The reaction was stirred at 50° C. overnight. The reaction was concentrated and used directly in the next step without further purification.

Step 4

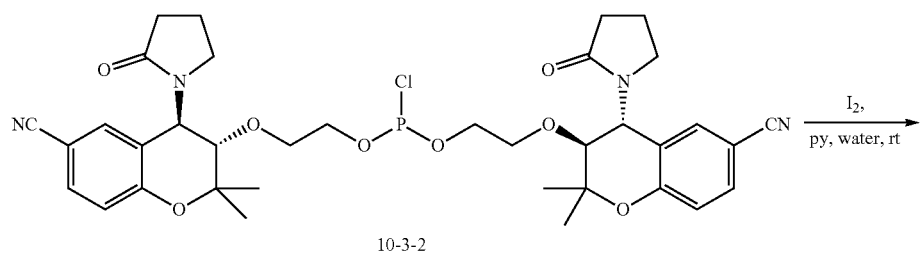

10-3-2

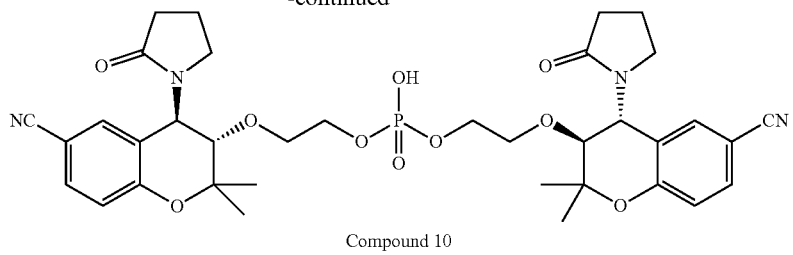

Compound 10

To the crude mixture of Compound 10-3-2 (55.6 mg, 78.7 µmol) in pyridine/water 10:1 (787 µL) was added iodine (60.0 mg, 236 µmol). After 0.5 h, reaction was judged to be finished. The reaction solution was concentrated and acidified by a few drops of 6 N HCl, then loaded on a reverse phase column, and purified with 0-20-40% ACN in water. The product eluted at 35% ACN in water. Fractions were concentrated to yield Compound 10 (25.1 mg, 44% yield) as a white solid.

$^1$H NMR (400 MHZ, DMSO-d6) δ 7.62 (dd, J=8.5, 1.9 Hz, 2H), 7.40 (s, 2H), 6.97 (d, J=8.5 Hz, 2H), 5.03 (s, 2H), 3.91-3.69 (m, 10H), 3.34 (s, 1H), 3.01 (s, 2H), 2.40 (ddd, J=32.2, 16.4, 7.8 Hz, 4H), 2.06-1.93 (m, 4H), 1.51 (s, 6H), 1.17 (s, 6H).

LCMS $R_T$=1.25 min; MS cal.: 722.27; found: [M]$^+$: 723.4.

Example 8

Synthesis of Compound 11

Step 1

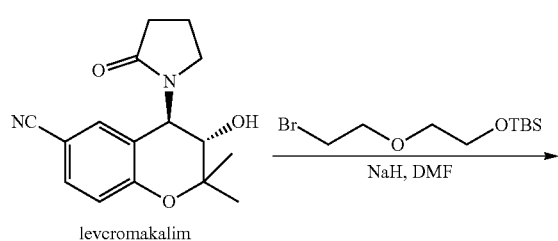

Sodium hydride (60% in dispersion in mineral oil) is added to a DMF solution of levcromakalim at room temperature, forming bubbles. After 5 min, sodium iodide is added, then (2-Bromoethoxy)-tert-butyldimethylsilane is added. Upon completion (as monitored by TLC or LCMS, about 30 min), the reaction is diluted by water, and extracted by ethyl acetate. Organic layers are combined, dried and concentrated. The resulting residue is purified by normal phase column with ethyl acetate in hexane. Fractions are concentrated to yield compound 11-1-2.

Step 2

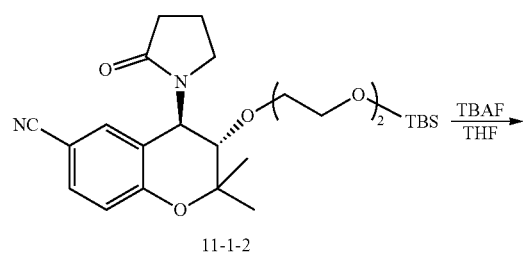

To compound 11-1-2 in THF is added tetrabutylammonium fluoride (1.0 M in THF). Reaction is stirred until judged to be complete. Reaction mixture is concentrated under vacuum and purified with normal phase column with ethyl acetate in hexane to yield compound 11-2-2.

Step 3

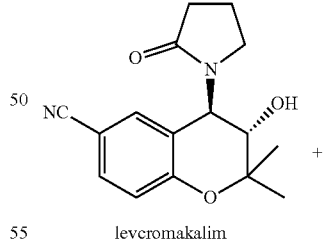

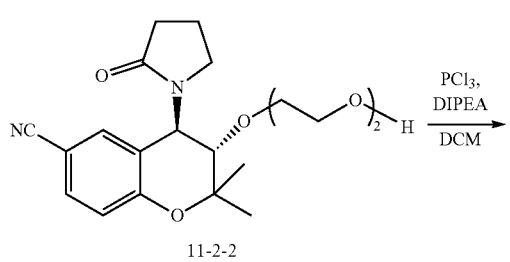

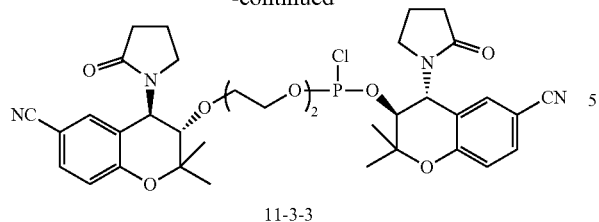

11-3-3

To a suspension of levcromakalim in DCM is added DIPEA. The suspension is slowly added to a solution of PCl₃ in DCM. The reaction is stirred at room temperature for 1 hour until the reaction is judged complete. The reaction is then concentrated in vacuo to give the crude mixture, which is dried under high vacuum and used in the next step without further purification.

The crude mixture from the previous step is dissolved in DCM. To this solution is added a solution of compound 11-2-2 with DIPEA in DCM. The reaction mixture is stirred at room temperature for 16 hours to give the crude compound 11-3-3. This crude was concentrated in vacuo and taken to the next step without further purification.

Step 4

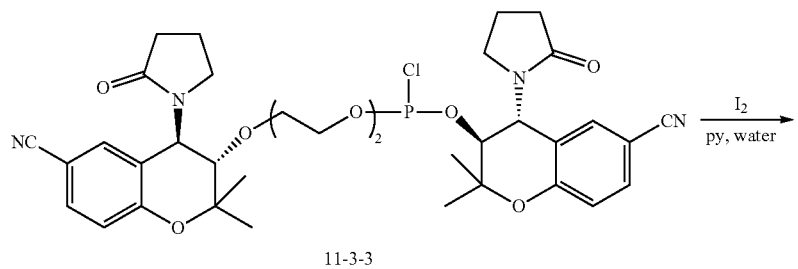

11-3-3

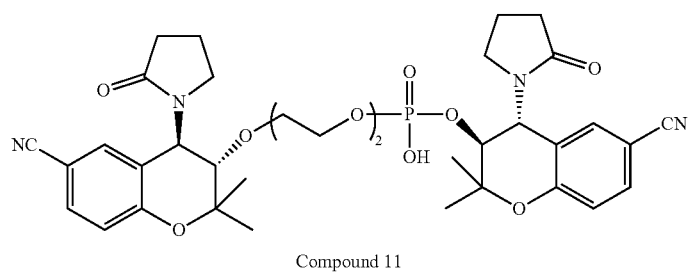

Compound 11

To the crude mixture of Compound 11-3-3 in pyridine/water 10:1 is added iodine. After approximately 0.5 h or the reaction is judged to be finished, the reaction solution is concentrated and acidified by a few drops of 6 N HCl, then loaded on a reverse phase column, and purified with ACN in water. The product fractions are concentrated to yield Compound 11

Alternatively, the product from Step 2 can be converted to a pharmaceutically acceptable salt:

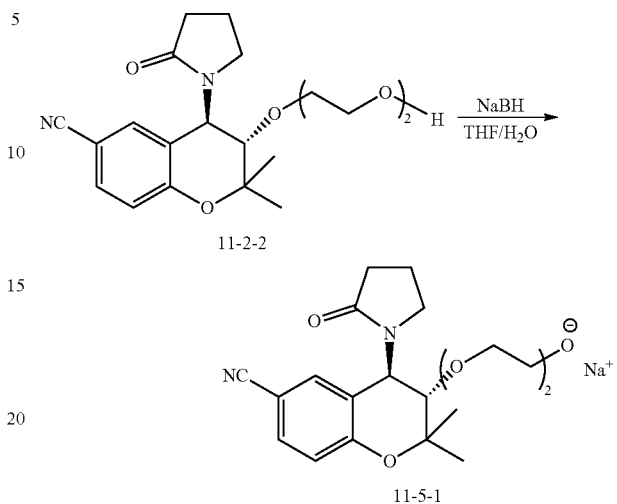

To a 4 dram vial is added Compound 11-2-2 in a 1:1 mixture of THF:H2O. To this solution is added a 0.25 M solution of Sodium Hydroxide. The solution is sonicated, directly freeze dried, and lyophilized to yield Compound 11-5-1 as a solid. Alternative salts, including the potassium and tetramethylammonium, cane be synthesized by a similar procedure.

Example 9

Synthesis of Compound 12
Step 1

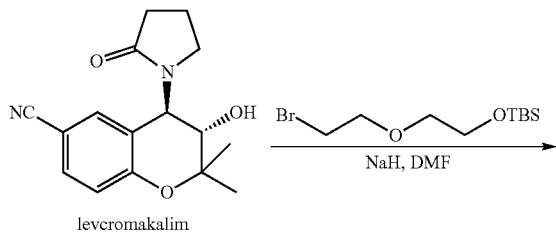

levcromakalim

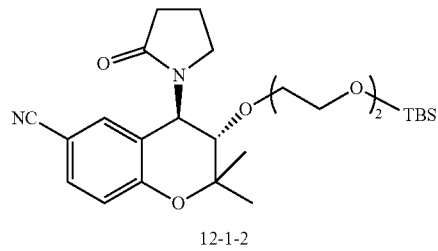

12-1-2

Sodium hydride (60% in dispersion in mineral oil) is added to a DMF solution of levcromakalim at room temperature, forming bubbles. After 5 min, sodium iodide is added, then (2-Bromoethoxy)-tert-butyldimethylsilane is added. Upon completion (as monitored by TLC or LCMS, about 30 min), the reaction is diluted by water, and extracted by ethyl acetate. Organic layers are combined, dried and concentrated. The resulting residue is purified by normal phase column with ethyl acetate in hexane. Fractions are concentrated to yield compound 12-1-2.

Step 2

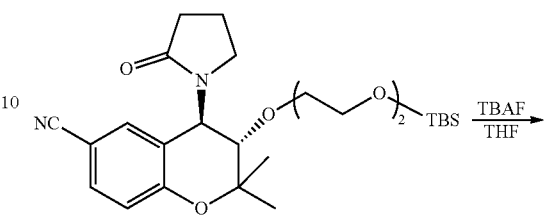

To compound 12-1-2 in THF is added tetrabutylammonium fluoride (1.0 M in THF). Reaction is stirred until judged to be complete. Reaction mixture is concentrated under vacuum and purified with normal phase column with ethyl acetate in hexane to yield compound 12-2-2.

Step 3

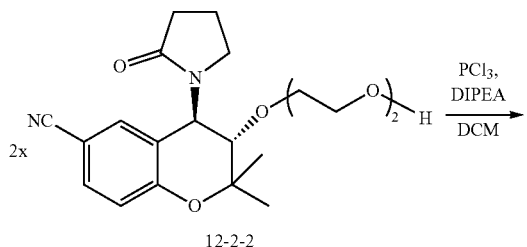

12-2-2

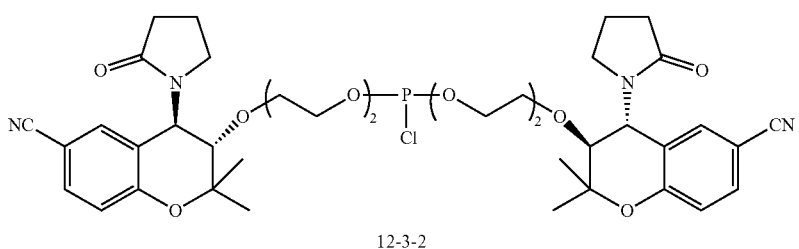

12-3-2

To a suspension of compound 12-2-2 in DCM is added DIPEA. The suspension is slowly added to a solution of PCl$_3$ in DCM. The reaction is stirred at room temperature for 1 hour until the reaction is judged complete. The reaction is then concentrated in vacuo to give the crude mixture, which is dried under high vacuum and used in the next step without further purification.

Step 4

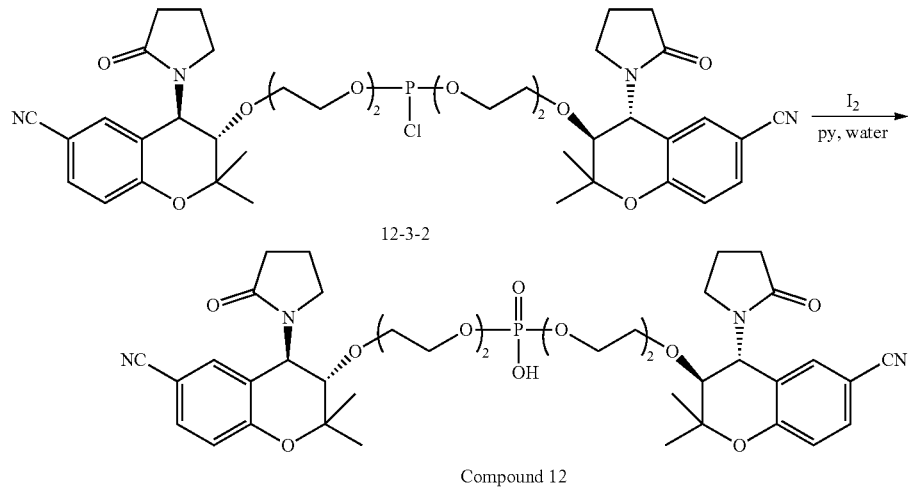

To the crude mixture of Compound 12-3-2 in pyridine/water 10:1 is added iodine. After approximately 0.5 h or the reaction is judged to be finished, the reaction solution is concentrated and acidified by a few drops of 6 N HCl, then loaded on a reverse phase column, and purified with ACN in water. The product fractions are concentrated to yield Compound 12

Example 10

Synthesis of Compound 13
Step 1

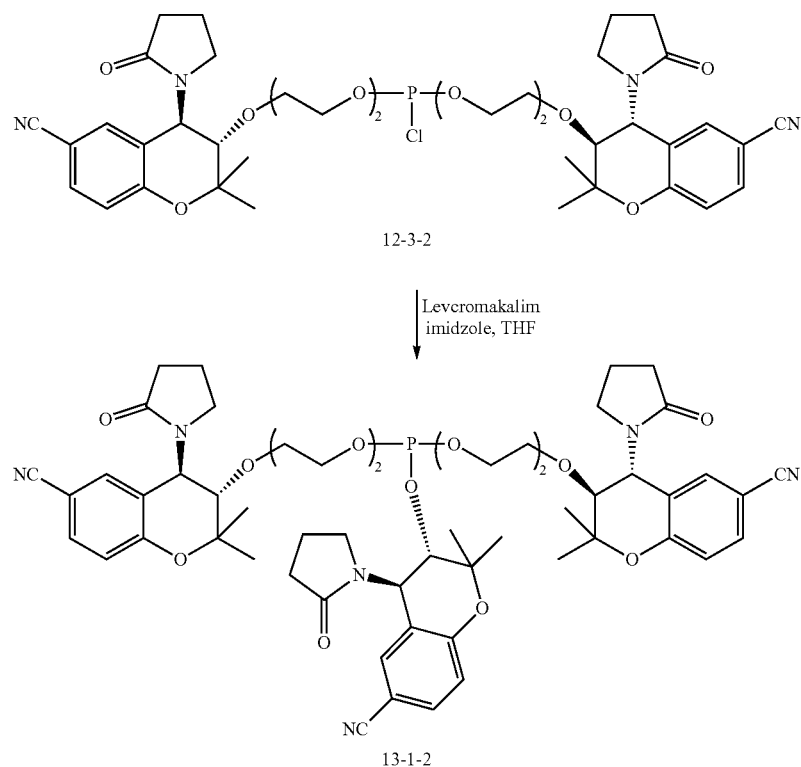

To a suspension of compound 12-3-2 and imidazole in THF is added Levcromakalim. The reaction is stirred at 50° C. overnight. The reaction is concentrated and used directly in the next step without further purification.

Step 2

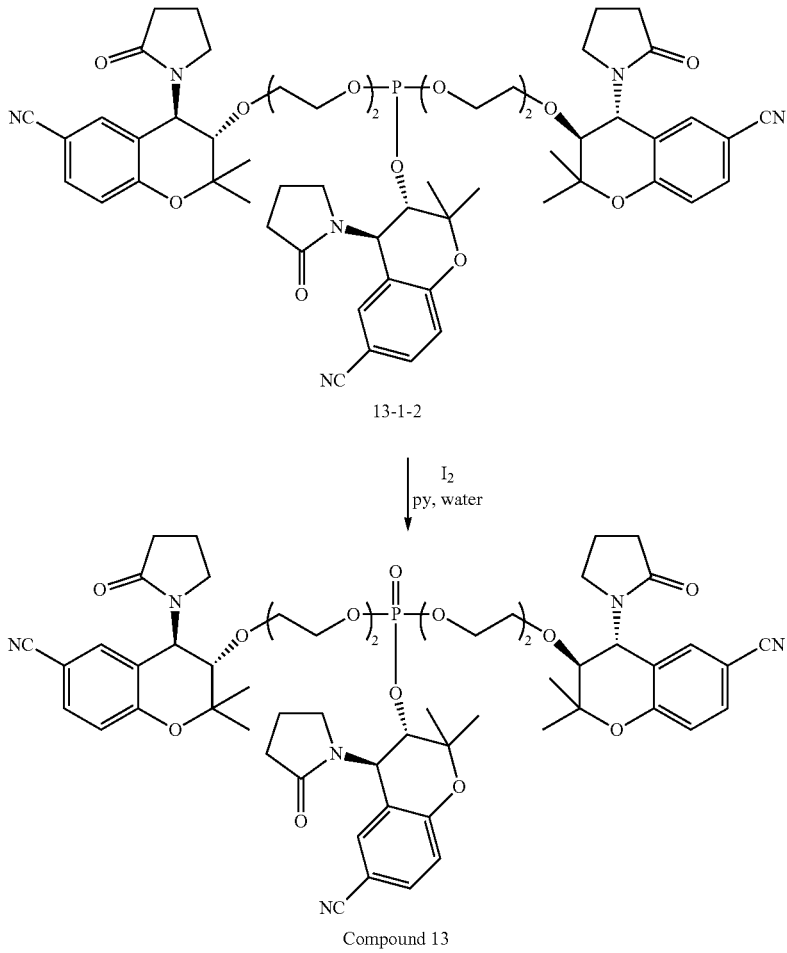

Compound 13

To the crude mixture of Compound 13-1-2 in pyridine/water 10:1 is added iodine. After approximately 0.5 h or the reaction is judged to be finished, the reaction solution is concentrated and acidified by a few drops of 6 N HCl, then loaded on a reverse phase column, and purified with ACN in water. The product fractions are concentrated to yield Compound 13.

Example 11

Synthesis of Compound 14
Step 1

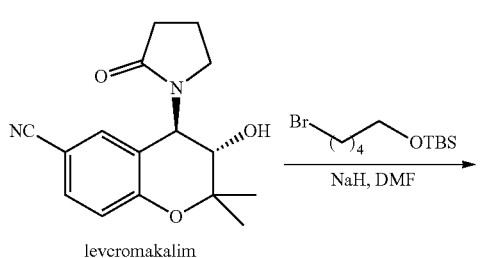

levcromakalim

-continued 14-1-2

Sodium hydride (60% in dispersion in mineral oil) is added to a DMF solution of levcromakalim at room temperature, forming bubbles. After 5 min, sodium iodide is added, then (2-Bromoethoxy)-tert-butyldimethylsilane is added. Upon completion (as monitored by TLC or LCMS, about 30 min), the reaction is diluted by water, and extracted by ethyl acetate. Organic layers are combined, dried and concentrated. The resulting residue is purified by normal phase column with ethyl acetate in hexane. Fractions are concentrated to yield compound 14-1-2.

Step 2

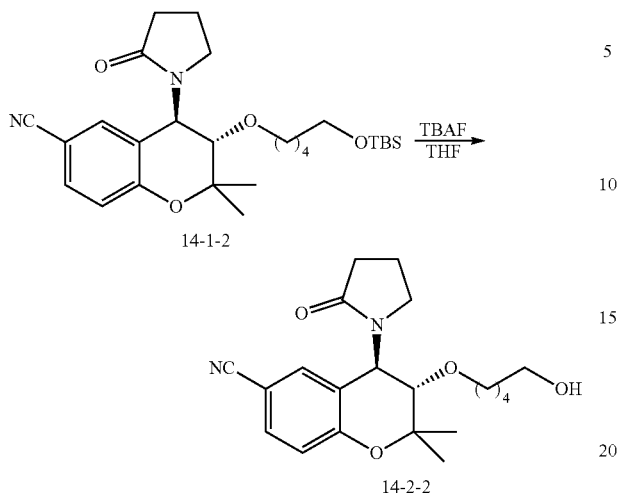

To compound 14-1-2 in THF is added tetrabutylammonium fluoride (1.0 M in THF). Reaction is stirred until judged to be complete. Reaction mixture is concentrated under vacuum and purified with normal phase column with ethyl acetate in hexane to yield compound 14-2-2.

Step 3

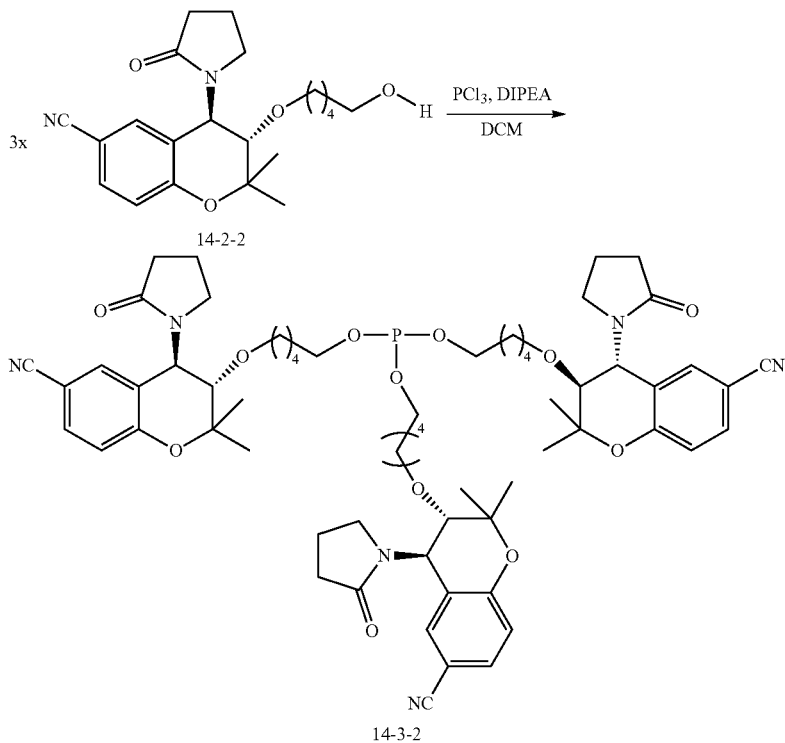

To a suspension of compound 14-2-2 in DCM is added DIPEA. The suspension is slowly added to a solution of $PCl_3$ in DCM. The reaction is stirred at room temperature for 1 hour until the reaction is judged complete. The reaction is then concentrated in vacuo to give the crude mixture, which is dried under high vacuum and used in the next step without further purification.

Step 4

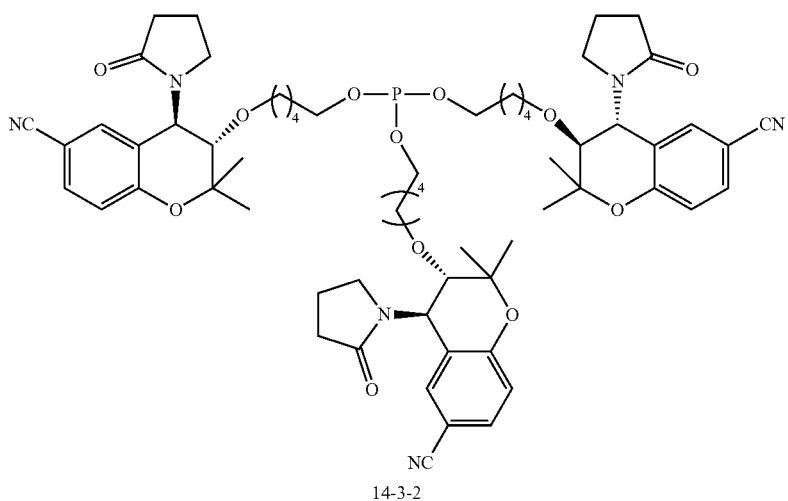
14-3-2

↓ I₂
py, water

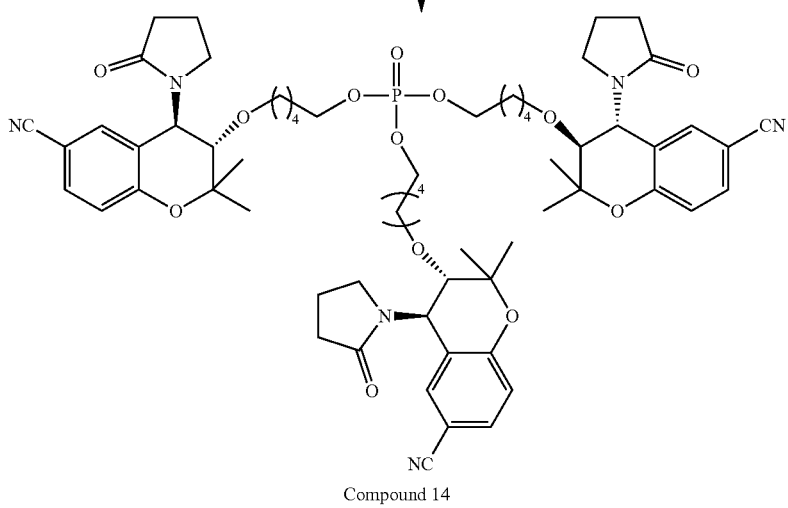
Compound 14

To the crude mixture of Compound 14-3-2 in pyridine/water 10:1 is added iodine. After approximately 0.5 h or the reaction is judged to be finished, the reaction solution is concentrated and acidified by a few drops of 6 N HCl, then loaded on a reverse phase column, and purified with ACN in water. The product fractions are concentrated to yield Compound 14.

Alternatively, the product from Step 2 can be converted to a pharmaceutically acceptable salt:

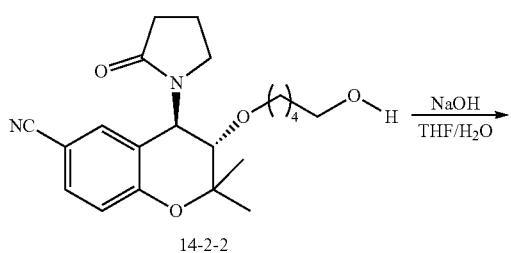
14-2-2

$\xrightarrow{\text{NaOH}}_{\text{THF/H}_2\text{O}}$

-continued

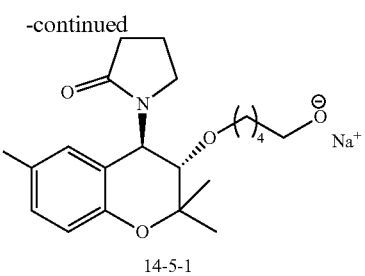
14-5-1

To a 4 dram vial is added Compound 14-2-2 in a 1:1 mixture of THF: H2O. To this solution is added a 0.25 M solution of Sodium Hydroxide. The solution is sonicated, directly freeze dried, and lyophilized to yield Compound 14-5-1 as a solid.

Example 12

Synthesis of Compound 15
Step 1

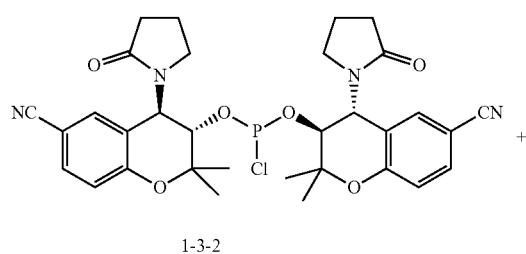

1-3-2

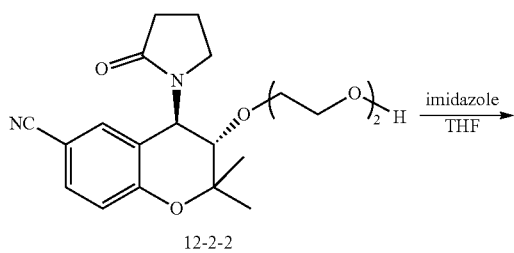

12-2-2

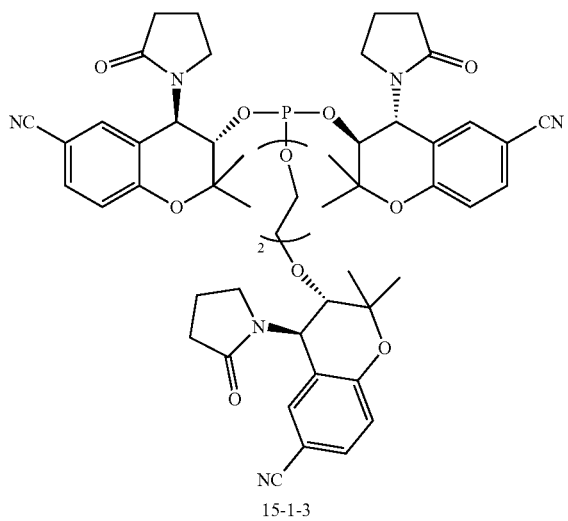

15-1-3

To a suspension of compound 1-3-2 and imidazole in THF is added 12-2-2. The reaction is stirred at 50° C. overnight. The reaction is concentrated and used directly in the next step without further purification.

Step 2

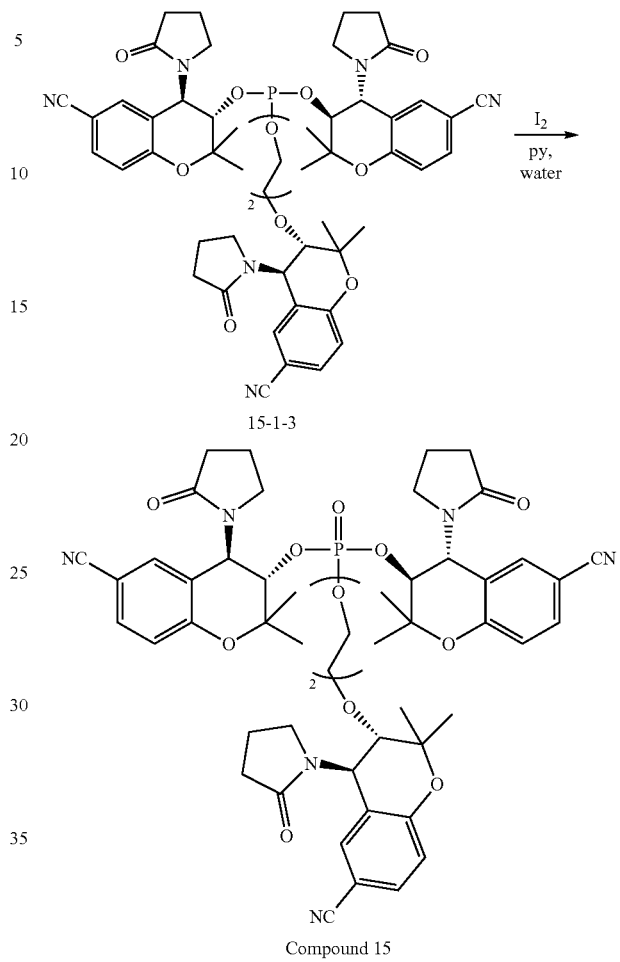

15-1-3

Compound 15

To the crude mixture of Compound 15-1-3 in pyridine/water 10:1 is added iodine. After approximately 0.5 h or the reaction is judged to be finished, the reaction solution is concentrated and acidified by a few drops of 6 N HCl, then loaded on a reverse phase column, and purified with ACN in water. The product fractions are concentrated to yield Compound 15.

Example 13

Synthesis of Compound 16
Step 1

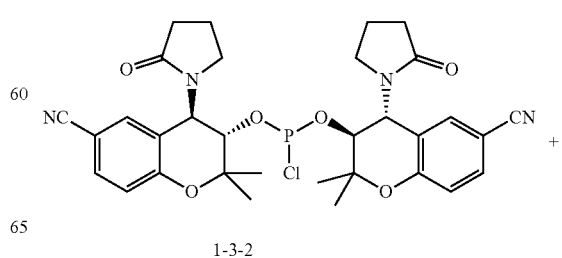

1-3-2

189

-continued

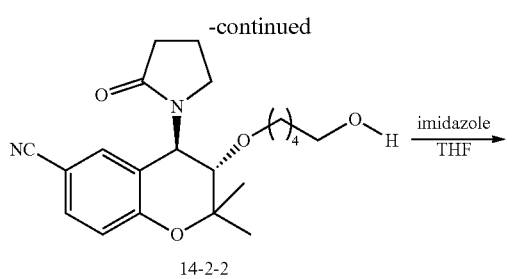

14-2-2 imidazole
THF
→

Step 2

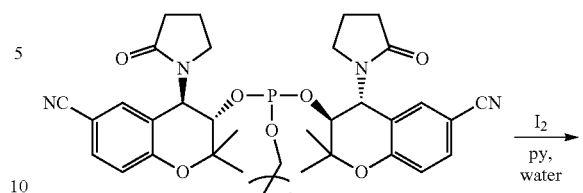

16-1-3

$I_2$
py,
water
→

16-1-3

To a suspension of compound 1-3-2 and imidazole in THF is added 14-2-2. The reaction is stirred at 50° C. overnight. The reaction is concentrated and used directly in the next step without further purification.

190

Compound 16

To the crude mixture of Compound 16-1-3 in pyridine/water 10:1 is added iodine. After approximately 0.5 h or the reaction is judged to be finished, the reaction solution is concentrated and acidified by a few drops of 6 N HCl, then loaded on a reverse phase column, and purified with ACN in water. The product fractions are concentrated to yield Compound 16.

Example 14

Synthesis of Compound 17

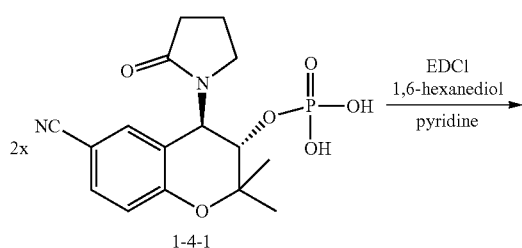

1-4-1

EDCl
1,6-hexanediol
─────────→
pyridine

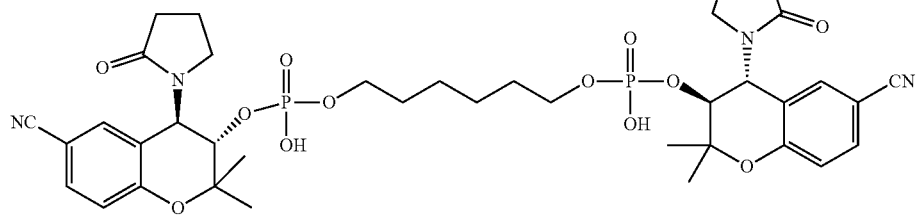

Compound 17

A 5 ml microwave vial was charged with compound 1-4-1 (50 mg, 0.13 mmol, 1 eq.), 1,6-hexanediol (8.0 mg, 0.07 mmol, 0.5 eq.), and 1-Ethyl-3-(3-dimethylaminopropyl) carbodiimide hydrochloride (EDCI) (30 mg, 0.15 mmol, 1.1 eq.). Pyridine (3 mL) was added to the mixture and the vial was sealed. The reaction was stirred at room temperature for 16 h. Reaction was determined to be complete by HPLC analysis. The crude reaction mixture was diluted with diethyl ether (5 mL) and upon standing a film was formed. Decanted diethyl ether, washed the residue with diethyl ether (5 mL), decanted, dissolved residue in ethanol, added 10 drops of 2M HCl in diethyl ether, and evaporated to dryness to afford an amber film (56 mg, 77%). 1H NMR (MeOD): δ 1.22 (4H, tt, J=7.5, 7.0 Hz), 1.31 (6H, s), 1.57 (4H, tt, 7.5, 7.0 Hz), 1.66 (6H, s), 2.06-2.14 (4H, m), 2.51-2.57 (4H, m), 3.55-3.63 (4H, m), 4.12 (4H, m), 4.66 (2H, d, J=7.9 Hz), 5.36 (2H, J=7.9 Hz), 6.96 (2H, dd, J=8.4), 7.35 (2H, s), 7.58 (2H, dd, J=8.4, 1.9 Hz).

Example 15

Synthesis of Compound 18

A 5 ml microwave vial was charged with compound 1-4-1 (50 mg, 0.13 mmol, 1 eq.), triethylene glycol (10.2 mg, 0.07 mmol, 0.5 eq.), and 1-Ethyl-3-(3-dimethylaminopropyl) carbodiimide hydrochloride (29 mg, 0.15 mmol, 1.1 eq.). Pyridine (0.5 mL) was added to the mixture and the vial sealed. The reaction was stirred at room temperature for 16 h. Reaction was determined to be complete by HPLC analysis. The crude reaction mixture was evaporated to dryness to afford an amber film. A few drops of 2N HCl in diethyl ether were added followed by 1 ml of ethyl acetate. The mixture was then filtered through a 0.45 μm PTFE syringe filter and evaporated to yield an amber film (22 mg, 37%). 1H NMR (MeOD): δ 1.31 (6H, s), 1.52 (6H, s), 2.12-2.16 (4H, m), 2.54-2.60 (4H, m), 3.52-3.66 (12H, m), 4.22 (4H, m), 4.72 (2H, d, J=7.9 Hz), 5.38 (2H, J=7.9 Hz), 6.98 (2H, dd, J=8.4), 7.37 (2H, s), 7.54 (2H, dd, J=8.4, 1.9 Hz).

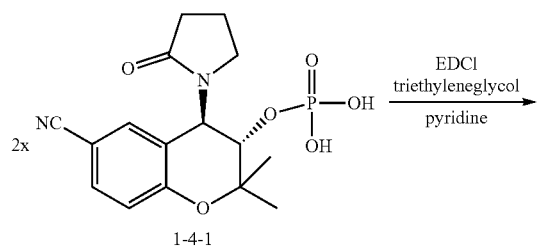

1-4-1

EDCI
triethyleneglycol
⎯⎯⎯⎯⎯⎯→
pyridine

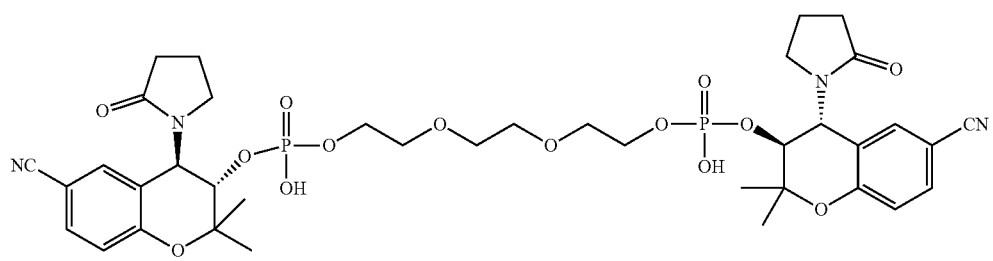

Compound 18

Example 16

Synthesis of Compound 19

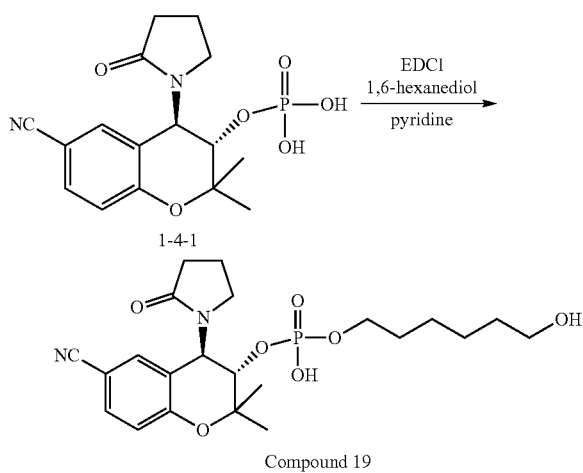

A microwave vial was charged with compound 1-4-1 (50 mg, 0.13 mmol, 1 eq.), 1,6-hexanediol (34 mg, 0.29 mmol, 2.1 eq.), and 1-Ethyl-3-(3-dimethylaminopropyl) carbodiimide hydrochloride (131 mg, 0.68 mmol, 5 eq.). Pyridine (0.5 mL) was added to the mixture and the vial sealed. The reaction was stirred at room temperature for 16 h. Reaction was determined to be complete by HPLC analysis. The crude reaction mixture was evaporated to dryness to afford an amber residue (66 mg). The crude material was diluted with 0.5 mL of 1 N HCl, extracted with ethyl acetate (1 mL), the layers were separated, and the organic layer was evaporated to dryness to afford a slight yellow film (23 mg, 38%). 1H NMR (MeOD): δ 1.27 (4H, m), 1.37 (3H, s), 1.57 (4H, m), 1.60 (3H, s), 2.06-2.14 (2H, m), 2.51-2.57 (2H, m), 3.55-3.63 (4H, m), 4.12 (2H, m), 4.66 (1H, d, J=7.9 Hz), 5.36 (1H, d, J=7.9 Hz), 6.96 (1H, dd, J=8.4), 7.35 (1H, s), 7.58 (1H, dd, J=8.4, 1.9 Hz).

Example 17

Synthesis of Compound 20

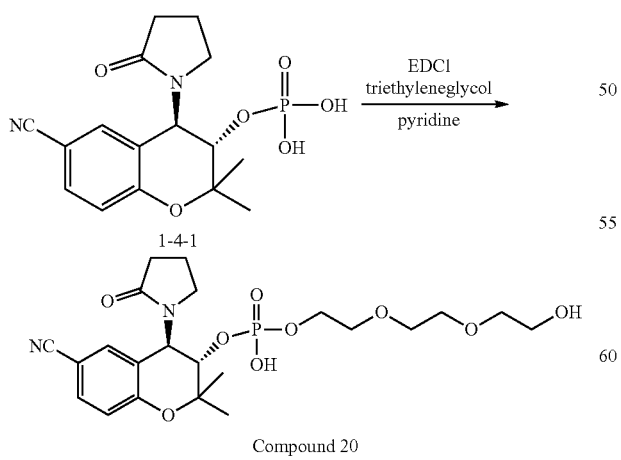

A microwave vial was charged with compound 1-4-1 (50 mg, 0.13 mmol, 1 eq.), triethylene glycol (43 mg, 0.29 mmol, 2.1 eq.), and 1-Ethyl-3-(3-dimethylaminopropyl) carbodiimide hydrochloride (131 mg, 0.68 mmol, 5 eq.). Pyridine (0.5 mL) was added to the mixture and the vial sealed. The reaction was stirred at room temperature for 16 h. Reaction was determined to be complete by HPLC analysis. The crude reaction mixture was evaporated to dryness to afford an amber residue (64 mg). The crude material was diluted with 0.5 mL of 1 N HCl, extracted with ethyl acetate (1 mL), the layers were separated, and the organic layer was evaporated to dryness to afford a slight yellow film (7 mg, 10%). 1H NMR (MeOD): δ 1.32 (3H, s), 1.58 (3H, s), 2.03-2.10 (2H, m), 2.52-2.58 (2H, m), 3.48-3.52 (2H, m), 3.68-3.74 (10H, m), 4.34 (2H, m), 4.75 (1H, d, J=7.9 Hz), 5.30 (1H, d, J=7.9 Hz), 6.97 (1H, dd, J=8.4), 7.38 (1H, s), 7.54 (1H, dd, J=8.4, 1.9 Hz).

Example 18

Synthesis of Compound 21

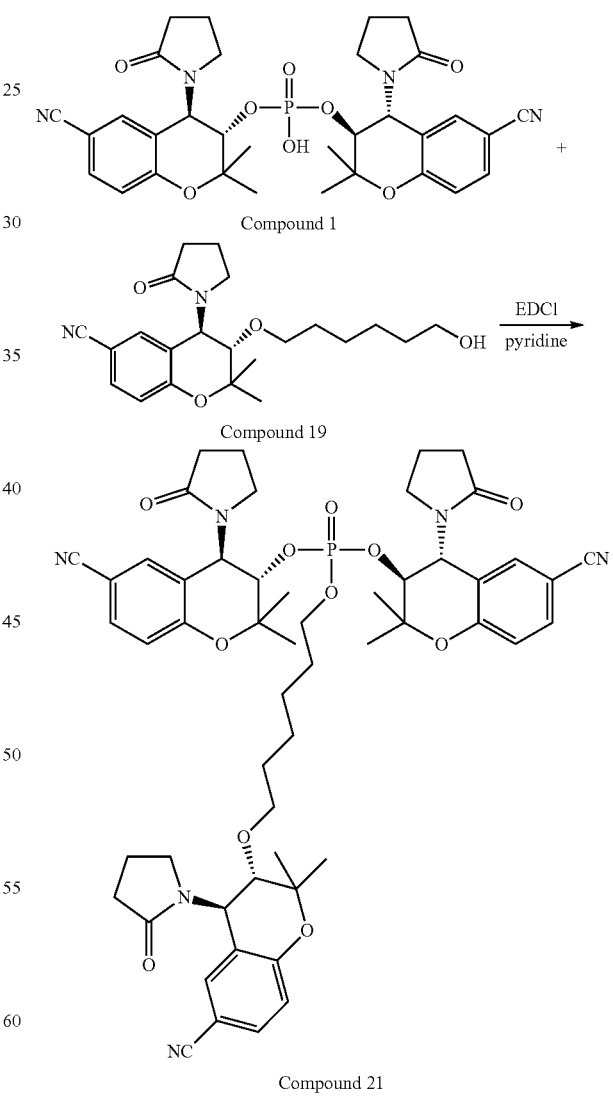

Compound 1, Compound 19, and EDCI are added to pyridine in a reaction tube. The reaction is allowed to stir for 48 hours at room temperature. When the reaction is determined to be complete by HPLC analysis, the crude reaction mixture is evaporated to dryness. The crude material is diluted with 1 N HCl, extracted with ethyl acetate, the layers are separated, and the organic layer is evaporated to dryness to afford Compound 21.

This specification has been described with reference to embodiments of the invention. However, one of ordinary skill in the art appreciates that various modifications and changes can be made without departing from the scope of the invention as set forth herein. Accordingly, the specification is to be regarded in an illustrative rather than a restrictive sense, and all such modifications are intended to be included within the scope of invention.

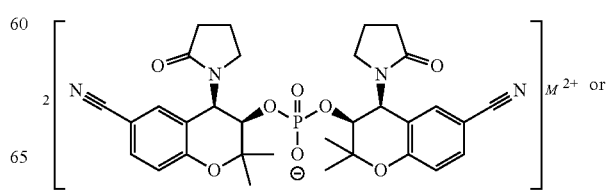

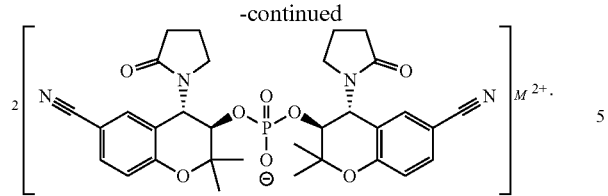
19. The compound of claim 13 of the structure:
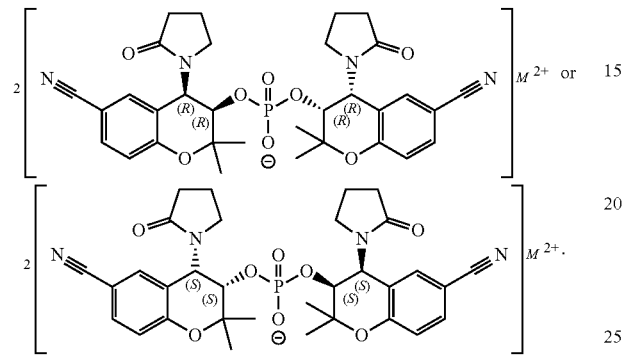

We claim:

1. A compound of the formula:

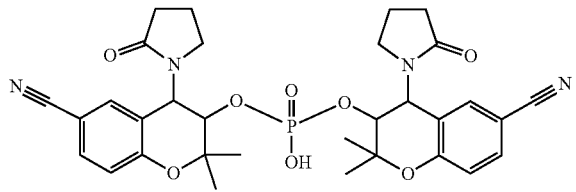 [SMILES: CC1(C)Oc2ccc(C#N)cc2C(N2CCCC2=O)C1OP(=O)(O)OC1C(N2CCCC2=O)c2cc(C#N)ccc2OC1(C)C]

or a pharmaceutically acceptable salt thereof.

2. The compound of claim 1 of the formula

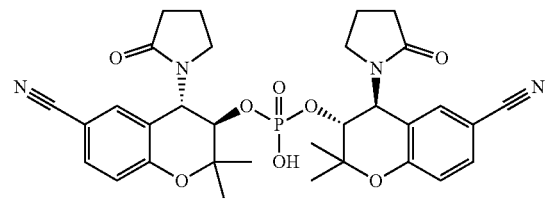 [SMILES: CC1(C)Oc2ccc(C#N)cc2[C@H](N2CCCC2=O)[C@H]1OP(=O)(O)O[C@@H]1[C@@H](N2CCCC2=O)c2cc(C#N)ccc2OC1(C)C]

or a pharmaceutically acceptable salt thereof.

3. The compound of claim 1 of the formula

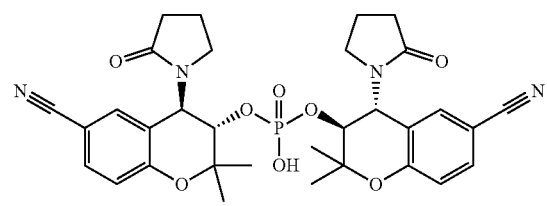 [SMILES: CC1(C)Oc2ccc(C#N)cc2[C@@H](N2CCCC2=O)[C@@H]1OP(=O)(O)O[C@H]1[C@H](N2CCCC2=O)c2cc(C#N)ccc2OC1(C)C]

or a pharmaceutically acceptable salt thereof.

4. The compound of claim 1 of the formula

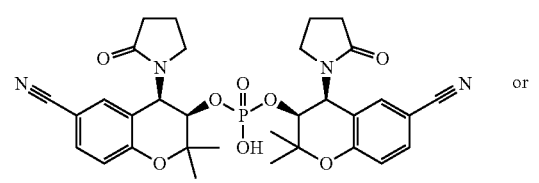

or

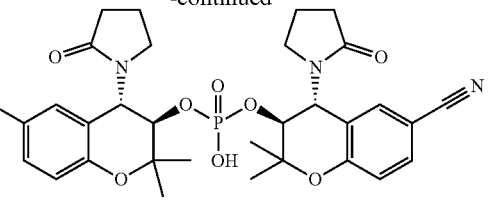

or a pharmaceutically acceptable salt thereof.

5. The compound of claim 1 of the formula

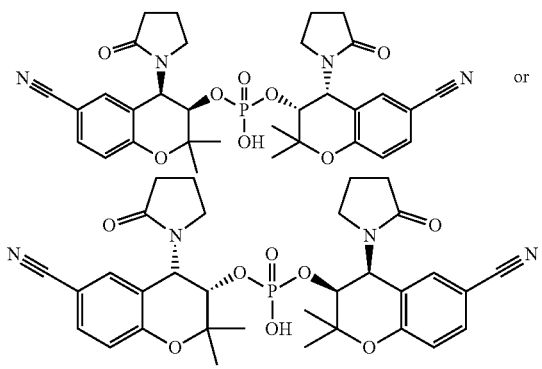

or a pharmaceutically acceptable salt thereof.

6. A compound of Formula I:

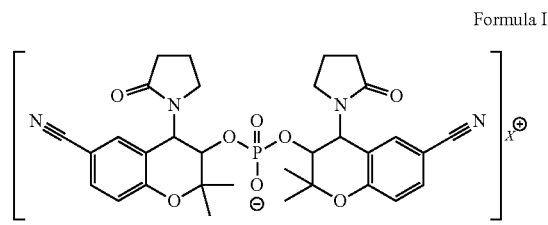

Formula I wherein $X^+$ is a counterbalancing, pharmaceutically acceptable cation, which is selected from the group consisting of an alkali metal cation and an ammonium ion.

7. The compound of claim 6 wherein $X^+$ is $Na^+$, $K^+$, $Li^+$ or $Cs^+$.

8. The compound of claim 6 wherein $X^+$ is selected from the group consisting of:

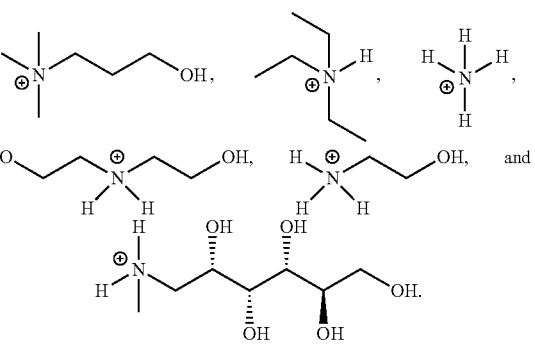

9. The compound of claim 6 of the structure:

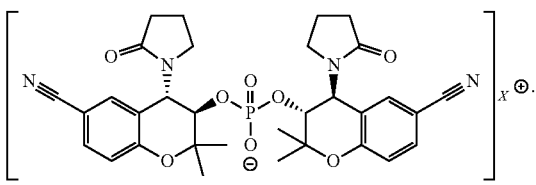

10. The compound of claim 6 of the structure:

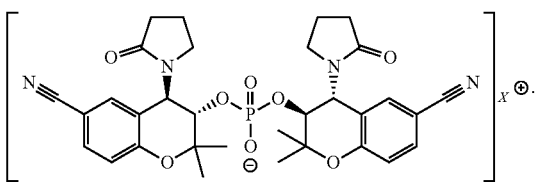

11. The compound of claim 6 of the structure:

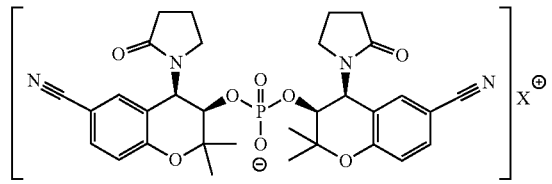

12. The compound of claim 6 of the structure:

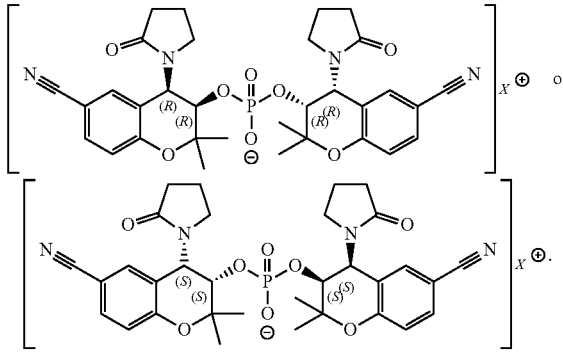

13. A compound of Formula II:

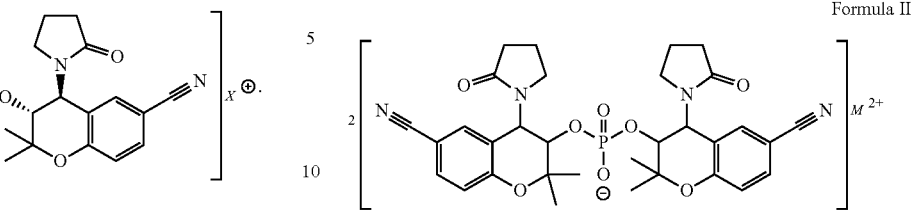

wherein $M^{2+}$ is a divalent pharmaceutically acceptable cation selected from the group consisting of an alkaline earth metal cation, a metal cation with an oxidation state of +2, and an ammonium ion with a net positive charge of two.

14. The compound of claim 13 wherein $M^{2+}$ is $Mg^{2+}$, $Ca^{2+}$, $Sr^{2+}$, $Zn^{2+}$, or $Fe^{2+}$.

15. The compound of claim 13 wherein $M^{2+}$ is selected from the group consisting of

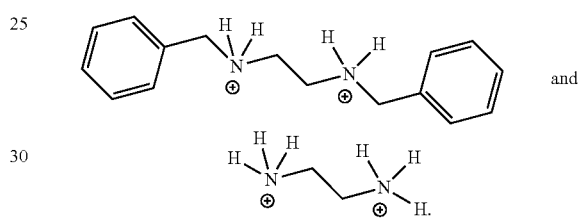

16. The compound of claim 13 of the structure:

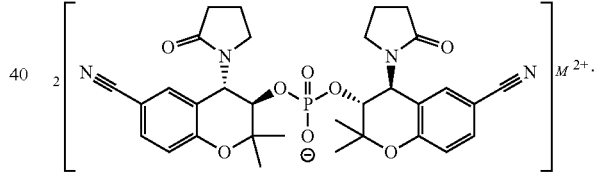

17. The compound of claim 13 of the structure:

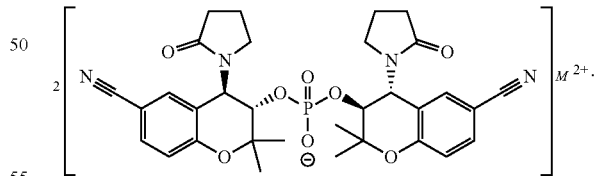

18. The compound of claim 13 of the structure: